United States Patent [19]
Hyatt

[11] Patent Number: 5,584,032
[45] Date of Patent: Dec. 10, 1996

[54] KERNEL PROCESSOR SYSTEM

[76] Inventor: Gilbert P. Hyatt, P.O. Box 846, Cypress, Calif. 90630

[21] Appl. No.: 34,627

[22] Filed: Mar. 22, 1993

Related U.S. Application Data

[63] Continuation of Ser. No. 815,644, Dec. 30, 1991, abandoned, which is a continuation of Ser. No. 662,211, Oct. 18, 1984, abandoned, which is a continuation-in-part of Ser. No. 661,649, Oct. 17, 1984, abandoned.

[51] Int. Cl.⁶ .......................................... G06F 3/14
[52] U.S. Cl. .................... 395/800; 364/DIG. 1; 364/DIG. 2; 364/237.2; 364/238.6; 364/239; 364/239.1; 364/239.3; 364/243
[58] Field of Search ............... 364/DIG. 1 MS File, 364/DIG. 2 MS File; 395/400, 425, 375, 800, 100, 116, 118, 126, 127, 128, 129, 132, 401, 405

[56] References Cited

U.S. PATENT DOCUMENTS

| | | | |
|---|---|---|---|
| 3,588,840 | 6/1971 | Nomura et al. | 364/900 |
| 3,909,839 | 9/1975 | Inaba et al. . | |
| 4,056,851 | 11/1977 | Hovagimyan et al. | 364/900 |
| 4,148,073 | 4/1979 | Slobodzian et al. | 358/240 |
| 4,168,532 | 9/1979 | Dempsey | 364/900 |
| 4,259,719 | 3/1981 | Edelman et al. | 364/200 |
| 4,275,457 | 6/1981 | Leighou et al. | 364/900 |
| 4,314,355 | 2/1982 | Leighou et al. | 364/900 |
| 4,322,844 | 3/1982 | Fellinger et al. | 370/84 |
| 4,394,774 | 7/1983 | Widergren et al. | 382/56 |
| 4,412,230 | 10/1983 | Goldberg | 345/27 |
| 4,423,482 | 12/1983 | Hargrove et al. | 364/200 |
| 4,425,616 | 1/1984 | Woodell | 364/200 |
| 4,426,712 | 1/1984 | Gorski-Popiel | 375/96 |
| 4,453,248 | 6/1984 | Ryan | 371/11 |
| 4,468,688 | 8/1984 | Gabriel et al. . | |
| 4,491,915 | 1/1985 | Forquer et al. | 364/200 |
| 4,494,194 | 1/1985 | Harris et al. | 364/200 |
| 4,496,976 | 1/1985 | Swanson et al. | 345/201 |
| 4,543,611 | 9/1985 | Kurahayashi | 358/260 |
| 4,596,026 | 6/1986 | Cease et al. | 375/118 |
| 4,672,369 | 6/1987 | Preiss et al. | 345/138 |
| 4,692,894 | 9/1987 | Bemis | 364/900 |
| 4,703,486 | 10/1987 | Bemis | 371/41 |

*Primary Examiner*—Robert B. Harrell
*Attorney, Agent, or Firm*—Gilbert P. Hyatt

[57] ABSTRACT

A kernel processor system having a buffer memory, a kernel memory, and a kernel processor provides improved kernel processing capability. The disclosed arrangement comprises an input circuit generating input information; a buffer memory storing buffered information; a write address circuit generating write addresses; a buffer memory write access circuit writing buffered information into the buffer memory in response to the input information and in response to the write addresses; a read address circuit generating read addresses; a buffer memory read access circuit generating buffered output information in response to the buffered information and in response to the read addresses; a kernel memory storing a kernel of information in response to the buffered output information; a kernel processor generating filtered output information in response to the kernel of information; and a display monitor displaying a filtered image in response to the filtered output information.

44 Claims, 41 Drawing Sheets

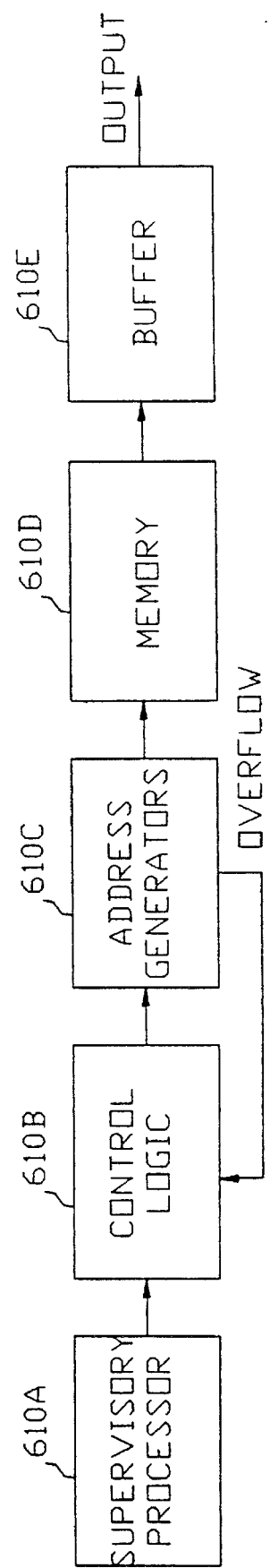

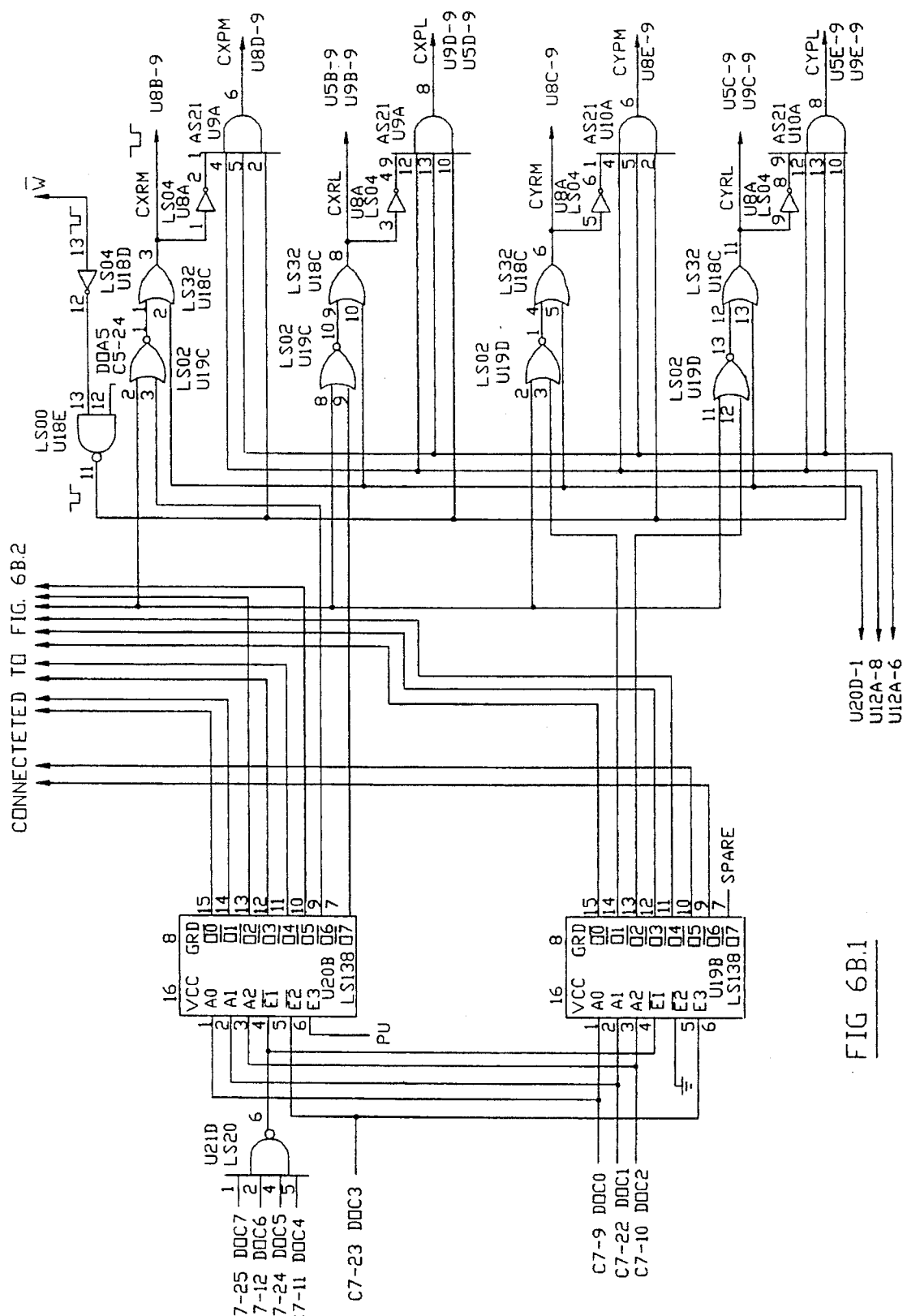
FIG 6B.1

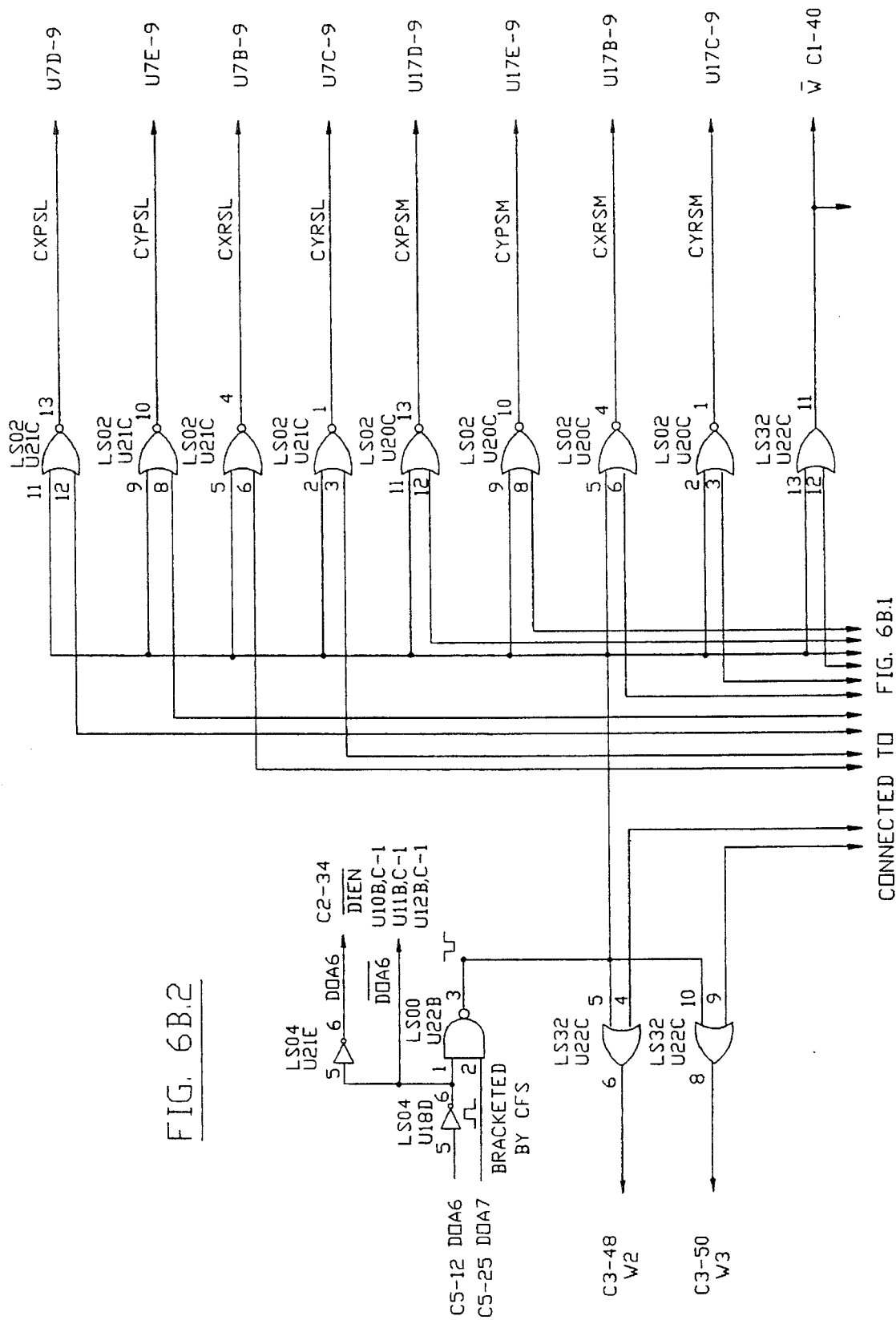

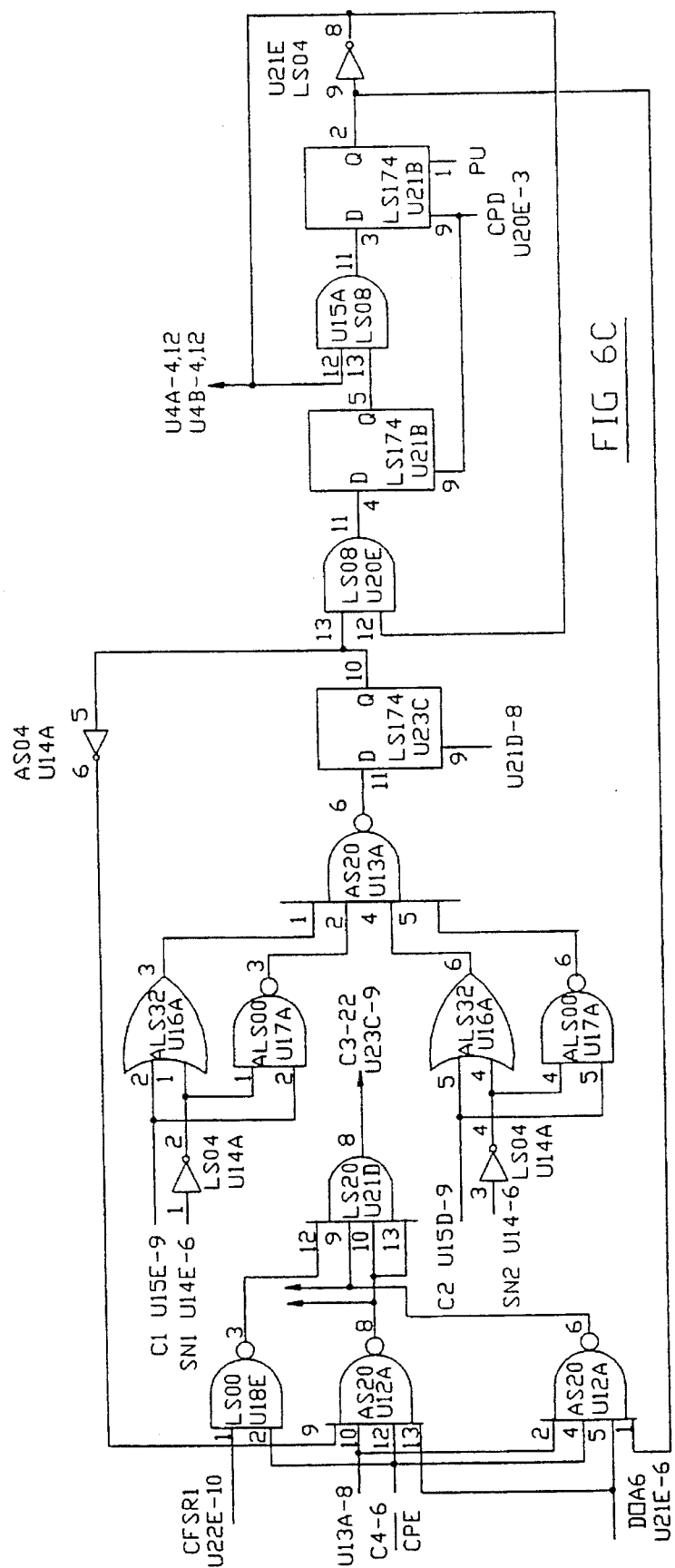

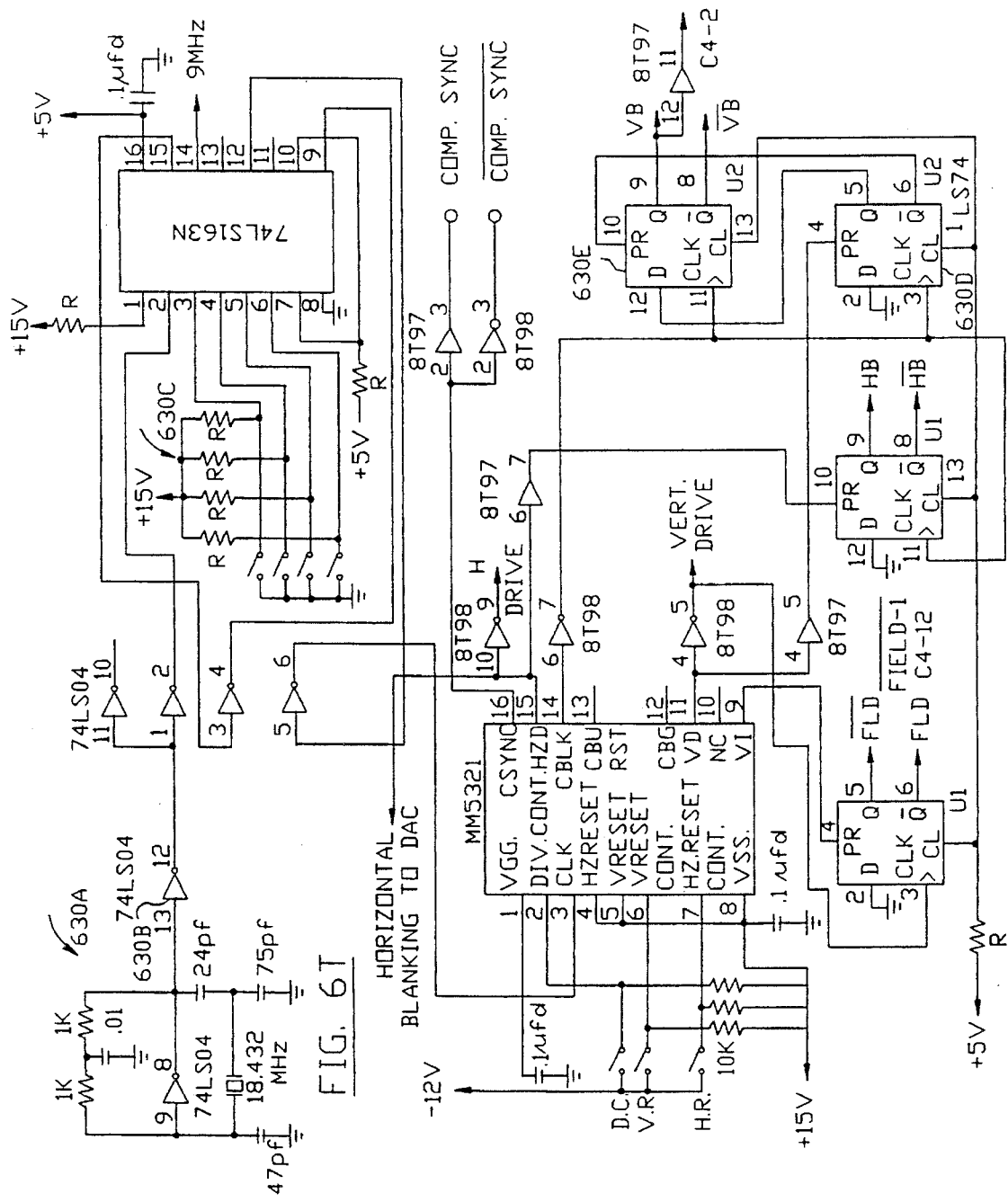

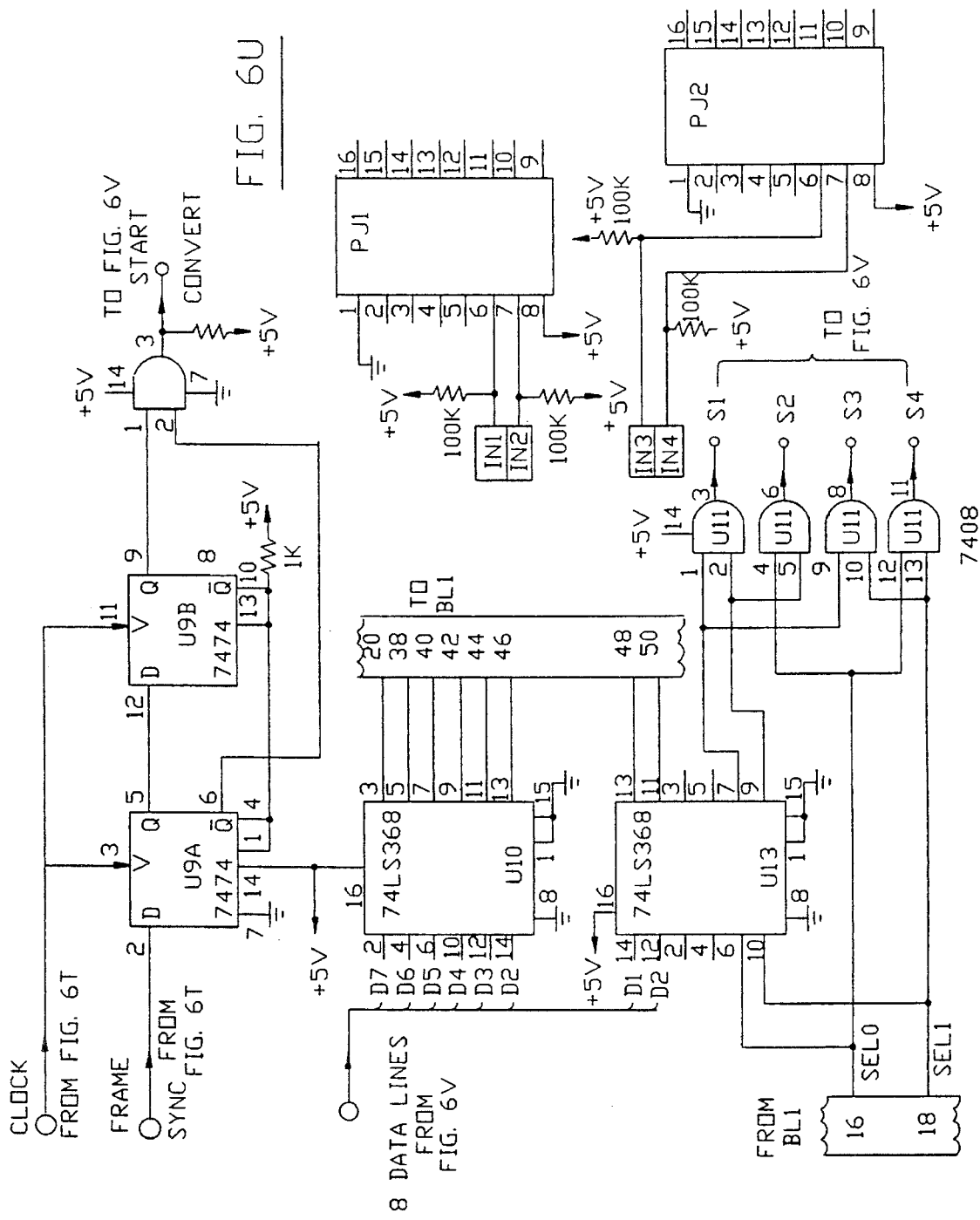

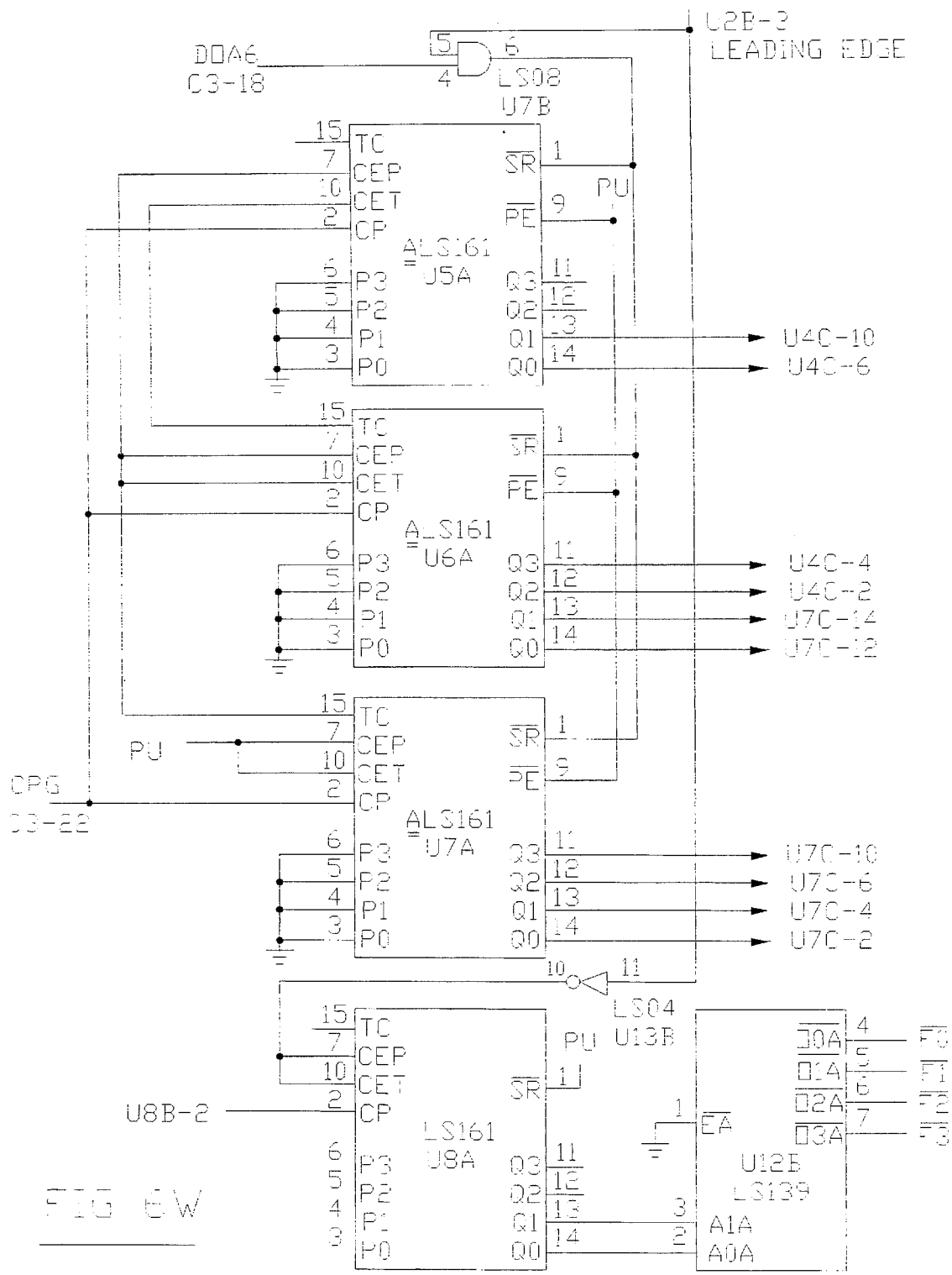

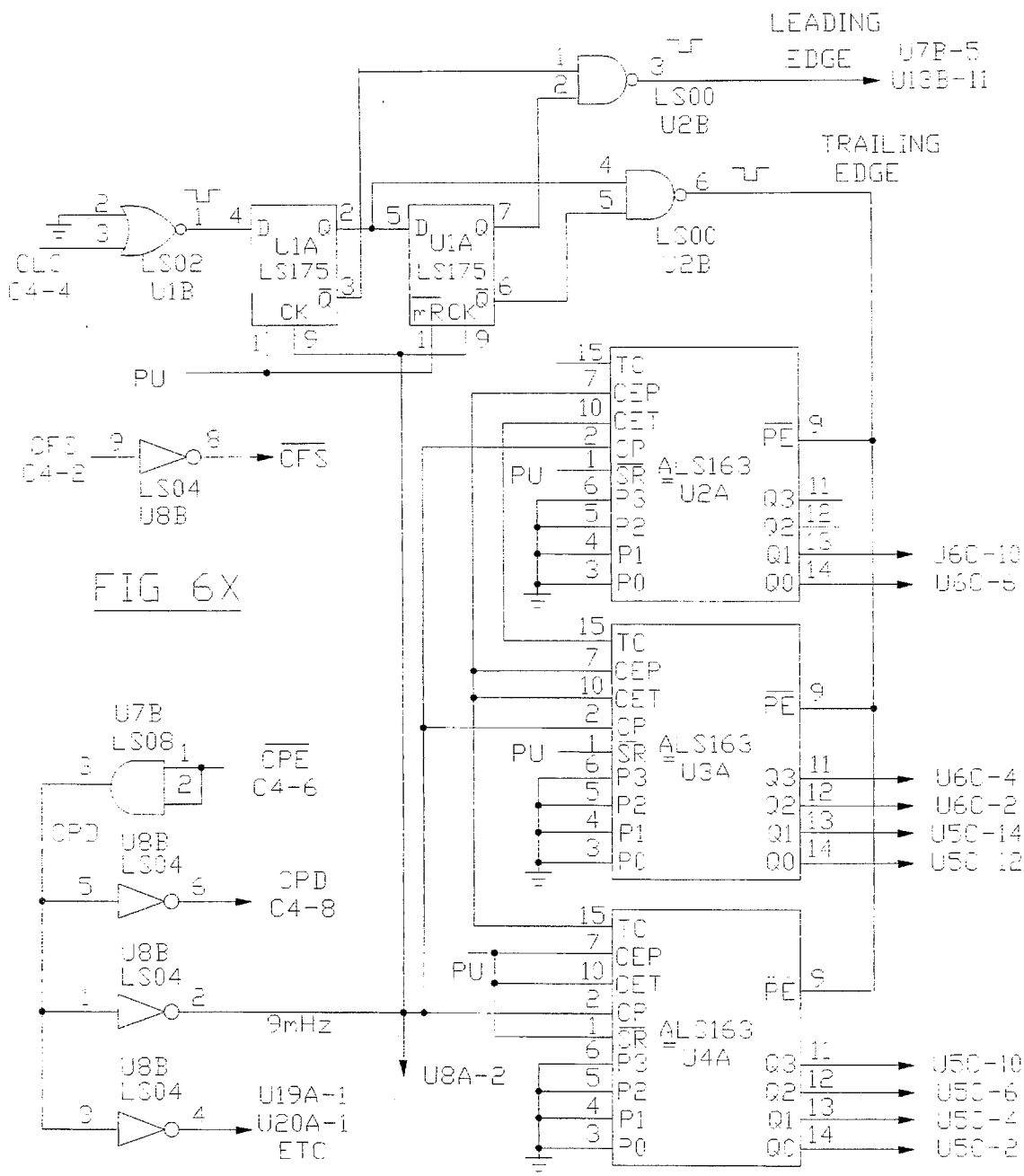

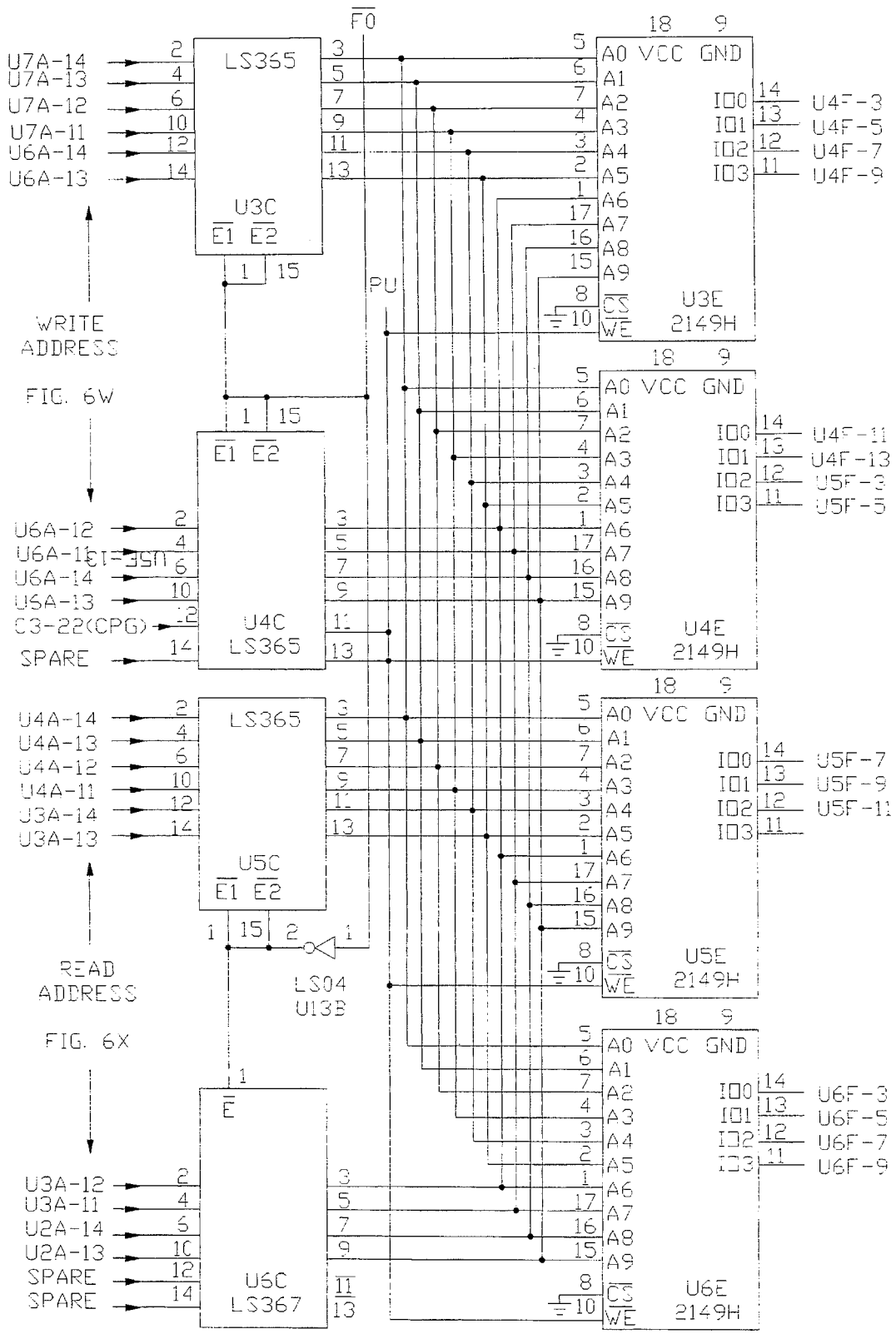
FIG. 6Y    BUFFER-1

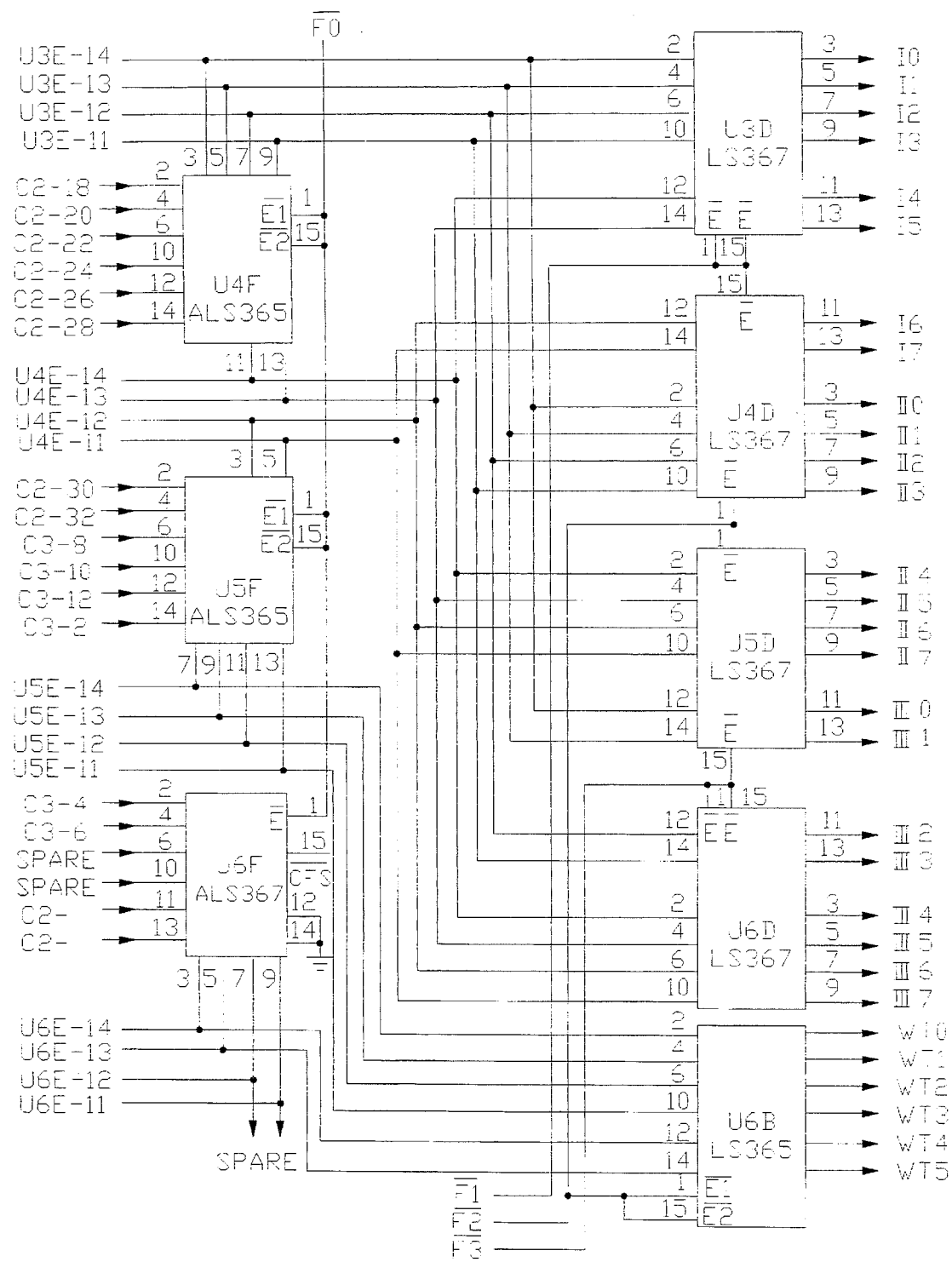
FIG. 6Z  BUFFER 1

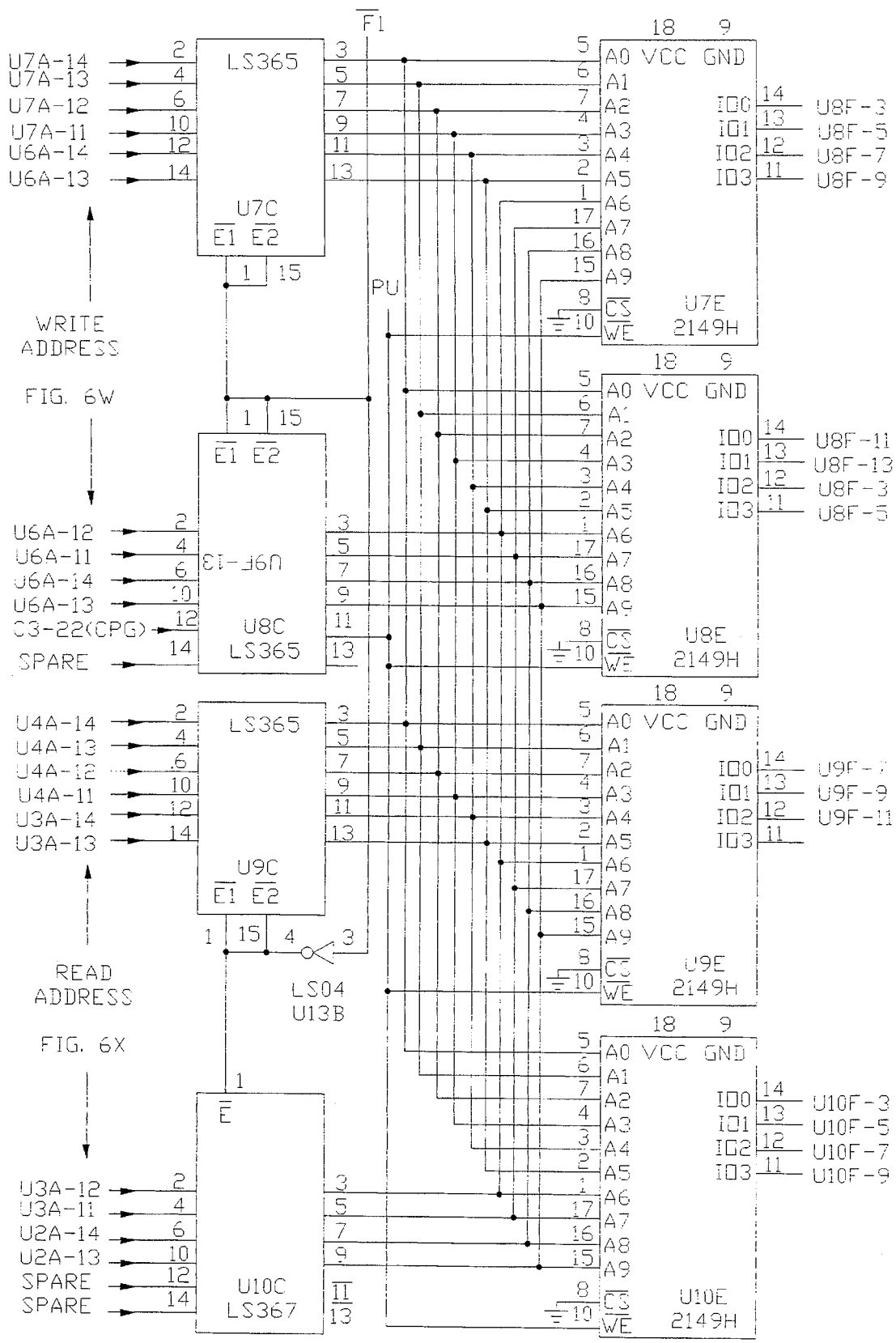
FIG. 6AA  BUFFER-2

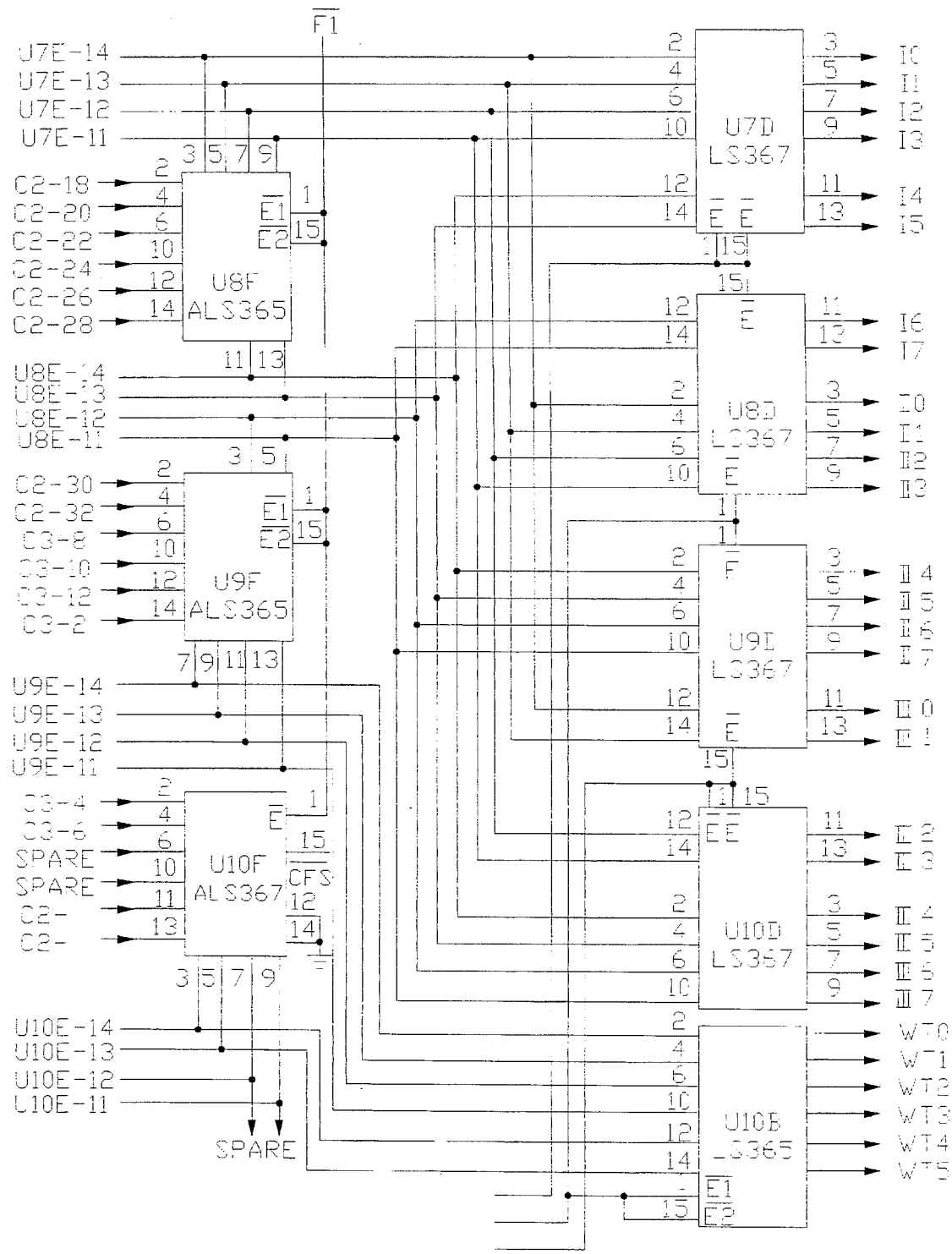
FIG. 6AB BUFFER 2

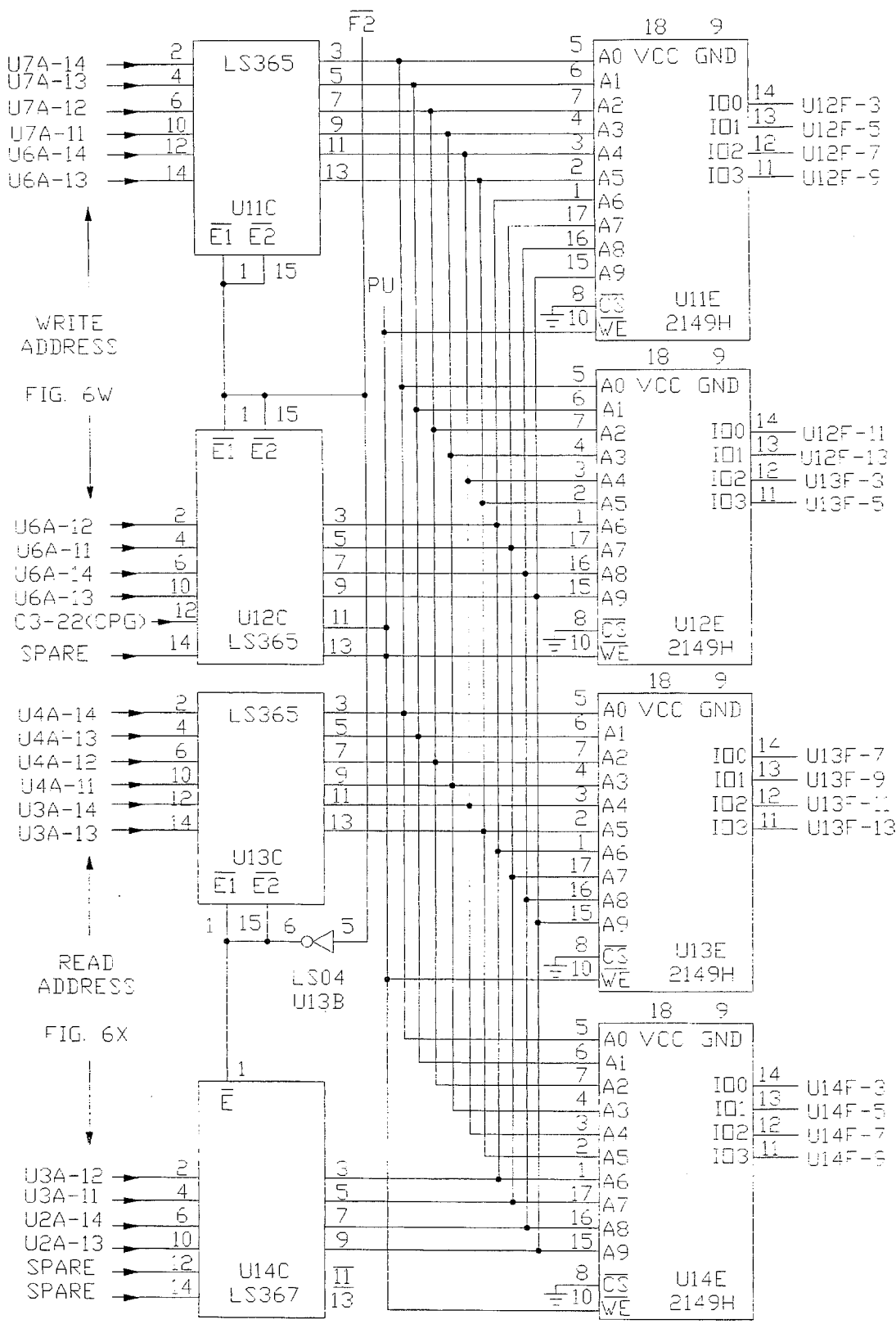
FIG. 6AC   BUFFER 3

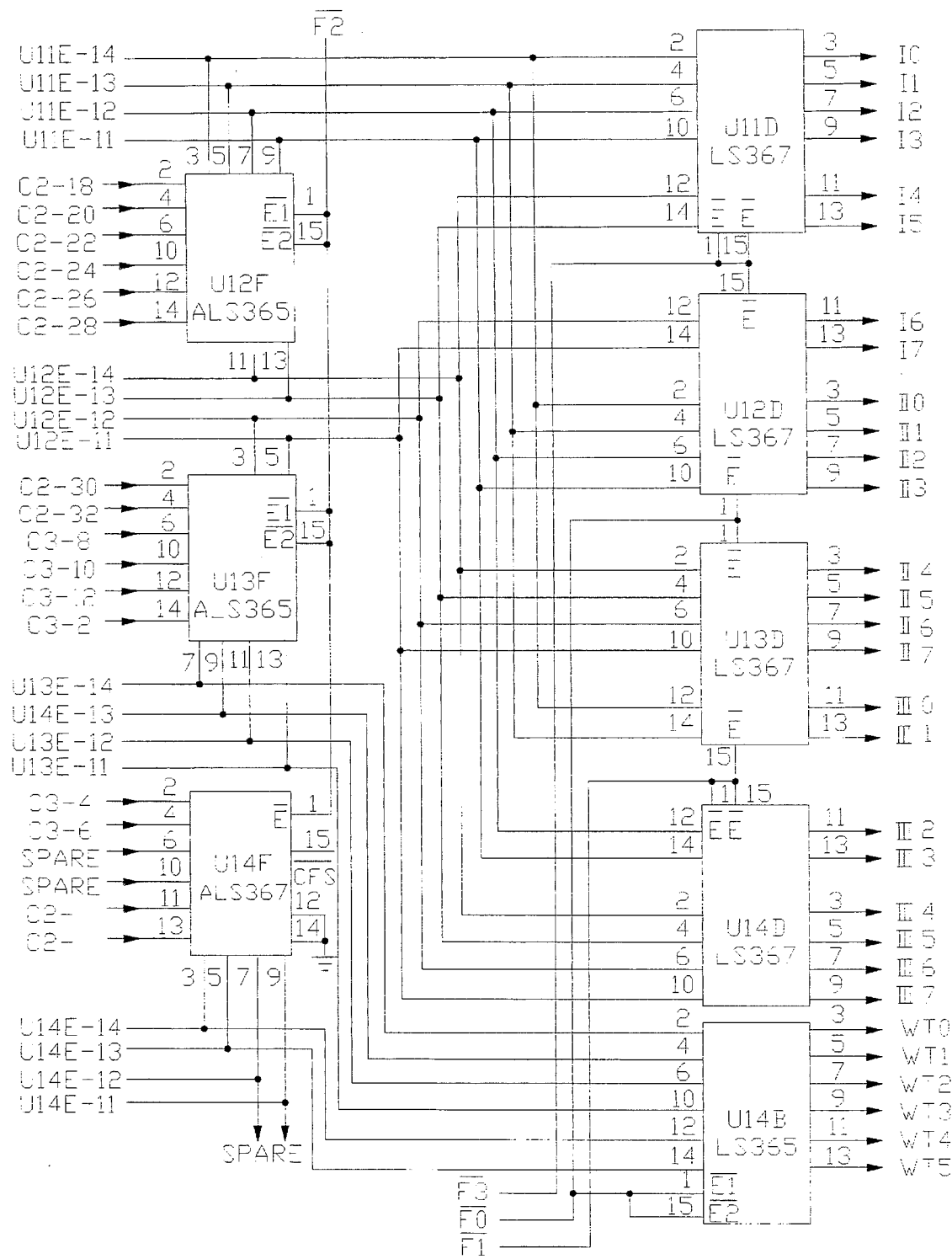
FIG. 6AD BUFFER 3

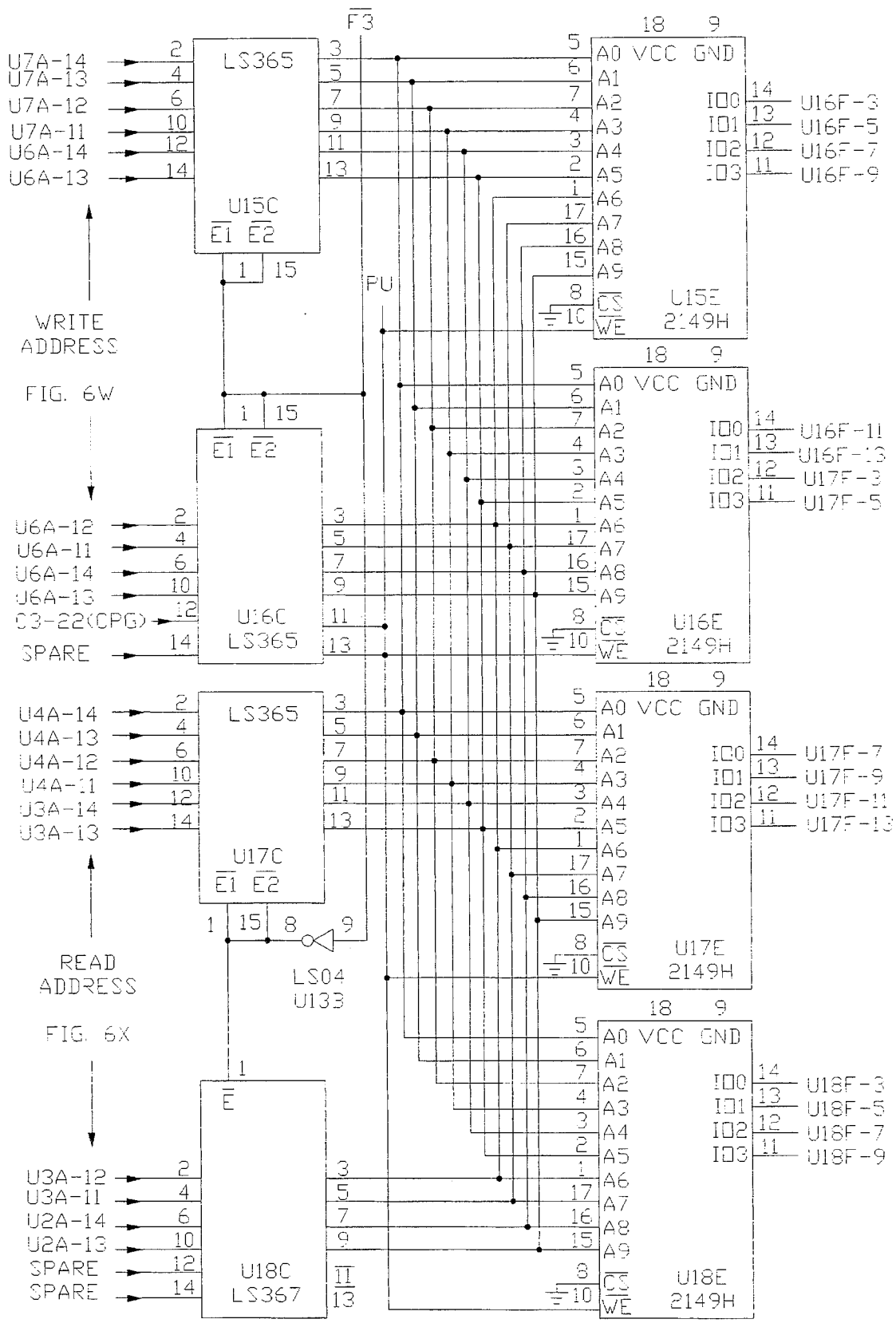
FIG. 6AE  BUFFER 4

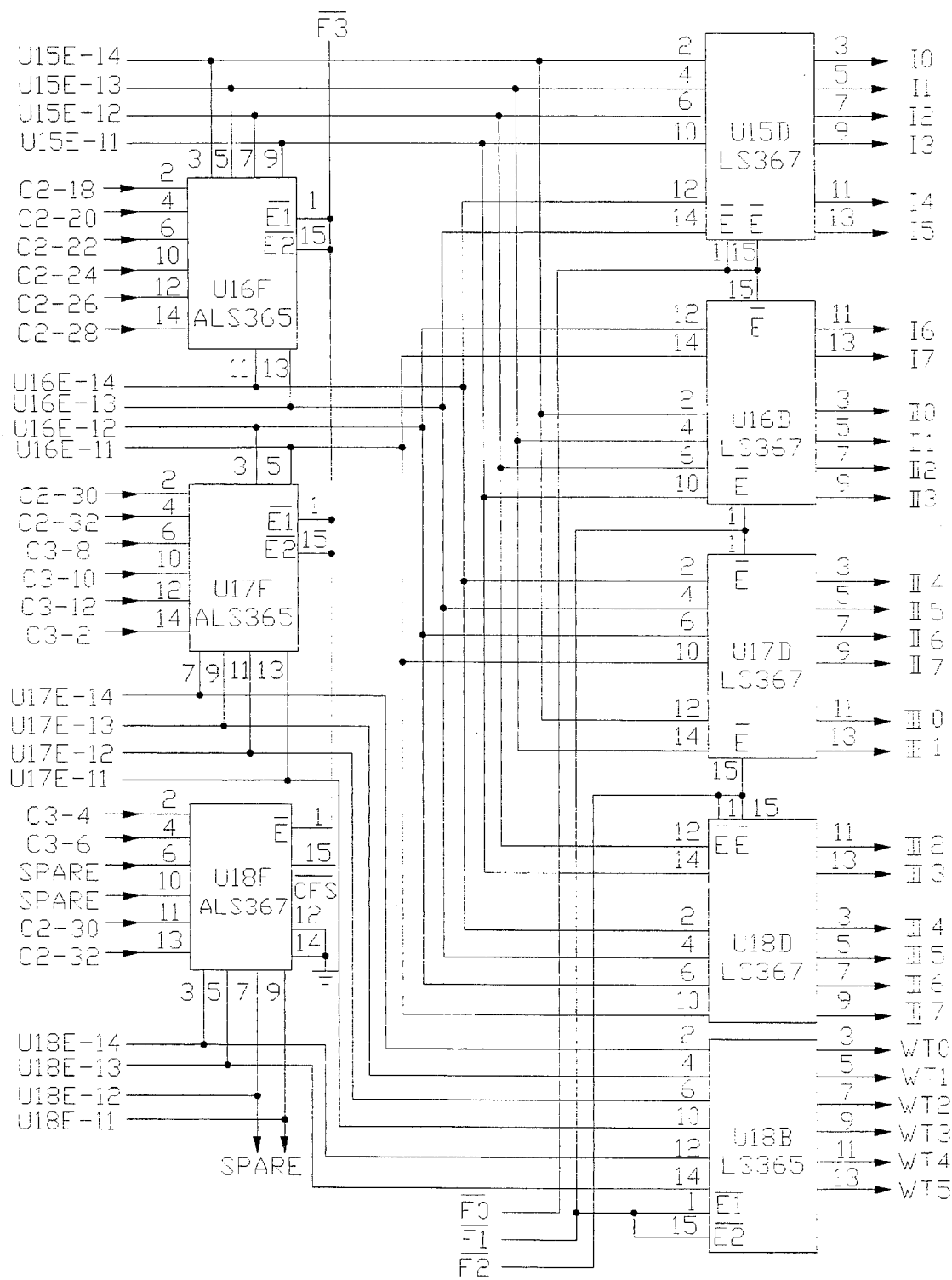
FIG. 6AF  BUFFER 4

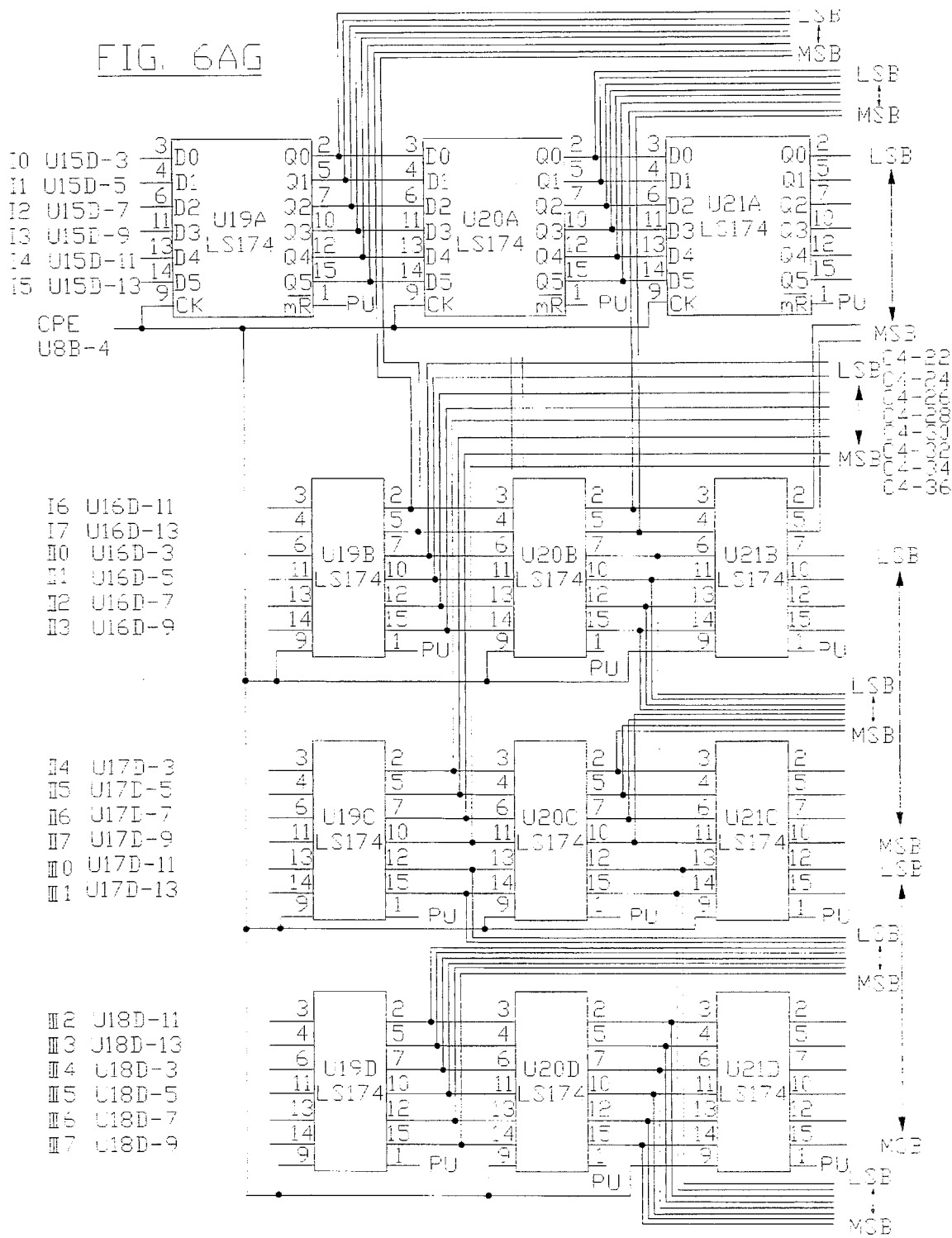

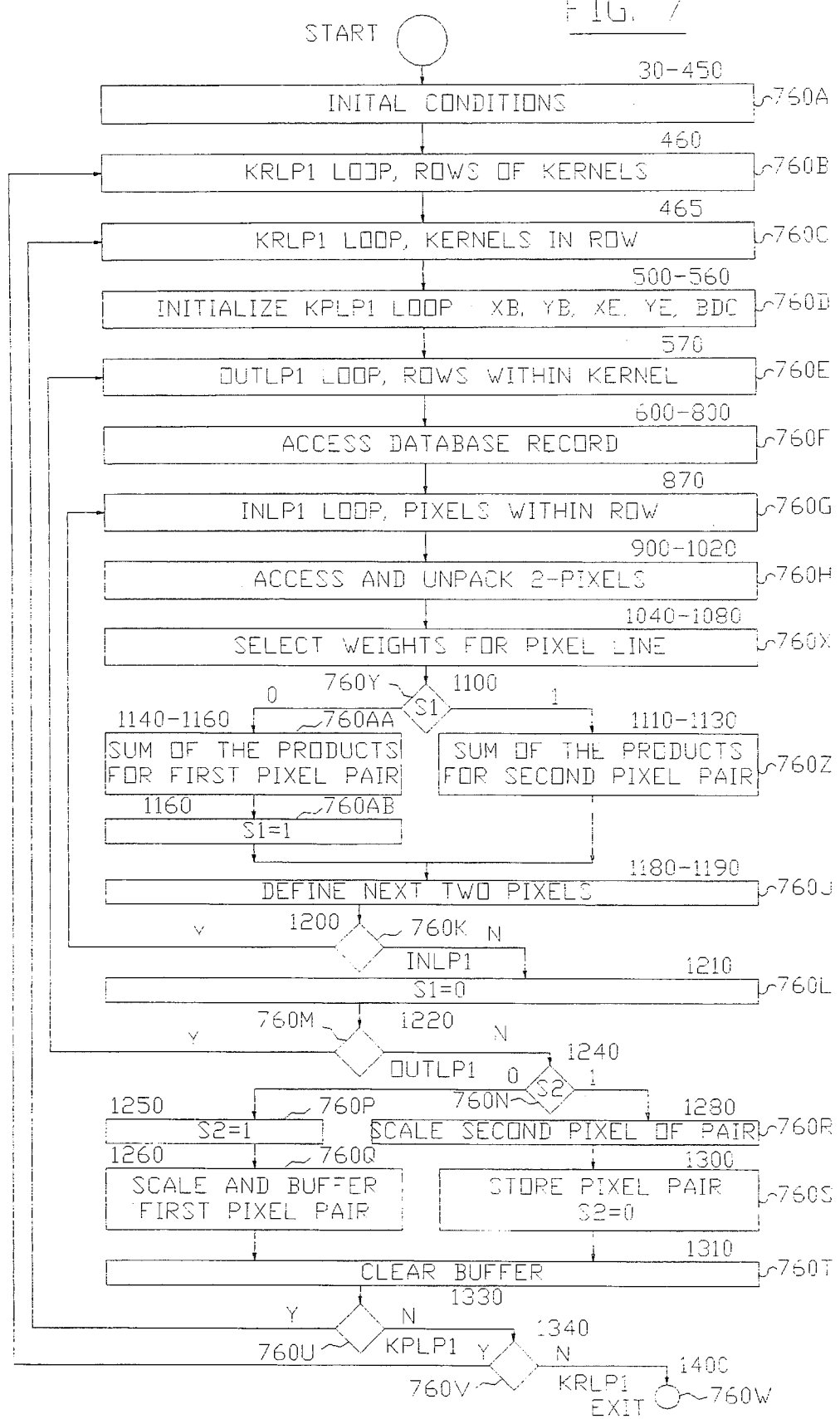

KERNEL PROCESSOR SYSTEM

CROSS-REFERENCE TO RELATED APPLICATIONS

The instant application is a file wrapper continuation of prior application Ser. No. 07/815,644 filed on Dec. 30, 1991 entitled A BUFFER MEMORY SYSTEM by Gilbert P. Hyatt and now abandoned in favor of the instant file wrapper continuation;

which application Ser. No. 07/815,644 is a file wrapper continuation of prior application Ser. No. 06/662,211 filed on Oct. 18, 1984 entitled A BUFFER MEMORY SYSTEM by Gilbert P. Hyatt and now abandoned in favor of the file wrapper continuation Ser. No. 07/815,644;

which application Ser. No. 06/662,211 is a continuation in part of prior application Ser. No. 06/661,649 filed on Oct. 17, 1984 entitled IMPROVED MEMORY ARCHITECTURE HAVING MULTI-DIMENSIONAL ADDRESSING by Gilbert P. Hyatt and now abandoned in favor of continuing applications;

wherein the benefit of the filing dates of application Ser. No. 07/815,644; application Ser. No. 06/662,211; and application Ser. No. 06/661,649 are claimed in accordance with 35 USC 120 and other authorities therefore.

BACKGROUND OF THE INVENTION

1. Field of the Invention

The field of the present invention is memory systems and, in particular, integrated circuit RAMs for digital systems.

2. Prior Art

The prior art in memory systems includes integrated circuit, core, bubble, CCD, and other types of memory systems. The most pertinent prior art is integrated circuit RAM systems. The prior art provides RAMs having tristate control for memory data lines to permit bussing of memory data lines and to facilitate bi-directional communication to the RAM for reading and writing of information from the bus. The prior art provides double buffer memories which require double the memory capacity of single buffer memories.

The prior art is further represented by the art of record herein.

SUMMARY OF THE INVENTION

The present invention is generally directed to improved memory architecture. Speed improvement is obtained by a combination of addressing the memory at a relatively low rate and scanning information out of the memory at a relatively high rate. This may be characterized as a multi-dimensional memory architecture, where the addressing logic forms a first dimension and the scanout logic forms a second dimension. This speed improvement can be implemented by using the memory tristate control logic for data scanout operations in conjunction with addressing logic to provide both, re-addressing and scanout of memory data. Additional speed improvement is obtained by a multiple buffer arrangement for storing information and for processing this information with a multiple processing of the same information in different relationships, such as with a spatial filter.

BRIEF DESCRIPTION OF THE DRAWINGS

A better understanding of the present invention may be obtained from a consideration of the detailed description hereinafter taken in conjunction with the drawings, which are briefly described below.

FIG. 5, comprises FIG. 5A is a block diagram representation of a spatial filter arrangement; FIG. 5B is a block diagram representation of a sum-of-the-products arrangement that can be used with the arrangement of FIG. 5A; FIG. 5C is a block diagram of a 3-channel sum-of-the-products arrangement; and FIG. 5D is a block diagram of a multiple channel buffer memory.

FIG. 6, comprises FIGS. 6A, 6B, 6C, 6D, 6E, 6F, 6G, 6H, 6I, 6J, 6K, 6L, 6M, 6N, 6O, 6P, 6Q, 6R, 6S, 6T, 6U, 6V, 6W, 6X, 6Y, 6Z, 6AA, 6AB, 6AC, 6AD, 6AE, 6AF, 6AG and 6AH: where FIG. 6B (comprising FIG. 6B.1 and FIG. 6B.2) is a detailed schematic diagram of clock steering logic; FIG. 6C is a detailed schematic diagram of clock gating logic; FIGS. 6G to 6J are detailed block diagram representations in accordance with the memory of FIG. 6E; FIGS. 6O and 6P are detailed schematic diagram representations of one configuration of an address generator that can be used in the system of the present invention; FIG. 6T is a detailed schematic diagram representation of a video synchronization pulse generator and clock pulse generator; FIG. 6U is a detailed schematic diagram representation of joystick interface logic; FIG. 6W is a detailed schematic diagram representation of an address counter arrangement for loading a multiple buffer memory and related logic; FIG. 6X is a detailed schematic diagram representation of an address counter arrangement for unloading a multiple buffer memory and related logic; FIG. 6Y is a detailed schematic diagram representation of a first channel address multiplexer and RAM arrangement for a multiple channel buffer memory; FIG. 6Z is a detailed schematic diagram representation of a first channel RAM input/output multiplexer arrangement for a multiple channel buffer memory; FIG. 6AA is a detailed schematic diagram representation of a second channel address multiplexer and RAM arrangement for a multiple channel buffer memory; FIG. 6AB is a detailed schematic diagram representation of a second channel RAM input/output multiplexer arrangement for a multiple channel buffer memory; FIG. 6AC is a detailed schematic diagram representation of a third channel address multiplexer and RAM arrangement for a multiple channel buffer memory; FIG. 6AD is a detailed schematic diagram representation of a third channel RAM input/output multiplexer arrangement for a multiple channel buffer memory; FIG. 6AE is a detailed schematic diagram representation of a forth channel address multiplexer and RAM arrangement for a multiple channel buffer memory; FIG. 6AF is a detailed schematic diagram representation of a forth channel RAM input/output multiplexer arrangement for a multiple channel buffer memory; FIG. 6AG is a detailed schematic diagram representation of a 9-pixel kernel register arrangement for spatial processing; FIG. 6AH is a detailed schematic diagram representation of a weight RAM arrangement for spatial processing.

FIG. 7 is a detailed flow diagram representation of the BASIC PROGRAM LISTING FTR.ASC for filtering images.

Figure 1:
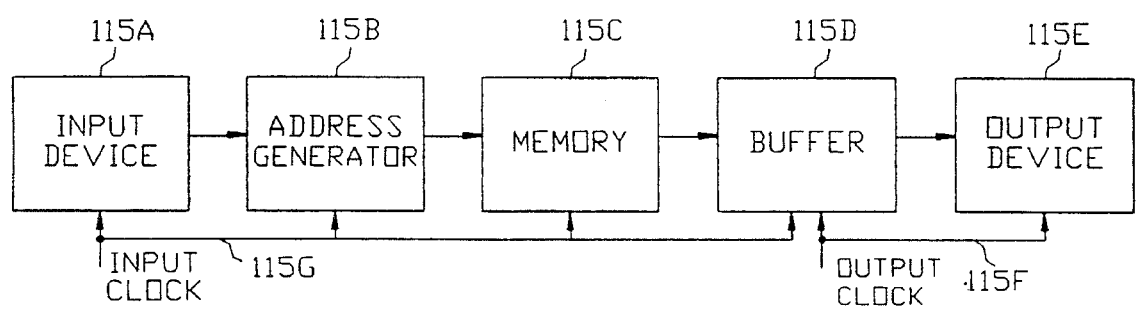
FIG. 1 is a block diagram representation of an arrangement for implementing the system of the present invention.

To facilitate disclosure of the illustrated embodiments, the components shown in FIGS. 1 to 7 of the drawings have been assigned reference numerals and a description of such components is given in the following detailed description. The components in the figures have in general been assigned reference numerals, where the hundreds digit of each reference numerals corresponds to the figure number. For example, the components in FIG. 1 had reference numerals between 100 and 199 and the components in FIG. 2 have reference numerals between 200 and 299, except that a component appearing in successive drawing figures has maintained the first reference numeral.

GRAPHICS PROCESSOR

A graphics processor architecture can be implemented with a address generator and control logic generating graphics vectors for storing into image memory. Image memory can then be scanned out, such as in a raster scan form to refresh a display. In one configuration, graphics vectors can be written into image memory on an offline basis and can be used to refresh the display on an online basis. Alternately, graphics vectors can be written into image memory on an online basis time shared with refreshing of the display on an online basis.

One arrangement of the graphics system of the present invention is shown in FIG. 1. Supervisory processor 115A loads graphics commands into address generators 115B. Address generators 115B generate addresses of graphics vectors for loading into image memory 115C and for raster scanning image memory 115C. The raster scan addresses scan-out the image in image memory 115C through the CRT interface 115D to refresh CRT 115E.

An experimental system has been constructed to demonstrate operation of the graphics display capability. The arrangement shown in FIG. 1 has been implemented in hardware for refreshing the display in real time. A program, such as the BASIC PROGRAM LISTING GRAPH.ASC, can be used to control that experimental hardware for refreshing the display. In this experimental system, the graphics vectors are loaded in an offline manner with the LD.ASC Basic program set forth in the BASIC PROGRAM LISTING LD.ASC herein; emulating hardware loading of graphics vectors in an online manner. In this experimental system, graphics operation is initiated each frame with supervisory processor 115A and hardware refresh is performed with address generators 115B and image memory 115C.

In a hardware configuration, graphics vector generation can be performed in real time using the software emulated vector generation capability implemented in hardware form. In one hardware configuration, graphic vectors can be generated cotemporaneously with refresh, such as with one set of address generators (i.e., the XR-address generator and the YR-address generator shown in FIGS. 6Q and 6R) generating graphics vectors into image memory while a second set of address generators (i.e., the XP-address generator and the YP-address generator shown in FIGS. 6O and 6P) are generating the raster scan addresses for scanning-out image memory for display. In this configuration, image memory can be implemented as a dual-ported image memory for simultaneously loading vectors into image memory and scanning-out image memory. In an alternate hardware configuration, graphic vectors can be generated and loaded into image memory during the vertical sync pulse period when the raster scan is blanked; time sharing the logic and memory between raster scanout and graphics generation. In this configuration, during the vertical sync period, the address generators can generate graphic vector addresses for loading the graphic vectors into image memory and, after the vertical sync period, the address generators can generate the raster scan addresses for scanning-out image memory for display.

The address generators can be used to generate graphic vectors and windows. For example, the LD.ASC program set forth in the BASIC PROGRAM LISTING LD.ASC herein has been used to load graphic vectors into image memory. This is achieved by using the address generators to generate the addresses of a vector and by strobing the color intensity of the vector into image memory.

Periods of time exist when the address generators are in a stand-by condition. For example, in a configuration where the address generators are scanning-out image memory to refresh a display; the address generators may not be used during the vertical blanking period and therefore may be available for graphic generation. Also, in a configuration where the address generators are not used during the horizontal blanking period, the address generators and therefore may be available for graphic generation during the horizontal blanking period. For example, a vertical blanking period of 1-millisecond will permit the address generators to draw about 5,000-graphic vector pixels operating at a 5-MHz pixel rate. Consequently, a meaningful number of graphic vector pixels can be generated during standby periods, permitting time sharing of the address generators for both, scanning-out an image to refresh a display and graphic vector generation.

A vector memory can be implemented to store parameters associated with the vectors to be generated. Vector memory can be loaded from various sources, such as from the supervisory processor that initializes the address generators, from a host processor, or from other sources. The vector memory can contain the start point coordinates and the vector deltas for the address generators and a quantity parameter or distance-to-go (DTG) parameter related to the quantity of vector steps to be generated for the particular vector. During image processing standby periods, graphic vector parameters can be loaded from the vector memory for generating the vectors with the address generators, similar to that performed with the LD.ASC program. After various standby periods, such as the horizontal and vertical synchronization periods; the address generators can be reinitialized; thereby overcoming the need to buffer scanout parameters. However, if the address generators will not be reinitialized following vector generation, it may be necessary to buffer the scanout address parameters in a buffer memory for reloading the pixel address generators after vector generation.

In the LD.ASC program, the number of steps for a vector are counted under program control in the supervisory processor. In a hardwired implementation, the number of steps for a vector can be counted with a hardware counter circuit. For example, the quantity or DTG parameter from the vector memory can be loaded into a 74LS169 counter as a parallel load parameter and the counter can be decremented in the count-down mode for each pixel step during vector generation. Generation of the vector can be terminated by detecting the underflow signal from the counter at the zero count.

Loading of the address generators from the vector memory can be performed in a manner similar to loading the address generators from the supervisory processor, as shown in the LD.ASC program listing herein and as discussed relative to the supervisory processor interface herein. Setting of the vector color intensity from the vector memory can be performed in a manner similar to setting of the vector color intensity from the supervisory processor in the LD.ASC program. Selecting of the write-mode for the image memory can be performed in a manner similar to setting of the write-mode with the load command signal DOA6 by the supervisory processor in the LD.ASC program.

Window generation can be implemented with parameters for a plurality of images stored in a window buffer memory and selected as the address generators scan across window boundaries during scanout and refresh of the CRT monitor. When the address generators cross window boundaries, the previous display parameters can be buffered in the buffer memory and the display parameters associated with the new image can be loaded from the window buffer memory into the address generators. Loading of display parameters associated with the new image from the window buffer memory can be accomplished as discussed above for loading of vector parameters during graphic vector generation. Storing of display parameters associated with the prior image into the window buffer memory can be accomplished by reversing the vector generation loading operation to obtain a window generation store operation.

SPATIAL FILTERING

General

Display systems can be implemented with spatial filters for anti-aliasing, pattern recognition, enhancement, and other purposes. A spatial filter arrangement will now be discussed with reference to FIGS. 5A to 5C.

Figure 5A:
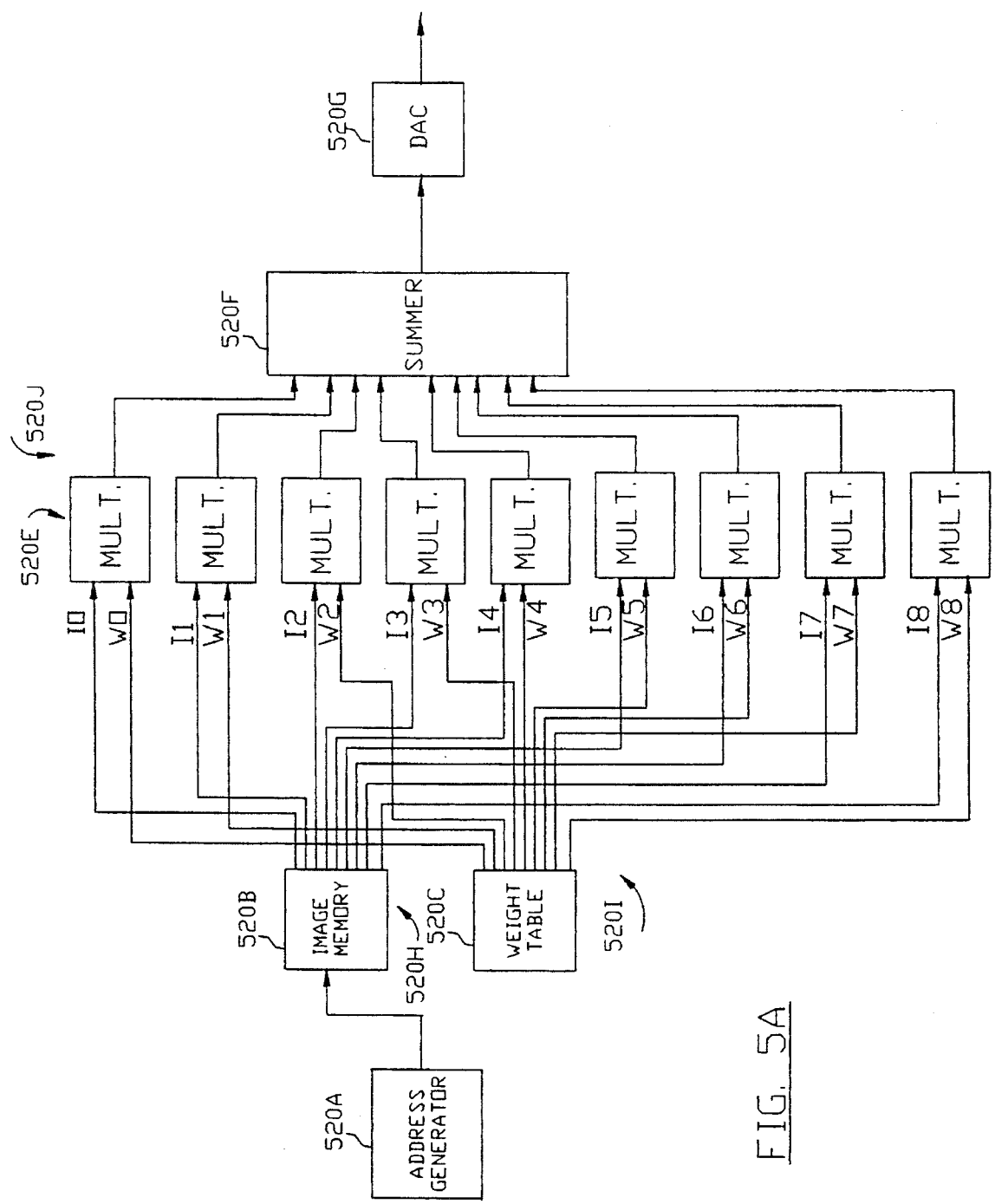
FIGS. 5A, 5B, 5C and 5D: where
Figure 5B:
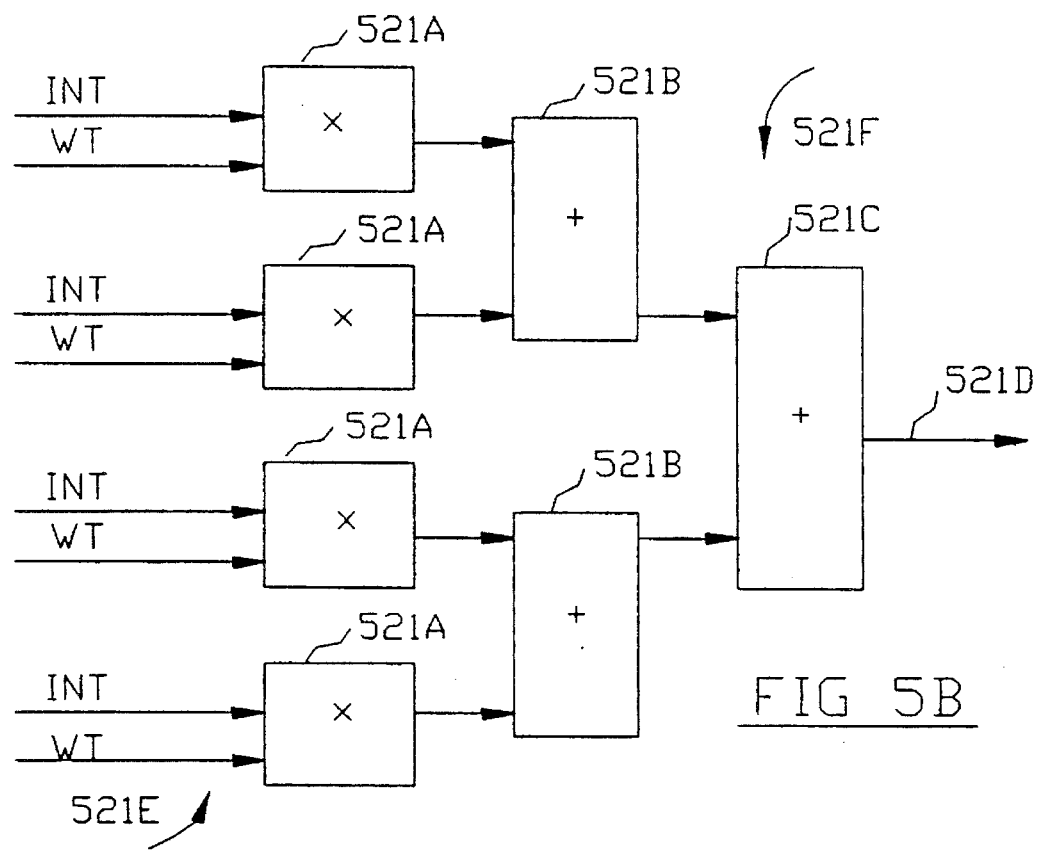

FIG. 5A shows an arrangement of a display system. Address generator 520A generates pixel addresses to access a plurality of pixels, such as a 9-pixel kernel 520H, from image memory 520B. Pixel information can be latched in registers to provide parallel pixel words or can be accessed sequentially as provided with the BASIC PROGRAM LISTING FTR.ASC herein. Weight table 520C supplies a plurality of kernel weights appropriate to spatial filtering of the pixel kernel, such as a kernel of 9-weights 520I, from weight table 520C. Weight information can be latched in registers or in the weight table to provide parallel pixel words or can be accessed sequentially as provided with the BASIC PROGRAM LISTING FTR.ASC herein. The pixel intensities I0 to I8 are each applied to a corresponding multiplier 520E and the weights W0 to W8 are each applied to a corresponding multiplier 520E for multiplying the corresponding intensity and weight together to generate product signals 520J. Product signals 520J are summed together with summer 520F to generated a weighted and mixed pixel intensity, which is converted to analog signal form with DAC 520G to excite a CRT display.

Figure 3:
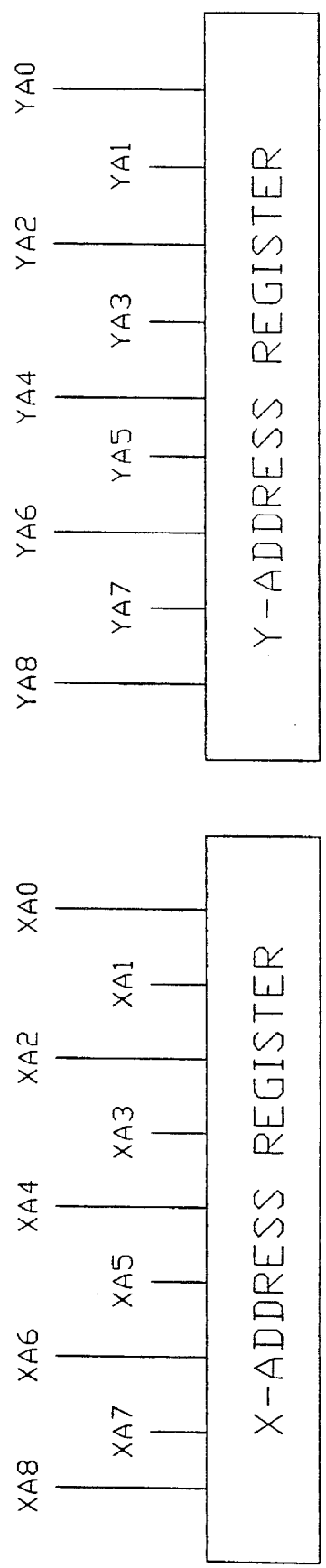
FIG. 3 is a diagram of an address generator partitioned into an X-address component and a Y-address component.
Figure 5C:
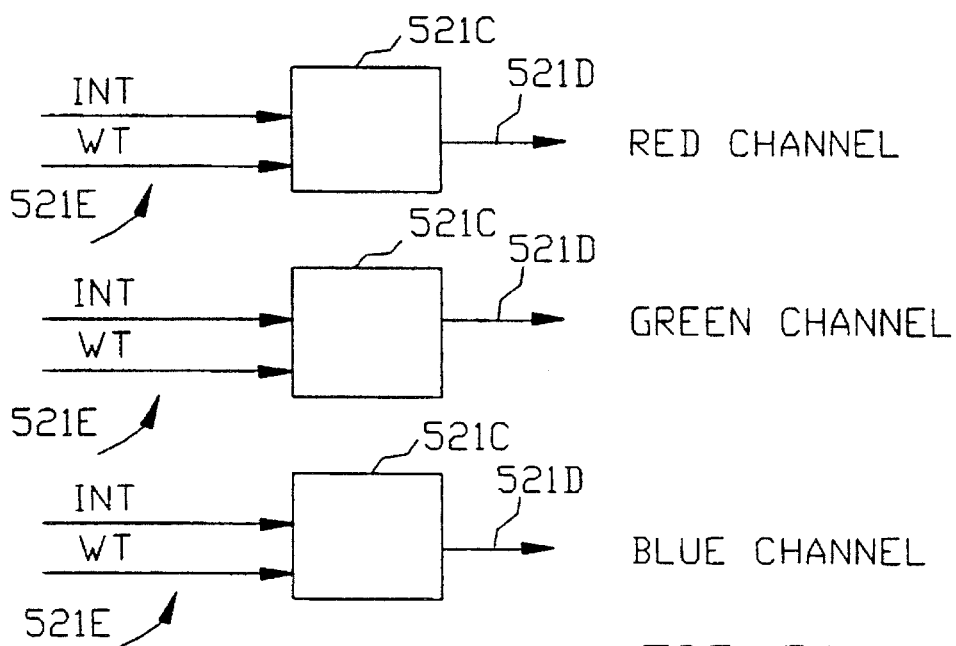

The arrangement discussed with reference to FIG. 5A is representative of a single color channel, such a single channel of a multiple color pixel; i.e., a red, green, or blue channel; and such as a monochromatic single channel. Intensity information INT and weight information WT can be input to multipliers 521A for weighting the pixel intensities, which in turn can be input to adders 521B and 521D for generating weighted and summed signal 521D. Three channels of the arrangement discussed with reference to FIG. 5B can be combined to provide a 3-channel color spatial filter. For example, as shown in FIG. 5C, 3-channels of intensity and weight information 521E are processed with sum-of-the-products logic 521F to generate 3-channels of signals 521G; such as red, green, and blue signals 521D.

The sum-of-the-products processing discussed above can be implemented with commercially available integrated circuit components, such as multiplier chips and adder chips. For example, multiplier chips are manufactured by TRW and adder chips are manufactured by Texas Instruments.

Description of FIG. 7 and the FTR.ASC Listing

A filter processor can be emulated in software to illustrate operation of a hardware configuration. One filter processor configuration is shown in the BASIC PROGRAM LISTING FTR.ASC provided herewith and is shown in flow diagram form in FIG. 7. This program provides for accessing of pixels from the database, filtering the pixels, and storing the filtered pixels in another file in the database. The unfiltered file is defined as UNFILTER.ASC and the filtered filed is defined as FILTERED.ASC. In this configuration, the database is constructed as 8-stripes, each stripe having 64-lines, and each line having 512-pixels. This comprises an image 512-lines by 512-pixels per line. The image database is constructed as a packed byte per pixel with 128-pixels stored in a sector on the disk. The Basic program FTR.ASC accesses the binary file as a Basic random file and unpacks the pixels for filtering under the Basic program. For convenience of implementation, 2-pixels at a time are unpacked for filtering and 2-pixels at a time are packed after filtering.

The filtering program will now be discussed with reference to the flow diagram in FIG. 7. The program is implemented with a plurality of loops. The outer loop KRLP1 defines the vertical coordinate of the pixel kernel. The next inner loop KPLP1 defines the horizontal coordinate of the pixel kernel. The next inner loop OUTLP1 defines the vertical coordinate of the pixel line in the kernel. The innermost loop INLP1 defines the horizontal coordinate of the pixel pair on the pixel line in the kernel. The program processes 3-pixels per line in the kernel with 2-iterations through the inner loop INLP1, then processes 3-lines in the kernel with 3-iterations through the next outer loop OUTLP1, then processes 512-kernels per line with 512-iterations through the next outer loop KPLP1, and then processes 64-lines of kernels per stripe with 64-iterations through the outer loop KRLP1.

The flow diagram (FIG. 7) is drawn with elements having descriptive labels that correspond with the program operations. The line numbers associated with these operations are listed above the elements for convenient cross-referencing to the Basic program FTR.ASC. Reference numerals 760A to 760AB are shown with connecting lines to the elements for convenient cross-referencing in the description.

Execution commences by generating initial conditions in element 760A. Operation then proceeds to the outer loop KRLP1 760B to address the first kernel position at the top edge of the kernel array and then proceeds to the next inner loop KPLP1 760C to address the first kernel position at the left edge of the kernel line. Operation then proceeds to element 760D to initialize the KPLP1 loop by generating the initial conditions XB, YB, XE, YE, and BDC. Operation then proceeds to the next inner loop OUTLP1 760E to address the top line of pixels in the kernel. Operation then proceeds to element 760F to access a database record corresponding to the top line of pixels in the kernel. Operation then proceeds to the inner loop INLP1 760G to address the pair of pixels at the leftmost side of the kernel in the selected line.

Operation then proceeds to element 760H to access and unpack a pixel pair and then to element 760X to select the weights for the selected pixel line. Operation then proceeds to element 760Y to test the S1-flag for processing of either the first pixel pair or the second pixel pair. If the S1-flag is 0-set, indicative of processing of the first pixel pair; operation proceeds along the 0-path to element 760AA to weight the first pair of pixels and to sum the weighted pixels in a partial summation. Operation then proceeds to element 760AB to 1-set the S1-flag, indicative of the need to process the second pixel pair on the next iteration. In element 760Y, if the S1-flag is 1-set, indicative of processing the second pixel pair; operation proceeds along the 1-path to element 760Z to weight the second pair of pixels and to sum these weighted pixels with the partial sum previously generated with the first pair of weighted pixels. Only the first pixel of the second pair of pixels is processed, where a 3-pixel line for a kernel is implemented with both pixels of the first pixel pair and the first pixel of the second pixel pair.

Operation then proceeds to element 760J to define the next pixel pair on the selected line of pixels and then to element 760K to determine if the last pixel pair per pixel line in the kernel has been processed. If the last pixel pair of the kernel has not been processed, operation branches along the Y-path looping back in the INLP1 loop to access the next pixel pair on the selected line of pixels. If the next pixel pair of the kernel has been processed, operation branches along the N-path to exit the INLP1 loop, then to element 760L to 0-set the S1-flag, and then to element 760M to determine if the last pixel line of the kernel has been processed. If the last pixel line of the kernel has not been processed, operation branches along the Y-path looping back in the OUTLP1 loop to access the next line of pixels in the kernel and to iterate through the INLP1 loop to access the kernel pixels on that line and to filter these kernel pixels. If the last pixel line of the kernel has been processed, operation branches along the N-path to exit the OUTLP1 loop and then to element 760N to test the S2-flag.

The S2-flag identifies whether the filtered pixel is the first or second pixel in a pixel pair. If the pixel is the first pixel in a pixel pair identified by the S2-flag being 0-set, operation branches along the 0-path to element 760P to 1-set the S2-flag indicative of the first pixel pair being processed and then to element 760Q to scale the filtered pixel and to buffer the filtered pixel. If the pixel is the second pixel in a pixel pair identified by the S2-flag being 1-set, operation branches along the 1-path from element 760N to element 760R to scale a second filtered pixel and to element 760S to store the filtered pixel pair in the database and to 0-set the S2-flag as indicative of the first pixel of the next pixel pair pending processing.

Operation then proceeds to element 760U to determine if the last kernel per kernel line has been processed. If the last kernel per line has not been processed, operation branches along the Y-path looping back in the KPLP1 loop to process the next kernel along the line of kernels. If the last kernel per line has been processed, operation branches along the N-path to element 760V to determine if the last line of kernels has been processed. If the last line of kernels has not been processed, operation branches along the Y-path looping back in the KRLP1 loop to process the next line of kernels. If the last line of kernels has been processed, operation branches along the N-path to element 760W to exit the filtering of the stripe.

Filtering of Images

Image processing can be performed on digitized images stored in the database. A stored image can be loaded from the database into image memory for image processing online with a hardware-implemented image processor. A stored image can be preprocessed, such as offline in the database and such as online with a preprocessor. Offline processing can be performed during database generation, such as filtering database images before storing the images in the database. Online preprocessing can be performed during system operation, such as by accessing database images and preprocessing the accessed database images with compression and filtering, prior to loading into image memory. Offline preprocessing can be performed for filtering of images, which is illustrative of other forms of offline preprocessing and is also illustrative of online preprocessing. For example, other forms of offline preprocessing includes data compression, image enhancement, and other forms of filtering. Also, other forms of online preprocessing includes data decompression, image expansion, image compression, and filtering.

Offline filtering and the other preprocessing operations illustrated therewith is shown in the BASIC PROGRAM LISTING FLT.ASC provided herein.

For this example, the image is constructed in database memory as 512-lines and 512-pixels per line. Each pixel is implemented with an 8-bit byte having the least significant 3-bits representing green intensity, the next more significant 2-bits representing red intensity, the next more significant 2-bits representing blue intensity, and the most significant bit being presently unused. The image is divided into 8-subimages; where each subimage contains 64-lines in a stripe. The stripes are identified as stripe-0 to stripe-7. For example, the lake image has the topmost stripe stored as the LAKE50.BIN file, the next lower stripe stored as the LAKE51.BIN file, the other stripes stored in the ascending LAKE5n. BIN files and the lowest stripe stored in the LAKE57.BIN file. The filter program accesses each stripe in sequence, filters the stripe, buffers the stripe as the FILTERED.BIN file, and stores the stripe as the FLAKE5n.BIN file. The filtering operation accesses a kernel of pixels surrounding the center pixel and consequently overlaps stripes for the first line and the last line in a stripe. Therefore, filtering of each stripe is implemented by accessing the particular stripe as the PRESENT.BIN file, accessing the previous stripe as the PRIOR.BIN file, and accessing the subsequent stripe as the NEXT.BIN file.

In this example, filtering is implemented with a 9-pixel kernel organized in a 3-pixel by 3-pixel array. This filtering is performed by multiplying each of 9-kernel pixels by the corresponding one of 9-kernel weights, summing the weighted pixel intensities, and then scaling to normalize the filtered intensity. This processing is performed for each of the 3-color components of the kernel pixels. Weights can be assigned to the particular kernel positions, selectable under operator control with the menu. Kernel weights No. 1 and kernel weights No. 2 are shaded, where the weights are decreasing from the kernel center towards the kernel periphery. Kernel weights No. 3 are unshaded. Additional kernel weights can be defined by the operator under menu control.

MEMORY ARCHITECTURE

General

The memory architecture of the present invention has important advantages in implementing digital systems. It is applicable to special purpose systems; such as display systems, array processors, and pipeline processors; and is applicable to general purpose systems; such as general purpose digital computers. It incorporates various features that may be used individually or in combinations to enhance performance and efficiency. One feature provides for accessing of memory at a relatively slow addressing rate and at a relatively fast scanout rate. Another feature provides a buffer memory to permit accessing of memory at a lower rate and higher duty cycle for information that is utilized at a higher rate and lower duty cycle. Various other features are also discussed herein.

Memory speed is an important consideration for design of digital systems; such as display systems, array processing systems, and pipeline systems. A configuration is discussed herein where system speed can be implemented to be significantly faster than implied by memory speed considerations. This configuration uses a combination of novel architectural features for outputting of relatively high bandwidth information with a relatively low bandwidth memory.

Brief Description

A memory architecture in accordance with the present invention will now be discussed with reference to FIGS. 1 and 2. Alternate configurations can be provided to implement the system of the present invention. However, this configuration is exemplary of the system of the present invention. Input device 115A generates input information under control of input clock 115G. Address generator 115B generates addresses for memory 115C under control of input clock 115G, such as for storing information from input device 115A into memory 115C or for accessing information from memory 115C under control of input device 115A. Memory 115C outputs information accessed with address generator 115B under control of input clock 115G. Buffer 115D receives information accessed from memory 115C for buffering therein under control of input clock 115G and generates information buffered therein under control of output clock 115F. Output device 115E, such as a display monitor, receives buffered information from buffer 115D under control of output clock 115F. This permits information to be accessed from memory 115C asynchronous with information to be output to output device 115E. Hence, buffer 115D can input information under control of input clock 115G and can output information under control of output clock 115F for resynchronizing of information flow, averaging of information rate, reorganizing of information into groups, and for other purposes.

In an alternate configuration, information from memory 115C can be output directly to output device 115E under control of input clock 115G, such as with input clock 115G and output clock 115F being the same clock and being connected theretogether.

Figure 2:
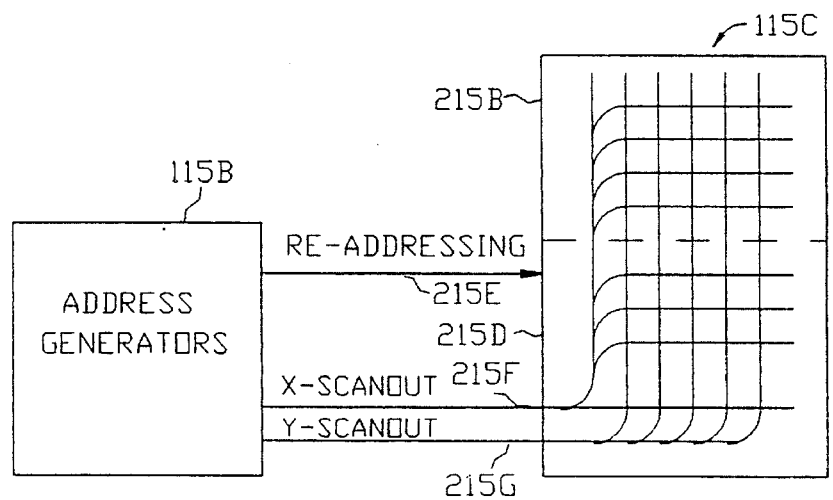
FIG. 2 is a block diagram representation of an arrangement for implementing the addressing and architecture of the memory of the present invention.

A multi-dimensional address configuration is shown in FIG. 2. Address generator 115B generates an address word having a re-addressing portion 215E, a Y-scanout portion, 215G, and an X-scanout portion 215F. This arrangement has particular advantages because the X-scanout signal 215F and the Y-scanout signal 215G can be generated more rapidly than re-addressing signal 215E to access or to write into memory 115C.

Memory 115C is shown partitioned onto 2-boards 215B and 215D. RAMs on the 2-boards can be addressed with re-addressing logic 215E. The RAMs are shown organized in an X-Y array of rows and columns. The X-scanout signals are decoded into a plurality of row signals shown radiating horizontally right from the X-scanout line 115F. The Y-scanout signals are decoded into a plurality of column signals shown radiating vertically up from the Y-scanout line 115G. The decoded row and column line signals enabled 1-row and 1-column as a function of the X-scanout and Y-scanout address portions, respectively. Consequently, 1-RAM at the intersection of the row and column enable signals is enabled to output the information addressed with re-addressing signal 215E and all other RAMs are disabled from outputting the information addressed with re-addressing signal 215E.

Various address register configurations will now be discussed with reference to FIGS. 3 and 4. FIG. 3 shows a dual address register configuration having an X-address register and a Y-address register. This arrangement is particularly applicable to display systems having a 2-dimensional memory map and generating vectors for storing into or for reading out of an image memory. The X-address register and the Y-address register can be separately controlled to generate a 2-dimensional vector for accessing a pixel in the memory. Actually, the 2-address registers can be considered to be concatenated to form a single address parameter for memory accessing. However, two separate 2-dimensional address registers are a convenient way of visualizing a single dimensional memory configured into a 2-dimensional memory map. In a configuration discussed for the experimental system herein, the 6-most significant bits of each register are combined for an 11-bit re-addressing word and a 1-bit board select signal while the 3-least significant bits of each register are separately decoded to select one of 8-rows and one of 8-columns on each board in accordance with the X-scanout signal 215F and Y-scanout signal 215G discussed with reference to FIG. 3.

Figure 4:
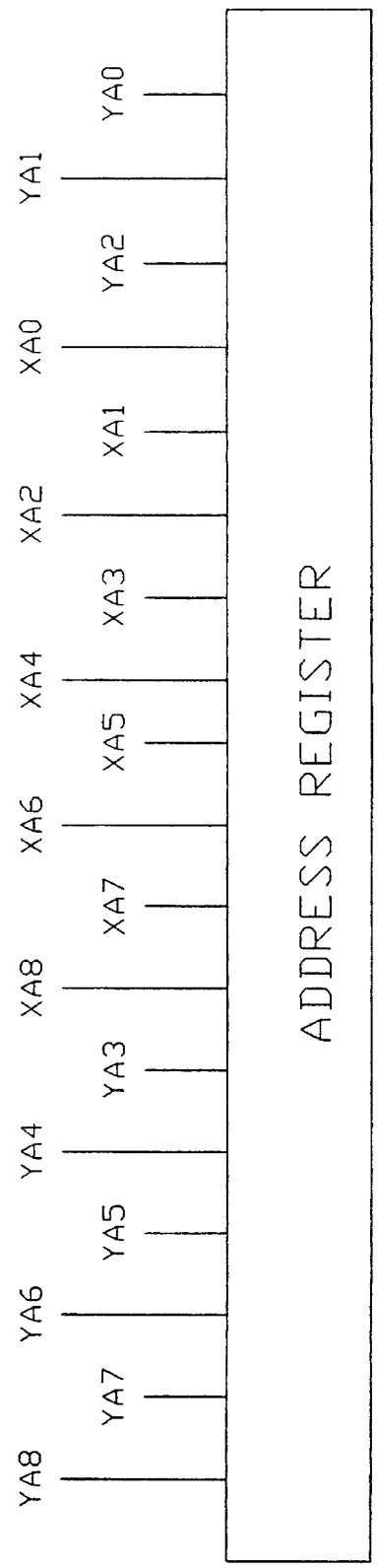
FIG. 4 is a diagram of an address generator concatenating an X-address component and a Y-address component.

FIG. 4 shows a single address register configuration, which can be implemented by concatenating the X-register and Y-register shown in FIG. 3 or, alternately, may be conceptually defined as a single register, a quadruple register, or other configurations. Selected bits of this single address register may be used to control re-addressing and row and column select for the memory in accordance with FIG. 2. Many configurations of signal groupings can be implemented; such as using signals XA0, XA1, XA4, XA6, YA3, YA4, and YA6 for re-addressing; signals XA3, XA7, YA5, and YA8 for X-scanout decoding; and signals YA0, YA1, YA2, XA2, XA5, XA8, and YA7 for Y-scanout decoding as an alternate to the above configuration discussed with reference to FIG. 3.

Memory addressing may be configured in a multi-dimensional form; such as 2-dimensional, 3-dimensional, or 4-dimensional form. For example, address generation may be performed with a plurality of different address generators; such as an X-address generator for one portion of a 2-dimensional address and a Y-address generator for the other portion of a 2-dimensional address, as discussed for a 2-dimensional memory map configuration herein. Also, addresses that are generated with a single address generator can be partitioned into multi-dimensional addresses; such as a 16-bit computer instruction address being partitioned into a W-dimension address for the most significant 4-bits, an X-dimension address for the next less significant 4-bits, a Y-dimension address for the next less significant 4-bits, and a Z-dimension address for the least significant 4-bits. Also, a multi-dimensional address, such as the X-dimensional address and Y-dimensional address for a display configuration, can be concatenated into a single address by combining the different portions thereof; such as combining the Y-address dimension as the most significant portion of the address word and the X-address dimension as the least significant portion of the address word.

In describing the novel architecture of the memory of the present invention, the word "dimension" and words relating thereto have been adapted to mean the different forms of addressing the RAMs. For example, the RAMs are addressed with a re-addressing portion of the address and a scanout portion of the address, which may be considered to be 2-dimensional addressing, and the scanout portion of the address are divided into row select signals to the G-bar pins and column select signals to the S-bar pins of the RAMs, which may be considered to be 2-dimensional scanout addressing. A memory having an address with the combination of a 1-dimensional re-addressing portion and a 2-dimensional scanout portion may be considered to be a 3-dimensional memory. This terminology is different from terminology associated with 2-spatial dimensions of an image, such as implemented in a memory map, and 2-spatial dimensions of an image, such as displayed on a monitor.

The memory arrangement discussed herein can be applied to a display system, as discussed in greater detail herein. Image pixels can be accessed in sequence for output to a display monitor. The memory can be configured in a 2-dimensional form, such as 1-dimension being the data block address and the other dimension being the pixel address within a block. Alternately, the address can be partitioned into a plurality of bytes from a least significant byte to a most significant byte and each byte can be used to address a different dimension of the memory. Image memory scanout can be implemented by scanning sequential addresses at a higher rate and by re-addressing the memory at a lower rate, such as with a gated clock. A gating signal can be used to gate the memory access clock without gating the output clock, such as a DAC clock; permitting display operations to proceed under control of the non-gated output clock without being affected by gating of the memory clock. An output buffer memory can be used to temporarily store pixel information to reduce sensitivity of the display to gating of the memory clock. A buffer memory also permits accessing of the image memory at a relatively high duty cycle even though the information may be output to the display at a lower duty cycle, or at a relatively low portion of the time that the memory information is available, or by not utilizing the information immediately after the information becomes available from the image memory. A buffer memory also permits accessing of image memory substantially as fast as image memory can be accessed, reducing constraint from output speed considerations.

The memory arrangement discussed herein can also be applied to a correlator processor memory. Data can be accessed in sequence for execution by the correlator. The memory can be configured in a 2-dimensional form, such as 1-dimension being the data block address and the other dimension being the data address within a block. Alternately, the address can be partitioned into a plurality of bytes from a least significant byte to a most significant byte and each byte can be used to address a different dimension of the memory. Data scanout can be implemented by scanning sequential addresses at a higher rate and by re-addressing the memory at a lower rate, such as with a gated clock. A gating signal can be used to gate the memory access clock without gating the output clock, permitting correlator operations to proceed under control of the non-gated output clock without being effected by gating of the memory clock. A buffer memory can be used to temporarily store correlation information to reduce sensitivity of the correlator to gating of the memory clock. A buffer memory also permits accessing of the correlator data at a relatively high duty cycle even though the information may be processed at a lower duty cycle, or at a relatively low portion of the time that the memory information is available, or by not utilizing the information immediately after the information becomes available. A buffer memory also permits accessing of correlator data substantially as fast as the data memory can be accessed, reducing constraints from output speed considerations.

The memory arrangement discussed herein can also be applied to an FFT processor memory. Data can be accessed in sequence for execution by the FFT processor. The memory can be configured in a 2-dimensional form, such as 1-dimension being the data block address and the other dimension being the data address within a block. Alternately, the address can be partitioned into a plurality of bytes from a least significant byte to a most significant byte and each byte can be used to address a different dimension of the memory. Data scanout can be implemented by scanning sequential addresses at a higher rate and by re-addressing the memory at a lower rate, such as with a gated clock. A gating signal can be used to gate the memory access clock without gating the output clock, permitting FFT operations to proceed under control of the non-gated output clock without being effected by gating of the memory clock. A buffer memory can be used to temporarily store FFT information to reduce sensitivity of the FFT processor to gating of the memory clock. A buffer memory also permits accessing of the FFT data at a relatively high duty cycle even though the information may be processed at a lower duty cycle, or at a relatively low portion of the time that the memory information is available, or by not utilizing the information immediately after the information becomes available. A buffer memory also permits accessing of FFT data substantially as fast as the data memory can be accessed, reducing constraints from output speed considerations.

The memory arrangement discussed herein can also be applied to general purpose computer memory. Instructions can be accessed in sequence for execution by the computer arithmetic and control logic. The memory can be configured in a 2-dimensional form, such as 1-dimension being the instruction or data block address and the other dimension being the instruction or data address within a block. Alternately, the address can be partitioned into a plurality of bytes from a least significant byte to a most significant byte and each byte can be used to address a different dimension of the memory. Instruction and data scanout can be implemented by scanning sequential addresses at a higher rate and by re-addressing the memory at a lower rate, such as with a gated clock. A gating signal can be used to gate the memory access clock without gating the output clock, permitting processing to proceed under control of the non-gated output clock without being effected by gating of the memory clock. A buffer memory can be used to temporarily store computer instructions and data to reduce sensitivity of the computer to gating of the memory clock. A buffer memory also permits accessing of the computer instructions and data at a relatively high duty cycle even though the information may be processed at a lower duty cycle, or at a relatively low portion of the time that the memory information is available, or by not utilizing the information immediately after the information becomes available. A buffer memory also permits accessing of computer instructions and data substantially as fast as the memory can be accessed, reducing constraints from output speed considerations.

Memory architectural features pertaining to high speed scanout in conjunction with re-addressing can provide speed enhancement, such as a 3-fold improvement in speed. These feature are particularly pertinent to RAMs having multiple tristate control signals; such as the Mitsubishi Electric M58725P RAMs. RAMs having a single tristate control signal can also be used with this configuration, but may involve additional decoder logic to decode scanout address signals, such as with linear select architecture consistent with a single tristate control signal.

The memory architecture of the present invention may be discussed in the content of a display application for purposes of illustration. However, this memory architecture is applicable to computer main memories, buffer memories, signal processing memories, and other memory applications in addition to display memories.

Re-Addressing And Scanout Memory Architecture

Multiple dimension image memory architecture, as previously discussed, involves simultaneous accessing of multiple pixels, such as in a 2-dimensional X/Y array, to increase effective memory speed. Such a configuration is appropriate for a 2-dimensional horizontal and vertical scanout for refreshing a display monitor and is also appropriate for other applications; such as general purpose computers and special purpose processors. Such a memory architecture may need buffer registers for temporary storage of accessed information, such as for temporary storage of accessed pixels so that a new memory access cycle may be initiated while the previously accessed pixels are being output to refresh the display monitor. An alternate configuration is discussed herein where a block of pixels is simultaneously accessed and is scanned-out without the need for buffer registers or overlapping memory accesses. This configuration can involve a multiple access period, where stored information is scanned out from an accessed block at high rate (shorter period) and a new block of stored information is accessed at a lower rate (lower period). A buffer memory, such as a FIFO or a double buffer memory, can be used to equalize these rate and period differences.

A novel memory architecture will now be discussed which enhances memory speed and economy. This architecture can be characterized as a multi-dimensional memory architecture that is divided into 2-address portions, a high speed address portion and a slow speed address portion. Another characteristic is a combination scanout and re-addressing architecture. Another characterization is use of tristate memory control logic to reduce the need for buffer registers and multiplexing logic. This can be accomplished by taking advantage of certain features of RAMs.

Conventional RAMs have a plurality of input address lines for addressing stored information, tristate output data direction control logic for selecting data input for writing and data output for reading, and tristate chip select logic for gating output information onto a bus. Use of these circuit features in a novel form implemented in the memory architecture described herein provides important advantages. For example, tristate data input and output control logic can be used in conjunction with tristate chip select logic to provide a high speed 2-dimensional scanout for rapid accessing of RAMs. The 2-dimensional scanout arrangement reduces auxiliary decoding and selection logic, reduces output buffer logic, is compatible with 2-dimensional memory map architectures, and facilitates relatively high speed operation with relatively low speed RAMs.

Higher speed scanout can be used in conjunction with slower speed addressing of the RAMs to provide an average access rate that is significantly higher than the addressing rate. For example, the Mitsubishi Electric M58725P RAMs have a 200-ns address period and a 100-ns scanout period. Assuming that a system will scanout 4-parameters before re-addressing is necessary and assuming that re-addressing is implemented with 3-scanout clock periods, 5-parameters can be accessed in 7-clock periods; 4-parameters times 1-clock period per parameter plus 1-parameter times 3-clock periods per parameter; in comparison to conventional re-addressing, where 5-parameters can be accessed in 15-clock periods (5-parameters times 3-clock periods/parameter). This scanout and re-addressing example yields an average of 1.4-clock periods per pixel for the scanout and re-addressing configuration compared to 3-clock periods per pixel for the re-addressing configuration, yielding an improvement of about 2-times in speed for this example.

RAMs are conventionally addressed with a number of address lines, such as 11-address lines for a 2,048 word RAM. Address signals typically propagate through the memory array and consequently can have relatively long propagation delays. RAMs conventionally have tristate enable signals to permit bussing of output signals and to select data input for storing and data output for accessing of data. The tristate enable signals can be used to gate the RAM outputs and consequently can have relatively short propagation delays.

The present multi-dimensional memory configuration uses less frequent accessing of data with the slower address signals (re-addressing) and uses more frequent accessing of data with the faster scanout control signals. Therefore, the average propagation delay is reduced, being a weighted average of several shorter scanout propagation delays and a single longer address propagation delay.

Speed is enhanced by changing the clock period to be a function of the addressing operation, such as a longer clock period for re-addressing and a shorter clock period for scanout. A buffer memory; such as a FIFO, double buffer, cache, or scratchpad memory; can be used to buffer output information from the memory for providing a constant memory output clock period in response to the variable memory input clock period.

A specific example will now be provided to illustrate use of relatively longer propagation delay address signals to select a single block of 64-pixels and using relatively shorter propagation delay tristate control signals to select a pixel from the selected block. Each address generator generates a concatenated address having a 3-bit tristate control signal portion and a 6-bit address signal portion. The 3-bit tristate control signal address can be implemented with the least significant bits (LSBs) of the address word and the 6-address bits can be implemented with the most significant bits (MSBs) of the address word. The address generators can be implemented to update the address, where the LSBs can be updated more frequently than the MSBs and where the addresses can scan through a block of pixels as the LSBs are updated and change to a different block of pixels when the MSBs are updated. Updating of the MSBs can be detected with an overflow from the LSBs to the MSBs in the address generator. Therefore, the LSBs can be updated relatively rapidly to scanout with the faster tristate control signals through the pixels within a block and the MSBs can be updated relatively slowly to change the selected block.

For purposes of illustration, an experimental configuration with an image memory having 262,144-pixels arranged in a 512-by-512 pixel memory map was implemented. Also for simplicity, Mitsubishi 58725P RAMs, Texas Instruments 7400 series TTL logic, and Intel logic is used. The Mitsubishi RAMs have 2K-words by 8-bits per word. Therefore, 128-RAMs are used to provide 262,144-pixels. For efficiency of implementation, the RAMs are arranged in two 2-dimensional boards each having a binary quantity (i.e., 8) RAMs for each dimension. Consequently, the 128-RAMs are arranged on 2-boards each having 64-RAMs, arranged in an 8-by-8 block of RAMs per board.

Each RAM has an 11-bit address for accessing one of 2048-words. Another address bit is used in this configuration for selecting one of the two RAM boards. For convenience of discussion, the 11-bit address and the 1-bit board select signals are organized in a 6-bit X-address dimension and a 6-bit Y-address dimension to select one block of 64-pixels out of 4096 blocks of 64-pixels. This arrangement is shown in the memory diagrams and tables included herewith. The memory map contains a 64-by-64 array of blocks for a total of 4096 blocks. The 12-address bits are organized into a 6-bit Y-axis address and a 6-bit X-axis address for a 64-by-64 array of blocks. The 6-bit X-axis address is divided into a 5-bit X-axis address to each RAM and a 6th X-axis address bit to select one of the two 64-RAM boards. Use of the X-address bit as a board select bit causes the 64-by-64 array of RAMs to have alternate X-dimensional columns to be selected from different boards. Alternately, use of the most significant X-address bit for the board select bit would cause the 64-by-64 array of RAMs to have all of the X-dimensional RAMs in one board adjacent to each other and all of the X-dimensional RAMs in the other board adjacent to each other.

Each of the 4096-blocks of pixels can be configured in an 8-by-8 array of 64-pixels. One of the 8-by-8 arrays of 64-pixels is shown in the image memory diagrams and tables included herewith. The 8-by-8 array can be addressed with a 2-dimensional 3-bit by 3-bit address organized in a 3-bit X-address and a 3-bit Y-address format. Each of the two 3-bit address portions can be decoded into 8-address lines, yielding an 8-by-8 array of address lines. If one of the first group of 8-address lines is excited to select a row of pixels and the second group of 8-address lines is excited to select a column of pixels, then the one pixel at the intersection of the row address line and column address line is selected out of the 64-pixels per block.

The memory scanout and re-addressing architecture can be implemented for cutting across image memory lines to generate a vector drawn at an angle to the raster lines and can be efficiently used in a raster scan image memory. For example, raster scan outputs proceed on a line-by-line basis; consistent with the line organization of the image memory. In such an arrangement, a single tri-state control signal can be used for scanout as the line progresses, with re-addressing being performed at block boundaries. In this configuration, a block may be a 1-dimensional line of pixels; in contrast to the above described 2-dimensional array of pixels per block. Block traversing in a 1-dimensional memory system is more nearly constant than in a multi-dimensional memory system. For example, a linear block along a scanline can have all pixels in the block accessed frame-after-frame independent of vector considerations. This may be different from a system having a 2-dimensional scanout block with vectors because a 2-dimensional scanout block may have different numbers of pixels traversed within a block as a function of the vector parameters. For example, the number of pixels traversed may be a function of the pixel entry point to the block and a function of the scanout vector angle through the block, where the pixel entry point may be a function of vector position and the scanout angle may be a function of vector slope.

The maximum, typical, average, and minimum number of pixels scanned in a block can be different for different configurations. For example, in a raster scan arrangement; all pixels in a block may be scanned for each traverse of the linear block. Therefore, in a 1-dimensional block configuration; the maximum, typical, average, and minimum number of pixels scanned in a block may be the same; which is the total number of pixels per block. In a 2-dimensional block configuration having vector directions, the maximum number of pixels may be the number of pixels along the diagonal of the block; the minimum number of pixels may be a single pixel, such as a scan clipping the corner of a block; and the typical number and average number may be inbetween the maximum and minimum, such as determined by typical and average block geometry relationships. Consequently, in a linear block raster scanout configuration, greater average scanout rates may be obtained due to the scanout of more pixels per block.

A buffer memory configuration can have the form of a multiple buffer, such as a double buffer. Alternately, the memory configuration discussed herein having gated clocks and a plurality of clock periods can be implemented with a smaller buffer memory to average a plurality of clock periods. For example, a 16-word FIFO can be used for loading at an input word rate under control of the gated clock pulse having a plurality of clock periods and for unloading at a clock rate consistent with the output word rate. The FIFO may be implemented with the S/N 74LS222, S/N 74LS224, or S/N 74S225 circuits which provide 16-words having 4-bits or 5-bits. These FIFOs can be configured in parallel to provide the 8-bits per word, as shown for the experimental configuration, or can provide other word sizes.

Memory Enhancement

The output of memory in the experimental configuration can be implemented to propagate down a datapipe to a buffer memory without communication with the front end control logic and address generators. Therefore, it can be considered to be implemented in a pipeline form. This pipeline permits introducing clock skew, where the clock to the output data pipe can be skewed ahead of the clock to the input at the data pipe. This permits greater speed in view of propagation delay considerations. For example, in the experimental configuration, the output registers are clocked with the 180-degree-phase clock and, consequently, provide a 1.5-clock period for propagation delay. One design consideration for this configuration is that propagation delay through the memory is less than ½-clock period or the newer high speed information from the next clock may be clocked into the datapipe with the 1.5-clock period clock.

Memory Map Display Architecture

An architecture of one form of memory map for a display will now be discussed. This memory map stores an image as a 2-dimensional array of pixels. In a monochromatic configuration, each pixel contains 1-intensity parameter. In a color configuration, each pixel contains 3-intensity parameters; red, blue, and green intensity parameters. Additional information can be contained in a pixel word; such as other parameters, flags, and control information. All information for a particular pixel can be packed together in a pixel word. Accessing of a pixel word can be implemented to access all information pertaining to the particular pixel word with one access or, alternately, can access portions of the pixel word for each of multiple accesses per pixel word. For simplicity of discussion herein, operations on a pixel word may be discussed as operations on a pixel.

Memory map configurations having 1-dimensional and multi-dimensional architectures have been discussed. Multi-dimensional architectures provide enhanced performance and flexibility, such as by accessing multiple pixels simultaneously.

Multi-dimensional architecture provides important advantages. It provides high speed, because of the addressing of 64-pixels in parallel and because the tristate select signals have shorter propagation delays than the address signals. It provides flexibility, because the tristate select signals can traverse the 64-pixel block at any vector angle and through any continuous sequence of pixels. It provides circuit efficiency because much of the address decode and tristate logic is implemented on the memory chips, because a multi-dimensional addressing arrangement is more efficient than a 1-dimensional addressing arrangement, and because the tristate logic reduces the need for output registers.

A configuration for simultaneous accessing of an 8-by-8 2-dimensional array of 64-pixels is shown in FIGS. 6E to 6N. A pixel address selects 64-pixels at a time out of the total array of pixels, such as out of 262,144-pixels in a 512-pixel by 512-pixel array. A subset of the 64-pixel block is then addressed with tristate enable signals, such as chip select and output select signals. Tristate select signals can be used to scan through a 64-pixel block to select a sequence of pixels therefrom.

The experimental configuration has been constructed having a 512-pixel by 512-pixel memory map. For convenience of experimentation, static 16K-RAM chips are used for memory map implementation. Typical circuits are the TMS-4016 RAM from Texas Instruments Inc. and the M58725P static RAM from Mitsubishi Electric. These circuits are configured in the form of a 2K-word by 8-bit static RAM having an 11-bit address, a tristate chip select, and a tristate output enable. Conventionally, the chip select and output enable are used to provide output bussing and to reduce the need for an output register. In the present configuration, the chip select and output enable signals are used to provide 2-additional dimensions of memory addressing. For example, the 11-address lines are used to select a block of 64-pixels out of 262,144-pixels; the chip select signal is used to select a column of 8-pixels out of the selected block of 64-pixels; and the output enable signal is used to select a row of 8-pixels out of the selected block of 64-pixels. The selection of a column of 8-pixels and a row of 8-pixels with the chip select signal and the output enable signal selects a single pixel at the intersection of that column and row from the selected block of 64-pixels. Consequently, a 3-dimensional architecture having address selection of a 64-pixel block, chip selection of an 8-pixel column in that block, and output enable selection of an 8-pixel row in that block uniquely selects a single pixel out of 262,144-pixels.

Memory chips have particular characteristics that can be adapted to memory architectures which are particularly appropriate for the systems discussed herein. For example, memory circuits conventionally have address lines and tristate select lines. The address lines are typically used to select a pixel per chip and the tristate select lines are typically used to disconnect undesired chips from the output bus and to reverse data direction for read and write operations. However, use of the address lines to select a block of pixels and use of the tristate select lines to scan through the block of pixels provides particular advantages. The access time from the address select is significantly greater than the access time from the chip select or the output enable select. Therefore, accessing with the chip select and output enable signals can proceed at a significantly faster rate than accessing with the address select.

The address select lines can be excited with the most significant bits (MSBs) of the X-address and Y-address generated with the address generators. The chip select and output enable signals can be excited with the decoded least significant bits (LSBs) of the X-address and Y-address generated with the address generators. For a 512-pixel by 512-pixel memory map having block of 64-pixels, the 6-MSBs of the Y-address and the 6-MSBs of the X-address can be combined into a 12-bit address to select one of 4096 blocks of 64-pixels. The 3-LSBs of the Y-address and the 3-LSBs of the X-address can be used to select one of 8-rows and one of 8 columns, respectively. As the address generation proceeds within a block of pixels, the address proceeds along a line at the appropriate vector angle through the block as the 3-LSBs of the X-address and the 3-LSBs of the Y-address are updated. When the address update progresses into the MSBs of either the X-address or Y-address, such as with an overflow; a new block of pixels is accessed and the address generation then proceeds within this new block of pixels along a line at the appropriate angle through the block.

The time period for memory accessing of a new block of pixels can be implemented to be longer than the time period for scanning pixels within a previously accessed block of pixels. This can be provided by scanning the pixels within a block at a higher rate and then accessing a new block at a lower rate. This can be implemented by using a higher clock rate to scan pixels within a block, to detect an overflow condition in the X-address and Y-address generators from the LSBs to the MSBs as being indicative of the need to access a new block of pixels, and to switch over to a lower clock rate for accessing of the new block of pixels.

The arrangement discussed with reference to FIGS. 6E to 6N illustrates 64-RAM chips in an 8-by-8 array of chips. Two of these 8×8 arrays of chips are used for a 512-pixel by 512-pixel memory map that is implemented in 64-pixel blocks with 2K-by-8 static RAMs. Each 2K-block array of pixels is selected with 11-bits of the 12-bit address. The particular one of the two 64-chip boards is selected with the remaining bit of the 12-bit address. This is shown with the 5-bits from the X-address and the 6-bits from the Y-address being bussed to all 128-chips of both boards and with 1-bit of the X-address being used to select one of the 2-boards in the uncomplemented state and the other of the 2-boards in the complemented state. The row select and the column select are each implemented by decoding 3-bits with a decoder to generate one of 8-signals to select one of 8-rows and one of 8-columns, respectively. The 11-address lines are bussed to the address input lines of each RAM chip. The 8-data lines are bussed from the data output lines of each RAM chip. Each column select line is bussed to all 8-chips in the related column for each of the two blocks. Each row select line is bussed to all 8-chips in the related row for each of the 2-boards. Consequently, the 11-address lines select 2-boards of 64-chips each, the twelfth address line selects one of 2-boards, and the 6 "scanout" lines select one of 64-pixels per board.

Image Memory

An image memory for a display in accordance with the present invention can take various forms; such as being implemented with static RAMs, dynamic RAMs, CCDs, ROMs, and other memory devices. The memory architecture can be a random access, sequential access, block access, or other form of architecture. The image memory can be implemented in an unbuffered form, or in a buffered form; such as with a double buffer, in conjunction with various line buffers, and in conjunction with frame buffers. These various alternatives can be adapted to operate with the present invention based upon the teachings herein showing a detailed design of a RAM image memory using static RAMs and accessed in a block oriented scanout arrangement. This configuration will now be discussed in detail with reference to FIGS. 6E to 6N.

Address generators for use with the memory arrangement shown in FIGS. 6E to 6N are discussed with reference to FIGS. 6O to 6R. The address generators can generate sequential addresses at the appropriate vector angle through image memory. Multiple RAM chips, in this example all RAM chips, are addressed with the more significant bits of the same address word for simultaneously accessing the corresponding word in each of the multiple RAM chips. The less significant bits of the address word are used to select which of the chips is to be enabled for outputting onto the output bus. The chip enable control is a higher speed control and hence permits higher speed memory operations when scanning out within a memory block and the chip address control is a lower speed control and hence involves lower speed memory operations when re-addressing. Therefore, two types of addressing will be described with reference to FIGS. 6E to 6N, which are re-addressing with the more significant address bits and scanout with the less significant address bits.

Re-addressing is performed with fanout buffers U19A for the Y-address bits and U19D for the X-address bits. These buffers generate the drive current necessary to fanout to a large number of RAM chips. In this configuration, 64-RAM chips are grouped on each of two image memory boards with each board having replicated buffers to facilitate increased speed and modularity. The buffer outputs are applied to the address inputs of the RAM chips. During scanout, the addresses are maintained constant. During re-addressing, the addresses are changed.

Scanout is performed with decoders U19B, U19C, and U19E. The less significant address bits are applied to these decoders and decoded into X-address and Y-address signals. The X-address signals select rows of RAM chips and the Y-address signals select columns of RAM chips in a 2-dimensional configuration on each board. Replicating memory address logic on each board facilitates increased speed and modularity. Each row and each column is composed of 8-RAM chips for an 8-by-8 array of RAM chips per board.

The Y-axis decoder U19B is addressed with the less significant Y-address bits YA0, YA1, and YA2 for decoding of column signals. The decoded column signals are applied to the RAM chip select pin, pin 18, to select the column of RAM chips and are applied to the Intel 8216 bus interface chips associated with that column for outputting to the memory output bus.

Selection of one of the 2-boards is provided with the fourth from the least significant X-address bit XA3 applied to U19B-6 and to the Intel 8216 chip select logic. XA3-bar is used to select memory board-1, XA3 is used to select memory board-2. Therefore, as the scanout proceeds in the X-direction, the same block on alternate boards are selected without re-addressing; effectively providing a 16-column by 8-row aspect ratio of RAM chips. Enabling of U19B with XA3 or XA3-bar to pin-6 is an optional control; where selection of one of two memory boards is performed with the Intel 8216 bus interface logic, as described below. Gating the column addresses U19B-6 with the XA3 and XA3-bar signals reduces memory power consumption.

The X-axis decoders U19C and U19E are addressed with the least significant X-address bits XA0, XA1, and XA2 for decoding of row signals. Decoder U19C is used for read operations, where the decoded row signals are applied to the RAM data enable pin, pin 20, to select the row of RAM chips for read operations. The RAM data enable control, pin 20, is conventionally used for selecting data direction during read and write operations. However, in this configuration; it is also used to facilitate 2-dimensional scanout capability. Decoder U19E is used for write operations, where the decoded row signals are applied to the write control pin, pin 21, to select the row of RAM chips for write operations. The DIEN-bar signal is generated from the computer run/load-bar signal DOA6; enabling U19C-6 for read operations during the run mode when DIEN-bar is 1-set, disabling U19C-6 for read operations during the load mode when DIEN-bar is 0-set, enabling U19E-5 for write operations during the load mode when DIEN-bar is 0-set, and disabling U19E-5 for write operations during the run mode when DIEN-bar is 1-set. Therefore, during the run mode, U19C is enabled for reading image memory and U19E is disabled for preventing writing into image memory. Also, during the load mode, U19C is disabled to prevent reading of image memory and U19E is enabled for permitting writing into image memory. Enabling of U19E enables the write pulse W-bar input to U19E-4 to be steered to the appropriate row of RAM chips for writing into the RAM chip that is enabled with the chip select column signal to pin 18.

The RAM chip data lines carry the output byte from the selected RAM chip during read operations and carry the input byte to the selected RAM chip during write operations. A shared bi-directional bus structure is used for bi-directional communication with the RAM chips. Intel 8216 bus interface circuits are used for bi-directional communication between a read bus and a write bus and the RAM chip. Each Intel 8216 can accommodated 4-lines, where Intel 8216 chips are used in pairs; U17A and U18A, U17B and U18B, U17C and U18C, and U17D and U18D; to accommodate the 8-lines of a RAM data byte. As can be seen in the memory schematics (FIGS. 6E to 6N); on the system bus side, the 8-input unidirectional lines for each pair of Intel 8216s are connected to different lines on the system write bus and the 8-output unidirectional lines for each pair of Intel 8216s are connected to different lines on the system read bus. On the memory side, the bi-directional input and output buffers of the 8216s are internally connected together to provide 8-bi-directional lines connecting to the 8-lines for each RAM chip associated with the particular pair of Intel 8216s. The design connects the data buses for a pair of columns of RAM chips to a single pair of Intel 8216s. This facilitates a tradeoff of the number of Intel 8216 chips used and the speed of operation.

A pair of NAND-gates U17E and U18E are used to OR the two column select signals associated with the pair of Intel 8216s and to AND the board select signal XA3 or XA3-bar for selection of the pair of Intel 8216s as a function of the selected board and the selected column pair of RAMs on that board. The selected pair of Intel 8216s connect the selected RAM to the input bus or output bus under control of the above described signals.

The run/load-bar signal applied as the DIEN-bar signal on pin 15 of the Intel 8216s selects the direction of data communication. If the DIEN-bar signal is 1-set, indicative of the run mode of operation; the 1-set signal applied to pin-15 of an Intel 8216 commands data output from the RAM data bus to the memory output data bus for reading of RAM. If the DIEN-bar signal is 0-set, indicative of the load mode of operation; the 0-set signal applied to pin-15 of an Intel 8216 commands data input to the RAM data bus from the memory input data bus for writing into RAM.

During read operations, all RAM chips are addressed with the same address signals and one of the RAM chips is selected with a combination of a column select signal and a row select signal. The selected RAM chip will have its output data lines enabled to be applied to the output data bus through the Intel 8216 bus interface chips. The column select signal also selects the Intel 8216 bus interface chips associated with selected column for applying the column-related RAM bus to the data bus for reading.

During write operations, all RAM chips are addressed with the same address signals and one of the RAM chips is selected with a combination of a column select signal and a row-selected write pulse for writing the information from the data lines into the selected RAM chip. The column select signal also selects the Intel 8216 bus interface chips associated with the selected column for applying the input data from the data bus to the RAM chips for writing.

Improved IC Memory Chip

An improved IC memory chip, can be implemented in accordance with the teachings of the present system and can provide important advantages over conventional memory chips. This improved memory chip can have multiple tristate control chip select inputs, similar to the 2-dimensional arrangement of the chip select and data enable signals. Also, each memory chip can have an output register to latch the accessed data, where the output register has an output tristate select with multi-dimensional selection. The data can be latched for scanout and new data can be accessed with a changing address. The data can be strobed into the output register before re-addressing the RAM, such as with a data hold strobe.

Multiple dimensions of tristate output select, can be implemented, exemplified by the 2D tristate control of the system disclosed herein. 2D, 4D, and other multi-dimensional tristate controls can provide further advantages in decoding and scanning-out from image memory.

Memory Logical Design

The memory implemented for the experimental configuration is implemented in a multiple board arrangement, where each board contains 64-RAMs organized in a logical 8-RAM column by 8-RAM row 2-dimensional array. All RAMs receive the same address. All 8-RAMs in an 8-RAM row receive the same X-select signal, which is different from the X-select signal for all other rows. All 8-RAMs in an 8-RAM column receive the same Y-select signal, which is different from the Y-select signal for all other columns. The input data and output data signals are bussed together for groups of 16-RAMs and interfaced with Intel 8216s for connecting to the system databus.

The regular array of RAMs lends itself to a tabular wire list type of documentation. MEMORY TABLE-A to MEMORY TABLE-D list the interconnections for the 64-RAM array on a board. The RAMs are organized in a physical 4-row by 16-column array comprising row-A to row-D and column-1 to column-8. Each RAM is identified by the physical row and column designation; where RAM U1A is the RAM that occupies the row-A and column-1 position, RAM U6C is the RAM that occupies the row-C and column-6 position, and the other RAMs occupy the other positions in row-A to row-D and column-1 to column-16.

MEMORY TABLE-A lists the connections for pin-1 to pin-12 of the first group of 32-RAMs. MEMORY TABLE-B lists the connections for pin-1 to pin-12 of the second group of 32-RAMs. MEMORY TABLE-C lists the connections for pin-13 to pin-24 of the first group of 32-RAMs. MEMORY TABLE-D lists the connections for pin-13 to pin-24 of the second group of 32-RAMs.

The address connections are the same for all RAMs; where pins 1 to 8, 19, 22, and 23 are connected to an 11-wire address bus; where each bus wire connects the same pin on each RAM. The vertical scanout pin, pin 18, for all 8-RAMs in a logical column are connected together and are connected to the vertical scanout signal from U19B corresponding to the particular logical column. The horizontal scanout pin, pin 20, for all 8-RAMs in a logical row are connected together and are connected to the horizontal scanout signal from U19C corresponding to the particular logical row. The horizontal write pin, pin 21, for all 8-RAMs in a logical row are connected together and are connected to the horizontal write signal from U19E corresponding to the particular logical row.

The databus connections are the same for all RAMs in a double logical column or single physical column array; where pins 9 to 11 and 13 to 17 are connected to an 8-wire data bus connecting all 16-RAMs in the double logical column or single physical column group. A pair of Intel 8216s connect each 16-RAM databus to the system databus with bi-directional read and write signal paths. Four pairs of Intel 8216s bi-directionally connect all 64-RAMs to the system databus.

Other Memory Configurations

Various configurations of the memory of the present invention have been described above to illustrate how the various features and devices of the memory of the present invention can be used to implement a system. These configurations are illustrative of a large number of other configurations that can be implemented from the teachings herein.

The memory configuration of the present invention has been discussed relative to implementing a 2D memory map for an image processing system and has briefly been discussed for other applications. It is herein intended that the memory architecture of the present invention be usable with other types of display systems and with other systems, such as computer systems and signal processing systems, that are not display systems.

The memory configuration of the present invention has been discussed in memory map form with an address derived from an X-axis address component and a Y-axis address component. Alternately, other addressing configurations can be implemented; such as a single address component for what may be considered to be a 1D memory, a 3-address component for what may be considered to be a 3D memory map, and other memory addressing configurations.

The memory configuration of the present invention has been discussed with reference to an integrated circuit RAM of the Mitsubishi M58725P-type. However, the teachings of the present invention are also appropriate for other integrated circuit RAMs and are also appropriate for integrated circuit ROMs and other memory technologies.

The memory configuration of the present invention has been discussed for a RAM component having 2-tristate control signals for controlling the tristate input and output of the RAM. Alternately, other numbers of tristate control signals can be accommodated; such as 1-tristate control signal, 3-tristate control signals, 5-tristate control signals, and other quantities of tristate control signals. The architecture for 2-tristate control signals permits implementation of what may be termed a 2-dimensional scanout arrangement having X-scanout control signals and Y-scanout control signals. Alternately, for a configuration having RAMs with 1-tristate control signal, a memory architecture that may be termed a 1-dimensional scanout arrangement can be implemented having 1-scanout signal to each RAM. The 1-scanout signal may be a single dimensional decode of the scanout portion of the address; such as 6-scanout bits being decoded to 64-RAM control signals with a different one of the 64-control signals going to each RAM tristate control signal input. Alternately, for a configuration having RAMs with more than 2-tristate control signals; such as 3-tristate control signals; a memory architecture that may be termed a multi-dimensional scanout arrangement; such as a 3D scanout arrangement; can be implemented with multiple scanout signals to each RAM; such as 3-scanout signals to each RAM. For example, the scanout portion of the address word can be divided into 3-groups of scanout signals, similar to the 2-groups of scanout signals for the arrangement discussed with reference to FIGS. 6E to 6N, and 1-signal from each of the 3-groups of scanout signals can be applied to a different one of the 3-tristate control inputs to the RAM for what may be considered to be a 3D-scanout control arrangement.

The memory configuration of the present invention has been discussed for an arrangement that applies the same re-addressing portion of the address word to all RAMs. Alternately, the re-addressing portion of the address word can be partitioned to different RAMs; such as with decoding of a portion of the address and selecting blocks of RAMs with the decoded signals, such as to the chip select pin of the RAMs.

The multi-dimensional memory addressing arrangement discussed herein has been illustrated with reference to RAMs having 2-tristate control pins. Such multi-dimensional addressing can be implemented with a memory having a single tristate control pin, as discussed above, with digital logic to convert the single tristate control pin to a multi-dimensional scanout addressing arrangement. For example, the single tristate control pin, if implemented in complement logic form for selecting with a complement signal, can be accessed with a 2-dimensional scanout arrangement by NANDing the 2-scanout address signals, such as the row select signal and the column select signal, with a NAND-gate to control the single tristate pin of the RAM. Similarly, multiple dimensional scanout control signals can be combined with logic external to the RAM to adapt the external scanout control signals to the particular capabilities of the RAM. For example, a a 6-dimensional scanout arrangement can be adapted for a 3-dimensional tristate controlled RAM by combining the 6-dimensional scanout signals into pairs processed with two input NAND-gates to control the 3-tristate pins. Alternately, this 6-dimensional scanout arrangement can be adapted for a 2-dimensional tristate controlled RAM by combining the 6-dimensional scanout signals into groups of 3-signals processed with 3-input NAND-gates to control the 2-tristate pins.

The memory configuration of the present invention has been discussed for an arrangement that pre-buses the data lines of 16-RAMs into a pre-databus and then further buses the 16-RAM pre-bused signals together onto a system databus. Other partitioning of bused data signals can be provided. For example, all data signals can be bused together onto the system databus without the intervening pre-busing of the 16-RAM data outputs. Alternately, other combinations of RAMs than 16-RAMs can have the data lines pre-bused, such as pre-busing of the data lines of 8-RAMs together.

BUFFER MEMORY

General

A buffer memory can provide important capabilities, such as discussed herein. For example, in a display application; a buffer memory permits the output pixel rate to be independent of the input pixel rate, such as for inputting at a rate consistent with the image processor and image memory characteristics and outputting at a rate consistent with CRT monitor characteristics. Further, it permits the CRT monitor to be relatively independent of discontinuities in the image processor, such as permitting the image processor to change the image processing clock period, without causing an undesirable transient on the CRT monitor. Still further, it permits the image processor to operate for the full blanked and unblanked line periods even though the CRT monitor may only be displaying information during the unblanked period; such as by loading the buffer memory during both, the blanked and unblanked periods, and unloading the buffer memory only during the unblanked periods. Yet further, it permits a multi-pixel kernel to be available to a spatial filter without requiring the image processor to make multiple redundant memory accesses of kernel pixels.

A buffer memory can be implemented inbetween an image memory and a display monitor to provide various capabilities. For example, in a spatial filtering arrangement; a buffer memory can provide a 2-dimensional kernel of 9-pixels for each center pixel without the need to provide 9-pixel accesses from the image memory for each center pixel. Also, a buffer memory can provide greater pixel resolution by permitting accessing of a slower image memory during the full line period, blanked and unblanked, at a lower pixel rate and accessing the faster buffer memory during the unblanked line period at a higher pixel rate. Further, a buffer memory permits use of a slower speed image memory because of the ability to access the image memory during the full line period, blanked and unblanked, and the ability to use the block partitioning arrangement of image memory with a high speed scanout implementation. Still further, a buffer memory permits the image memory to be accessed at a rate different from the display pixel rate and permits the image memory to be accessed at a non-constant rate and an asynchronous rate relative to the display monitor refresh rate; such as for equalizing different rate pixel output periods from the image memory caused by a fast scanout rate and a slower block transition rate.

The memory architecture discussed herein has many advantages. For example, a memory configuration is provided for high resolution pixel rates to a display monitor using slow RAMs for image memory. Also, a configuration is provided for generating a kernel of 9-pixels to be available in parallel for image processing using an image memory that is accessed at a lower rate. Also, a configuration is provided for buffering of accessed information that is to be used a plurality of times as an alternate to multiple accesses for information that is to be used a plurality of times.

A first-in first-out (FIFO) memory can be used as a buffer memory. This permits substantially simultaneous loading and unloading of the buffer memory and permits time sharing of a single buffer memory between loading and unloading operations. Contention between loading and unloading operations can reduce effective speed. For example, with unloading requirements determined by the display monitor pixel rate and with image quality effected by changes in the output pixel period, the memory speed can be kept relatively high and the output pixel period can be kept constant. This can be accomplished by resolving contention in favor of the output accessing of the FIFO, effectively reducing the input rate due to contention. A multiple buffer arrangement, such as a double buffer arrangement, can be used for a buffer memory. A multiple buffer is configured with redundant memory circuits, where one buffer is being loaded while another buffer is being unloaded, consequently reducing contention therebetween. Therefore, loading and unloading of the buffer memory can proceed at the write and read rates, respectively, for the memory circuits without reducing the rates as a result of contention. An advantage over a FIFO can be obtained with a multiple buffer because a FIFO involves both read and write operations in the same memory at substantially the same time while a multiple buffer arrangement permits either read operations for outputting from the buffer without write operations or permits write operations for inputting to a buffer without read operations; thereby permitting slower RAM circuits and greater pixel rates.

A double buffer memory can be implemented with the required buffer being replicated with double the amount of RAM circuitry. For example, a 1-line buffer configuration would be implemented with a double 1-line buffer for storing of an image in a first line-buffer while accessing a 1-line image from a second line-buffer. Similarly, a 3-line buffer configuration would be implemented with a double 3-line buffer for storing of a 3-line image in a first 3-line buffer while accessing a 3-line image from a second 3-line buffer. An alternate configuration provides a multiple buffer, such as a double buffer, without the need to double all of the buffer memory capability. For example, a system having a 3-line buffer for convenient generation of a 9-pixel kernel can be implemented with a 3-line buffer for the output buffer and a 1-line buffer for the input buffer and having precession or commutation of line buffers between input and output operations. This can reduce memory requirements, such as reducing requirements from a 6-line full double buffer to a 4-line improved buffer; yielding a reduction in memory circuit requirements by one-third.

Memory architecture pertaining to a buffer memory provides further speed enhancement in addition to the scanout and re-addressing features discussed above. For example, in a display application image memory can be accessed during the full line period, blanked and unblanked portions, and pixels can be output to the monitor during the unblanked portion and not during the blanked portion. This provides a meaningful speed advantage, such as a 16%-speed advantage for a configuration having 53-microseconds per line unblanked period and 63-microseconds per line blanked plus unblanked periods. This buffer memory feature is relatively independent of the type of memory chips available and relatively independent of the scanout and re-addressing arrangement.

Memory architectural features of sequentially accessing a scanline of pixels and buffering the scanline of pixels for multiple operations at different times for each pixel, such as kernel processing, provide a memory bandwidth enhancement. These features utilize several characteristics of the experimental configuration. Pixels can be accessed from image memory in an ordered form, such as in a scanline form consistent with the ordered form of pixels in a raster scan CRT monitor. The number of pixels to be buffered may be a relatively small percentage of the total image memory capacity, such as 3-scanlines out of 512-scanlines, about ½% of the image memory capacity.

The memory configuration in the experimental display system has significant advantages over other memory architectures. For example, it provides more than a 10-MHz rate for a kernel of 9-pixels, which is equivalent to a pixel access rate of more than 90-MHz (10-MHz kernels times 9-pixels/kernel). It performs this function using 200-ns RAM chips, implying only a 5-MHz pixel rate (1/200-ns=5-MHz). Therefore, it provides about an 18-times advantage in memory access rate (90-MHz/5-MHz=18-times). Alternately, accessing each of the kernel pixels at the implied 5-MHz access rate provides a kernel access rate of 0.55-MHz (5-MHz/9-pixels) instead of the 10-MHz kernel rate in the above example. Such an 0.55-MHz rate may be further degraded because the 200-ns access time of the RAM may be degraded by additional propagation delays, such as address input and data output logical propagation delays. Consequently, an advantage of about 20-times in memory bandwidth can be obtained.

Speed advantages can be obtained by accessing information from memory at a higher duty cycle and lower clock rate and outputting information at a lower duty cycle and higher clock rate by buffering accessed information with a buffer memory. For example, in a display system; pixels can be accessed from image memory at a slower clock rate during the full line period, blanked and unblanked line period portions, and pixels can be output to the display interface at a higher clock rate during the unblanked portion of the line and not during the blanked portion of the line.

Important speed and memory access advantages can be obtained by buffering of information that will be used a plurality of times, such as by buffering pixel information that will be used 9-times for a 9-kernel pixel. In this configuration, each pixel can be used to generate 9-output pixels, where a pixel will be used at each of 9-kernel positions for generating 9-adjacent pixels. Therefore, buffering the output pixels can reduce memory access bandwidth by a factor related to the number of times the pixel is used, 9-times in this example.

A system requiring a 13-MHz pixel rate during the unblanked period of a line and requiring accessing of 9-pixels from image memory for each output pixel implies a memory access rate of 117-MHz (13-MHz times 9-input pixels for each output pixel). However, accessing of memory during the full line period (both blanked and unblanked portions) can provide an improvement of 1.24-times by accessing of pixels at about a 10.5-MHz rate during the full line period, blanked and unblanked portions, (13-MHz times 53-microseconds unblanked period divided by 67-microsecond for the blanked and unblanked period). Further, the buffer memory arrangement discussed herein overcomes the need to access 9-pixels from image memory to generate a single output pixel with a novel buffer memory configuration. Consequently, the buffer memory arrangement discussed herein can provide an improvement over 11-times (1.24 times 9) over a non-optimized arrangement.

FIFO Buffer Memory Architecture

The arrangement discussed above for generating a sequential line of pixels can be adapted to provide a triple line of pixels for spatial processing. A single line of pixels can be converted to a triple line of pixels with a look-ahead buffering arrangement. For example, if the memory map scanout is performed a line ahead of the display refresh and if 3-scanlines of scanned-out pixels are buffered, then the 9-pixels for a particular kernel, which is centered about the present pixel being displayed, is available in the 3-scanline buffer. The 3-scanline buffer can be implemented in various arrangements, such as with a double buffer arrangement and with a FIFO arrangement. A FIFO arrangement will now be discussed with reference to FIG. 5D.

Figure 5D:
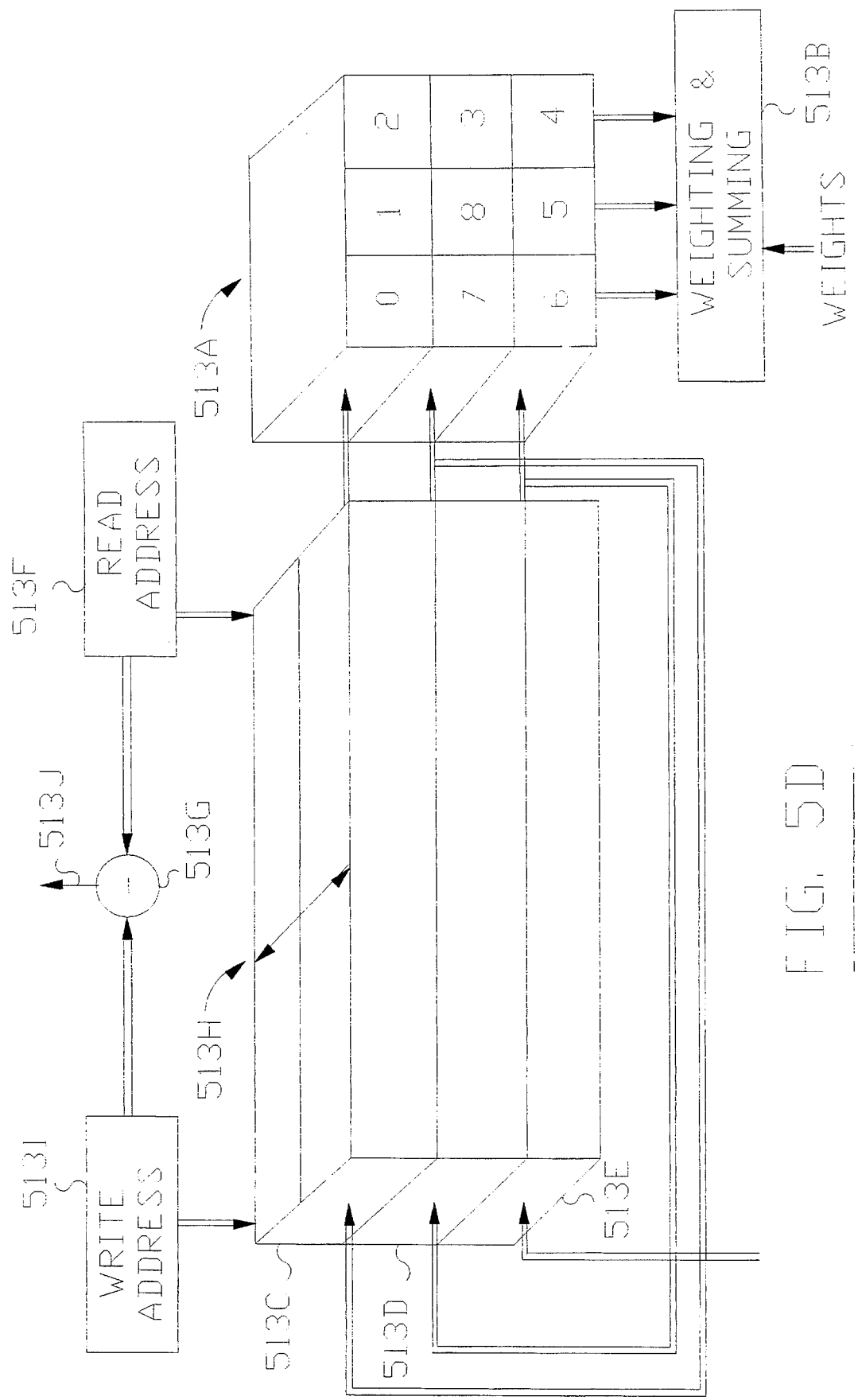

The arrangement shown in FIG. 5D comprises 3-scanline buffers 513H implemented as FIFOs and an output register array 513A implemented to provide a 9-pixel kernel in parallel for spatial processing. The FIFOs are shown connected in serial form so that the next line of pixels being accessed are shifted into the lower FIFO channel 513E the present line of pixels, which is being shifted out of the lower FIFO channel 513E, is recirculated and shifted into the middle FIFO channel 513D; and the present line of pixels, which is being shifted out of the middle FIFO channel 513D, is recirculated and shifted into the upper FIFO channel 2610C. Consequently, the lower FIFO channel 513E contains the next line of pixels, the middle FIFO channel 513D contains the present line of pixels, and the upper FIFO channel 513C contains the prior line of pixels. The parallel shifting of all three FIFO channels 513H makes available the next line, present line, and prior line of pixels; which can be shifted into the parallel register array 513A for spatial processing with processor 513B.

FIFOs can be implemented with RAMs, where the next address to be loaded is generated with a write address counter 513I and the next address to be accessed is generated with a read address counter 513F. As pixels are shifted into the FIFO, the write address counter 513I is incremented to the next available FIFO address. As pixels are shifted out of the FIFO, the read address counter 513F is incremented to the next FIFO address to access the next pixel in sequence. The read address counter can be incremented at a rate consistent with the display refresh requirements, which can be a constant rate along a scanline and a zero rate during line retrace and frame retrace. The write address counter can be incremented at a rate consistent with the scanout of pixels from the image memory, which can be a constant rate within a block and a lower rate between blocks. Therefore, the FIFO permits interfacing of two circuits operating asynchronously relative to each other. Comparator 513G can be implemented to compare the read address and the write address from read address counter 513F and from write address counter 513I, respectively. In normal operation, the write address is ahead of the read address. However, if the FIFO gets overloaded, the read address counter can be advanced up to and past the write address counter; thereby overwriting important data. Comparator 513G detects such an overwrite condition and generates an error signal 513J, such to alert the operator or to override input operations.

The line buffer can be initialized by initiating image memory scanout prior to the first line to be displayed in order to load the 3-lines into the line buffer. This can be achieved with a look-ahead executed during the end of the previous frame, such as during the frame retrace period. Also, the system can be configured so that the average scanout rate from image memory is greater than the refresh rate of the display. Therefore, the line buffer will have sufficient pixels for refreshing the display. If the line buffer becomes fully loaded, detected by the read address approaching the write address; a disable signal can be generated to disable scanout from image memory until the display refresh has vacated capacity in the line buffer.

The parallel registers 513A can be implemented in a 3-pixel by 3-pixel array so that each row of three registers receives 3-pixel words from the corresponding line buffer channel. For example, the top row of registers 0, 1, and 2 receives prior pixel words from the top line buffer channel; the middle row of registers 7, 8, and 3 receives present pixel words from the middle line buffer channel; and the bottom row of registers 6, 5, and 4 receives next pixel words from the bottom line buffer channel. Implementation of the parallel registers to transfer in the row direction toward the right permits pixel words to be shifted into the register rows from the line buffer and to be shifted along the register row toward the right as the scanline progresses. Therefore, only a single pixel need be shifted out of each line buffer channel for a particular pixel period; where the three rows of pixels are shifted toward the right to cause the kernel to shift toward the right along the scanlines.

The intensities for the 9-pixels stored in registers 513A can be output to the weighting multipliers and adders 513B for sum of the product processing for spatial filtering.

Kernel Memory Operations

Image processing may involve processing of a plurality of pixel intensities to generate a single pixel intensity for display. For example, an output pixel to a display monitor may be a convolved sum of the weighted intensities of a kernel of pixels. A kernel of pixels may be a 3-pixel by 3-pixel kernel, a 5-pixel by 5-pixel kernel, or other kernels. The need to process multiple pixels to generate each output pixel implies that image memory must be accessed a plurality of times for a plurality of pixels that are to be convolved for each output pixel. For example, in a configuration that processes a 9-pixel kernel to generate an output pixel, image memory would be accessed 9-times for a 9-pixel kernel for each output pixel period. This imposes a memory bandwidth requirement of 9-times the output pixel rate for the image memory access rate. Therefore, a system using such a configuration would require very high speed image memories or alternately would have relatively low resolution; either spatial resolution, or temporal resolution, or both; or alternately would have a combination of high image memory speed requirements and low output resolution. For example, a system having a 10-MHz output pixel requirement and a 9-pixel kernel spatial filtering output processing requirement would appear to need a 90-MHz memory pixel access rate. However, 90-MHz RAM chips may have poor availability and may be relatively expensive compared to slower speed RAM chips.

An arrangement is provided herein using a buffer memory to store pixels accessed from image memory at the output pixel rate and providing a kernel of 9-pixels to the output filter. This configuration permits accessing of a 9-pixel kernel at more than a 10-MHz rate, yielding an equivalent pixel rate of more than 90-MHz (9-pixel kernel times 10-MHz). However, this configuration uses RAM chips having a 200-ns access time, implying an equivalent pixel access rate of about 5-MHz. This yields an improvement of about 18-times (90-MHz/5-MHz) in memory access bandwidth and permits use of less expensive lower speed RAMs to obtain relatively high resolution and to support multiple pixel kernel spatial filtering.

Blanked and Unblanked Memory Operations

A video signal can be generated with a plurality of line synchronization signals having a blanked portion for horizontal retrace and having an unblanked portion for displaying a line of the image. For example, the line rate may be about 15,750-Hz; yielding about a 63-microsecond line period. Approximately 10-microseconds of this line period may be blanked, yielding about a 53-microsecond unblanked line period. In a system having a direct output from the image memory to the display monitor, the image memory may be accessed during the unblanked period and the image memory may not be accessed during the blanked period. However, important advantages can be obtained by accessing image memory during the full line period, during both blanked and unblanked portions of the line period. This can be implemented with a buffer memory that stores pixels during the blanked and unblanked portions of the line period and accesses pixels for display during the unblanked portion of the line period.

The number of pixels that are input to the line buffer from image memory may be the same as the number of pixels that are output from the line-buffer to the display monitor. The output period can be implemented to be the unblanked portion of the line period and the input period can be implemented to be the blanked plus unblanked portions of the line period. Therefore, because the output period is shorter than the input period; the output rate can be greater than the input rate. Consequently, the image memory generating the input rate can be slower than the output pixel rate and, hence, the output pixel rate can be greater than indicated by image memory speed. For example, in a system having a 63-microsecond line period and a 53-microsecond unblanked portion of the line period, a 10-MHz buffer input rate can be buffered to provide about a 12-MHz output rate because of the greater input period for loading the buffer; i.e., 63-microseconds; compared to the output period for unloading the buffer; i.e., 53-microseconds. This permits relatively slower speed RAMs to be used for image memory, which may be a larger memory (i.e.; a 265,000 pixel image memory) in conjunction with a higher speed buffer memory, which may be a smaller memory (i.e.; a 512-pixel line buffer memory); thereby efficiently providing high pixel rates with relatively slow speed image memory RAMs.

⁴⁄₃rds Buffer Memory Architecture

The buffer memory features discussed herein are illustrated with a novel buffer memory, herein called a ⁴⁄₃rds buffer memory, that provides double buffer memory capabilities. A double buffer memory duplicates the buffer memory requirements so that a first buffer memory can be in the process of being loaded while a second buffer memory is in the process of being unloaded. The ⁴⁄₃rds buffer memory is more efficient than a full buffer memory because it replicates only ⅓rd of the redundant buffer memory; where 3-lines are being simultaneously unloaded while a 4th-line is being loaded. This 3-line multiple buffer, implemented as a ⁴⁄₃rds line buffer, is illustrative of other multiple buffer type configurations that are optimized to reduce the amount of memory from double to less than double. For example, the improved multiple buffer memory can be implemented in the form of a ³⁄₂'s buffer, a ⁵⁄₃rds buffer, and other optimized multiple buffer configurations The optimized multiple buffer is exemplified with a precession technique. For example, a fractional portion of the buffer is replicated for loading while a full buffer is being unloaded. Then, the newly loaded portion of the buffer is precessed into the output buffer, the output buffer is precessed within the output buffer, and part of the output buffer is precessed to the input buffer. For example, in the ⁴⁄₃rds buffer arrangement discussed herein; line buffers, line buffer-1 to line buffer-4, are shared between input and output buffers; where the input line buffer uses a 1-line buffer and the other line buffer uses a 3-line buffer. Line-buffers, line buffer-1 to line buffer-4, may be precessed in sequence; where each line-buffer is sequentially switched to the input line buffer, output line-buffer channel-1, output line-buffer channel-2, output line-buffer channel-3, and then back to input line-buffer in sequence. When line buffer-1 is in the input line buffer position, line buffer-2 is in the channel-1 position, line buffer-3 is in the channel-2 position, and line buffer-4 is in the channel-3 position. During the next line operation, line buffer-1 is switched to the channel-1 position, line buffer-2 is switched to the channel-2 position, line buffer-3 is switched channel-3 position, and line buffer-4 is switched to the input buffer position. The 4-line buffers precess in sequence through the input buffer; output buffer channel-1, output buffer channel-2, and output buffer channel-3, and input buffer positions. Consequently, a new line of information is being loaded into the line-buffer in the input buffer position, the most recent line of information is being output in the output buffer channel-1 position, the next most recent line of information is being output in the output buffer channel-2 position, and the oldest line of information is being output in the output buffer channel-3 position. Hence, output buffer channel-1 provides kernel pixels 1, 2, and 3; output buffer channel-2 provides kernel pixels 8, 9, and 4; and output buffer channel-3 provides kernel pixels 7, 6, and 9. For the next line condition, each line is shifted end around; where the most recent line of information loaded in the line-buffer in the input position is switched to the output buffer channel-1 position, the line-buffer in the output buffer channel-1 position is switched to the output buffer channel-2 position, the line-buffer in the output buffer channel-2 position is switched to the output buffer channel-3 position, and the line-buffer in the output buffer channel-3 position (which is the oldest information and is no longer needed) is switched to the input buffer position for loading of a new line of information. This end-around shifting of lines of information causes a precession of the 4-line buffers to the 4-buffer positions to provide for inputting of a new line of information and for simultaneously outputting each of the last 3-lines of information for implementing a parallel 3-line 9-pixel kernel for spatial filtering.

Other Buffer Configurations

Various configurations of the buffer of the present invention have been discussed above to illustrate how the various features and devices of the buffer of the present invention can be used to implement a system. These configurations are illustrative of a large number of other configurations that can be implemented from the teachings herein.

The buffer of the present invention has been described in combination with other novel features of the present invention, such as a novel memory architecture. However, the buffer of the present invention can be used with other systems having other configurations, where the buffer of the present invention is not constrained to use only with the other elements of the system of the present invention.

The buffer of the present invention has been described for implementation with integrated circuit RAMs. Alternately, the buffer teachings of the present invention can be implemented with other memories; such as CCD memories, core memories, and other types of memories. Also, many of the teachings associated with the buffer memory of the present invention can be utilized with ROMs.

The weight memory of the present invention is described herein for implementation with integrated circuit RAMs. Alternately, the weight memory teachings of the present invention can be implemented with other memories; such as CCD memories, core memories, ROMs, PROMs, EROMs, and other types of memories. For example, the weight memory can be implemented as a weight ROM in place of the weight RAM.

The buffer of the present invention has been discussed in the form of a 4/3-buffer as an improvement on a double buffer. Other non-integer or fractional multiple buffers can be implemented, such as a 5/3-buffer instead of a 4/3-buffer, for replacing other integer multiple buffers, such as a triple buffer instead of a double buffer.

The buffer of the present invention has been discussed in conjunction with a 9-pixel kernel spatial filter. However, the buffer of the present invention can be implemented with other post processor arrangements with a kernel processor and can be implemented with other kernel processors, such as a 25-pixel kernel or a 48-pixel kernel processor.

EXPERIMENTAL SYSTEM

EXPERIMENTAL SYSTEM ARCHITECTURE

General Description

An experimental system is configured with a host computer, a display processor, a memory, and a color monitor. The host computer is implemented with an S100 bus configuration using S100 compatible boards, such as Compupro boards; together with disk drives, printers, and other peripherals. The CRT monitor is a conventional color monitor having an analog RGB input, shown with monitor documentation included herewith. The display processor and memory arrangement is configured with a plurality of wire wrap boards. These boards include a logic board, BL1; 2-memory boards, BM1 and BM2; a rear-end board, BR1; and a buffer board, BB1.

Operation of hardware and software in the experimental system discussed herein in conjunction with a color monitor demonstrates operation of the system, meeting of system objectives, and providing actual reduction to practice. For example, information has been loaded into image memory and has been display processed and displayed to demonstrate operation.

Supervisory Processor Interface

The interface between the supervisory processor and the display processor comprises input synchronization signals from the display processor to the supervisory processor to synchronize the supervisory processor with the display processor operations and output commands from the supervisory computer to initialize the display processor.

Synchronization signals include a frame synchronization signal and a line synchronization signal. The frame synchronization signal occurs during vertical retrace and vertical blanking of the video signal. The line synchronization signal occurs during horizontal retrace and horizontal blanking of the video signal. An interlaced scan arrangement is used for the experimental system, although other scan arrangements can readily be accommodated. A field identification signal is provided that identifies whether the field is a first field or a second field of the interlaced scan.

Communication between the supervisory processor and the display processor is performed with a 3-port parallel interface to a Compupro Interfacer-II board under program control. Each port has 8-parallel input lines and 8-parallel output lines. The port assignments are listed in the COMPUTER PORT TABLE included herein. Output signals are defined as DO signals and input signals are defined as DI signals. Port identification; A, B, or C; follows the DO or DI symbol. Signal line identification follows the port identification; i.e., DOA7 identifies output line-7 in port-A.

Signal DOA5 controls loading in sequential and random access form. Sequential loading is selected when DOA5 is high and random access loading is selected when DOA5 is low. When DOA5 is high, an output strobe on DOA7 causes the pixel address registers to be updated with the related slope parameters on the falling edge of the strobe. This insures compatibility with the DOA7 strobe used as a write-bar signal to write the previous pixel information into the previously addressed pixel in image memory.

Signal DOA6 controls loading and running operations. Running is selected when DOA6 is high and loading is selected when DOA6 is low. In general, DOA6 is high during displaying of images and DOA6 is low during loading of images into memory.

Signal DOA7 strobes the information output with Port-B and Port-C into the destinations. DOA7 is normally low, and DOA7 is pulsed high and then pulsed low under program control to form an output strobe.

Signal DIA0 inputs the frame sync pulse from the CRT monitor interface. This frame sync pulse is the blanking pulse that blanks the CRT monitor during the vertical retrace period and during a predetermined number of lines prior to and subsequent to the vertical retrace period. This frame sync pulse occurs once per field, twice per frame, in the interlaced scan system as implemented with the demonstration system. The rising edge of the frame sync pulse, detected under program control, initiates loading of the parameters for a new field from the supervisory processor into the display processor.

Signal DIA2 inputs the line sync signal from the CRT monitor interface, which is implemented for hardware control but not software control in the experimental system.

Signal DIA4 inputs the frame identification signal from the CRT monitor interface. DIA4 is high during the field-1 period and low during the field-2 period.

Signals DOB0 through DOB7 output the information to be loaded into the destination identified with Port-C. This information can be delta information to be loaded into the delta registers, pixel address information to be loaded into the pixel address registers, and pixel data to be loaded into image memory.

Signals DOC0 through DOC7 output the address of the destination to be loaded with the Port-B output signals. The various destinations are listed in the TABLE OF DESTINATION SELECT ASSIGNMENTS included herein; including the 4-delta registers each having an MSH and an LSH, 2-address registers each having an MSH and an LSH, data to be written into image memory, and weights to be written into a weight table memory.

Image Loading

Loading of an image into memory is performed by loading the XP and YP-address registers with the address of each pixel to be loaded, then outputting the pixel information to be loaded with Port-B, and then strobing the pixel information into image memory with the DOA7 signal. A sequential load feature is provided under control of the DOA5 signal. When the DOA5 signal is high, a vector can be loaded; where the previously loaded pixel address is incremented with the related delta parameter to obtain the next pixel address to reduce software overhead and thereby speedup loading of image memory.

Loading of image memory with the supervisory processor is performed with a 3-port output arrangement having 8-bits per port. The first port, Port-A, communicates control signals between the supervisory processor and the display processor. The second port, Port-B, communicates address and data information to be loaded into the display processor between the supervisory processor and the display processor. The third port, Port-C, selects the register or memory in the display processor for loading. The protocol involves outputting of the destination address on Port-C, outputting of information to be loaded into the display processor on Port-B, and then outputting of a data strobe on Port-A. The data strobe loads the output information into the selected destination.

A program to load vectors into memory is provided herein as the BASIC PROGRAM LISTING LD.ASC and is briefly discussed in the section entitled Software herein.

Software

Programs have been developed to operate the experimental system and are included herein in the tables BASIC PROGRAM LISTINGS. These programs are source programs, that are compiled with a Basic compiler and linked with a Basic linker to obtain compiled Basic programs. Compiled Basic programs run significantly faster that interpretive Basic programs, which maintains real time synchronization between the display processor and the supervisory processor. The source listings may be readily compiled and linked by one skilled in the art to provide the compiled Basic programs executed to perform the image loading and image processing operations. The programs are programmed to be menu driven, prompting the operator to select various operator-selectable options.

The Basic listings included herein have extensive annotation to teach one skilled in the art the features implemented therein.

The BASIC PROGRAM LISTING LD.ASC provided herein teaches loading of vectors into memory. The BASIC PROGRAM LISTING GRAPH.ASC provided herein teaches refreshing of a CRT monitor from memory. These listings are clearly coded and amply annotated to teach one skilled in the are how to operate the experimental system disclosed herein under program control.

Circuit Boards

The experimental system is implemented with wire wrap circuit boards consisting of 2-Memory Boards (BM1 and BM2), 1-Logic Board (BL1), 1-Buffer Board (BB1), and 1-Rear End Board (BR1). Each board is constructed with a Vector board, manufactured by Vector Electronic Company of Sylmar, Calif., having 1/10th inch hole spacings on a 17-inch by 8½-inch board. Wire wrap DIP sockets and cable connectors are inserted into the Vector board and interconnected with wire wrap interconnections. Information on the DIPs plugged-in to the DIP sockets is provided for selected boards in the printout of the TABLE OF DIP LAYOUT ON BOARDS included herewith. Information on the cable connectors is provided for each cable in the printout of the CABLE CONNECTION TABLE included herewith.

DIP assignments are provided for selected boards in the TABLE OF DIP LAYOUT ON BOARDS included herewith, for each board. DIPs are arranged on the boards as rows identified with alphabetical symbols; i.e., A to E; and as columns identified with numerical symbols; i.e., 1 to 23. Each DIP position on a board is identified with a U symbol followed by the column and row symbols (i.e., U3A).

Logical schematic diagrams showing implementation of the experimental system are provided herewith, such as shown in FIG. 6. These logical diagrams show standard commercially available integrated circuits; such as TTL series 7400 ICs, Mitsubishi M58725 RAMs, and 8216 bi-directional bus drivers, and Signetics 8T97 buffers. Specifications for these integrated circuits are available in catalogs and specification sheets from the abovementioned manufacturers and are well known in the art.

The schematic diagrams show the logical function in symbolic form, identify the type of IC, identify the DIP numbers and pin numbers, and show wiring interconnections between DIP and pin numbers. Device types are often shortened, such as shortening the name 74LS02 to LS02. DIP assignments are identified with U numbers, such as U20C representing the DIP at row-20 column-C on the subject circuit board. For example, a NOR-gate is shown at the top portion of FIG. 6B identified with the designation LS02 as being a 74LS02 quad NOR-gate integrated circuit, identified with the designation U21C as being located on the BL1 circuit board at row-C column-21, and having 2-input signals on pin-11 and pin-12 of the DIP and one output signal on pin-13 of the DIP. The input to pin-11 is shown connected to the output of DIP U22B pin-3, the input to pin-12 is shown connected to the output of DIP U20B pin-12, and the output from pin-13 is shown connected to DIP U7D pin-9. For convenience of documentation, interconnections may be designated by the DIP identification number and pin number separated by a dash; i.e., U21C-13 representing pin-13 of DIP U21C. For convenience of discussion, logical circuits may be designated by the DIP identification number and the output pin number separated by a dash; i.e., U21C-13 representing pin-13 of DIP U21C.

Cable List

A cable list is provided in the CABLE CONNECTION TABLE included herewith. This cable list identifies the cables between the various Vector boards and between the Vector boards and the supervisory processor. Each cable between display processor boards is implemented with a 50-pin ribbon cable having odd pins connected to ground for signal isolation. Each cable between the Vector boards and the supervisory processor is implemented with an RS-232 type 25-pin ribbon cable, consistent with the signal representations for the Compupro Interfacer-II board. The cable list identifies the pin associated with a signal, a symbol associated with the signal, a description of the signal, a representative source of the signal and a representative destination of the signal.

S-100 Bus System

The experimental system has been implemented with an S-100 bus based system performing supervisory processor functions in conjunction with the novel software and hardware, as discussed herein. Two S-100 bus based systems have been configured, the Camille system and the Murphy system. The configuration of the Camille system will be discussed in detail hereinafter. The Camille system comprises a computer, a pair of floppy disk drives, a terminal, and printers as discussed below.

The floppy disk drives are implemented with a pair of 8-inch disk drives in an enclosure and operating in conjunction with a DMA controller in the computer. The disk drives are manufactured by Siemens as the FDD 100-8; the drive enclosure is manufactured by International Instrumentation, Incorporated; and the DMA Controller is manufactured by CompuPro as the Disk 1 DMA Controller; all described in detail in the referenced manuals.

The terminal is manufactured by Applied Digital Data Systems, Inc. (ADDS) as the Model Viewpoint/3A Plus; described in detail in the referenced manual.

The printers include a dot matrix printer manufactured by Star Micronics, Inc. as the Gemini-10, a dot matrix printer manufactured by Epson as the FX-100, and a daisywheel printer manufactured by Smith-Corona as the TP-I; all described in detail in the referenced manuals.

The computer is implemented with a cabinet manufactured by Fulcrum Computer Products as the I8080 Microcomputer System Cabinet and having a backplane S-100 board manufactured by CPA which is described in detail in the referenced CPA manual.

The computer is implemented with various S-100 boards manufactured by CompuPro including the 8085-8088 CPU board, RAM 16 and RAM 17 memory boards, a System Support board, and a pair of Interfacer 2 boards. One Interfacer 2 board is used to interface to the terminal and printers. The other Interfacer 2 board provides the 3-channel parallel interface to the control logic. These boards are described in detail in the referenced manuals.

The joysticks are implemented with the Computer Compatible Joystick; described in the referenced applications notes.

The operating system is CP/M 80, which is described in detail in the referenced documents.

The applications program runs under Basic, which is described in detail in the referenced documents.

The following documents provide supplemental data on the computer system and are herein incorporated by reference.

1. Technical Manual, Siemens, OEM Floppy Disk Drive FDD 100-8, Technical Manual, Model 100-80.

2. Manual, International Instrumentation, Incorporated, Universal Disk Enclosures, General Information/Pricing, 1982.

3. User Manual, CompuPro Division of Godbout Electronics, Disk 1 Arbitrated 24 Bit DMA Floppy Disk Controller, 1981.

4. User's Manual, Applied Digital Data Systems, Inc., Viewpoint/3A Plus, 518-31100.

5. Operation Manual, Star Micronics, Inc., Gemini-10 printer.

6. Operation Manual, Epson, FX Printer, 1983.

7. Operator's Manual, Smith-Corona, TP-I.

8. Functional Description, CP-A, Revision 1.

9. Technical Manual, CompuPro Division of Godbout Electronics, 8085/8088 CPU Dual CPU, 2/83.

10. Technical Manual, CompuPro Division of Godbout Electronics, RAM 16 Static Memory, 4/82.

11. Technical Manual, CompuPro Division of Godbout Electronics, RAM 17 64K Static Memory, 9/82.

12. User's Manual, CompuPro Division of Godbout Electronics, System Support 1, 8/81.

13. Technical Manual, CompuPro Division of Godbout Electronics, Interfacer 2, 4/82.

14. The CP/M Handbook with MP/M, by Rodnay Zaks, published by Sybex, 1980.

15. CP/M Primer, by Stephen Murtha and Mitchell Waite, published by Howard W. Sams & Co., Inc., 1980.

16. An Introduction to CP/M Features and Facilities, published by Digital Research, January 1978.

17. Microsoft Basic Reference Book, published by Microsoft, 1979.

18. Microsoft Basic Compiler Documentation, published by Microsoft.

19. The Basic Handbook (2nd Edition), by David Lien, published by Compusoft Publishing, 1981.

20. Microsoft Basic (2nd Edition), by Ken Knecht, published by Dilithium Press, 1983.

21. Basic Basic (2nd Edition), by James Coan, published by Hayden Book Company, Inc., 1978.

22. Computer Compatible Joystick Instruction, applicable to: Apple-II.

LOGIC BOARD

Control Logic

Various control arrangements can be provided for controlling operation. For example; counter, ROM, and logical control arrangements of synchronous or asynchronous design can be used. A gated clock arrangement has been implemented for control, which is illustrative of other forms of gated clock control logic and other non-gated clock control logic implementations. This gated clock control arrangement will now be discussed with references to FIGS. 6B to 6D.

Figure 6D:
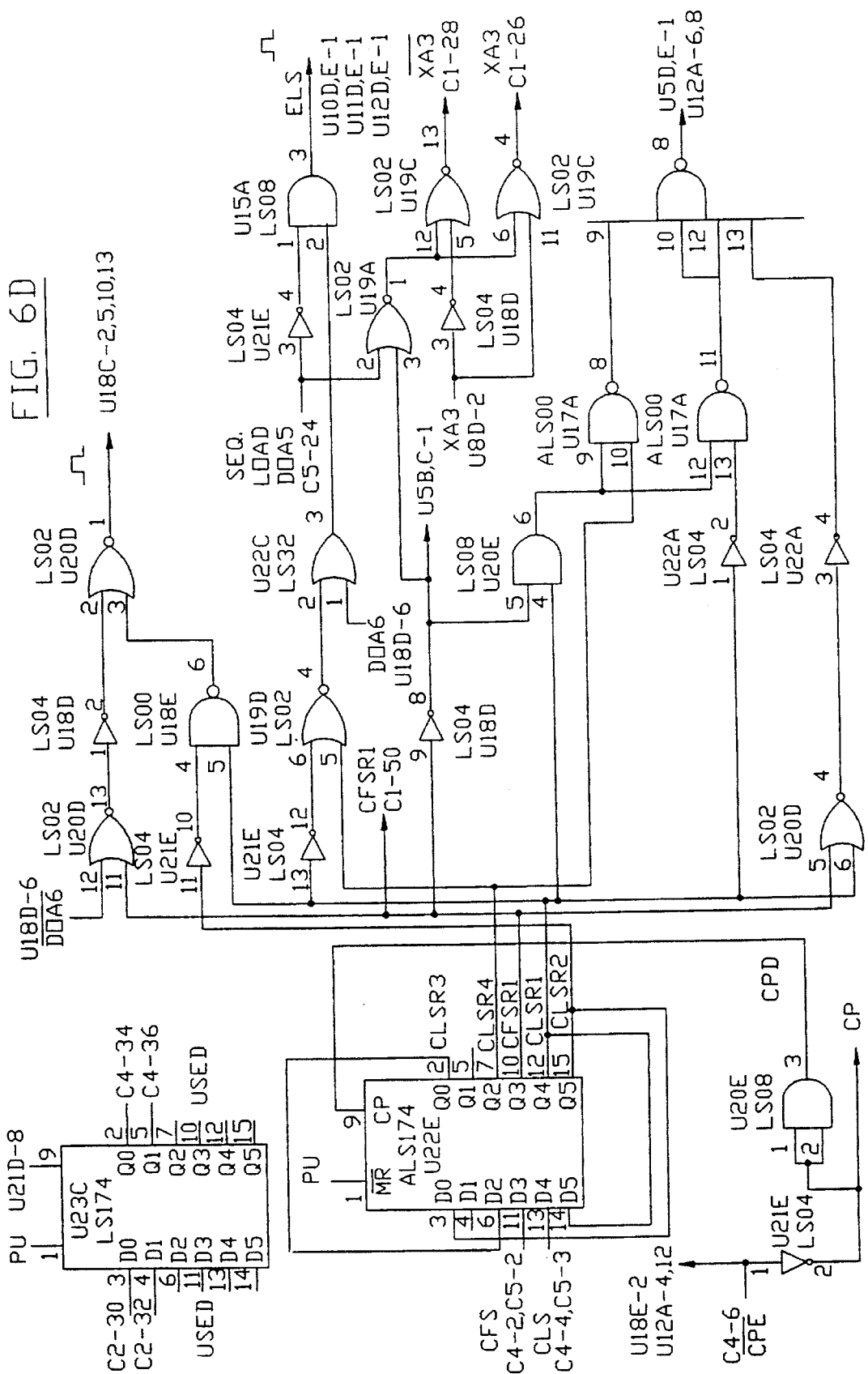
FIG. 6D is a detailed schematic diagram of control logic.

The gated clock control logic shown in FIGS. 6B to 6D controls the clock pulses to various logic devices; such as address generators, memories, and other devices; to clock the various operations associated therewith. For example, the write strobe W-bar to the memories is generated with U22C-11 and clocks to various registers are gated with circuits U21C, U20C, U19C, U19D, U18C, U9A, and U10A (FIG. 6B). Several different types of clocks are generated at different times and are controlled to be non-conflicting with other clocks. Load clocks are generated under computer control to load computer generated parameters into various registers. Address generator clocks can be generated under control of external sync pulses. High speed clocks can be generated under control of various signals to generate addresses that are not in contention with other signals generating clocks and are not generated at times that such addresses are not needed.

The logic composed of U18D-6, U22B-3, U21E-6, U19B, U20B, and U21D-6 (FIG. 6B) is controlled by the computer for generating strobe signals and control signals for loading computer information into the address generators and for disabling operations during loading of computer information. Logic gates U20C and U21C (FIG. 6B) gate the computer strobe to load delta registers. Logic gates U19C, U19D, and U18C (FIG. 6B) gate various clock signals to load and update R-registers. Logic gates U9A and U10A (FIG. 6B) gate various clock signals to load and update P-registers. Flip-flops U22E and associated logic U20D-4, U22A-4, U18D-8, U21E-4, U15A-3, U22C-3, U20D-13, U18D-2, U21E-10, U18E-6, U20D-1, U21E-12, U19D-4, U18E-3, U21D-8, U20E-6, U17A-8, U17A-11, U22A-2, U13A-8, U21E-2, U20E-3, and other related elements (FIG. 6D) synchronize and process the sync signals CFS and CLS to generate clock and control signals for processor operation. Logic gates and flip-flops U12A, U21D-8, U18E-3, U14A-2, U14A-4, U16A-3, U17A-3, U16A-6, U17A-6, U13A-6, U23C-10, U14A-6, U20E-11, U21B-5, U15A-11, U21B-2, U21E-8, and related gates (FIG. 6C) control the gated clock pulses for address generation operations.

The computer interface signals are defined in the tables of computer interface signals; PORT-A, PORT-B, AND PORT-C. Port-A input and output signals are control signals. Port-B output signals are address and data signals to load into the selected destination. Port-C output signals are destination select signals.

Computer load logic will now be discussed with reference to FIG. 6B. Computer control signals DOA6 and DOA7 control loading of initial conditions. When DOA6 is 1-set, run operation is commanded and loading of initial conditions from the computer with the load strobe DOA7 is disabled with gate U22B-3. When DOA6 is 0-set, run operation is disabled and load operation is enabled through inverter U18D-6 by enabling gate U22B-3 to pass an inverted computer strobe DOA7 as signal U22B-3. This gated strobe is used to clock the selected register, steered with the register address decoders U19B and U20B to gates U21C, U20C, U19C, and U19D. The inverted DOA6 signal U18D-6 is inverted with U21E-6 to generate the DIEN-bar signal for memory read and write operations. When DOA6 is high, defining the run mode; DIEN-bar is high establishing the memory read mode. When DOA6 is low, defining the load mode; DIEN-bar is low establishing the memory write mode. DIEN-bar control operations are discussed in detail with reference to FIGS. 6E to 6N for the memory logic.

Write signals U22C-6 and U22C-8 control writing into a peripheral RAM by enabling write pulses W2 and W3 when addressed through U19B-10 and U19B-9 respectively.

Gate U22C-11 is an OR-gate that is enabled with the address of the memory U19B-11 to load data into the memory for steering of the computer strobe U22B-3 to generate a write strobe to load the computer generated parameter into memory.

Gates U20C and U21C are NOR-gates that are enabled with the destination register address signals from U19B and U20B to select the delta register to be loaded by steering of the computer strobe U22B-3 to clock the appropriate delta register to load the computer generated parameter into the selected register.

A master clock, shown as CPE-bar (FIG. 6D), is fanned-out, gated, and applied to the synchronous elements. The CPE-bar clock is derived from a clock pulse generator and communicated to the logic board on cable C4-6. Alternately, clock CPE-bar can be generated with a self-contained clock generating operating asynchronously with reference to the external clock to permit optimization of clock periods for system operation. For example, the external clock may be constrained to a clock frequency consistent with the requirements of a sync generator for the CRT monitor, which may not be an optimum clock frequency for the address generators. Therefore, a separate clock can be provided having a clock frequency that is optimum for the address generators in place of the external clock.

Clock logic will now be discussed with reference to FIG. 6D. The clock CPE-bar is logically processed to clock synchronous elements in the address generators at the same time. For convenience of definition, clocking occurs at the rising edge of the delayed clock pulse CPD, which is delayed by 2-gate propagation delays after the early clock CPE-bar and one inversion of the early clock CPE-bar. For example, CPE-bar propagates through inverter U21E-2 and non-inverting AND-gate U20E-3 to provide one inversion and 2-delays to generate delayed clock CPD prior to being used to synchronously clock register U22E. Similarly, clock CPE-bar is delayed by gating logic U12A-8 and U12A-6 (FIG. 6C), providing one stage of delay and one stage of inversion, and by non-inverting gates U9A-6, U9A-8, U10A-6, and U10A-8 (FIG. 6B) to provide the 2-propagation delays and the single inversion from the early clock CPE-bar to the clock signals for registers U8D, U9D, U5D, U8E, U5E, and U9E.

In one display configuration, register U22E is used to synchronize operation of the logic with a frame sync signal CFS and a line sync signal CLS. A short synchronous pulse is generated in conjunction with the line sync signal CLS. CFS is synchronously clocked into flip-flop U22E-10 and CLS is synchronously clocked into flip-flop U22E-12 to latch these signals as CFSR1 and CLSR1 respectively synchronous with the address generator clock. Latched line sync signal CLSR1 is then latched in flip-flop U22E-15 one clock period later for a delayed line sync signal CLSR2. The delayed line sync signal CLSR2 U22E-15 is inverted with inverter U21E-10 and NANDed with the non-delayed line sync signal CLSR1 with NAND-gate U18E-6 to generate a short inverted pulse bracketing the first clock period of line sync signal CFSR1.

Clock signal CPE-bar (FIG. 6D) is gated with NAND-gates U12A-8 and U12A-6 (FIG. 6C) to generate a gated clock signal for address generation; which is performed with registers U8D, U9D, U5D, U8E, U9E, and U5E. Gating of the clocks to these registers with AND-gates U9A-6, U9A-8, U10A-6, and U10A-8 gates address generator operations.

Control logic for a display configuration will now be discussed with reference to FIG. 6D. Signal U13A-8 is a clock gate control signal for gating the address generator clock, as described herein with reference to FIG. 6C. This gate signal is comprised of three components; U17A-8, U17A-11, and U22A-4. These components cause the clock to be generated at the appropriate time in conjunction with the display sync signals. Gate U20D-4 ORs together the line sync and frame sync signals to enable the address generator clock through U22A-4 and U13A-8 when neither a frame sync signal CFSR1 nor a line sync signal CLSR1 is present. Gate U20E-6 ANDs together the inverted frame sync signal CFSR1 through inverter U18D-8 and the line sync signal. Gate U17A-8 NANDs together U20E-6 and the delayed line sync signal CLSR4 to enable the address generator clock through U13A-8. Gate U17A-11 NANDs together U20E-6 and the undelayed inverted line sync signal CLSR1 through inverter U22A-2 to enable the address generator clock through U13A-8.

The ELS signal U15A-3 controls multiplexers U10D, U11D, U12D, U10E, U11E, and U12E (FIG. 6D). During the appropriate portions of the load mode, the address generator P-registers are loaded from the address generator R-registers under control of the ELS signal. During other periods of time, the address generator P-registers are updated from the related delta registers under control of the ELS signal. The ELS signal is disabled by the sequential load control signal DOA5 inverted with U21E-4. This permits the P-registers to be updated from the delta registers to generate vectors into memory, such as for a display configuration. The ELS signal is strobed with a short pulse U19D-4 during the load mode DOA6 as controlled with U22C-3. During the load mode, the ELS signal is enabled with DOA6 enabling U22C-3 to pass the short pulse U22C-2. The short pulse is generated by the early line sync signal CLSR1 U22E-12 and the thrice delayed line sync signal CLSR4 U22E-7 for a 3-clock period transfer pulse to transfer information from the R-registers to the P-registers. The 3-period pulse U19D-4 is generated when CLSR4 U22E-7 is low and when CLSR1 U22E-10 is high, as inverted with U21E-12 to define the period that the undelayed line sync signal CLSR1 has gone high and before the delayed line sync signal CLSR4 has gone high; indicative of the first 3-clock periods at the start of a line sync pulse.

The XA3 and XA3-bar signals are shown gated with U19A-1 to disable both the XA3-bar signal and hence memory board-1 and the XA3 signal and hence memory board-2 with gates U19C-13 and U19C-4 respectively. This provides for blanking of the display and clearing of the buffer memory by outputting zeros from the disabled memory board when either the frame sync signal CFSR1 or the sequential load signal DOA5 are true. U19C-1 disables the memory boards during sequential loading with DOA5 U19A-3 and during the vertical blanking period with the inverted CFSR1 signal from inverter U18D-8.

Registers U22E and U23C are used to latch signals. U23C-2 and U23C-5 latch signals C2-30 and C2-32 to provide latched signals C4-32 and C4-36 respectively. U23C-10 is used in the clock gating logic, as discussed with reference to FIG. 6C. U22E-10 and U22E-12 latch signals CFS and CLS respectively. U22E-15, U22E-2, and U22E-7 provide 1-clock delay, 2-clock delays, and 3-clock delays respectively for the CLSR1 signal.

Gated clock operations will now be discussed with reference to FIG. 6C. Gated clock signals U12A-8 and U12A-6 each gate early clock CPE-bar with DOA6 from U21E-6 so that address generation will only be performed when the run/load-bar signal DOA6 is high, indicative of run operations. Gated clock signals U12A-8 and U12A-6 also gate early clock CPE-bar with U13A-8, which is composed of 3-gating conditions; U17A-8, U17A-11, and U22A-4; discussed in greater detail with reference to FIG. 6D. Gated clock signal U12A-8 also gates early clock CPE with U14A-6, which enables high clock rate memory scanout operations within a block. Gated clock signal U12A-6 also gates early clock CPE-bar with U21B-2, which enables low clock rate memory block re-addressing operations. Consequently, when memory operations are proceeding within a block of 64-pixels, the address generator clock is generated as shorter period clock signal U12A-8 and, when memory operations are making a transition between blocks and need additional clock time for re-addressing, the address generator clock is generated as longer period clock signal U12A-6.

Determination of whether memory scanout or re-addressing is being performed for the particular clock period is determined by detecting an overflow of an address generator, as indicative of re-addressing, or detecting of a non-overflow of all address generators, as indicative of scanout. Overflow for this condition is defined as an overflow for a positive delta condition and an underflow for a negative delta condition. Therefore, detection of a carry condition for a positive delta or detection of a non-carry condition for a negative delta represents an overflow condition for gating a clock. An overflow condition on either the X-address generator or the Y-address generator causes a re-addressing condition.

As shown in FIG. 6C, a re-addressing condition is detected with NAND-gate U13A-6 from any one or combination of the 4-conditions U16A-3, U17A-3, U16A-6, and U17A-6. U16A-3 compares the inverted overflow bit C1-bar U15E-9 of the Y-address generator with the non-inverted sign bit SN1 U14E-6 of the Y-delta register to detect a Y-negative overflow condition. U17A-3 compares the overflow bit C1 U15E-9 of the Y-address generator with the inverted sign bit SN1 U14E-6 of the Y-delta register to detect a Y-positive overflow condition. U16A-6 compares the inverted overflow bit C2-bar U15D-9 of the X-address generator with the non-inverted sign bit SN2 U14D-6 of the X-delta register to detect an X-negative overflow condition. U17A-6 compares the overflow bit C2 U15D-9 of the X-address generator with the inverted sign bit SN2 U14D-6 of the X-delta register to detect a X-positive overflow condition. An overflow signal U13A-6 is latched and delayed with flip-flop D23C-10 for enabling of the scanout clock U12A-8 for scanout, in the absence of an overflow condition. Flip-flop U23C-10 provides a one-clock period delay so that an extended re-addressing clock period occurs in the clock period following the overflow condition, which is the clock period during which the re-addressing is performed. Latched overflow signal U23C-10 is inverted with inverter U14A to form a non-overflow signal U14A-6 and used to enable the scanout clock U12A-8.

Latched overflow signal U23C-10 is also processed with flip-flops U21B-5 and U21B-2 to provide a triple clock period for an overflow. These flip-flops are clocked with the non-gated delayed clock pulse CPD U20E-3 to control non-gated clock period time delays. If clocked with the gated clock pulse, such as with U15A-8; then the gating clock logic could cause the clock signal to lock-up.

A triple clock period for re-addressing will now be discussed with reference to FIG. 6C. Detection of an overflow condition U23C-10 with gate U20E-11 sets flip-flop U21B-5 on the first clock period and sets flip-flop U21B-2 on the second clock period, which adds 2-clock periods to the basic single clock period; yielding a triple clock period to facilitate re-addressing. At the completion of the third clock period, the 1-set signal U21B-2 enables a single clock signal U12A-6 and is inverted to a 0-set signal U21E-8 to reset U21B-5 through U20E-11 and to reset U21B-2 through U15A-11 on the next clock to clock flip-flops U21B-5 and U21B-2, respectively. This triple clock period logic is designed to operate for a single overflow condition surrounded by non-overflow conditions, or for two overflow conditions immediately following each other, and for many overflow conditions immediately following each other. For a single overflow condition; scanout clock U12A-8 has a series of single period clocks and has 3-clock periods missing that are coincident with overflow conditions and re-addressing clock U12A-6 has a single clock coincident with the overflow condition. For multiple sequential overflow conditions; scanout clock U12A-8 has a series of single period clocks with a series of triple clock periods missing that are coincident with the multiple sequential overflow conditions and re-addressing clock U12A-6 has multiple sequential clocks each separated by 2-clock periods.

The scanout clock U12A-8 and the re-addressing clock U12A-6 are generated separately for gating purposes. They are ORed together with gate U21D-8 for loading the buffer memory with signal C3-22 and for clocking register U23C-9. This causes the pipeline from the memory output through the buffer memory to be clocked by an out-of-phase signal, yielding a 1.5 clock period propagation delay time for the memory. The design is carefully configured so that the pipeline propagation delay is greater than the 0.5 clock periods and less than the 1.5 clock periods to facilitate proper clocking of the memory output signal into the buffer memory with a propagation delay that can approach the 1.5 clock period.

The clock signals to the address generation registers are implemented as the logical-OR of a plurality of different clock signals. In order to equalize clock delays so that each clock is twice delayed, including the once inverted CPE-bar signal with U12A-8 and U12A-6, the two address generator clocks U12A-8 and U12A-6 are separately ORed together with each of the address generator clock gates U9A-6, U9A-8, U10A-6, and U10A-8 (FIG. 6B) rather than using the pre-Ored clock signal U21D-8 in order to reduce clock skew.

Clock gating logic will now be discussed in greater detail with reference to FIG. 6B. Address decoders U20B and U19B decode the destination address DOC0 to DOC7 to generate a decoded address signal at the outputs of U19B and U20B to select the gated clock channel. This steers the computer load strobe U22B-3 to the addressed register to load that register. The address assignments are set forth in the table entitled DESTINATION SELECT ASSIGNMENTS. The most significant 16-address block is decoded using block decode logic U21D-6 to enable decoders U19B and U20B when the 4-MSBs DOC4, DOC5, DOC6, and DOC7 are all 1-set. The block enable signal U21D-6 enables U19B and U20B with the E1-bar inputs. The most significant address signal DOC3 enables U20B when low, indicated by the E2-bar input, and enables U19B when high, indicated by the E3 input. Consequently, U20B generates the LSH addresses and U19B generates the MSH addresses. One of the 8-addresses for the selected half is selected with the 3-least significant address bits DOC0, DOC1, and DOC2 which go to each address decoder U19B and U20B. The address decoder that has been selected with the DOC3 to DOC7 address signals has one of 8-address output lines low, as determined by the DOC0 to DOC2 least significant address bits. The low output line enables the register clock gating logic to steer the clock to the addressed register. The clock is the negative going strobe U22B-3 generated under computer control. Effectively, the decoded address signals steer the computer strobe to the appropriate register clock input to clock the computer output data word into that register.

Control logic for a display configuration will now be discussed with reference to FIG. 6D. Signal U20D-1 is a single pulse clock signal occurring at the leading edge of the line sync signal except when a frame sync pulse or a computer load signal is generated. This clock pulse is generated by U18E-6, as previously described. Disabling of this clock pulse during the frame sync pulse and the computer load period is performed by O-ring together the computer load signal DOA6-bar U20D-12 and the synchronized frame sync signal CFSR1 U20D-11. When either the computer load signal DOA6-bar or the computer frame sync signal CFSR1 are high, NOR gate U20D-13 and inverter U18D-2 apply a high signal to U20D-2, which causes U20D-1 to be low independent of the line sync clock pulse. Only when the computer load signal is in the run state (DOA6-bar is low) and the frame sync signal CSFR1 is low can the line sync clock U20D-1 go high to generate a clock pulse.

The line sync clock U20D-1 is generated from the line sync signal CLS. The CLS signal is latched in flip-flop U22E-12 to generate a resynchronized line sync signal CLSR1. The resynchronized line sync signal CLSR1 is delayed one clock period by latching in flip-flop U22E-15 to generate a delayed resynchronized line sync signal CLSR2. NAND-gate U18E-6 generates a one clock period negative pulse when the resynchronized line sync signal CLSR1 U22E-12 is high and when the delayed resynchronized line sync signal CLSR2 U22E-15 is still low, indicative of the first clock period of the resynchronized line sync signal. Inverter U21E-10 inverts the delayed line sync signal CLSR2 U22E-15 for NANDing with the non-delayed line sync signal CFSR1 U22E-12 for generation of the one clock period signal U18E-6. Therefore, U20D-1 is a one clock period positive pulse that occurs at the leading edge of each line sync pulse that is disabled by the computer being in the load mode or that is disabled by the frame sync signal. This clock U20D-1 is used to clock the R-registers for updating with the delta parameter at the positive edge and to transfer the updated number in the R-registers to the R-registers at the negative edge.

The computer strobe DOA7 is generated under software control. It is a short positive pulse, typically about 3-microseconds in width. It is NANDed with the computer run signal DOA6 using inverter U18D-6 and NAND-gate U22B-3 to generate a short negative pulse when enabled by the DOA6 run/load-bar signal being low, as indicative of a load command. The negative pulse U22B-3 is used to clock the register that is addressed with the computer destination address signal with decoders U19B and U20B to load data from the computer into that selected register.

Address generator clock gating logic will now be discussed with reference to FIG. 6B. This logic is composed of gates U19C, U19D, U18C, U8A, U9A, and U10A. This logic comprises 4-channels of clock logic for the address generation registers, where the clock gating logic for each channel is similar to the clock gating logic for the other 3-channels.

R-register gating logic will now be discussed with reference to FIG. 6B.

Gate U19C-1 steers the load strobe U22B-3 to clock the register with the computer generated strobe to load the computer generated parameter into the related register. Steering signal U19C-3 steers the computer pulse U19C-2 to the input of gate U18C-1. Gate U18C-3 combines the two mutually exclusive clock signals, the computer strobe and the line sync strobe to clock the XR-register CXRM with signal U18C-3 for the computer strobe and on the rising edge of the line sync pulse.

Gate U19C-10 steers the load strobe U22B-3 to clock the register with the computer generated strobe to load the computer generated parameter into the related register. Steering signal U19C-9 steers the computer pulse U19C-8 to the input of gate U18C-9. Gate U18C-8 combines the two mutually exclusive clock signals, the computer strobe and the line sync strobe to clock the XR-register CXRL with signal U18C-8 for the computer strobe and on the rising edge of the line sync pulse.

Gate U19D-1 steers the load strobe U22B-3 to clock the register with the computer generated strobe to load the computer generated parameter into the related register. Steering signal U19D-3 steers the computer pulse U19D-2 to the input of gate U18C-4 Gate U18C-6 combines the two mutually exclusive clock signals, the computer strobe and the line sync strobe to clock the YR-register CYRM with signal U18C-6 for the computer strobe and on the rising edge of the line sync pulse.

Gate U19D-13 steers the load strobe U22B-3 to clock the register with the computer generated strobe to load the computer generated parameter into the related register. Steering signal U19D-12 steers the computer pulse U19D-11 to the input of gate U18C-12. Gate U18C-11 combines the two mutually exclusive clock signals, the computer strobe and the line sync strobe to clock the YR-register CYRL with signal U18C-11 for the computer strobe and on the rising edge of the line sync pulse.

P-register clock logic will now be discussed with reference to FIG. 6B.

The XP-register clock signal U9A-6 to XP-register CXPM is generated from the inverted XR-register clock signal CXRM U8A-2, the gated write signal U18E-11, the re-addressing clock U12A-8, and the scanout clock U12A-6. The inverted R-register clock signal U8A-2 causes the XP-register CXRM to be clocked with the computer strobe and with the trailing edge of the line sync signal, the inverted clock signal from U18C-3. The gated write signal U18E-11 clocks the XP-registers for each write strobe U22C-11 that loads a parameter into memory in order to advance the address generators to the next address. The gated re-addressing clock signal U12A-6 and the gated scanout signal U12A-8 have been discussed above with reference to FIG. 6C.

The XP-register clock signal U9A-8 to XP-register CXPL is generated from the inverted XR-register clock signal CXRL U8A-4, the gated write signal U18E-11, the re-addressing clock U12A-8, and the scanout clock U12A-6. The inverted R-register clock signal U8A-4 causes the XP-register CXRL to be clocked with the computer strobe and with the trailing edge of the line sync signal, the inverted clock signal from U18C-8. The gated write signal U18E-11 clocks the XP-registers for each write strobe U22C-11 that loads a parameter into memory in order to advance the address generators to the next address. The gated re-addressing clock signal U12A-6 and the gated scanout signal U12A-8 have been discussed above with reference to FIG. 6C.

The YP-register clock signal U10A-6 to YP-register CYPM is generated from the inverted YR-register clock signal CYRM U8A-6, the gated write signal U18E-11, the re-addressing clock U12A-8, and the scanout clock U12A-6. The inverted YR-register clock signal U8A-6 causes the YP-register CYRM to be clocked with the computer strobe and with the trailing edge of the line sync signal, the inverted clock signal from U18C-6. The gated write signal U18E-11 clocks the YP-registers for each write strobe U22C-11 that loads a parameter into memory in order to advance the address generators to the next address. The gated re-addressing clock signal U12A-6 and the gated scanout signal U12A-8 have been discussed above with reference to FIG. 6C.

The YP-register clock signal U10A-8 to YP-register CYPL is generated from the inverted YR-register clock signal CYRL U8A-8, the gated write signal U18E-11, the re-addressing clock U12A-8, and the scanout clock U12A-6. The inverted YR-register clock signal U8A-8 causes the YP-register CYRL to be clocked with the computer strobe and with the trailing edge of the line sync signal, the inverted clock signal from U18C-11. The gated write signal U18E-11 clocks the YP-registers for each write strobe U22C-11 that loads a parameter into memory in order to advance the address generators to the next address. The gated re-addressing clock signal U12A-6 and the gated scanout signal U12A-8 have been discussed above with reference to FIG. 6C.

Gates U22C-11, U18D-12, and U18E-11 provide a write strobe to clock the address registers to advance the address in the address registers in accordance with the delta parameters loaded in the delta registers. This write clock clocking of the address registers is used for writing a sequence of words into memory without the need to reload the address registers, where the address registers are incremented with the write strobe to advance the address from the initially loaded address in accordance with the delta parameters. This write strobe is gated with the DOA5 signal with gate U18E-11 to enable advancing the address generators during the load mode and to disable advancing the address generators during the run mode.

Address Generators

Two address generator configurations are shown in FIGS. 6O to 6R. The address generators shown in FIGS. 6O to 6R provide for overflow detection to gate a clock in accordance with the arrangement shown in FIG. 6C. The address generators shown in FIGS. 6O to 6R do not provide for such overflow detection. In this configuration, overflow detection is enhanced by arranging the adder logic so that the overflow from an adder chip coincides with the desired position of overflow detection. In order to provide this feature, an extra adder chip is used in the address generators of FIGS. 6O and 6P. The address generators shown in FIGS. 6Q and 6R do not have such overflow detection and consequently can be implemented with one less adder chip.

The XP-address generator will now be discussed with reference to FIG. 6O. Register U8D, U9D, and U5D store the address parameter. Register U17D and U7D store the delta parameter for updating the address parameter. Adders U13D to U16D and U6D add the delta parameter to the address parameter to obtain an updated address parameter. Multiplexers U10D to U12D provide for loading initial conditions into the address register during the load mode and provide for updating the address parameter in the address register in response to the delta parameter in the delta register in the run mode.

The delta parameter initial condition is loaded into the delta register from the computer output port. The 6-LSBs from the computer output byte are applied to the D-inputs of delta register U17D and U7D. The CXPS clock provides a clock pulse at the appropriate time, as described with reference to FIG. 6B, to clock the initial conditions into the delta registers.

The address parameter initial condition is loaded into the address register from the computer output port. The 6-LSBs from the computer output byte are applied to the D-inputs of address register U8D, U9D, and U5D. The CXPM and CXPL clocks provide clock pulses at the appropriate times, as described with reference to FIG. 6B, to clock the initial conditions into the address register.

In the run mode, the address register is clocked with the CXPM and CXPL clocks to update the address parameter in response to the delta parameter. The output of the address register; the Q-outputs of the U8D, U9D, and U5D register; are applied to the A-inputs of adder circuits U13D to U16D and U6D. The output of the delta register; the Q-outputs of the U17D and U7D register; are applied to the B-inputs of adder circuits U13D to U16D and U6D. The output of the adder circuits on the summation lines is the binary sum of the A-inputs from the address register and the B-inputs from the delta register, providing an updated address parameter that is input to the address register through the multiplexers to the D-inputs of the address register. Consequently, each time the address register is clocked, the updated address is loaded into the address register and the updated address that is loaded into the address register is output on the Q-lines from the address register to again be added to the delta parameter with the adders to provide the next updated address to the address register.

The multiplexers U10D, U11D, and U12D multiplex the updated address parameter from the adders into the address register to load the initial conditions into the address register at the beginning of the load mode and to load the updated address parameter from the adders thereafter. The ELS signal from U15A-3, as described with reference to FIG. 6D, controls the multiplexer to load initial conditions at the start of a line sync pulse and to enable updating of the address parameter with the delta parameter thereafter.

The adders are connected with the carry output from the preceding stage connected to the carry input of the next subsequent stage for a rapid carry propagating through the adder. The adders are arranged so that the overflow from U15D-9 coincides with the point that divides the scanout bits and the re-addressing bits, where the scanout bits are the three less significant bits and the re-addressing bits are the six more significant bits. The next most significant bit XA3 for the XP address generator is used as the board control bit instead of a re-addressing bit for the XP-address generator. The overflow signal U15D-9 is input to U16A-5 and U17A-5 (FIG. 6C) for controlling gating of the clock.

The YP-address generator will now be discussed with reference to FIG. 6P. Register U8E, U9E, and U5E store the address parameter. Register U17E and U7E store the delta parameter for updating the address parameter. Adders U13E to U16E and U6E add the delta parameter to the address parameter to obtain an updated address parameter. Multiplexers U10E to U12E provide for loading initial conditions into the address register during the load mode and provide for updating the address parameter in the address register in response to the delta parameter in the delta register in the run mode.

The delta parameter initial condition is loaded into the delta register from the computer output port. The 6-LSBs from the computer output byte are applied to the D-inputs of delta register U17E and U7E. The CYPS clock provides a clock pulse at the appropriate time, as described with reference to FIG. 6B, to clock the initial conditions into the delta registers.

The address parameter initial condition is loaded into the address register from the computer output port. The 6-LSBs from the computer output byte are applied to the D-inputs of address register U8E, U9E, and U5E. The CYPM and CYPL clocks provide clock pulses at the appropriate times, as described with reference to FIG. 6B, to clock the initial conditions into the address register.

In the run mode, the address register is clocked with the CYPM and CYPL clocks to update the address parameter in response to the delta parameter. The output of the address register; the Q-outputs of the U8E, U9E, and U5E register; are applied to the A-inputs of adder circuits U13E to U16E and U6E. The output of the delta register; the Q-outputs of the U17E and U7E register; are applied to the B-inputs of adder circuits U13E to U16E and U6E. The output of the adder circuits on the summation lines is the binary sum of the A-inputs from the address register and the B-inputs from the delta register, providing an updated address parameter that is input to the address register through the multiplexers to the D-inputs of the address register. Consequently, each time the address register is clocked, the updated address is loaded into the address register and the updated address that is loaded into the address register is output on the Q-lines from the address register to again be added to the delta parameter with the adders to provide the next updated address to the address register.

The multiplexers U10E, U11E, and U12E multiplex the updated address parameter from the adders into the address register to load the initial conditions into the address register at the beginning of the load mode and to load the updated address parameter from the adders thereafter. The ELS signal from U15A-3, as described with reference to FIG. 6D, controls the multiplexer to load initial conditions at the start of a line sync pulse and to enable updating of the address parameter with the delta parameter thereafter.

The adders are connected with the carry output from the preceding stage connected to the carry input of the next subsequent stage for a rapid carry propagating through the adder. The adders are arranged so that the overflow from U15E-9 coincides with the point that divides the scanout bits and the re-addressing bits, where the scanout bits are the three less significant bits and the re-addressing bits are the six more significant bits. The overflow signal U15E-9 is input to U16A-2 and U17A-2 (FIG. 6C) for controlling gating of the clock.

The XR-address generator will now be discussed with reference to FIG. 6Q. Register U8B, U9B, and U5B store the address parameter. Register U17B and U7B store the delta parameter for updating the address parameter. Adders U13B to U15B and U6B add the delta parameter to the address parameter to obtain an updated address parameter. Multiplexers U10B to U12B provide for loading initial conditions into the address register during the load mode and provide for updating the address parameter in the address register in response to the delta parameter in the delta register in the run mode.

The delta parameter initial condition is loaded into the delta register from the computer output port. The 6-LSBs from the computer output byte are applied to the D-inputs of delta register U17B and U7B. The CXRS clock provides a clock pulse at the appropriate time, as described with reference to FIG. 6B, to clock the initial conditions into the delta registers.

The address parameter initial condition is loaded into the address register from the computer output port. The 6-LSBs from the computer output byte are applied to the D-inputs of address register U8B, U9B, and U5B. The CXRM and CXRL clocks provide clock pulses at the appropriate times, as described with reference to FIG. 6B, to clock the initial conditions into the address register.

In the run mode, the address register is clocked with the CXRM and CXRL clocks to update the address parameter in response to the delta parameter. The output of the address register; the Q-outputs of the U8B, U9B, and U5B register; are applied to the A-inputs of adder circuits U13B to U15B and U6B. The output of the delta register; the Q-outputs of the U17B and U7B register; are applied to the B-inputs of adder circuits U13B to U15B and U6B. The output of the adder circuits on the summation lines is the binary sum of the A-inputs from the address register and the B-inputs from the delta register, providing an updated address parameter that is input to the address register through the multiplexers to the D-inputs of the address register. Consequently, each time the address register is clocked, the updated address is loaded into the address register and the updated address that is loaded into the address register is output on the Q-lines from the address register to again be added to the delta parameter with the adders to provide the next updated address to the address register.

The multiplexers U10B, U11B, and U12B multiplex the updated address parameter from the adders into the address register to load the initial conditions into the address register during the load mode and to load the updated address parameter from the adders during the run mode. The DOA6-bar signal from U18D-6, as described with reference to FIG. 6B, controls the multiplexer to load initial conditions in the load mode and to enable updating of the address parameter with the delta parameter in the run mode.

The adders are connected with the carry output from the preceding stage connected to the carry input of the next subsequent stage for a rapid carry propagating through the adder.

The YR-address generator will now be discussed with reference to FIG. 6R. Register U8C, U9C, and U5C store the address parameter. Register U17C and U7C store the delta parameter for updating the address parameter. Adders U13C to U15C and U6C add the delta parameter to the address parameter to obtain an updated address parameter. Multiplexers U10C to U12C provide for loading initial conditions into the address register during the load mode and provide for updating the address parameter in the address register in response to the delta parameter in the delta register in the run mode.

The delta parameter initial condition is loaded into the delta register from the computer output port. The 6-LSBs from the computer output byte are applied to the D-inputs of delta register U17C and U7C. The CYRS clock provides a clock pulse at the appropriate time, as described with reference to FIG. 6B, to clock the initial conditions into the delta registers.

The address parameter initial condition is loaded into the address register from the computer output port. The 6-LSBs from the computer output byte are applied to the D-inputs of address register U8C, U9C, and U5C. The CYRM and CYRL clocks provide clock pulses at the appropriate times, as described with reference to FIG. 6B, to clock the initial conditions into the address register.

In the run mode, the address register is clocked with the CYRM and CYRL clocks to update the address parameter in response to the delta parameter. The output of the address register; the Q-outputs of the U8C, U9C, and U5C register; are applied to the A-inputs of adder circuits U13C to U15C and U6C. The output of the delta register; the Q-outputs of the U17C and U7C register; are applied to the B-inputs of adder circuits U13C to U15C and U6C. The output of the adder circuits on the summation lines is the binary sum of the A-inputs from the address register and the B-inputs from the delta register, providing an updated address parameter that is input to the address register through the multiplexers to the D-inputs of the address register. Consequently, each time the address register is clocked, the updated address is loaded into the address register and the updated address that is loaded into the address register is output on the Q-lines from the address register to again be added to the delta parameter with the adders to provide the next updated address to the address register.

The multiplexers U10C, U11C, and U12C multiplex the updated address parameter from the adders into the address register to load the initial conditions into the address register during the load mode and to load the updated address parameter from the adders during the run mode. The DOA6-bar signal from U18D-6, as described with reference to FIG. 6B, controls the multiplexer to load initial conditions in the load mode and to enable updating of the address parameter with the delta parameter in the run mode.

The adders are connected with the carry output from the preceding stage connected to the carry input of the next subsequent stage for a rapid carry propagating through the adder.

Output of the address signals will now be discussed with reference to FIGS. 6O and 6P. The Q-outputs of the XP-address register and YP-address register are routed to the memory for accessing and for loading of information. The address connections between the memory and the address generators are listed in the CABLE CONNECTION TABLE here under the heading CABLE-I BM1,2/BL1 (C1). The Y-address bits Y0 to Y8 and the X-address bits X0 to X8, including the complemented and uncomplemented X3 memory board address select bit, are listed therein together with source circuits on the control logic board and destination circuits on the memory boards.

In the run mode, the XP-address register and YP-address register are continually clocked with the gated clock, as discussed with reference to FIG. 6B; resulting in the address parameters being continually updated with the delta parameters and resulting in the memory being continually addressed by the updated address parameters. The XA3 and XA3-bar memory board select signals are gated with U19A-1 in order to blank the CRT monitor and clear the buffer, as discussed with reference to FIG. 6D herein.

MEMORY BOARDS

Figure 6E:
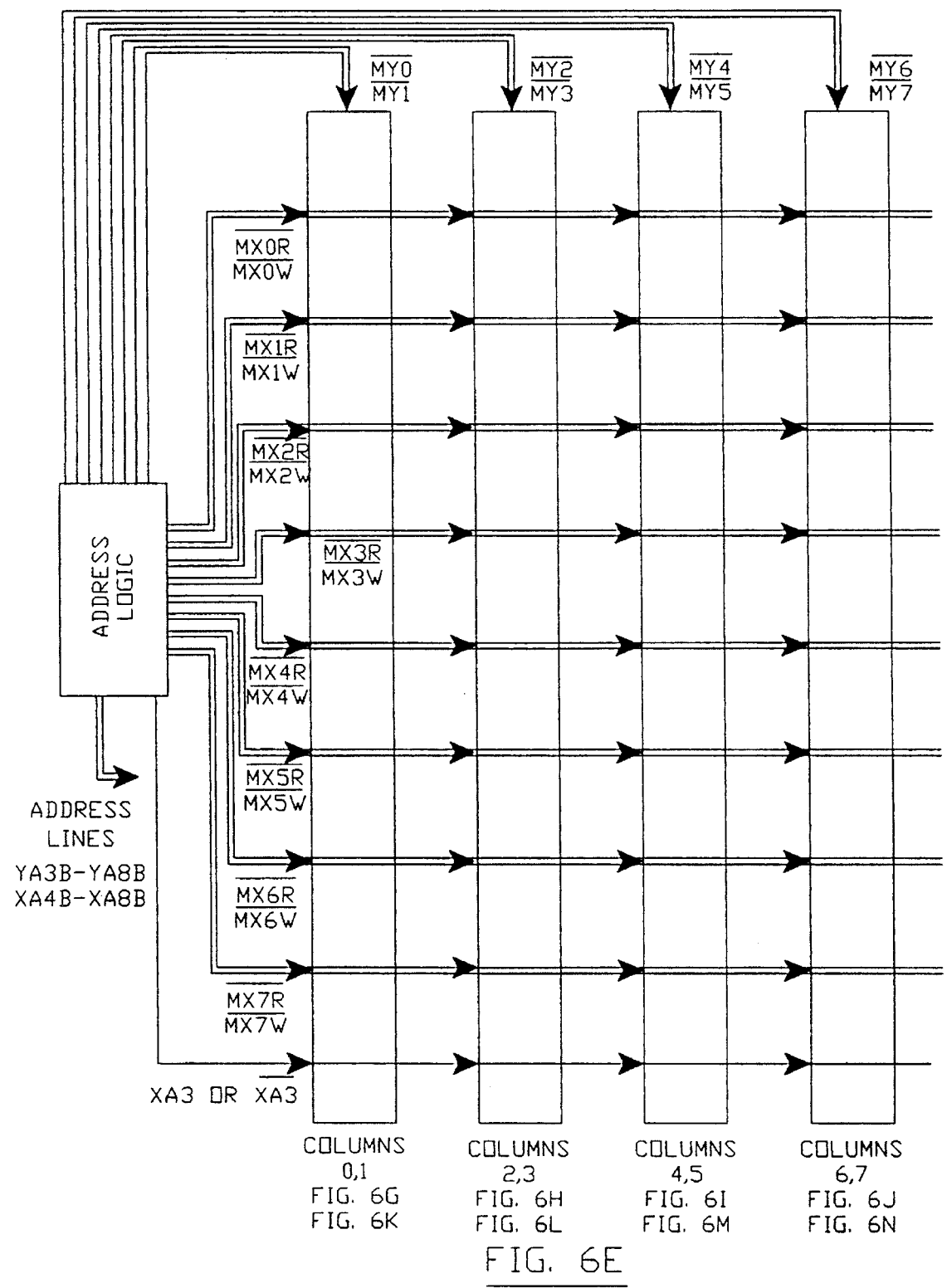
FIG. 6E is a block diagram of a configuration for implementing the memory of the present invention.

A detailed design of one configuration of the memory of the present invention is shown in FIGS. 6E to 6N. The architecture of one of the memory boards is shown in block diagram form in FIG. 6E, is shown in detailed block diagram form in FIGS. 6F to 6J, and is shown in detailed logical diagram form in FIGS. 6K to 6N. Commonality of symbols and features in these diagrams provide for cross referencing to different levels of detail between these diagrams. This memory uses Mitsubishi M58725P RAMs having 16,384 (16K) bits per RAM, organized in a 2,048 (2K) words by 8-bits per word configuration. Logical diagrams of RAM chips are shown in FIGS. 6K to 6N. Each RAM chip comprises 11-address lines A0 to A10, 8-data lines DQ1 to DQ8, a chip select line S-bar, an output enable line OE-bar, and a write pulse line W-bar. The address lines address 1-word out of 2K-words stored in the memory chip. The data lines output the addressed word in the read mode and input a word for storage in the write mode. The data lines are tristate lines that, when in the read mode, output the addressed information when enabled with the chip select line S-bar and, when in the write mode, store the data in the addressed location. The output enable signal G-bar controls inputting and outputting of data from the RAM. When disabled with the chip select line or the output enable line, the data lines are in the floating tristate condition.

Figure 6F:
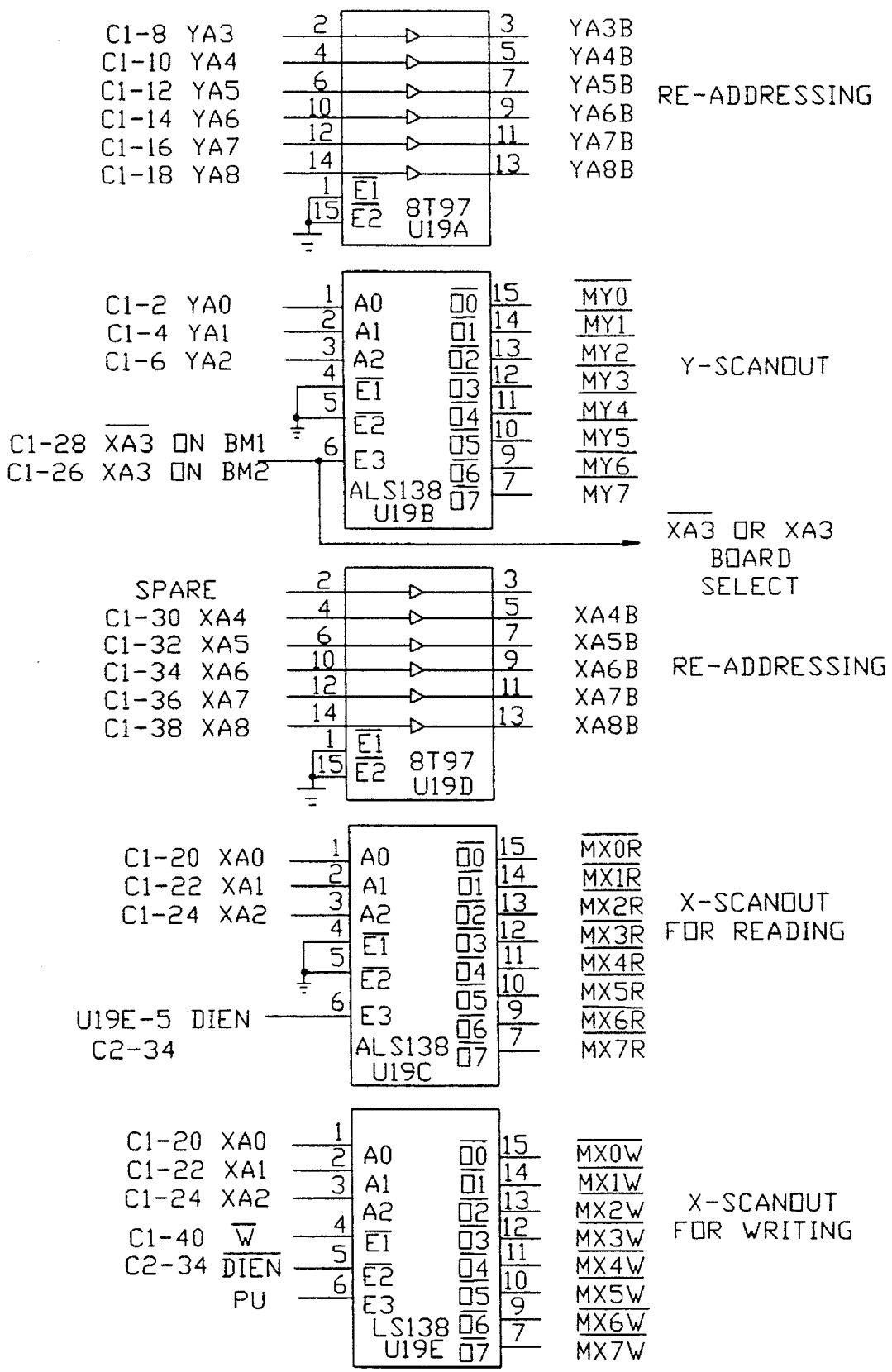
FIG. 6F is a detailed schematic representation of logic for addressing and scanning-out memory information in accordance with the the memory of FIG. 6E.
Figure 6G:
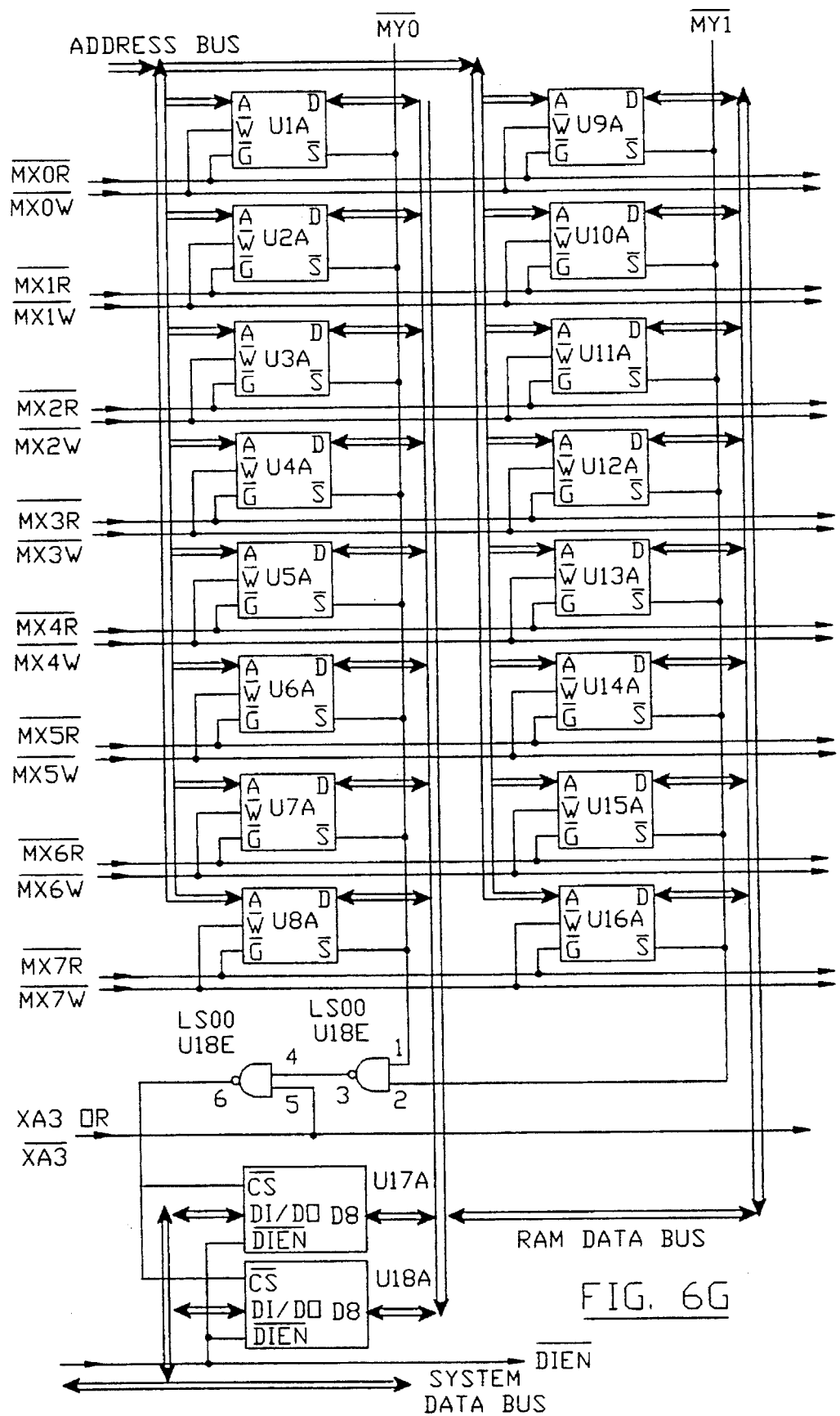
Figure 6H:
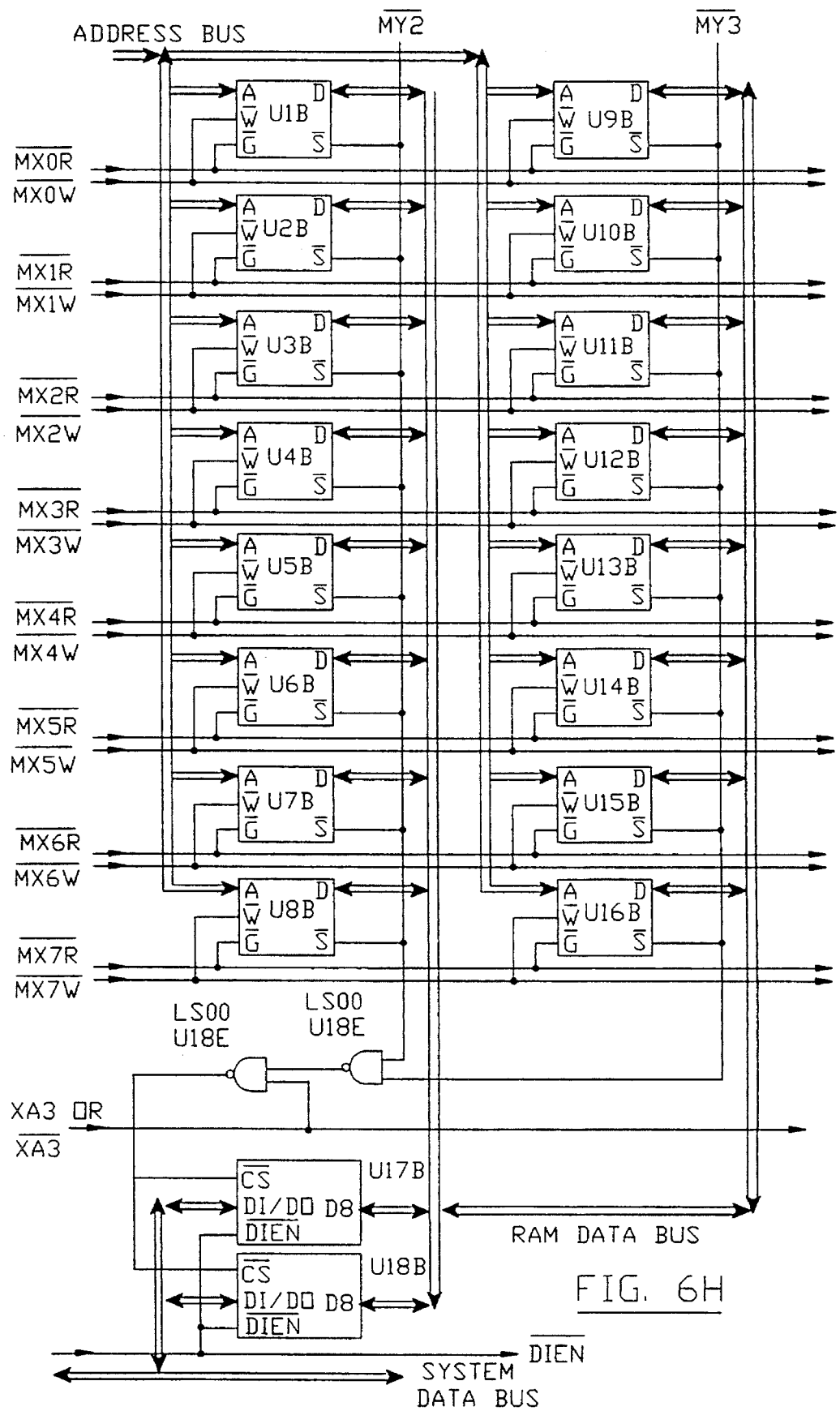
Figure 61:
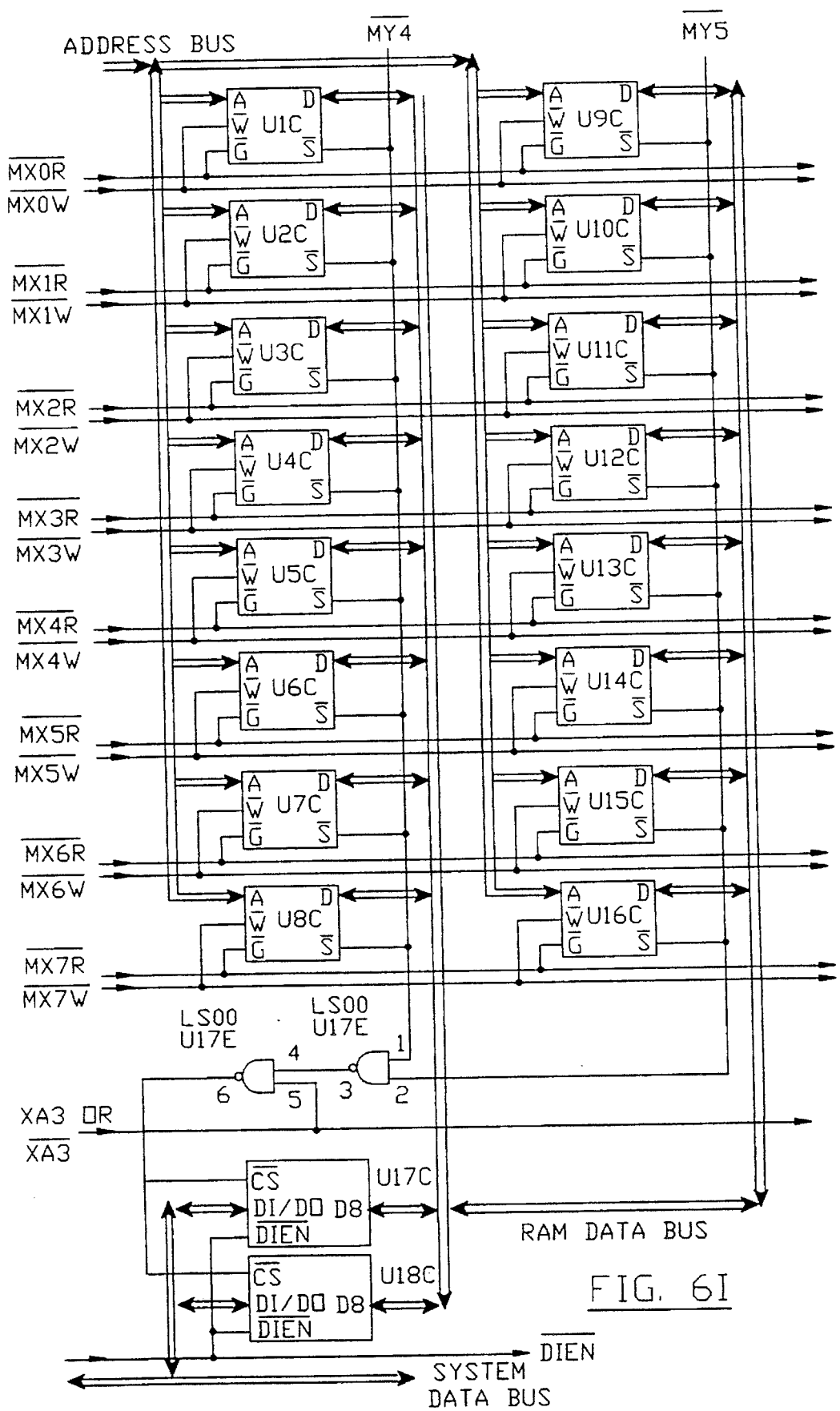
Figure 6J:
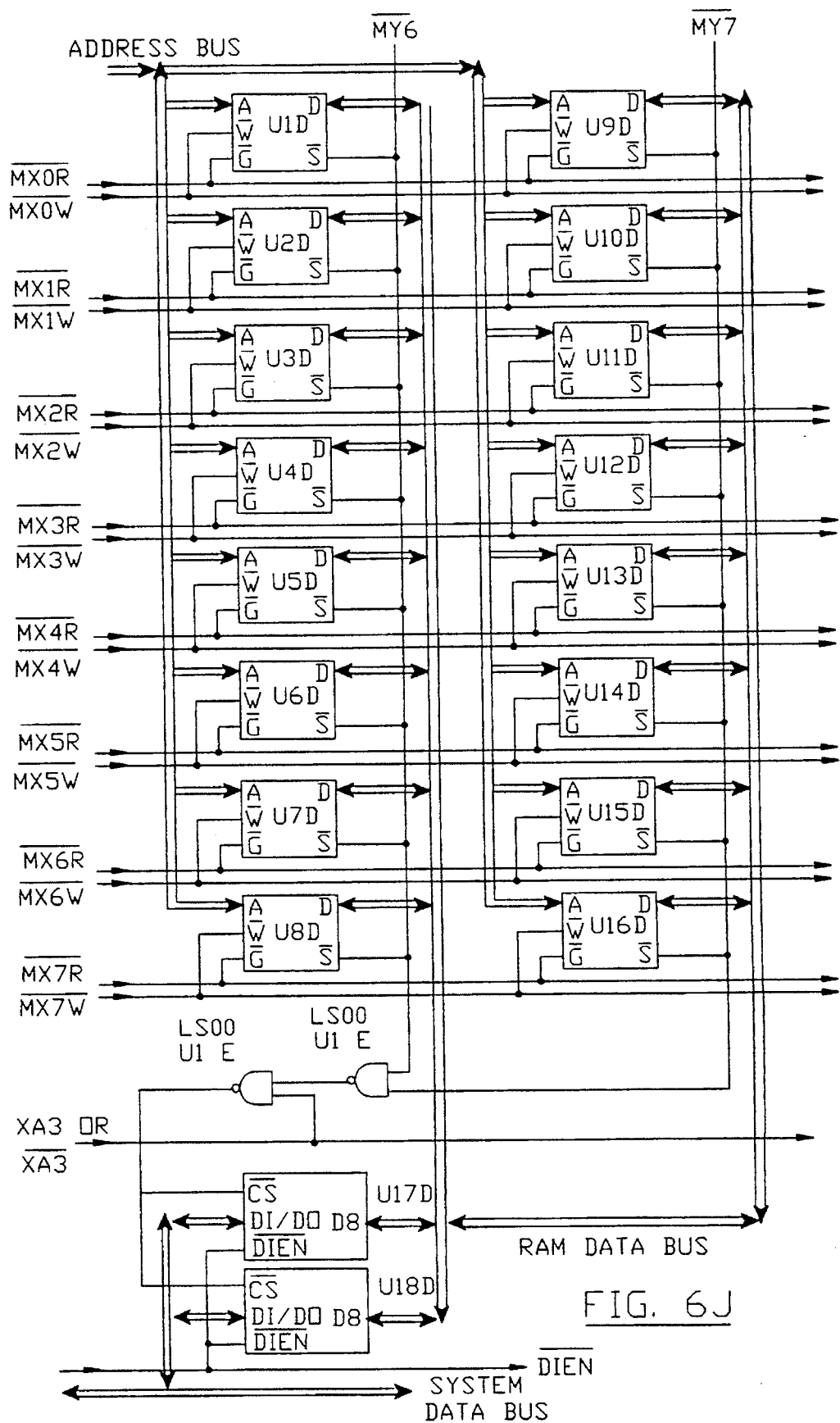

The memory control logic is comprised of circuits U19A to U19E, as shown in FIG. 6F. Buffers U19A and U19D are non-inverting buffers that buffer the address signals for fanout to the RAMs. In this configuration, 11-address signals YA3B to YA8B and XA4B to XA8B are fanned out to the address inputs A0 to A10 of the RAMs. Decoders U19B, U19C, and U19E decode the scanout portion of the address word for control of the tristate data lines of the RAMs. Decoder U19B decodes the Y-scanout portion YA0 to YA2 of the scanout portion of the Y-address. Decoders U19C and U19E decode the X-scanout portion XA0 to XA2 of the X-scanout portion of the address. Decoder U19C is enabled for read operations and decoder U19E is enabled for write operations. Each of decoders; U19B, U19C, and U19E; receive 3-input scanout address lines and generate 8-decoded scanout control lines in response to the decoding. Decoded signals MY0-bar to MY7-bar from U19B generate Y-control signals to select one column of 8-RAMs with the chip select pin S-bar. Decoded signals MX0R-bar to MX7R-bar from U19C generate X-control signals in the read mode to select one row of 8-RAMs with the output enable pin G-bar. Decoded signals MX0W-bar to MX7W-bar from U19E generate X-control signals in the write mode to select one row of 8-RAMs with the output enable pin G-bar. Therefore, selection of a column of 8-RAMs with the Y-scanout signals and selection of a row of 8-RAMs with the X-scanout signals selects a single RAM common to both the selected row and the selected column for read and write operations.

The decoders have gating signals E1-bar, E2-bar, and E3. Signals E1-bar and E2-bar are permanently enabled on decoders U19B and U19C with a ground connection and signal E3 is permanently enabled on decoder U19E with a pullup connection. Signal E3 on decoder U19B is used to place the RAMs on the non-selected memory board in the standby mode for reduced power consumption. This is achieved by disabling U19B on the non-selected board and enabling U19B on the selected board with the XA3 and XA3-bar signals, which select the board to be utilized. Disabling U19B on the non-selected board disables the Y-scanout signals to the chip select pin S-bar, which in turn places the non-selected RAMs into the standby mode for reduced power consumption. The XA3 and XA3-bar gating of the U19B decoder is not necessary for memory operation, but is used for reduction of power consumption. Pin E3 on decoder U19C and pin E2-bar on decoder U19E are controlled with the DIEN-bar signal which is derived from the computer run/load mode signal for enabling decoder U19C in the run mode to read from memory, to disable decoder U19E in the run mode to prevent writing into memory, to enable decoder U19E in the load mode to write into memory and to disable decoder U19C in the load mode to read from memory. When decoder U19E is enabled in the load mode, the write pulse W-bar controls decoder U19E; where decoder U19E effectively steers the W-bar write pulse to the one of eight decoded signal lines MX0W-bar to MX7W-bar under control of the XA0, XA1, and XA2 scanout address signals.

A discussion will now be provided relative to FIGS. 6G to 6N to illustrate the logical design of the memory. FIGS. 6G to 6K each show 16-RAMs organized in 2-logical columns and constructed on one row on a memory board, where each memory board has 4-groups of 16-RAMs each shown in one of FIGS. 6G to 6J. The manner in which these 4-pairs of logical columns connect together is shown in FIG. 6E and is shown by the interconnections between FIGS. 6G to 6J and FIGS. 6K to 6N and by the discussions hereinafter.

All RAMs are addressed by the same 11-address lines; shown as the address bus to the A-input of each RAM in FIGS. 6G to 6J and shown in greater detail as the address bus to the A0 to A10 inputs of RAMs U8 and U16 for each pair of logical columns in FIGS. 6K to 6N. The addresses are placed on the address bus by U19A and U19D (FIG. 6F) and are routed to all 16-RAMs on each of the RAM groups (FIGS. 6G to 6J) to excite the RAM address inputs A (FIGS. 6G to 6J) and A0 to A10 (FIGS. 6K to 6N).

Each logical column of RAMs is selected by a single one of the eight Y-scanout signals from U19B (FIG. 6F), shown connected to the S-bar pin of each RAM in the logical column in FIGS. 6G to 6J and shown in greater detail to the S-bar inputs of RAMs U8 and U16 for each pair of logical columns in FIGS. 6K to 6N.

Each logical row of RAMs is selected by a single one of the eight X-scanout signals; MX0R to MX7R in the read mode to the output enable pin G-bar and MX0W to MX7W in the write mode to the W-bar from U19C and U19E respectively (FIG. 6F). Each of these signals are shown connected to the pair of RAM in the logical row for each pair of logical columns in FIGS. 6G to 6J and shown in greater detail for RAMs U8 and U16 for each pair of logical columns in FIGS. 6K to 6N. Each of these X-scanout signals enable the same pair of RAMs in each of the 4-pairs of logical columns (FIGS. 6G to 6J and FIGS. 6K to 6N).

All RAMs in the pair of columns shown in each of FIGS. 6G to 6J and FIGS. 6K to 6N have the corresponding data bus pins collected together; shown as the data bus to the D-input of each RAM in FIGS. 6G to 6J and shown in greater detail as the data bus to the D0 to D7 pins of RAMs U8 and U16 for each pair of logical columns in FIGS. 6K to 6N. The data bus and control signals are connected to a pair of Intel 8216 bus interface chips for each pair of logical columns, as shown in simplified form in FIGS. 6G to 6J and in detailed form in FIGS. 6K to 6N. The operation of the data bus interface is discussed in greater detail hereinafter.

In view of the above, all RAMs are addressed with the same address signals and one RAM that is at the intersection of the enabled X-row scanout signal and the enabled Y-column scanout signal alone is permitted to place the addressed word on the data bus in the read mode and alone is written into at the addressed location from the data bus.

In the read mode, one RAM is enabled to output the addressed word onto the system data bus. This can be implemented by busing together the corresponding 8-data lines from each RAM. However, busing together a large number of RAM data lines, such as 128-RAM data lines in this configuration, can result in reduced RAM speed, such as due to bus and chip capacitance. Therefore, Intel 8216 bi-directional bus drivers are provided to isolate groups of RAMs from the system data bus and from other groups of RAMs.

Figure 6K:
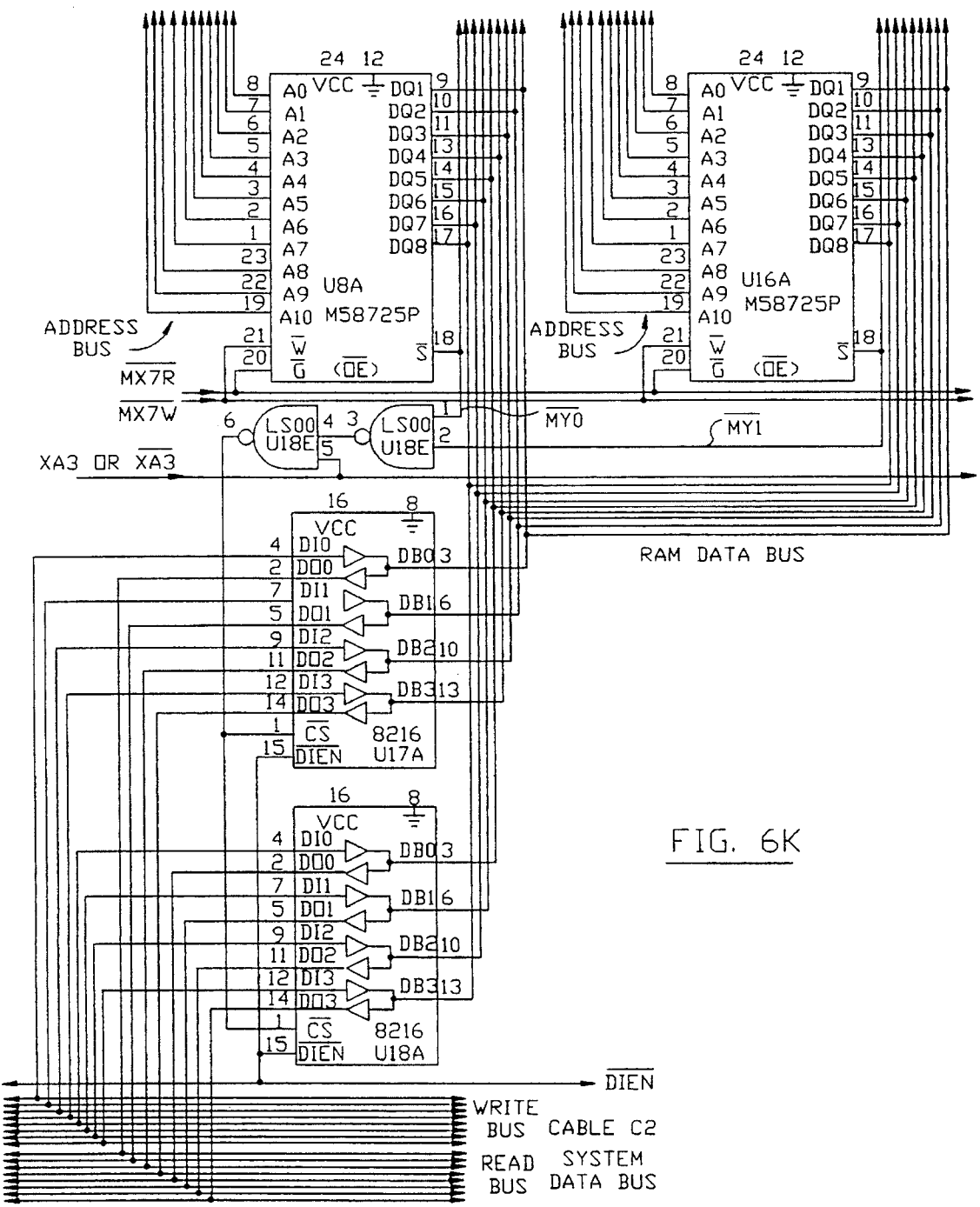
FIGS. 6K to 6N are detailed schematic diagram representations in accordance with the memory of FIGS. 6F and FIGS. 6G to 6J.
Figure 6L:
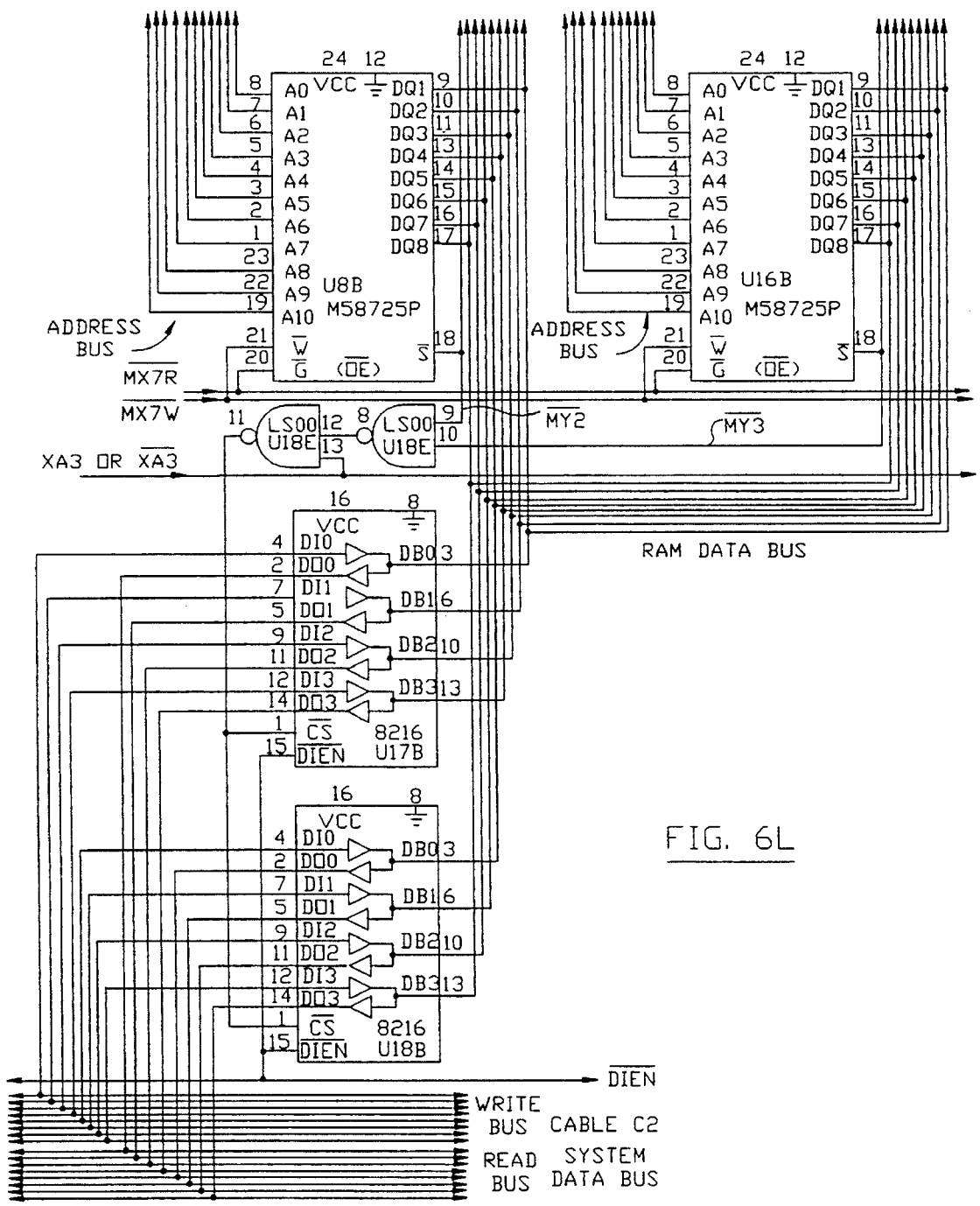
Figure 6M:
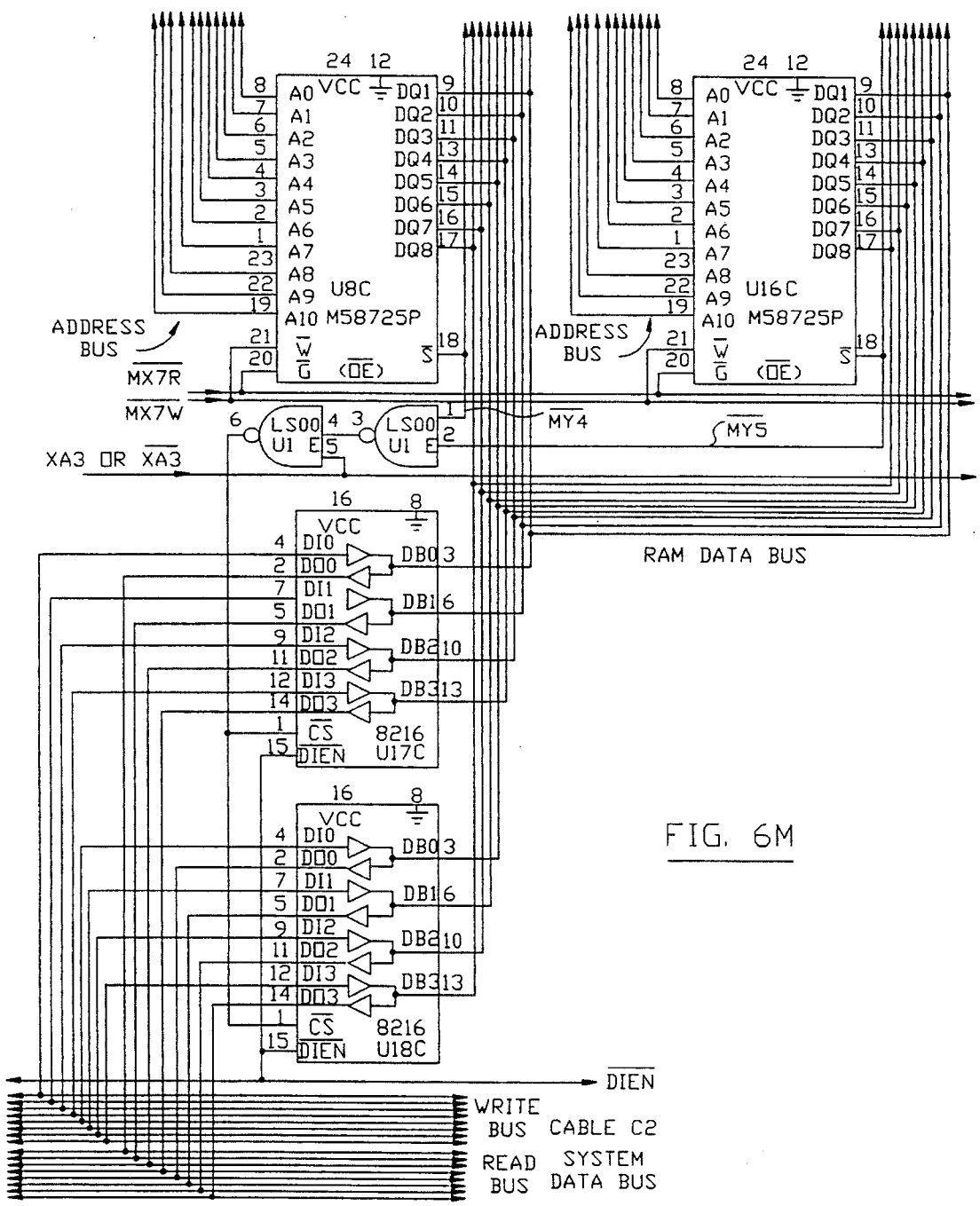
Figure 6N:
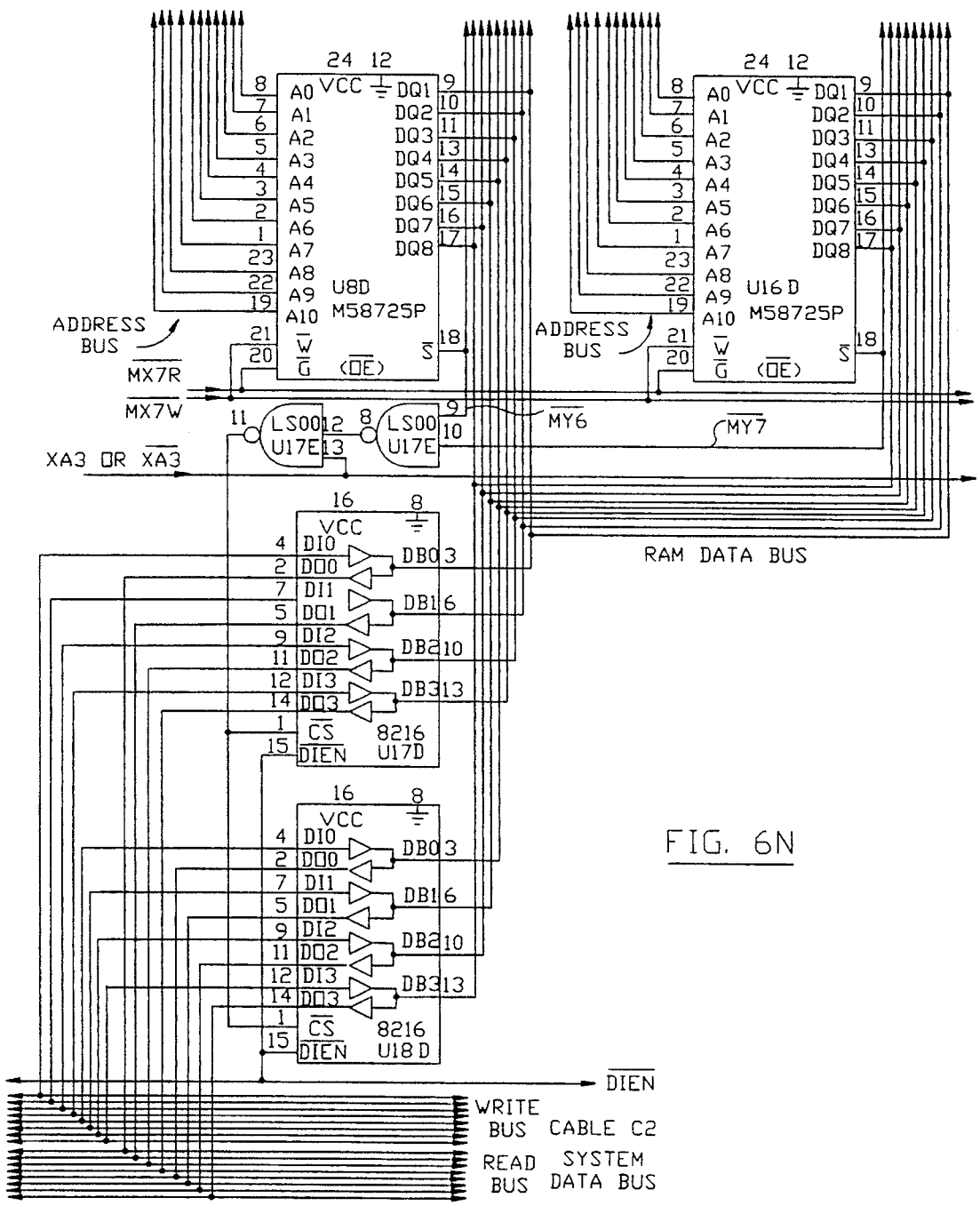
Figure 60:
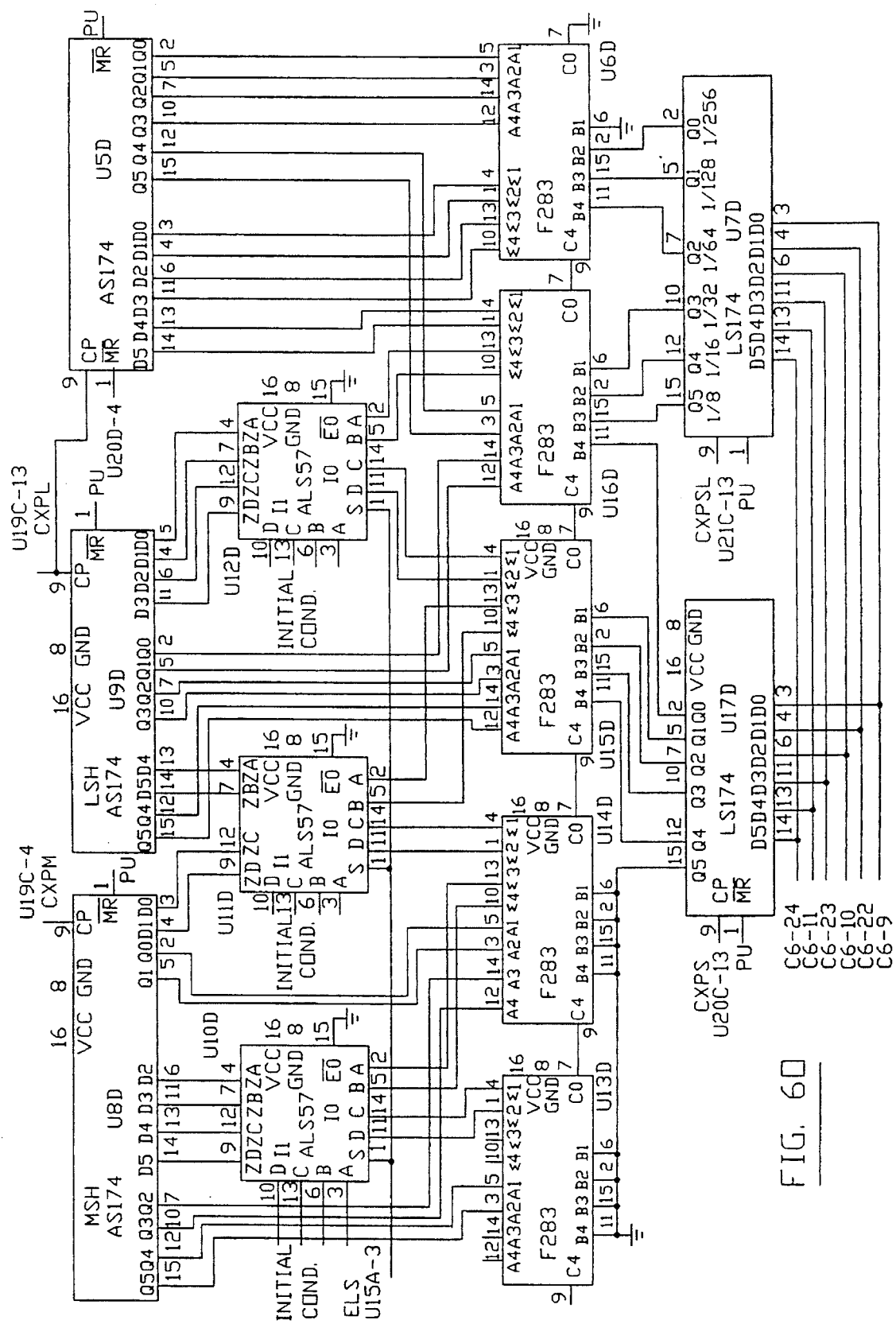
Figure 6P:
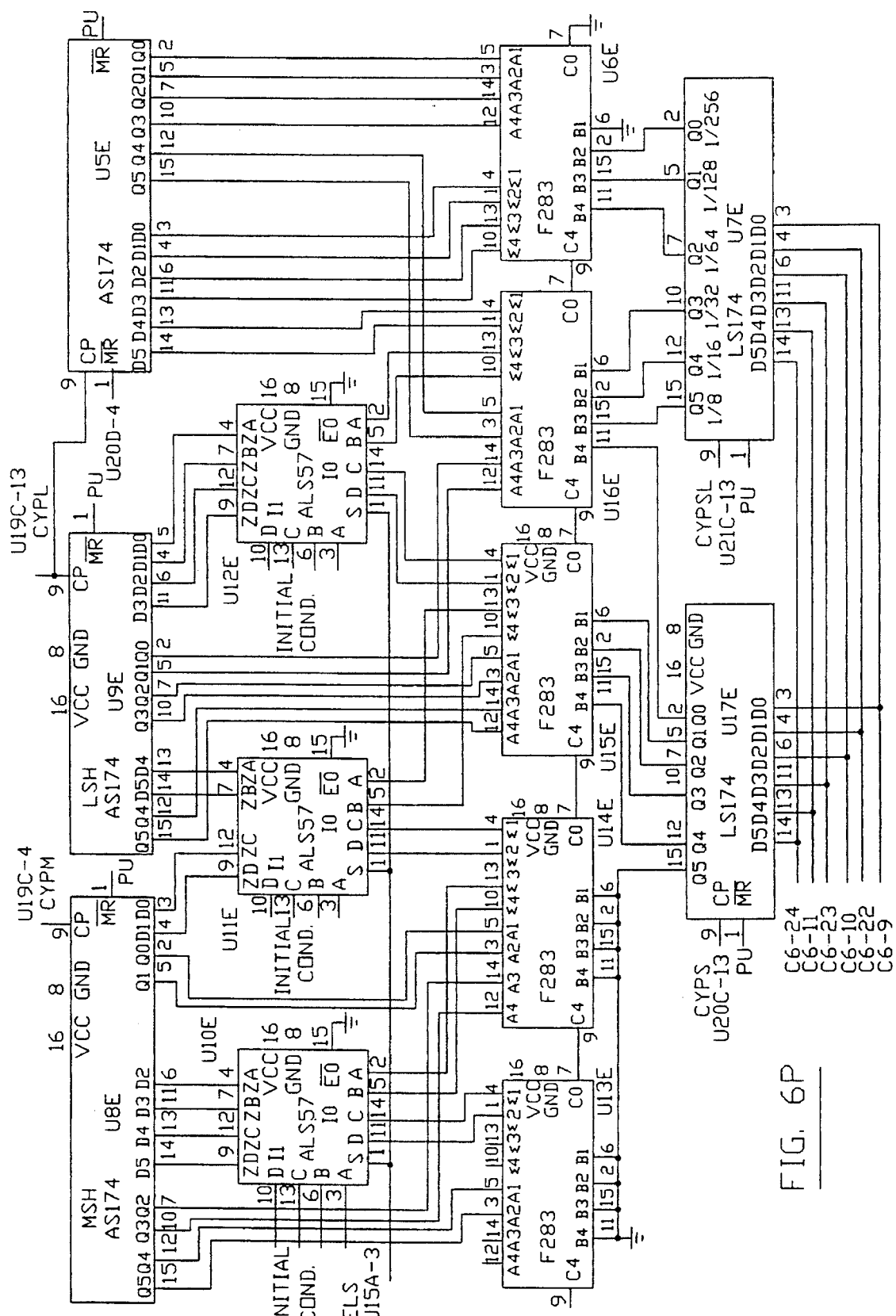
Figure 6Q:
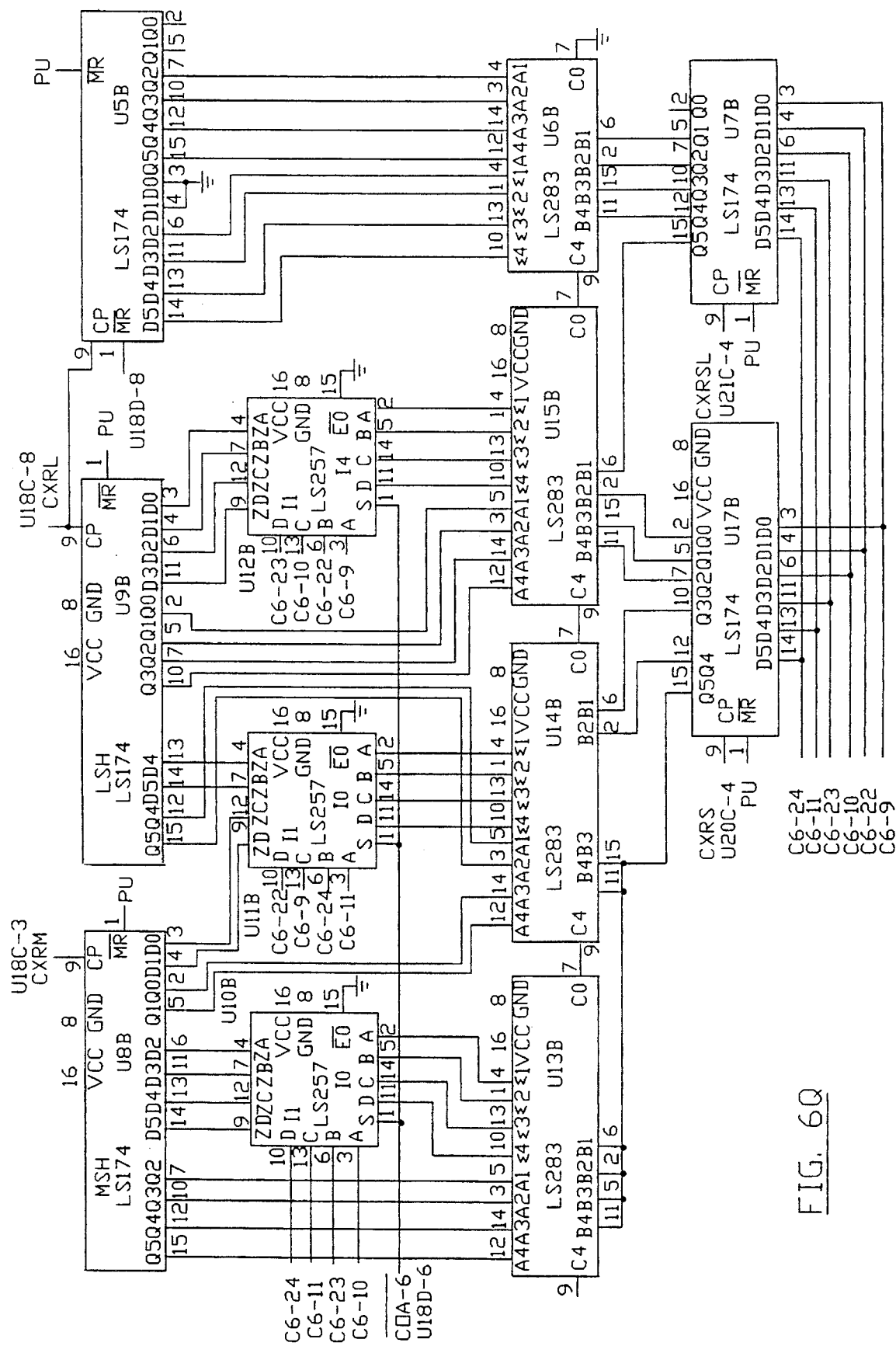
FIGS. 6Q and 6R are detailed schematic diagram representations of another configuration of an address generator that can be used in the system of the present invention.
Figure 6R:
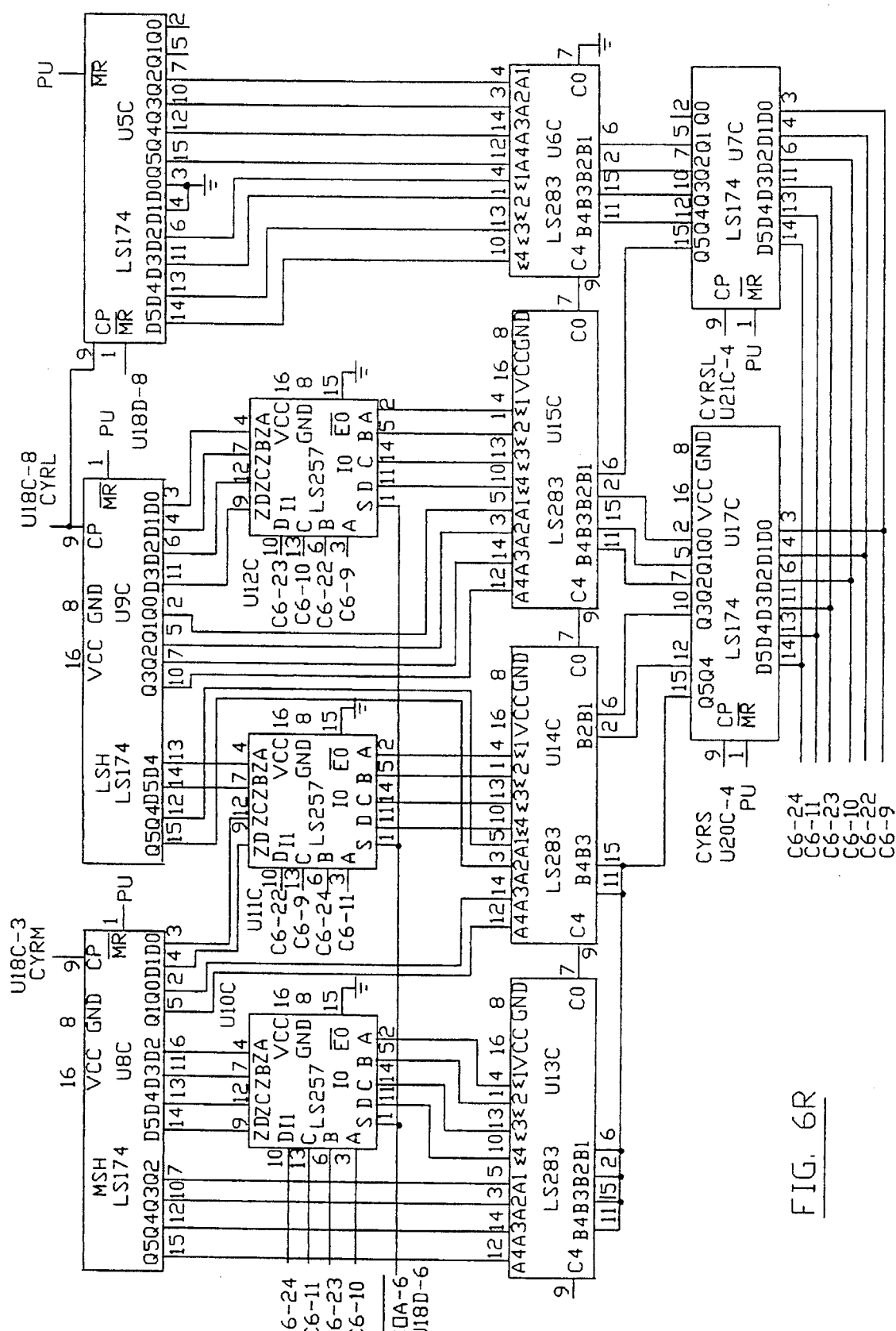

The system data bus interface will now be described with reference to FIGS. 6K to 6N. FIG. 6K shows the data bus interface for row-A on each of the two memory boards. FIG. 6L shows the data bus interface for row-B on each of the two memory boards. FIG. 6M shows the data bus interface for row-C on each of the two memory boards. FIG. 6N shows the data bus interface for row-D on each of the two memory boards.

For this configuration, 16-RAMs are bused together through each system data bus interface circuit, comprising two Intel 8216 components. The bi-directional signals DB0, DB1, DB2, and DB3 are connected to the RAM data bus and the uni-directional signals DI0 and DO0, DI1 and DO1, DI2 and DO2, and DI3 and DO3 are connected to the uni-directional system bus for reading from RAM through the DO0 to DO3 unidirectional outputs and for writing into RAM on the DI0 to DI3 unidirectional inputs. A pair of Intel 8216 4-bit bus drivers are used to control the 8-data bus lines for the RAM data bus.

The Intel 8216s are controlled with the board select signal XA3 or XA3-bar and the scanout address select signals for the 2-columns of RAMs associated with the Intel 8216 circuits. The board select signal, XA3-bar for memory board-1 and XA3 for memory board-2, control all of the Intel 8216s on the board. Therefore, the Intel 8216s on the enabled board are partially enabled to connect the RAM data buses on that board to the system bus and the Intel 8216 on the disabled board are fully disabled to disconnect the RAM databuses on that board from the system bus. Similarly, the column select signals for the 2-columns of RAMs connected to the particular Intel 8216s are controlled with the column select signals so that the column select signal enabling a column of RAMs will also partially enabled the Intel 8216s associated with that column to connect the selected column data bus to the system data bus. Because 2-columns of RAMs are connected to each Intel 8216 circuit, the related column select signals are ORed together with a NAND gate; where the column select signals are in complement logic form and consequently a NAND gate can perform an OR function; and are then ANDed with the board select signal XA3 or XA3-bar in a second NAND gate in non-complement logic form to generate the control signal in complement logic form as needed for the Intel 8216 chip select. The Intel 8216 circuits are steered with the DIEN-bar control, which is connected to the DIEN signal generated with U21E-6 (FIG. 6B). Therefore, in the run mode; the DIEN signal controls the Intel 8216s to connect the RAM data bus through the DO0 to DO3 buffers to output the RAM signals onto the system output data bus and, in the load mode; the DIEN signal controls the Intel 8216s to connect the RAM data bus through the DI0 to DI3 buffers to input the write signals from the system data bus to the RAMs.

Row A on the board has 2-logical columns of RAMs (FIGS. 6G and 6K), comprising the first column with RAMs U1A to U8A and the second column with RAMs U9A to U16A. As shown in greater detail with reference to FIGS. 6K to 6N; the first column is selected with the MY0-bar column select scanout signal and the second column is selected with the MY1-bar column select signal. The 2-column select signals are ORed together with U18E-3 and are ANDed with the board select signal with U18E-6 to enable U17A and U18A.

Row B on the board has 2-logical columns of RAMs (FIGS. 6H and 6L), comprising the third column with RAMs U1B to U8B and the fourth column with RAMs U9B to U16B. As shown in greater detail with reference to FIGS. 6K to 6N; the third column is selected with the MY2-bar column select scanout signal and the fourth column is selected with the MY3-bar column select signal. The 2-column select signals are ORed together with U18E-8 and are ANDed with the board select signal with U18E-11 to enable U17B and U18B.

Row C on the board has 2-logical columns of RAMs (FIGS. 6I and 6M), comprising the fifth column with RAMs U1C to U8C and the sixth column with RAMs U9C to U16C. As shown in greater detail with reference to FIGS. 6K to 6N; the fifth column is selected with the MY4-bar column select scanout signal and the sixth column is selected with the MY5-bar column select signal. The 2-column select signals are ORed together with U17E-3 and are ANDed with the board select signal with U17E-6 to enable U17C and U18C.

Row D on the board has 2-logical columns of RAMs (FIGS. 6J and 6N), comprising the seventh column with RAMs U1D to U8D and the eighth column with RAMs U9D to U16D. As shown in greater detail with reference to FIGS. 6K to 6N; the seventh column is selected with the MY6-bar column select scanout signal and the eighth column is selected with the MY7-bar column select signal. The 2-column select signals are ORed together with U17E-8 and are ANDed with the board select signal with U17E-11 to enable U17D and U18D.

BUFFER BOARD

General

Figure 6S:
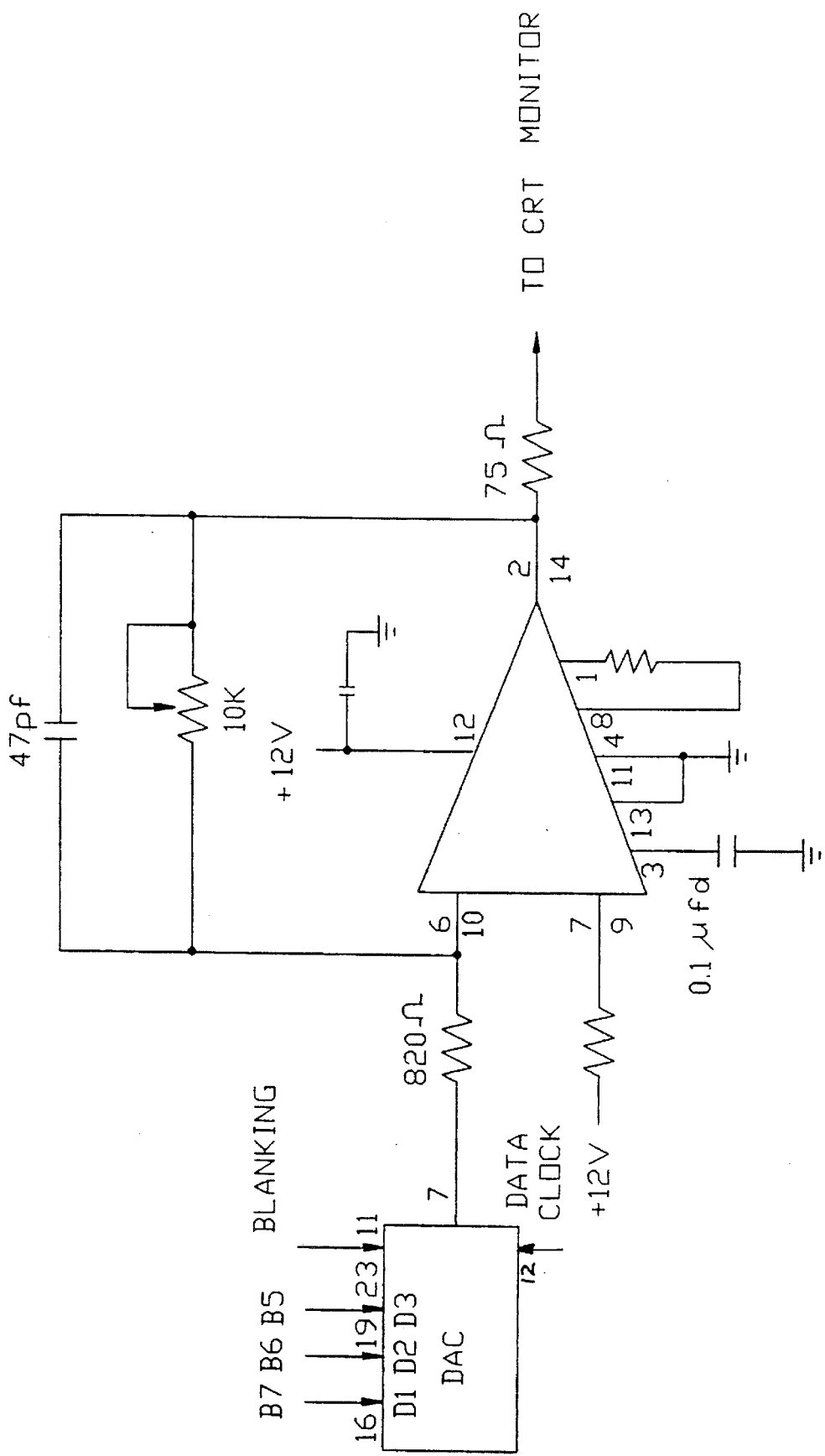
FIG. 6S is a detailed schematic diagram representation of a video DAC channel.
Figure 6V:
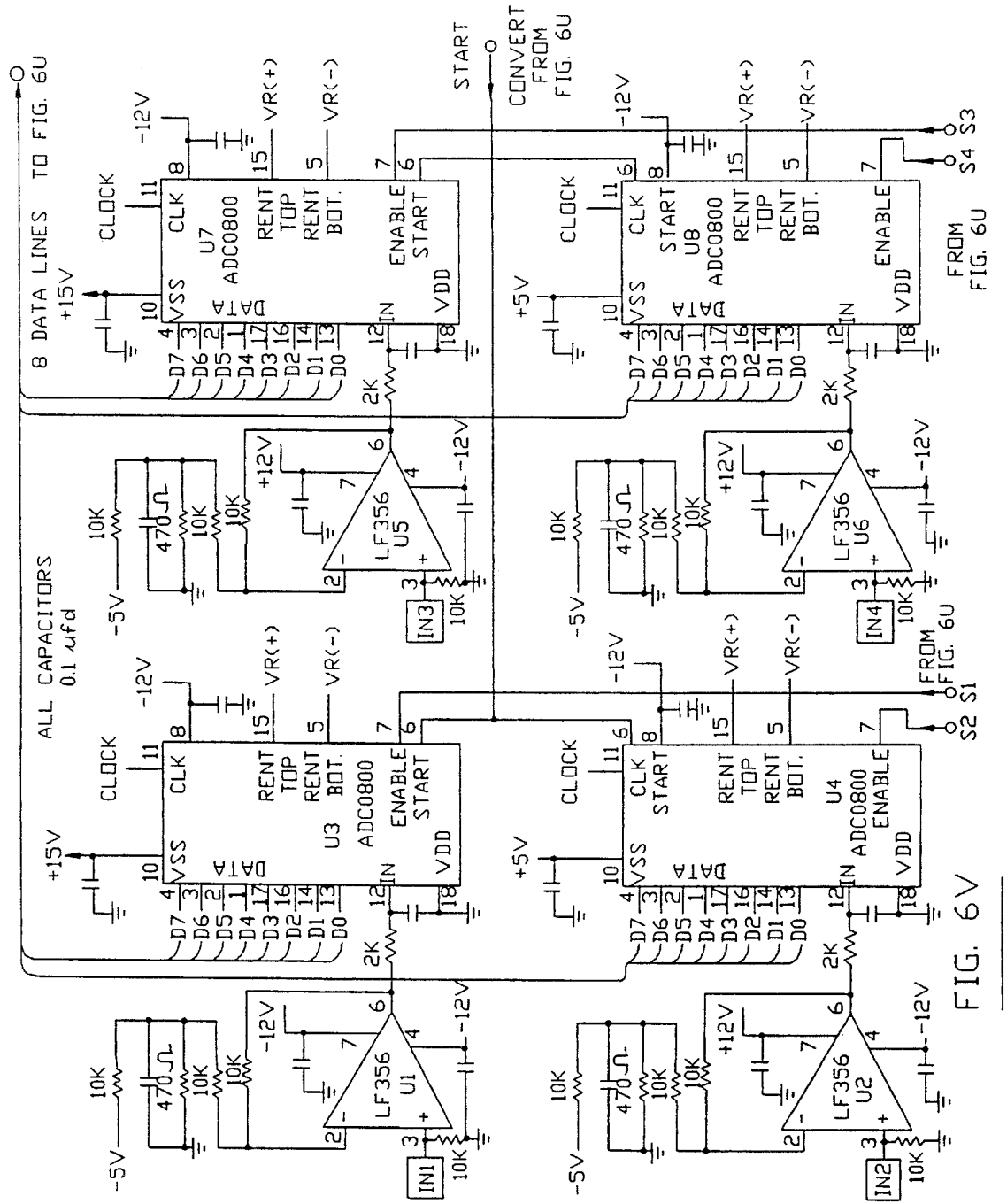
FIG. 6V is a detailed schematic diagram representation of joystick analog to digital converters.
Figure 6A:
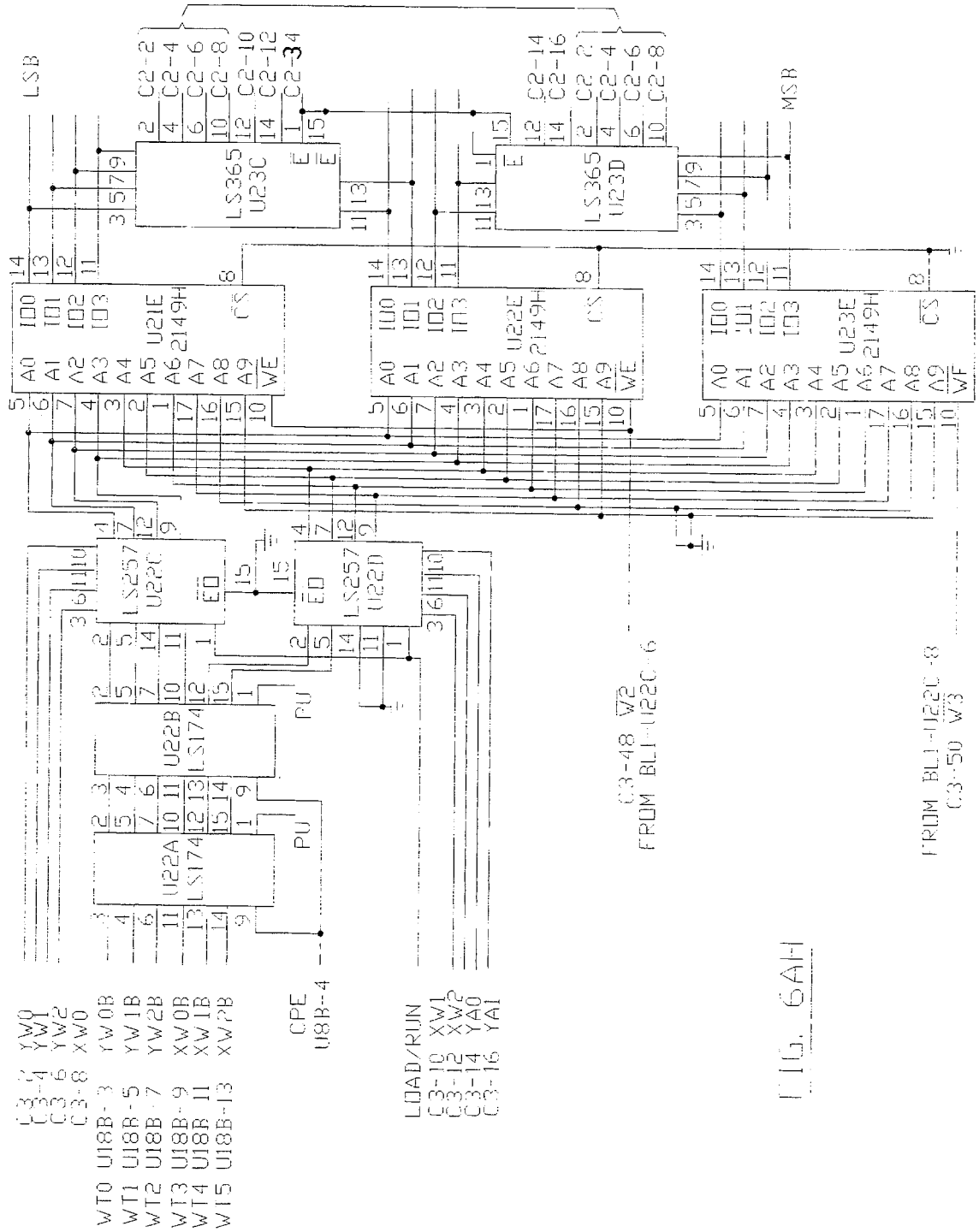
FIG. 6A is a block diagram representation of a system configuration for implementation of the present invention.

The buffer board is implemented with a buffer to buffer the outputs of image memory and to apply these outputs to the rear-end board (FIG. 6A). The buffer can be implemented with various forms of buffer memories, such as double buffers and FIFOs. Alternately, the buffer can be eliminated and the memory output can be routed directly to the rear-end board.

The CABLE CONNECTION TABLE provided herein illustrates on arrangement for connecting the buffer board inbetween the memory and logic boards and the rear-end board. The buffer board receives memory information and a gated clock from the memory and logic boards to clock the memory information into the buffer and receives a rear-end board clock to clock the buffered information into the rear-end board, as generally discussed with reference to FIG. 6A.

Alternately, the memory and logic boards can provide the unbuffered information directly to the rear-end board without an intervening buffer board for clocking the memory information into the DACs on the rear-end board with the gated clock from the logic board.

4/3 Buffer Implementation

The 4/3 buffer will now be discussed with reference to FIGS. 6W to 6AD. A precessional approach is shown controlled with counter U8A decoded with decoder U12B to identify which of the 4-precessional conditions exists for each line-buffer (FIG. 6W). This decoded number controls which of the 4-lines of buffer memory are selected for each of the 4-operational positions; the input line buffer, the output line-buffer channel-1, the output line-buffer channel-2, and the output line-buffer channel-3 positions. As the precessional counter sequences through its 4-states, the precessional decoder sequences through the 4-select signals to control sequential precessional operation. The selection logic is shown in the BUFFER MEMORY MULTIPLEXER ASSIGNMENT TABLE, where the input processional counter states are shown decoded into the decoded states and shown further decoded into the single input line-buffer select signal, the 3-output line-buffer select signal, and the output weight select signal.

| BUFFER MEMORY MULTIPLEXER ASSIGNMENT TABLE | | | | | | | |
|---|---|---|---|---|---|---|---|
| | INPUT | | OUTPUT | | | | |
| CNTR STATE | INPUT DATA ABCD | IN ADD. COUNTER ABCD | OUT ADD. COUNTER ABCD | CH-I ABCD | CH-II ABCD | CH-III ABCD | WEIGHT ABCD |
| 00 | 1000 | 1000 | 0111 | 0100 | 0010 | 0001 | 0010 |
| 01 | 0100 | 0100 | 1011 | 0010 | 0001 | 1000 | 0001 |
| 10 | 0010 | 0010 | 1101 | 0001 | 1000 | 0100 | 1000 |
| 11 | 0001 | 0001 | 1110 | 1000 | 0100 | 0010 | 0100 |

NOTES:
1) INPUT DATA assignment's are the same as ADD. COUNTER assignments.
2) OUTPUT CH-II assignments are the same as OUTPUT WEIGHT assignments.
3) INPUT ADD. COUNTER assignments are the complement of OUTPUT ADD. COUNTER assignments.

The ⅔ rds buffer is shown implemented with two address counters, an input address counter controlled by the image processor and the image memory clock and an output address counter controlled by the CRT monitor clock. The input address counter controls a single line-buffer that is being loaded by the image processor. The output address counter controls three line-buffers outputting to the spatial filter. Address multiplexing logic consists of multiplexers that select either the input counter or the output counter for the address input of each line-buffer RAM in accordance with the input columns in the BUFFER MEMORY MULTIPLEXER ASSIGNMENT TABLE. Similarly, this logic selects the write mode for the line buffer being loaded and selects the read mode for the 3-line-buffers being unloaded.

Similar to the address selection discussed above, the input and output signals to the RAM line-buffer being loaded and from the RAM line-buffer being unloaded are shown implemented with input multiplexers U4F, U5F, U6F, U8F, U9F, U10F, U12F, U13F, U14F, U16F, U17F, and U18F and output multiplexers U3D, U4D, U5D, U6D, U7D, U8D, U9D, U10D, U11D, U12D, U13D, U14D, U15D, U16D, U17D, and U18D. The single line-buffer, selected for inputting and operating under control of the input address counter, receives input data from the image processor for storing therein. The 3-line buffers, selected for outputting and operating under control of the output address counter, generates output data to the post-processor for exciting the display. The output channel of each of the line buffers is controlled for outputting to each of the 3-output channels under control of the precessional decoder signals. Each of the 3-line buffers selected for outputting are selected for outputting to different output channels; channel-1, channel-2, and channel-3; under control of the precessional decoder signals; as shown in the OUTPUT columns of the BUFFER MEMORY MULTIPLEXER ASSIGNMENT TABLE. Similarly, the spatial filtering weight is selected from the channel-2 line-buffer, as shown in the WEIGHT column of the BUFFER MEMORY MULTIPLEXER ASSIGNMENT TABLE.

In view of the above and in view of the referenced schematics and block diagrams, a buffer memory is provided that inputs pixel information to any one of 4-line-buffers and outputs pixel information from any one of 4-line-buffers to any one of 3-output channels. Also, sequential operation is provided that sequentially applies each of the 4-line buffers to each of the positions of input buffer, channel-1 output buffer, channel-2 output buffer, and channel-3 output buffer for loading of a single line into a line-buffer and simultaneously for outputting of 3-parallel lines into a post-processor.

The buffer memory is shown implemented to store both weight address information for weight determination and pixel intensity information. The pixel intensity information is loaded into an interface pipeline (kernel) register, such as for use with the post processor, such as a spatial processor. The weight address information is converted to weight information with a table lookup in a weight-RAM. Weight address information is stored in the line-buffer to implement interpolation in the post-processor; which, in one configuration may be more efficiently implemented with weight address information. Alternately, the weight address information can be converted to weight information before loading into the line buffers, such as with a weight RAM, for storing of weight information instead of weight address information in the buffer memory.

A register interface is provided inbetween the buffer memory and the post-processor. The registers may be considered to be implemented in a pipeline form to enhance performance and to provide stable latched signals for the post-processor. The registers are implemented to store 9-pixels in a 9-pixel kernel arrangement for processing with a post-processor. Also, a weight RAM is provided that stores weight information in response to weight address information from the buffer memory.

The memory components are Intel 2149H RAMs. The logic components are 7400 series logic, particularly 74LS, 74ALS, and 74AS circuits; such as produced by Texas Instruments. Alternately, the buffer memory can be implemented with other components.

Buffer Memory Address Counters

The buffer memory is composed of one line buffer selected as an input line buffer and 3-line buffers selected as output line buffers. Separate address counters are used to generate addresses for the input line buffer and to generate addresses for the output line buffers so that loading of data into the input line buffer can proceed asynchronously with respect to outputting of data from the output line buffers. The output address counter is discussed relative to FIG. 6X and the input address counter is discussed relative to FIG. 6W below.

Control logic for the address counters is shown in FIG. 6X, comprising flip-flops U1A and gates U1B-1, U2B-3, AND U2B-6. Gate U1B-1 receives and inverts the line sync signal CLS for loading into flip-flops U1A. The inverted line sync pulse is shifted through flip-flops U1A-2 and U1A-7 and the leading edge is detected with gate U2B-3 and the trailing edge is detected with gate U2B-6. Leading edge detection is performed by NANDing the once delayed complemented and the twice delayed uncomplemented shifted CLS-signal with gate U2B-3. Trailing edge detection is performed by NANDing the once delayed uncomplemented and the twice delayed complemented shifted CLS-signal with gate U2B-6. Therefore, gate U2B-3 will generate a 1-clock period negative going pulse at the leading edge of the CLS-signal and gate U2B-6 will generate a 1-clock period negative going pulse at the trailing edge of the CLS-signal for synchronizing the input address counter and the output address counter to the line sync signal, respectively.

As discussed above, the input line buffer can be controlled to commence loading of information at the beginning of the line sync period to provide extra time to load the line buffer and the output line buffer can be controlled to commence outputting of information at the end of the line sync period to synchronize outputting of pixel information with completion of the blanking pulse.

Clock fanout logic is shown in FIG. 6X, where AND gate U7B-3 receives the complemented early clock CPE-bar and provides a non-inverting delay and inverters U8B-2, U8B-4, and U8B-6 provide the inverted and delayed CPD clock signal.

The output address counter will now be discussed with reference to FIG. 6X. The output address counter is composed of counters U2A, U3A, and U4A. This counter is connected as a synchronous 12-bit counter by connecting the TC-signal on pin-15, the CEP-signal on pin-7, and the CET-signal on pin-10 between the different stages in the manner shown. The output counter is clocked under control of the output pixel clock CPE-bar inverted and delayed to the CPD clock signal to generate 10-address signals to the output address bus (or read address bus) to the buffer memories. The output address counter is cleared with the trailing edge pulse from U2B-6 to the counter clear input PE-bar on pin-9 at the end of the line blanking period to initiate address counting from the first address in the buffer memory coincident with the beginning of the line blanking CLS-signal.

The input address counter will now be discussed with reference to FIG. 6W. The input address counter is composed of counters U5A, U6A, and U7A. This counter is connected as a synchronous 12-bit counter by connecting the TC-signal on pin-15, the CEP-signal on pin-7, and the CET-signal on pin-10 between the different stages in the manner shown. The input counter is clocked under control of the input pixel gated clock CPG C3-22 to generate 10-address signals to the input address bus (or write address bus) to the buffer memories. The CPG clock is the gated clock generated on the control logic board with gate U21D-8. The input address counter is cleared with the leading edge pulse from U2B-3 to the counter clear input PE-bar on pin-9 at the beginning of the line blanking period to initiate address counting from the first address in the buffer memory coincident with the end of the line blanking CLS-signal.

The buffer memory multiplexer control will now be discussed with reference to FIG. 6W. The multiplexer logic has been discussed with reference to the BUFFER MEMORY MULTIPLEXER ASSIGNMENT TABLE above. Counter U8A is a modulo-3 counter, counting from 0 to 3 and then overflowing to 0 again. It counts in response to the leading edge pulse from U2B-3, inverted with U13B-10, and applied to the CEP and CET inputs to increment counter U8A. Consequently, counter U8A is incremented at the beginning of each line sync pulse for changing the buffer memory multiplexing on a scanline-by-scanline basis. The modulo-3 count is decoded by decoder U12B to generate one of four mode signals; F0-bar, F1-bar, F2-bar, and F3-bar in response to the state of counter U8A. The decoded mode signal controls the buffer memory multiplexer in accordance with the assignments in the BUFFER MEMORY MULTIPLEXER ASSIGNMENT TABLE.

Line Buffer Memory

The line buffer memory is composed of 4-line buffers shared to implement a multiple buffer configuration. These 4-line buffers are similar in design and operate under control of multiplexer signals and address signals.

The first line buffer will now be discussed with reference to FIGS. 6Y and 6Z. Four RAM circuits U3E to U6E are addressed through tristate multiplexers U3C to U6C. Multiplexers U3C and U4C select the write address from the write bus (or input bus) and multiplexers U5C and U6C select the read address from the read bus (or output bus) under control of the mode control signal F0-bar U12B-4 in accordance with the logic shown in the BUFFER MEMORY MULTIPLEXER ASSIGNMENT TABLE. Multiplexers U3C and U4C are selected with the F0-bar signal and multiplexers U5C and U6C are selected with the F0-bar signal complemented with U13B-2. The selected address is applied to the address inputs on RAMs U3E to U6E. The write multiplexer U4C also multiplexes the write pulse to U4C-11 and to the write inputs to the RAMs WE-bar on pin-10. When the write multiplexer U3C and U4C is selected, the write address is applied to RAMs U3E to U6E and the write pulse CPG is applied to the write input WE-bar of the RAMs. When the read multiplexer U5C and U6C is selected, the read address is applied to RAMs U3E to U6E and the write pin-10 WE-bar is pulled up to select read operations.

The RAM input and output lines IO0 to IO3 are shared between outputting of information in the read mode and inputting of information in the write mode. Input information is selected with line buffers U4F to U6F, which apply input information obtained from the input bus to the RAM IO lines in the write mode and which are tristate-disabled to disconnect the input information on the input bus from the RAM IO lines in the read mode. Line buffers U4F to U6F are controlled with the F0-bar multiplexer control signal to connect the input bus to the RAM IO lines when the F0-bar signal enables the write address and the write pulse through multiplexers U3C and U4C and to disconnect the input bus from the RAM 10 lines when the F0-bar signal enables the read address and disables the write address and write pulse. Hence, line buffers U4F to U6F are enabled when the RAM channel is in the write mode and are disabled when the RAM channel is in the read mode. As can be seen from the schematic, line buffers U4F to U6F apply the 8-intensity bits from image memory over the buffer input bus to the inputs of RAMs U3E and U4E and apply the weight addresses from the address generators over the buffer input bus to the inputs of RAMs U5E and U6E, with 2-spare bits presently unassigned.

Output information is multiplexed onto the buffer output buses; identified as the channel-I bus, the channel-II bus, the channel-III bus, and the weight bus. The 3-channel buses comprising the pixel intensities from the 3-output line buffers are applied to the 3-channels of kernel registers. The weight bus, comprising the weight addresses of the selected channel, is applied to the single channel of weight registers U22A and U22B for accessing the weight RAM.

The 8-intensity lines from RAMs U3E and U4E are applied to all 3-channels through different multiplexers so that the intensity lines can be selected for one of the 3-output channels or for none of the 3-output channels under control of multiplexers U3D to U6D. Because each intensity parameter and each output channel has 8-bits, because each multiplexer U3D to U6D has 6-bits, and because the 74LS367 multiplexers can each control separately 4-bits and 2-bits, the 8-bits selected for one of 3-channels are partitioned between a pair of multiplexers. For example, the intensity bits from RAMs U3E and U4E are controlled with multiplexers U3D and U4D for channel-I, with multiplexers U4D and U5D for channel-II, and with multiplexers U5D and U6D for channel-III. The specific partitioning of intensity bits and multiplexers is shown in the schematic diagram. The multiplexing of the intensity bits onto the channel-I bus is controlled with the F1-bar multiplexer control signal to control all of multiplexer U3D and 2-bits of multiplexer U4D. The multiplexing of the intensity byte onto the channel-II bus is controlled with the F2-bar multiplexer control signal to control 4-bits of multiplexer U4D and 4-bits of multiplexer U5D. The multiplexing of the intensity byte onto the channel-III bus is controlled with the F3-bar multiplexer control signal to control 2-bits of multiplexer U5D and all 6-bits of multiplexer U6D. Consequently, multiplexers U3D to U6D multiplex the 8-intensity bits from RAMs U3E and U4E onto one of the 3-output channel buses under control of the multiplexer control signals in accordance with the definitions shown in the BUFFER MEMORY MULTIPLEXER ASSIGNMENT TABLE.

The 6-weight address lines are applied to the weight bus under control of multiplexer U6B as output from RAMs U5E and U6E. This first RAM buffer line outputs to the weight bus under control of the F2-bar signal. Consequently, when the first line buffer is selected with the F2-bar signal to output the stored intensity onto the channel-II bus through multiplexers U4D and U5D, the weight addresses from RAMs U5E and U6E are applied to the weight bus through multiplexer U6B under control of the F2-bar signal.

The second line buffer will now be discussed with reference to FIGS. 6AA and 6AB. Four RAM circuits U7E to U10E are addressed through tristate multiplexers U7C to U10C. Multiplexers U7C and U8C select the write address from the write bus (or input bus) and multiplexers U9C and U10C select the read address from the read bus (or output bus) under control of the mode control signal F1-bar U12B-5 in accordance with the logic shown in the BUFFER MEMORY MULTIPLEXER ASSIGNMENT TABLE. Multiplexers U7C and U8C are selected with the F1-bar signal and multiplexers U9C and U10C are selected with the F1-bar signal complemented with U13B-4. The selected address is applied to the address inputs on RAMs U7E to U10E. The write multiplexer U8C also multiplexes the write pulse to U8C-11 and to the write inputs to the RAMs WE-bar on pin-10. When the write multiplexer U7C and U8C is selected, the write address is applied to RAMs U7E to U10E and the write pulse CPG is applied to the write input WE-bar of the RAMs. When the read multiplexer U9C and U10C is selected, the read address is applied to RAMs U7E to U10E and the write pin-10 WE-bar is pulled up to select read operations.

The RAM input and output lines IO0 to IO3 are shared between outputting of information in the read mode and inputting of information in the write mode. Input information is selected with line buffers U8F to U10F, which apply input information obtained from the input bus to the RAM IO lines in the write mode and which are tristate-disabled to disconnect the input information on the input bus from the RAM IO lines in the read mode. Line buffers U8F to U10F are controlled with the F1-bar multiplexer control signal to connect the input bus to the RAM IO lines when the F1-bar signal enables the write address and the write pulse through multiplexers U7C and U8C and to disconnect the input bus from the RAM IO lines when the F1-bar signal enables the read address and disables the write address and write pulse. Hence, line buffers U8F to U10F are enabled when the RAM channel is in the write mode and are disabled when the RAM channel is in the read mode. As can be seen from the schematic, line buffers U8F to U10F apply the 8-intensity bits from image memory over the buffer input bus to the inputs of RAMs U7E and U8E and apply the weight addresses from the address generators over the buffer input bus to the inputs of RAMs U9E and U10E, with 2-spare bits presently unassigned.

Output information is multiplexed onto the buffer output buses; identified as the channel-I bus, the channel-II bus, the channel-III bus, and the weight bus. The 3-channel buses comprising the pixel intensities from the 3-output line buffers are applied to the 3-channels of kernel registers. The weight bus, comprising the weight addresses of the selected channel, is applied to the single channel of weight registers U22A and U22B for accessing the weight RAM.

The 8-intensity lines from RAMs U7E and U8E are applied to all 3-channels through different multiplexers so that the intensity lines can be selected for one of the 3-output channels or for none of the 3-output channels under control of multiplexers U7D to U10D. Because each intensity parameter and each output channel has 8-bits, because each multiplexer U7D to U10D has 6-bits, and because the 74LS367 multiplexers can each control separately 4-bits and 2-bits, the 8-bits selected for one of 3-channels are partitioned between a pair of multiplexers. For example, the intensity bits from RAMs U7E and U8E are controlled with multiplexers U7D and U8D for channel-I, with multiplexers U8D and U9D for channel-II, and with multiplexers U9D and U10D for channel-III. The specific partitioning of intensity bits and multiplexers is shown in the schematic diagram. The multiplexing of the intensity bits onto the channel-I bus is controlled with the F2-bar multiplexer control signal to control all of multiplexer U7D and 2-bits of multiplexer U8D. The multiplexing of the intensity byte onto the channel-II bus is controlled with the F3-bar multiplexer control signal to control 4-bits of multiplexer U8D and 4-bits of multiplexer U9D. The multiplexing of the intensity byte onto the channel-III bus is controlled with the F0-bar multiplexer control signal to control 2-bits of multiplexer U9D and all 6-bits of multiplexer U10D. Consequently, multiplexers U7D to U10D multiplex the 8-intensity bits from RAMs U7E and U8E onto one of the 3-output channel buses under control of the multiplexer control signals in accordance with the definitions shown in the BUFFER MEMORY MULTIPLEXER ASSIGNMENT TABLE.

The 6-weight address lines are applied to the weight bus under control of multiplexer U10B as output from RAMs U9E and U10E. This first RAM buffer line outputs to the weight bus under control of the F3-bar signal. Consequently, when the first line buffer is selected with the F3-bar signal to output the stored intensity onto the channel-II bus through multiplexers U8D and U9D, the weight addresses from RAMs U9E and U10E are applied to the weight bus through multiplexer U10B under control of the F3-bar signal.

The third line buffer will now be discussed with reference to FIGS. 6AC and 6AD. Four RAM circuits U11E to U14E are addressed through tristate multiplexers U11C to U14C. Multiplexers U11C and U12C select the write address from the write bus (or input bus) and multiplexers U13C and U14C select the read address from the read bus (or output bus) under control of the mode control signal F2-bar U12B-6 in accordance with the logic shown in the BUFFER MEMORY MULTIPLEXER ASSIGNMENT TABLE. Multiplexers U11C and U12C are selected with the F2-bar signal and multiplexers U13C and U14C are selected with the F2-bar signal complemented with U13B-6. The selected address is applied to the address inputs on RAMs U11E to U14E. The write multiplexer U12C also multiplexes the write pulse to U12C-11 and to the write inputs to the RAMs WE-bar on pin-10. When the write multiplexer U11C and U12C is selected, the write address is applied to RAMs U11E to U14E and the write pulse CPG is applied to the write input WE-bar of the RAMs. When the read multiplexer U13C and U14C is selected, the read address is applied to RAMs U11E to U14E and the write pin-10 WE-bar is pulled up to select read operations.

The RAM input and output lines IO0 to IO3 are shared between outputting of information in the read mode and inputting of information in the write mode. Input information is selected with line buffers U12F to U14F, which apply input information obtained from the input bus to the RAM IO lines in the write mode and which are tristate-disabled to disconnect the input information on the input bus from the RAM IO lines in the read mode. Line buffers U12F to U14F are controlled with the F2-bar multiplexer control signal to connect the input bus to the RAM IO lines when the F2-bar signal enables the write address and the write pulse through multiplexers U11C and U12C and to disconnect the input bus from the RAM IO lines when the F2-bar signal enables the read address and disables the write address and write pulse. Hence, line buffers U12F to U14F are enabled when the RAM channel is in the write mode and are disabled when the RAM channel is in the read mode. As can be seen from the schematic, line buffers U12F to U14F apply the 8-intensity bits from image memory over the buffer input bus to the inputs of RAMs U11E and U12E and apply the weight addresses from the address generators over the buffer input bus to the inputs of RAMs U13E and U14E, with 2-spare bits presently unassigned.

Output information is multiplexed onto the buffer output buses; identified as the channel-I bus, the channel-II bus, the channel-III bus, and the weight bus. The 3-channel buses comprising the pixel intensities from the 3-output line buffers are applied to the 3-channels of kernel registers. The weight bus, comprising the weight addresses of the selected channel, is applied to the single channel of weight registers U22A and U22B for accessing the weight RAM.

The 8-intensity lines from RAMs U11E and U12E are applied to all 3-channels through different multiplexers so that the intensity lines can be selected for one of the 3-output channels or for none of the 3-output channels under control of multiplexers U11D to U14D. Because each intensity parameter and each output channel has 8-bits, because each multiplexer U11D to U14D has 6-bits, and because the 74LS367 multiplexers can each control separately 4-bits and 2-bits, the 8-bits selected for one of 3-channels are partitioned between a pair of multiplexers. For example, the intensity bits from RAMs U11E and U12E are controlled with multiplexers U11D and U12D for channel-I, with multiplexers U12D and U13D for channel-II, and with multiplexers U13D and U14D for channel-III. The specific partitioning of intensity bits and multiplexers is shown in the schematic diagram. The multiplexing of the intensity bits onto the channel-I bus is controlled with the F3-bar multiplexer control signal to control all of multiplexer U11D and 2-bits of multiplexer U12D. The multiplexing of the intensity byte onto the channel-II bus is controlled with the F0-bar multiplexer control signal to control 4-bits of multiplexer U12D and 4-bits of multiplexer U13D. The multiplexing of the intensity byte onto the channel-III bus is controlled with the F1-bar multiplexer control signal to control 2-bits of multiplexer U13D and all 6-bits of multiplexer U14D. Consequently, multiplexers U11D to U14D multiplex the 8-intensity bits from RAMs U11E and U12E onto one of the 3-output channel buses under control of the multiplexer control signals in accordance with the definitions shown in the BUFFER MEMORY MULTIPLEXER ASSIGNMENT TABLE.

The 6-weight address lines are applied to the weight bus under control of multiplexer U14B as output from RAMs U13E and U14E. This first RAM buffer line outputs to the weight bus under control of the F0-bar signal. Consequently, when the first line buffer is selected with the F0-bar signal to output the stored intensity onto the channel-II bus through multiplexers U12D and U13D, the weight addresses from RAMs U13E and U14E are applied to the weight bus through multiplexer U14B under control of the F0-bar signal.

The fourth line buffer will now be discussed with reference to FIGS. 6AE and 6AF. Four RAM circuits U15E to U18E are addressed through tristate multiplexers U15C to U18C. Multiplexers U15C and U16C select the write address from the write bus (or input bus) and multiplexers U17C and U18C select the read address from the read bus (or output bus) under control of the mode control signal F3-bar U12B-7 in accordance with the logic shown in the BUFFER MEMORY MULTIPLEXER ASSIGNMENT TABLE. Multiplexers U15C and U16C are selected with the F3-bar signal and multiplexers U17C and U18C are selected with the F3-bar signal complemented with U13B-8. The selected address is applied to the address inputs on RAMs U15E to U18E. The write multiplexer U16C also multiplexes the write pulse to U16C-11 and to the write inputs to the RAMs WE-bar on pin-10. When the write multiplexer U15C and U16C is selected, the write address is applied to RAMs U15E to U18E and the write pulse CPG is applied to the write input WE-bar of the RAMs. When the read multiplexer U17C and U18C is selected, the read address is applied to RAMs U15E to U18E and the write pin-10 WE-bar is pulled up to select read operations.

The RAM input and output lines IO0 to IO3 are shared between outputting of information in the read mode and inputting of information in the write mode. Input information is selected with line buffers U16F to U18F, which apply input information obtained from the input bus to the RAM IO lines in the write mode and which are tristate-disabled to disconnect the input information on the input bus from the RAM IO lines in the read mode. Line buffers U16F to U18F are controlled with the F3-bar multiplexer control signal to connect the input bus to the RAM IO lines when the F3-bar signal enables the write address and the write pulse through multiplexers U15C and U16C and to disconnect the input bus from the RAM IO lines when the F3-bar signal enables the read address and disables the write address and write pulse. Hence, line buffers U16F to U18F are enabled when the RAM channel is in the write mode and are disabled when the RAM channel is in the read mode. As can be seen from the schematic, line buffers U16F to U18F apply the 8-intensity bits from image memory over the buffer input bus to the inputs of RAMs U15E and U16E and apply the weight addresses from the address generators over the buffer input bus to the inputs of RAMs U17E and U18E, with 2-spare bits presently unassigned.

Output information is multiplexed onto the buffer output buses; identified as the channel-I bus, the channel-II bus, the channel-III bus, and the weight bus. The 3-channel buses comprising the pixel intensities from the 3-output line buffers are applied to the 3-channels of kernel registers. The weight bus, comprising the weight addresses of the selected channel, is applied to the single channel of weight registers U22A and U22B for accessing the weight RAM.

The 8-intensity lines from RAMs U15E and U16E are applied to all 3-channels through different multiplexers so that the intensity lines can be selected for one of the 3-output channels or for none of the 3-output channels under control of multiplexers U15D to U18D. Because each intensity parameter and each output channel has 8-bits, because each multiplexer U15D to U18D has 6-bits, and because the 74LS367 multiplexers can each control separately 4-bits and 2-bits, the 8-bits selected for one of 3-channels are partitioned between a pair of multiplexers. For example, the intensity bits from RAMs U15E and U16E are controlled with multiplexers U15D and U16D for channel-I, with multiplexers U16D and U17D for channel-II, and with multiplexers U17D and U18D for channel-III. The specific partitioning of intensity bits and multiplexers is shown in the schematic diagram. The multiplexing of the intensity bits onto the channel-I bus is controlled with the F0-bar multiplexer control signal to control all of multiplexer U15D and 2-bits of multiplexer U16D. The multiplexing of the intensity byte onto the channel-II bus is controlled with the F1-bar multiplexer control signal to control 4-bits of multiplexer U16D and 4-bits of multiplexer U17D. The multiplexing of the intensity byte onto the channel-III bus is controlled with the F2-bar multiplexer control signal to control 2-bits of multiplexer U16D and all 6-bits of multiplexer U17D. Consequently, multiplexers U15D to U18D multiplex the 8-intensity bits from RAMs U15E and U16E onto one of the 3-output channel buses under control of the multiplexer control signals in accordance with the definitions shown in the BUFFER MEMORY MULTIPLEXER ASSIGNMENT TABLE.

The 6-weight address lines are applied to the weight bus under control of multiplexer U18B as output from RAMs U17E and U18E. This first RAM buffer line outputs to the weight bus under control of the F1-bar signal. Consequently, when the first line buffer is selected with the F1-bar signal to output the stored intensity onto the channel-II bus through multiplexers U16D and U17D, the weight addresses from RAMs U17E and U18E are applied to the weight bus through multiplexer U18B under control of the F1-bar signal.

Kernel Logic

The kernel logic for spatial processing will now be discussed with reference to FIG. 6AG. This kernel logic includes a 9-pixel kernel implemented with registers U19A to U19D, U20A to U20D, and U21A to U21D.

The 9-pixel kernel is composed of 3-adjacent buffered lines and 3-adjacent pixels on each line. The 3-lines are shifted out of the 3-line buffers into a 3-pixel register for each line buffer. Because each pixel is shown implemented as an 8-bit intensity word and because each register has 6 flip-flops, 1⅓ register chips are needed to store a pixel word. Therefore, the 3-lines of 8-bit pixels are stored in 4-lines of 6-bit registers.

Referring to the pixel designation of FIG. 5D, the following pixel storage is implemented with the kernel registers. Pixel-0 is stored in 6-bits of U19A and 2-bits of U19B. Pixel-1 is stored in 6-bits of U20A and 2-bits of U20B. Pixel-2 is stored in 6-bits of U21A and 2-bits of U21B. Pixel-7 is stored in 4-bits of U19B and 4-bits of U19C. Pixel-8 is stored in 4-bits of U20B and 4-bits of U20C. Pixel-3 is stored in 4-bits of U21B and 4-bits of U21C. Pixel-6 is stored in 2-bits of U19C and 6-bits of U19D. Pixel-5 is stored in 2-bits of U20C and 6-bits of U20D. Pixel-4 is stored in 2-bits of U21C and 6-bits of U21D.

The above assignment of 8-bit pixels to 6-bit registers can be seen with reference to the output lines at the left of FIG. 6AG. These output lines show the 8-lines grouped together for each of the 9-kernel pixels and show the source registers for these lines.

The 3-lines of pixels are scanned out of the line buffers onto the channel-I bus, channel-II bus, and channel III bus; as shown at the left hand side of FIGS. 6Z, 6AB, 6AD, and 6AF. The 3-channel scanline pixels are each implemented with 8-pixel lines being input to registers U19A to U19D with the above described partitioning for triple 8-bit pixel bytes loaded into quadruple 6-bit registers. The pixel information in registers U19A to U19D is shifted into registers U20A to U20D respectively and is also output to the spatial filter logic as pixel-0, pixel-7, and pixel-6 respectively of the kernel. The pixel information in registers U20A to U20D is shifted into registers U21A to U21D respectively and is output to the spatial filter logic as pixel-1, pixel-8, and pixel-5 respectively of the kernel. The pixel information in registers U21A to U21D is output to the spatial filter logic as pixel-2, pixel-3, and pixel-4 respectively of the kernel. This shift register operation is performed under control of the CPE clock U8B-4 which clocks the information out of the line buffers, into the kernel registers, and through the kernel registers to provide a 9-pixel kernel in parallel to the spatial filter logic.

In a non-filtered implementation, the center pixel is provided to the video DACs on the rear end board to display the center pixel without spatial filtering. The center pixel is shown output on cable C-4 lines 22, 24, 26, 28, 30, 32, 34, and 36.

In a spatial filtering implementation, the output of the 9-pixel kernel is provided in parallel to the sum-of-the-products logic that performs spatial filtering. The output of the sum-of-the-products processing is provided to the video DACs on the rear-end board to display the spatially filtered pixel. The 9-pixel kernel is shown output in parallel through the 72-lines (9-pixels by 8-bits per pixel) at the left hand side of FIG. 6AG.

Weight Logic

The weight logic will now be discussed with reference to FIG. 6AH. The weight logic is implemented with registers U22A and U22B; decoders U22C and U22D; RAMs U21E to U23E; and multiplexers U23C and U23D.

The weight addresses stored in the line buffers are output to the weight RAMs U21E to U23E for accessing of the weights associated therewith. In one configuration, the weights to be accessed are associated with the center pixel in the kernel. Therefore, the weight addresses from the line buffer are shown delayed 2-clock periods with registers U22A and U22B so that they are available as addresses to the weight RAM when the pixel with which they are associated is in the center pixel position, pixel-8 position, of the kernel. Multiplexers U22C and U22D provide for addressing of weight RAM U21E to U23E from two sources, for reading and for writing.

During the run mode, addresses from the line buffers are selected with multiplexers U22C and U22D for accessing weights stored in weight RAMs U21E to U23E. During the load mode, the computer can generate weight addresses through the output port for writing weights into the weight RAMs; where the addresses selected with multiplexers U22C and U22D and are applied to weight RAMs U21E to U23E.

The RAM IO lines IO0 to IO3 are used for both input and output of data, controlled with the WE-bar pins. In the run mode, the W2-bar and W3-bar signals to the WE-bar pins are high, selecting reading from the weight RAM for outputting on the RAM IO lines to the spatial filter logic. In the load mode, the W2-bar and W3-bar signals can be controlled by the computer to be low, selecting writing into the weight RAM from the computer output signals through multiplexers U23C and U23D. The weight addresses stored in register U22B are output to multiplexers U22C and U22D for accessing of weights from the weight RAM when selected by the run mode signal to multiplexers U22C and U22D. The weight addresses from the computer output port are applied to multiplexers U22C and U22D for storing of weights in the weight RAM when selected by the load mode signal to multiplexers U22C and U22D.

The weight bus communicates the weight address bits from the line buffers to weight register U22A; where the weight address is shifted into the weight registers to address the weight RAMs in a manner similar to the pixel intensities being shifted into the kernel registers for spatial filtering, as discussed above. The weight addresses are composed of the Y-weight address YW0B, YW1B, and YW2B and the X-weight address XW0B, XW1B, and XW2B shifted into register U22A.

Multiplexers U22C and U22D select the address for the weight RAMs, comprising the buffered weight addresses from register U22B in the run mode and the computer generated weight addresses XW0, XW1, XW2, YW0, YW1, and YW2 in the load mode when the computer is loading the weight RAMs. The multiplexer source information is selected with the load/run signal from the computer. The addresses from the multiplexers are used to address the weight RAMs to access the appropriate weights as a function of the weight addresses from the line buffers in the run mode and to store the computer generated weights as a function of the computer generated weight addresses in the load mode when the W2-bar or W3-bar signals select writing into the weight RAMs. The data to be loaded into the weight RAMs in the load mode is input to tri state buffers U23C and U23D and is controlled to be applied to the RAM IO lines with control signal C2-34 to the buffer circuits. When the input data is applied to the RAM IO lines, the input data can be stored in the RAMs under control of the W2-bar signal or the W3-bar signal to RAMs U21E to U23E. When the input data is not applied to the RAM IO lines through U23C and U23D, the weights stored in the RAMs are output on the RAM IO lines to the spatial filter.

REAR-END BOARD

The rear-end board interfaces the system to a CRT monitor and provides synchronization and clock signals for the CRT monitor and for the rest of the system. The rear-end board also performs auxiliary functions, such as converting analog joystick signals to digital form for control of a display processor. The rear-end board is shown in FIGS. 6S to 6V in detailed schematic diagram form.

A clock pulse generator 630A is implemented with a pair of inverters, an 18.432-MHz (herein referred to as 18-MHz for convenience) crystal, resistors, and capacitors as shown in FIG. 6T to generate a square wave signal from inverter 630B pin-12. A counter circuit (74LS163N) is clocked from the inverted 18-MHz signal to pin-2 through inverter 74LS04 pin 2 for counting down the 18-MHz signal to about a 9-MHz clock signal for the display processor output from pin-14 and about a 2-MHz clock signal to the sync generator circuit MM5321 from pin-12. A group of 4-switches with pull-up resistors are connected to the preload inputs of the counter on pins 3 to 6 to preload a selected amount for implementing count periods other than binary numbers.

A synchronization signal generator is implemented with a National Semiconductor MM5321 component. The MM5321 is connected in a usual fashion, such as described in the specification sheets and shown in FIG. 6T. Switches D.C., V.R., and H.R. select MM532 modes of operation.

The MM5321 horizontal drive signal is output from pin-15 and is used to blank the digital to analog converters (DACs) and is output through an 8T98-9 inverter H-DRIVE for generating the horizontal sync signal or line sync signal CLS to the digital logic boards. The horizontal drive signal is also output to flip-flop U1-9, which is used to experiment with horizontal blanking HB signals.

The MM5321 vertical drive signal is output from pin-11 and is used to generate vertical blanking signals through an 8T97-5 to vertical blanking flip-flops U2, generating vertical blanking signal VB which is used to blank the video DACs. The vertical blanking signal VB U2-9 is buffered with 8T97-11 through cable C4-2 to apply the vertical blanking signal to the digital logic as the CFS signal.

The MM5321 composite sync signal is output from pin-16 and is used as the composite sync signal to the CRT monitor, buffered with an 8T97-3 and an 8T98-3 for complement signals.

The MM5321 blanking clock signal is output from pin-14 and is used to clock the vertical blanking flip-flops U2 and the horizontal blanking flip-flops U1-9 HB through an inverter 8T98-7.

The MM5321 interlace control signal is output from pin-9 and is used to control flip-flop U1-5 FLD-bar to generate the field-1-bar signal on cable C4-12 to the control logic board.

Joystick input circuits are shown in FIGS. 6U and 6V. FIG. 6U provides the control circuits for the joystick analog to digital converters (ADCs) and FIG. 6V shows the ADCs. These ADCs are input to the computer through the control logic board to provide operator control of display processing.

The joysticks utilized in this configuration are Apple-2 Compatible Joysticks named Computer Compatible Joystick. They are analog joysticks having analog potentiometers for analog control. The joystick signals are input through plugs PJ1 and PJ2 at pin-6 and pin-7 for connection to the scaling amplifiers and ADCs shown in FIG. 6V. The ADCs are controlled to start the conversion with the frame sync transition of the frame sync signal by shifting the frame sync signal through flip-flops U9A-5 and U9A-9 and detecting the condition of U9A-5 being in the 0-state and U9A-9 being in the 1-state with AND-gate U12-3 to generate a 1-clock period start convert pulse to the ADCs. The ADCs will start the conversion in response to this start convert pulse and will latch up the converted digital number for input to the computer under program control.

The two computer signals SEL0 and SEL1 are received from the computer through the control logic board to select one of four ADC numbers for input to the computer. These signals are inverted with U13-7 and U13-9. The inverted and non-inverted SEL0 and SEL1 signals are decoded with U11-3 for ADC 1-selection with signal S1, ADC-2 selection with signal S2, ADC-3 selection with signal S3, and ADC-4 selection with signal S4. Inverters U10 and U13 receive 8 signals from the ADCs, shown in FIG. 6V, and buffers these 8-signals to drive the cable for input to the computer through the control logic board.

Consequently, the computer under program control generates select signals SEL0 and SEL1 and reads the 8-bit number from the selected ADC. In one implementation, the computer under program control generates four sequential select signal codes on lines SEL0 and SEL1 to address the four ADCs in sequence and inputs the selected ADCs output number for processing under program control.

The 4-ADCs and associated scaling amplifiers are shown in FIG. 6V. The ADCs are implemented with the well known ADC0800 components, such as manufactured by National Semiconductor. The scaling amplifiers are implemented with the well known LF356 amplifiers. Each of the 4-joystick inputs from plugs PJ1 and PJ2 (FIG. 6U) are shown connected to a different ADC channel through a scaling amplifier U1, U2, U5, and U6 (FIG. 6V). The scaling amplifiers are connected in a conventional manner with resistor and capacitor networks to scale the joystick signals. Each scaling amplifier has its output on pin-6 connected to the input of its related ADC on pin-12. The ADCs convert the analog signal input at pin-12 in response to the start convert signal to pin-6 and latch the converted number in an internal register. The internal register is implemented with a tristate output controlled by the output enable signal to pin-7. The corresponding output lines of each ADC are connected together to form an 8-bit bus D0 to D7 which is routed to buffer amplifiers U10 and U13 (FIG. 6U). Consequently, when one of the ADCs is tristate-enabled with one of the decoded select signals S1 to S4 (FIG. 6U) input to pin-7 of the ADCs (FIG. 6V), the number converted by that ADC is applied to the 8-bit data bus for communication to the computer.

One channel of video DAC is shown in FIG. 6S. Each of the three channels are implemented with similar signals, except that the green channel having 3-bits is connected to data bits D5 to D7 and the red and blue channels having 2-bits are connected to data bits D6 and D7. These video DACs are high speed DACs for converting intensity signals from digital signal form, as generated by the display processor, to analog signal form for exciting a CRT monitor. Three video DACs are used to convert three video signals; the red video signal, the blue video signal, and the green video signal; to generate the RGB signals to the CRT monitor. The video DACs can be implemented with the TDC1016 DACs manufactured by TRW. The connections for this DAC are shown in the VIDEO DAC CONNECTION TABLE provided herein. The D9 and D10 data pins are connected to ground. The digital red and blue signals having 2-bits resolution are connected to the D7 and D8 data pins. The digital green signal having 3-bits resolution is connected to the D6 and D8 data pins. The other data pins are connected to ground.

Buffer amplifiers are implemented with the well known LM359 buffer amplifier, where the buffer amplifier connections are shown in FIG. 6S. The output of each buffer amplifier excites one of the red, green, or blue inputs to the CRT monitor.

| VIDEO DAC CONNECTION TABLE | | |
|---|---|---|
| 1 | NC | NO CONNECTION |
| 2 | VEE | −5VDC |
| 3 | COMP | 6.8 MICROFARAD CAPACITOR TO −5VDC |
| 4 | REF | −1V |
| 5 | AGND | GROUND |
| 6 | AGND | GROUND |
| 7 | OUT | VIDEO OUTPUT TO BUFFER AMPLIFIER |
| 8 | GND | GROUND |
| 9 | VCC | +5VDC |
| 10 | DGND | GROUND |
| 11 | NDIS | BLANKING SIGNAL |
| 12 | CLK | CLOCK |
| 13 | CLK+ee | |
| 14 | +e,uns NDIS | |
| 15 | D1 | MOST SIGNIFICANT BIT, COMPLEMENT |
| 16 | D1 | MOST SIGNIFICANT BIT, UNCOMPLEMENT |
| 17 | N2C | +5VDC |
| 18 | D2 | DATA BIT 2, COMPLEMENT |
| 19 | D2 | DATA BIT 2, UNCOMPLEMENT |
| 20 | NFH | GROUND |
| 21 | NFL | GROUND |
| 22 | D3 | DATA BIT 3, COMPLEMENT - GROUND |
| 23 | D3 | DATA BIT 3, UNCOMPLEMENT - GROUND |
| 24 | D4 | DATA BIT 4, COMPLEMENT - GROUND |
| 25 | D4 | DATA BIT 4, UNCOMPLEMENT - GROUND |
| 26 | D5 | DATA BIT 5, COMPLEMENT - GROUND |
| 27 | D5 | DATA BIT 5, UNCOMPLEMENT - RED, BLUE GROUND; GREEN SIGNAL |
| 28 | D6 | DATA BIT 6, COMPLEMENT - GROUND |
| 29 | D6 | DATA BIT 6, UNCOMPLEMENT - RED, GREEN, BLUE SIGNAL |
| 30 | D7 | DATA BIT 7, COMPLEMENT - GROUND |
| 31 | D7 | DATA BIT 7, UNCOMPLEMENT - RED, GREEN, BLUE SIGNAL |
| 32 | D8 | DATA BIT 8, COMPLEMENT - GROUND |
| 33 | D8 | DATA BIT 8, UNCOMPLEMENT - GROUND |
| 34 | D9 | DATA BIT 9, COMPLEMENT - GROUND |
| 35 | D9 | DATA BIT 9, UNCOMPLEMENT |

VIDEO DAC CONNECTION TABLE

| | | |
|---|---|---|
| 36 | D10 | LEAST SIGNIFICANT BIT, COMPLEMENT |
| 37 | D10 | LEAST SIGNIFICANT BIT, UNCOMPLEMENT |
| 38 | NC | NO CONNECTION |
| 39 | NC | NO CONNECTION |
| 40 | NC | NO CONNECTION |

CIRCUIT SPECIFICATIONS

The circuits used in the experimental system are generally commercially available circuits that are well known and that are described in widely distributed specification sheets and component catalogs. A list of these specification sheets and catalogs is provided hereinafter and the materials referenced therein are incorporated herein by reference. For example, the 74LS00, 74ALS00, and 74AS00 specifications are set forth in the referenced Texas Instruments and Motorola catalogs and the Intel 8216 bus interface and the Intel 2149 RAM specifications are set forth in the referenced Intel catalogs; which are herein incorporated by reference.

1. Texas Instruments, ALS/AS Logic Circuits Data Book, 1983.
2. Texas Instruments, The TTL Data Book, Volume 3, 1984.
3. Texas Instruments, The TTL Pocket Data Book, 1983.
4. Intel, Component Data Catalog, 1981.
5. Intel, Memory Components Handbook, 1984.
6. Motorola, Schottky TTL Databook, 1981.

Various circuits used in the experimental system are described in the following list of component specifications, which are herein incorporated by reference.

1. TRW, LSI D/A Converters, TDC1016J-8/9/10.
2. TRW, Monolithic Video D/A Converters; TDC1016J-8, TDC0106J-9, TDC1016J-10; 1979.
3. Texas Instruments, TMS-4016, 2048-Word By 8-Bit Static RAM.
4. National Semiconductor, ADC0800 8-Bit A/D Converter.
5. National Semiconductor, MM5321 TV Camera Sync Generator.
6. Signetics, Hex Buffers/Inverters; 8T95, 96, 97, 98.
7. Mitsubishi; M58725P,S;P-15,S-15; 16384-BIT (2048-word by 8-bit static RAM.

COMPUTER PORT TABLE

PORT-A CONTROL PORT

| BIT | NAME | FUNCTION | NOTES |
|---|---|---|---|
| 0 | DOA0 | TEST PULSE-1 | |
| 1 | DOA1 | JOYSTICK SELECT-1 | |
| 2 | DOA2 | JOYSTICK SELECT-0 | |
| 3 | DOA3 | | |
| 4 | DOA4 | UNBLANK | HIGH IS UNBLANKED, LOW IS BLANKED |
| 5 | DOA5 | SEQUENTIAL-LOAD | SEQUENTIAL LOAD OF IMAGE MEMORY |
| 6 | DOA6 | LOAD-BAR/RUN | BRACKETED BY FRAME BLANKING CFS |
| 7 | DOA7 | DATA STROBE | BRACKETED BY PBO AND PCO |
| 0 | DIA0 | FRAME SYNC | VERTICAL FIELD BLANKING PULSE |
| 1 | DIA1 | | |
| 2 | DIA2 | LINE SYNC | HORIZONTAL LINE BLANKING PULSE |
| 3 | DIA3 | | |
| 4 | DIA4 | FRAME-1 | |
| 5 | DIA5 | | |
| 6 | DIA6 | | |
| 7 | DIA7 | | |

SEQUENTIAL CONTROL OF IMAGE LOADING (1) RESET DOA5
(2) LOAD X+Y START ADDRESSES, (PIXEL ADDRESS TIMES 8)
(3) LOAD SLOPES TIMES 256
(4) SET DOA5
(5) GENERATE A SEQUENCE OF STROBED DATA OUTPUTS ALONG LINE
(6) ADDRESS COUNTER WILL AUTOMATICALLY ADVANCE
(7) DOA5 must be set before strobing data into memory independent of whether one or a sequence of strobes is to be generated.

PORT-B ADDRESS/DATA PORT

| BIT | NAME | FUNCTION | NOTES |
|---|---|---|---|
| 0 | DOB0 | LSB | |
| 1 | DOB1 | ! | |
| 2 | DOB2 | ! | |
| 3 | DOB3 | ! | |
| 4 | DOB4 | ! | |
| 5 | DOB5 | ! | |
| 6 | DOB6 | ! | |
| 7 | DOB7 | MSB | |
| 0 | DIB0 | LSB | |
| 1 | DIB1 | ! | |
| 2 | DIB2 | ! | |
| 3 | DIB3 | ! | |
| 4 | DIB4 | ! | |

PORT-B ADDRESS/DATA PORT

| BIT | NAME | FUNCTION | NOTES |
|---|---|---|---|
| 5 | DIB5 | ! | |
| 6 | DIB6 | ! | |
| 7 | DIB7 | MSB | |

PORT-C DESTINATION SELECT PORT

| BIT | NAME | FUNCTION | NOTES |
|---|---|---|---|
| 0 | DOC0 | LSB | |
| 1 | DOC1 | ! | |
| 2 | DOC2 | ! | |
| 3 | DOC3 | ! | |
| 4 | DOC4 | ! | |
| 5 | DOC5 | ! | |
| 6 | DOC6 | ! | |
| 7 | DOC7 | MSB | |
| 0 | DIC0 | LSB | |
| 1 | DIC1 | ! | |
| 2 | DIC2 | ! | |
| 3 | DIC3 | ! | |
| 4 | DIC4 | ! | |
| 5 | DIC5 | ! | |
| 6 | DIC6 | ! | |
| 7 | DIC7 | MSB | |

DESTINATION SELECT ASSIGNMENTS

| P | B7 | B6 | B5 | B4 | B3 | B2 | B1 | B0 | REGISTER | B7 | B6 | B5 | B4 | B3 | B2 | B1 | B0 |
|---|---|---|---|---|---|---|---|---|---|---|---|---|---|---|---|---|---|
| 0 | 0 | 0 | 0 | 0 | 0 | 0 | 0 | 0 | | | | | | | | | |
| 1 | 0 | 0 | 0 | 0 | 0 | 0 | 0 | 1 | | | | | | | | | |
| 2 | 0 | 0 | 0 | 0 | 0 | 0 | 1 | 0 | | | | | | | | | |
| . | | | | | | | | | | | | | | | | | |
| 127 | 0 | 0 | 0 | 0 | 1 | 1 | 1 | 1 | | | | | | | | | |
| 129 | 0 | 0 | 0 | 1 | 0 | 0 | 0 | 1 | | | | | | | | | |
| 130 | 0 | 0 | 0 | 1 | 0 | 0 | 1 | 0 | | | | | | | | | |
| . | | | | | | | | | | | | | | | | | |
| 240 | 1 | 1 | 1 | 1 | 0 | 0 | 0 | 0 | XR-DELTA LSH | 0 | 0 | A5 | A4 | A3. | A2 | A1 | A0 |
| 241 | 1 | 1 | 1 | 1 | 0 | 0 | 0 | 1 | YR-DELTA LSH | 0 | 0 | A5 | A4 | A3. | A2 | A1 | A0 |
| 242 | 1 | 1 | 1 | 1 | 0 | 0 | 1 | 0 | XP-DELTA MSH | 0 | 0 | A4 | A4 | A3. | A2 | A1 | A0 |
| 243 | 1 | 1 | 1 | 1 | 0 | 0 | 1 | 1 | XP-DELTA LSH | 0 | 0 | A4 | A4 | A3. | A2 | A1 | A0 |
| 244 | 1 | 1 | 1 | 1 | 0 | 1 | 0 | 0 | YP-DELTA LSH | 0 | 0 | A4 | A4 | A3. | A2 | A1 | A0 |
| 245 | 1 | 1 | 1 | 1 | 0 | 1 | 0 | 1 | YP-DELTA MSH | 0 | 0 | A4 | A4 | A3. | A2 | A1 | A0 |
| 246 | 1 | 1 | 1 | 1 | 0 | 1 | 1 | 0 | XR-ADDRESS MSH | 0 | 0 | A11 | A10 | A9 | A8 | A7 | A6 |
| 247 | 1 | 1 | 1 | 1 | 0 | 1 | 1 | 1 | XR-ADDRESS LSH | 0 | 0 | A4 | A4 | A3. | A2 | A1 | A0 |
| 248 | 1 | 1 | 1 | 1 | 1 | 0 | 0 | 0 | XR-DELTA MSH | 0 | 0 | A4 | A4 | A3. | A2 | A1 | A0 |
| 249 | 1 | 1 | 1 | 1 | 1 | 0 | 0 | 1 | YR-ADDRESS MSH | 0 | 0 | A11 | A10 | A9 | A8 | A7 | A6 |
| 250 | 1 | 1 | 1 | 1 | 1 | 0 | 1 | 0 | YR-ADDRESS LSH | 0 | 0 | A4 | A4 | A3. | A2 | A1 | A0 |
| 251 | 1 | 1 | 1 | 1 | 1 | 0 | 1 | 1 | YR-DELTA MSH | 0 | 0 | A4 | A4 | A3. | A2 | A1 | A0 |
| 252 | 1 | 1 | 1 | 1 | 1 | 1 | 0 | 0 | DATA | D7 | D6 | D5 | D4 | D3 | D2 | D2 | D0 |
| 253 | 1 | 1 | 1 | 1 | 1 | 1 | 0 | 1 | WEIGHTS, LS BYTE (W2) | W7 | W6 | W5 | W4 | W3 | W2 | W1 | W0 |
| 254 | 1 | 1 | 1 | 1 | 1 | 1 | 1 | 0 | WEIGHTS, MS NIBBLE (W3) | 0 | 0 | 0 | 0 | W11 | W10 | W9 | W8 |
| 255 | 1 | 1 | 1 | 1 | 1 | 1 | 1 | 1 | SPARE | | | | | | | | |

NOTES
1. Frame sync and CP-bar must be synchronized
2. Gated clock.
3. First line sync per frame is under the frame sync envelope. Therefore, U20D-1 generates second line sync as first pulse.
4. First line sync under frame sync envelope loads pixel registers.

| | |
|---|---|
| CXPSM | XP-DELTA MSB CLOCK |
| CXPSL | XP-DELTA LSB CLOCK |
| CYPSM | YP-DELTA MSB CLOCK |
| CYPSL | YP-DELTA LSB CLOCK |
| CXRSM | XR-DELTA MSB CLOCK |
| CXRSL | XR-DELTA LSB CLOCK |
| CYRSM | YR-DELTA MSB CLOCK |
| CYRSL | YR-DELTA LSB CLOCK |
| CD | DATA STROBE |
| CXRM | XR-ADDRESS MSH CLOCK |
| CXRL | XR-ADDRESS LSH CLOCK |
| CXPM | XP-ADDRESS MSH CLOCK |
| CXPL | XP-ADDRESS LSH CLOCK |
| CYRM | YR-ADDRESS MSH CLOCK |
| CYRL | YR-ADDRESS LSH CLOCK |
| CYPM | YP-ADDRESS MSH CLOCK |
| CYPL | YP-ADDRESS LSH CLOCK |

CABLE CONNECTION TABLE
CABLE-I BM1,2/BL1 (C1)

| PIN | SIGNAL | SIGNAL DESCRIPTION | SOURCE | DESTINATION |
|---|---|---|---|---|
| 1 | GROUND | GROUND | | |
| 2 | YA0 | MEMORY ADDRESS, BIT-Y0 | BL1-U9E-10 | BM1,2-U19B-1 |
| 3 | GROUND | GROUND | | |
| 4 | YA1 | MEMORY ADDRESS, BIT-Y1 | BL1-U9E-12 | BM1,2-U19B-2 |
| 5 | GROUND | GROUND | | |
| 6 | YA2 | MEMORY ADDRESS, BIT-Y2 | BL1-U9E-15 | BM1,2-U19B-3 |
| 7 | GROUND | GROUND | | |
| 8 | YA3 | MEMORY ADDRESS, BIT-Y3 | BL1-U8E-2 | BM1,2-U19A-2 |
| 9 | GROUND | GROUND | | |
| 10 | YA4 | MEMORY ADDRESS, BIT-Y4 | BL1-U8E-5 | BM1,2-U19A-4 |
| 11 | GROUND | GROUND | | |
| 12 | YA5 | MEMORY ADDRESS, BIT-Y5 | BL1-U8E-7 | BM1,2-U19A-6 |
| 13 | GROUND | GROUND | | |
| 14 | YA6 | MEMORY ADDRESS, BIT-Y6 | BL1-U8E-10 | BM1,2-U19A-10 |
| 15 | GROUND | GROUND | | |
| 16 | YA7 | MEMORY ADDRESS, BIT-Y7 | BL1-U8E-12 | BM1,2-U19A-12 |
| 17 | GROUND | GROUND | | |
| 18 | YA8 | MEMORY ADDRESS, BIT-Y8 | BL1-U8E-15 | BM1,2-U19A-14 |
| 19 | GROUND | GROUND | | |
| 20 | XA0 | MEMORY ADDRESS, BIT-X0 | BL1-U9D-10 | BM1,2-U19C-1 |
| 21 | GROUND | GROUND | | |
| 22 | XA1 | MEMORY ADDRESS, BIT-X1 | BL1-U9D-12 | BM1,2-U19C-2 |
| 23 | GROUND | GROUND | | |
| 24 | XA2 | MEMORY ADDRESS, BIT-X2 | BL1-U9D-15 | BM1,2-U19C-3 |
| 25 | GROUND | GROUND | | |
| 26 | XA3 | MEMORY ADDRESS, BIT-X3 (BM2) | BL1-U8D-2 | BM1,2-U19B-6 |
| 27 | GROUND | GROUND | | |
| 28 | XA3-BAR | MEMORY ADDRESS, BIT-X3-BAR (BM1) | BL1-U18D-4 | BM1,2-U19B-6 |
| 29 | GROUND | GROUND | | |
| 30 | XA4 | MEMORY ADDRESS, BIT-X4 | BL1-U8D-5 | BM1,2-U19D-4 |
| 31 | GROUND | GROUND | | |
| 32 | XA5 | MEMORY ADDRESS, BIT-X5 | BL1-U8D-7 | BM1,2-U19D-6 |
| 33 | GROUND | GROUND | | |
| 34 | XA6 | MEMORY ADDRESS, BIT-X6 | BL1-U8D-10 | BM1,2-U19D-10 |
| 35 | GROUND | GROUND | | |
| 36 | XA7 | MEMORY ADDRESS, BIT-X7 | BL1-U8D-12 | BM1,2-U19D-12 |
| 37 | GROUND | GROUND | | |
| 38 | XA8 | MEMORY ADDRESS, BIT-X8 | BL1-U8D-15 | BM1,2-U19D-14 |
| 39 | GROUND | GROUND | | |
| 40 | W1-BAR | MEMORY READ/WRITE (LOW => WRITE) | BL1-U22C-11 | BM1,2-U19E-4 |
| 41 | GROUND | GROUND | | |
| 42 | | | | |
| 43 | GROUND | GROUND | | |
| 44 | | | | |
| 45 | GROUND | GROUND | | |
| 46 | | | | |
| 47 | GROUND | GROUND | | |
| 48 | | | | |
| 49 | GROUND | GROUND | | |
| 50 | | | | |

CABLE-II BM1,2/BL1/BB1 (C2)

| PIN | SIGNAL | SIGNAL DESCRIPTION | SOURCE | DESTINATION |
|---|---|---|---|---|
| 1 | GROUND | GROUND | | |
| 2 | MI0 | MEMORY DATA INPUT, BIT-0 (PB0) | BL1-C6-9 | BM1,2-U17A,B,C,D-4 |
| 3 | GROUND | GROUND | | |
| 4 | MI1 | MEMORY DATA INPUT, BIT-1 (PB1) | BL1-C6-22 | BM1,2-U17A,B,C,D-7 |
| 5 | GROUND | GROUND | | |
| 6 | MI2 | MEMORY DATA INPUT, BIT-2 (PB2) | BL1-C6-10 | BM1,2-U17A,B,C,D-9 |
| 7 | GROUND | GROUND | | |
| 8 | MI3 | MEMORY DATA INPUT, BIT-3 (PB3) | BL1-C6-23 | BM1,2-U17A,B,C,D-12 |
| 9 | GROUND | GROUND | | |
| 10 | MI4 | MEMORY DATA INPUT, BIT-4 (PB4) | BL1-C6-11 | BM1,2-U18A,B,C,D-4 |
| 11 | GROUND | GROUND | | |
| 12 | MI5 | MEMORY DATA INPUT, BIT-5 (PB5) | BL1-C6-24 | BM1,2-U18A,B,C,D-7 |
| 13 | GROUND | GROUND | | |
| 14 | MI6 | MEMORY DATA INPUT, BIT-6 (PB6) | BL1-C6-12 | BM1,2-U18A,B,C,D-9 |
| 15 | GROUND | GROUND | | |
| 16 | MI7 | MEMORY DATA INPUT, BIT-7 (PB7) | BL1-C6-25 | BM1,2-U18A,B,C,D-12 |
| 17 | GROUND | GROUND | | |
| 18 | MO0 | MEMORY DATA OUTPUT, BIT-0 (GREEN) | BM1,2-U17A,B,C,D-2 | BB1-U . . . ;C4-22 |
| 19 | GROUND | GROUND | | |
| 20 | MO1 | MEMORY DATA OUTPUT, BIT-1 (GREEN) | BM1,2-U17A,B,C,D-5 | BB1-U . . . ;C4-24 |

CABLE-II BM1,2/BL1/BB1 (C2)

| PIN | SIGNAL | SIGNAL DESCRIPTION | SOURCE | DESTINATION |
|---|---|---|---|---|
| 21 | GROUND | GROUND | | |
| 22 | MO2 | MEMORY DATA OUTPUT, BIT-2 (GREEN) | BM1,2-U17A,B,C,D-11 | BB1-U . . . ;C4-26 |
| 23 | GROUND | GROUND | | |
| 24 | MO3 | MEMORY DATA OUTPUT, BIT-3 (RED) | BM1,2-U17A,B,C,D-14 | BB1-U . . . ;C4-28 |
| 25 | GROUND | GROUND | | |
| 26 | MO4 | MEMORY DATA OUTPUT, BIT-4 (RED) | BM1,2-U18A,B,C,D-2 | BB1 ;C4-30 |
| 27 | GROUND | GROUND | | |
| 28 | MO5 | MEMORY DATA OUTPUT, BIT-5 (BLUE) | BM1,2-U18A,B,C,D-5 | BB1 ;C4-32 |
| 29 | GROUND | GROUND | | |
| 30 | MO6 | MEMORY DATA OUTPUT, BIT-6 (BLUE) | BM1,2-U18A,B,C,D-11 | BB1 ;C4-34 |
| 31 | GROUND | GROUND | | |
| 32 | MO7 | MEMORY DATA OUTPUT, BIT-7 (SPARE) | BM1,2-U18A,B,C,D-14 | BB1 ;C4-36 |
| 33 | GROUND | GROUND | | |
| 34 | DIEN-BAR | MEMORY READ/WRITE | BL1-U21E-6 | BM1,2-U18A,B,C,D-15<br>BM1,2-U17A,B,C,D-15<br>U19C-6<br>BB2-U23C-1,15<br>BB1-U23D-1,15 |
| 35 | GROUND | GROUND | | |
| 36 | | | | |
| 37 | GROUND | GROUND | | |
| 38 | | | | |
| 39 | GROUND | GROUND | | |
| 40 | | | | |
| 41 | GROUND | GROUND | | |
| 42 | | | | |
| 43 | GROUND | GROUND | | |
| 44 | | | | |
| 45 | GROUND | GROUND | | |
| 46 | | | | |
| 47 | GROUND | GROUND | | |
| 48 | | | | |
| 49 | GROUND | GROUND | | |
| 50 | | | | |

CABLE-III BR1/BL1/BB1 (C3)

| PIN | SIGNAL | SIGNAL DESCRIPTION | SOURCE | DESTINATION |
|---|---|---|---|---|
| 1 | GROUND | GROUND | | |
| 2 | YW0 | WEIGHT ADDRESS | | BB1-U22C-10 |
| 3 | GROUND | GROUND | | |
| 4 | YW1 | WEIGHT ADDRESS | | BB1-U22C-13 |
| 5 | GROUND | GROUND | | |
| 6 | YW2 | WEIGHT ADDRESS | | BB1-U22C-6 |
| 7 | GROUND | GROUND | | |
| 8 | XW0 | WEIGHT ADDRESS | | BB1-U22C-3 |
| 9 | GROUND | GROUND | | |
| 10 | XW1 | WEIGHT ADDRESS | | BB1-U22D-3 |
| 11 | GROUND | GROUND | | |
| 12 | XW2 | WEIGHT ADDRESS | | BB1-U22D-6 |
| 13 | GROUND | GROUND | | |
| 14 | YA0 | WEIGHT ADDRESS | | BB1-U22D-13 |
| 15 | GROUND | GROUND | | |
| 16 | YA1 | WEIGHT ADDRESS | | BB1-U22D-10 |
| 17 | GROUND | GROUND | | |
| 18 | DOA6 | | | BB1-U7B-4 |
| 19 | GROUND | GROUND | | |
| 20 | | | | |
| 21 | GROUND | GROUND | | |
| 22 | CPG | GATED CLOCK PULSE | BL1-U21D-8 | BB1-U7A,U6A,U5A-2 |
| 23 | GROUND | GROUND | | |
| 24 | | | | |
| 25 | GROUND | GROUND | | |
| 26 | | | | |
| 27 | GROUND | GROUND | | |
| 28 | | | | |
| 29 | GROUND | GROUND | | |
| 30 | | | | |
| 31 | GROUND | GROUND | | |
| 32 | | | | |
| 33 | GROUND | GROUND | | |
| 34 | | | | |
| 35 | GROUND | GROUND | | |

CABLE-III BR1/BL1/BB1 (C3)

| PIN | SIGNAL | SIGNAL DESCRIPTION | SOURCE | DESTINATION |
|---|---|---|---|---|
| 36 | | | | |
| 37 | GROUND | GROUND | | |
| 38 | | | | |
| 39 | GROUND | GROUND | | |
| 40 | | | | |
| 41 | GROUND | GROUND | | |
| 42 | | | | |
| 43 | GROUND | GROUND | | |
| 44 | | | | |
| 45 | GROUND | GROUND | | |
| 46 | | | | |
| 47 | GROUND | GROUND | | |
| 48 | W2-BAR | WEIGHT RAM READ/WRITE(LOW=>WRITE) | BL1-U22C-6 | BB1-U21E,U22E-10 |
| 49 | GROUND | GROUND | | |
| 50 | W3-BAR | WEIGHT RAM READ/WRITE(LOW=>WRITE) | BL1-U22C-8 | BB1-U23E-10 |

CABLE-IV BR1/BL1/BB1 (C4)

| PIN | SIGNAL | SIGNAL DESCRIPTION | SOURCE | DESTINATION |
|---|---|---|---|---|
| 1 | GROUND | GROUND | | |
| 2 | FRAME | SYNC (CFS) | BR1 | BL1-U22E-11, C5-2 |
| 3 | GROUND | GROUND | | |
| 4 | LINE | SYNC (CLS) | BR1 | BL1-U22E-13, C5-3 |
| 5 | GROUND | GROUND | | |
| 6 | INPUT | PIXEL CLOCK EARLY (CPE-BAR) | BR1 | BL1-U21E-1 |
| 7 | GROUND | GROUND | | |
| 8 | DAC | PIXEL CLOCK (CPD) (CHANGE TO BF1-10MHZ) | BB1-U8B-6 | BR1- |
| 9 | GROUND | GROUND | | |
| 10 | OUTPUT | PIXEL CLOCK (CPO) | BR1 | BB1 |
| 11 | GROUND | GROUND | | |
| 12 | FIELD-1 | (F1) | BR1 | C5-4 |
| 13 | GROUND | GROUND | | |
| 14 | | | BR1 | C5-5 |
| 15 | GROUND | GROUND | | |
| 16 | SEL0 | ADC SELECT LSB DOA2 | C5-10 | BR1-U11,U13 |
| 17 | GROUND | GROUND | | |
| 18 | SEL1 | ADC SELECT MSB DOA1 | C5-22 | BR1-U11,U13 |
| 19 | GROUND | GROUND | | |
| 20 | DJ7 | JOYSTICK COMMAND MSB | BR1-U10-3 | C6-18 |
| 21 | GROUND | GROUND | | |
| 22 | MO0R | BUFFER OUTPUT TO CRT DACS (GREEN) | BB1-U19B-7 | BR-U |
| 23 | GROUND | GROUND | | |
| 24 | M01R | BUFFER OUTPUT TO CRT DACS (GREEN) | BB1-U19B-10 | BR-U |
| 25 | GROUND | GROUND | | |
| 26 | MO2R | BUFFER OUTPUT TO CRT DACS (GREEN) | BB1-U19B-12 | BR-U |
| 27 | GROUND | GROUND | | |
| 28 | MO3R | BUFFER OUTPUT TO CRT DACS (RED) | BB1-U19B-15 | BR-U |
| 29 | GROUND | GROUND | | |
| 30 | MO4R | BUFFER OUTPUT TO CRT DACS (RED) | BB1-U19C-2 | BR-U |
| 31 | GROUND | GROUND | | |
| 32 | MO5R | BUFFER OUTPUT TO CRT DACS (BLUE) | BB1-U19C-5 | BR-U |
| 33 | GROUND | GROUND | | |
| 34 | MO6R | BUFFER OUTPUT TO CRT DACS (BLUE) | BB1-U19C-7 | BR-U |
| 35 | GROUND | GROUND | | |
| 36 | MO7R | BUFFER OUTPUT TO CRT DACS (SPARE) | BB1-U19C-10 | |
| 37 | GROUND | GROUND | | |
| 38 | DJ6 | JOYSTICK COMMAND | BR1-U10-5 | C6-5 |
| 39 | GROUND | GROUND | | |
| 40 | DJ5 | JOYSTICK COMMAND | BR1-U10-7 | C6-17 |
| 41 | GROUND | GROUND | | |
| 42 | DJ4 | JOYSTICK COMMAND | BR1-U10-9 | C6-4 |
| 43 | GROUND | GROUND | | |
| 44 | DJ3 | JOYSTICK COMMAND | BR1-U10-11 | C6-16 |
| 45 | GROUND | GROUND | | |
| 46 | DJ2 | JOYSTICK COMMAND | BR1-U10-13 | C6-3 |
| 47 | GROUND | GROUND | | |
| 48 | DJ1 | JOYSTICK COMMAND | BR1-U13-13 | C6-15 |
| 49 | GROUND | GROUND | | |
| 50 | DJ0 | JOYSTICK COMMAND | BR1-U13-11 | C6-2 |

| CABLE-V BL1/COMPUTER PORT-A CONTROL (C5) | | | | |
|---|---|---|---|---|
| PIN | SIGNAL | SIGNAL DESCRIPTION | SOURCE | DESTINATION |
| 1 | −12V | | | |
| 2 | DIA0 | COMPUTER DATA INPUT, FRAME SYNC | C4-2 | COMPUTER |
| 3 | DIA2 | COMPUTER DATA INPUT, LINE SYNC | C4-4 | COMPUTER |
| 4 | DIA4 | COMPUTER DATA INPUT, FIELD 1-BAR | C4-12 | COMPUTER |
| 5 | DIA6 | COMPUTER DATA INPUT | | COMPUTER |
| 6 | | | | |
| 7 | +5V | | | |
| 8 | | | | |
| 9 | DOA0 | COMPUTER DATA OUTPUT, TEST PULSE-1 | COMPUTER | |
| 10 | DOA2 | COMPUTER DATA OUTPUT, JOYSTICK SEL.-0 | COMPUTER | C4-16 |
| 11 | DOA4 | COMPUTER DATA OUTPUT, TEST PULSE-16 | COMPUTER | |
| 12 | DOA6 | COMPUTER DATA OUTPUT, LOAD-BAR/RUN | COMPUTER | BL1-U1BD-5 |
| 13 | +12V | | | |
| 14 | GROUND | GROUND | | |
| 15 | DIA1 | COMPUTER DATA INPUT | | COMPUTER |
| 16 | DIA3 | COMPUTER DATA INPUT | | COMPUTER |
| 17 | DIA5 | COMPUTER DATA INPUT | | COMPUTER |
| 18 | DIA7 | COMPUTER DATA INPUT | | COMPUTER |
| 19 | GROUND | GROUND | | |
| 20 | GROUND | GROUND | | |
| 21 | | | | |
| 22 | DOA1 | COMPUTER DATA OUTPUT, JOYSTICK SEL.-1 | COMPUTER | C4-18 |
| 23 | DOA3 | COMPUTER DATA OUTPUT, UNBLANK | COMPUTER | C4- |
| 24 | DOA5 | COMMAND SEQ. LOAD OF IMAGE MEMORY | COMPUTER | BL1-U18E-12 |
| 25 | DOA7 | OUTPUT DATA STROBE | COMPUTER | BL1-U22B-2 |
| 26 | | | | |

| CABLE-VI BL1/COMPUTER PORT-B ADDRESS/DATA (C6) | | | | |
|---|---|---|---|---|
| PIN | SIGNAL | SIGNAL DESCRIPTION | SOURCE | DESTINATION |
| 1 | −12V | | | |
| 2 | DIB0 | COMPUTER DATA INPUT, JOYSTICK | C4-50 | COMPUTER |
| 3 | DIB2 | COMPUTER DATA INPUT, JOYSTICK | C4-46 | COMPUTER |
| 4 | DIB4 | COMPUTER DATA INPUT, JOYSTICK | C4-42 | COMPUTER |
| 5 | DIB6 | COMPUTER DATA INPUT, JOYSTICK | C4-38 | COMPUTER |
| 6 | | | | |
| 7 | +5V | | | |
| 8 | | | | |
| 9 | DOB0 | COMPUTER DATA OUTPUT | COMPUTER | C2-2; U17C-3 |
| 10 | DOB2 | COMPUTER DATA OUTPUT | COMPUTER | C2-6; U17C-6 |
| 11 | DOB4 | COMPUTER DATA OUTPUT | COMPUTER | C2-10; U17C-13 |
| 12 | DOB6 | COMPUTER DATA OUTPUT | COMPUTER | C2-14 |
| 13 | +12V | | | |
| 14 | GROUND | GROUND | | |
| 15 | DIB1 | COMPUTER DATA INPUT, JOYSTICK | C4-48 | COMPUTER |
| 16 | DIB3 | COMPUTER DATA INPUT, JOYSTICK | C4-44 | COMPUTER |
| 17 | DIB5 | COMPUTER DATA INPUT, JOYSTICK | C4-40 | COMPUTER |
| 18 | DIB7 | COMPUTER DATA INPUT, JOYSTICK | C4-20 | COMPUTER |
| 19 | GROUND | GROUND | | |
| 20 | GROUND | GROUND | | |
| 21 | | | | |
| 22 | DOB1 | COMPUTER DATA OUTPUT | COMPUTER | C2-4; U17C-4 |
| 23 | DOB3 | COMPUTER DATA OUTPUT | COMPUTER | C2-8; U17C-11 |
| 24 | DOB5 | COMPUTER DATA OUTPUT | COMPUTER | C2-12; U17C-14 |
| 25 | DOB7 | COMPUTER DATA OUTPUT | COMPUTER | C2-16 |
| 26 | | | | |

| CABLE-VII BL1/COMPUTER PORT-C REGISTER SELECT (C7) | | | | |
|---|---|---|---|---|
| PIN | SIGNAL | SIGNAL DESCRIPTION | SOURCE | DESTINATION |
| | −12V | | | |
| 2 | DIC0 | COMPUTER DATA INPUT | | COMPUTER |
| 3 | DIC2 | COMPUTER DATA INPUT | | COMPUTER |
| 4 | DIC4 | COMPUTER DATA INPUT | | COMPUTER |

-continued

| | | CABLE-VII BL1/COMPUTER PORT-C REGISTER SELECT (C7) | | |
|---|---|---|---|---|
| PIN | SIGNAL | SIGNAL DESCRIPTION | SOURCE | DESTINATION |
| 5 | DIC6 | COMPUTER DATA INPUT | | COMPUTER |
| 6 | | | | |
| 7 | +5V | | | |
| 8 | | | | |
| 9 | DOC0 | COMPUTER DATA OUTPUT | COMPUTER | BL1-U19B-1, U20B-1 |
| 10 | DOC2 | COMPUTER DATA OUTPUT | COMPUTER | BL1-U19B-3, U20B-3 |
| 11 | DOC4 | COMPUTER DATA OUTPUT | COMPUTER | BL1-U21D-5 |
| 12 | DOC6 | COMPUTER DATA OUTPUT | COMPUTER | BL1-U21D-2 |
| 13 | +12V | | | |
| 14 | GROUND | GROUND | | |
| 15 | DIC1 | COMPUTER DATA INPUT | | COMPUTER |
| 16 | DIC3 | COMPUTER DATA INPUT | | COMPUTER |
| 17 | DIC5 | COMPUTER DATA INPUT | | COMPUTER |
| 18 | DIC7 | COMPUTER DATA INPUT | | COMPUTER |
| 19 | GROUND | GROUND | | |
| 20 | GROUND | GROUND | | |
| 21 | | | | |
| 22 | DOC1 | COMPUTERDATA OUTPUT | COMPUTER | BL1-U19B-2, U20B-2 |
| 23 | DOC3 | COMPUTER DATA OUTPUT | COMPUTER | BL1-U19B-6, U20B-5 |
| 24 | DOC5 | COMPUTER DATA OUTPUT | COMPUTER | BL1-U21D-4 |
| 25 | DOC7 | COMPUTER DATA OUTPUT | COMPUTER | BL1-U21D-1 |
| 26 | | | | |

TABLE OF DIP LAYOUT ON BOARDS

| POSITION | BOARD-BM1,2 | | | MEMORY BOARD |
|---|---|---|---|---|
| | TYPE | PINS | SPARES | |
| U1A | 58725 | 24 | NONE | |
| U1B | 58725 | 24 | NONE | |
| U1C | 58725 | 24 | NONE | |
| U1D | 58725 | 24 | NONE | |
| U1E | | | | |
| U2A | 58725 | 24 | NONE | |
| U2B | 58725 | 24 | NONE | |
| U2C | 58725 | 24 | NONE | |
| U2D | 58725 | 24 | NONE | |
| U2E | | | | |
| U3A | 58725 | 24 | NONE | |
| U3B | 58725 | 24 | NONE | |
| U3C | 58725 | 24 | NONE | |
| U3D | 58725 | 24 | NONE | |
| U3E | | | | |
| U4A | 58725 | 24 | NONE | |
| U4B | 58725 | 24 | NONE | |
| U4C | 58725 | 24 | NONE | |
| U4D | 58725 | 24 | NONE | |
| U4E | | | | |
| U5A | 58725 | 24 | NONE | |
| U5B | 58725 | 24 | NONE | |
| U5C | 58725 | 24 | NONE | |
| U5D | 58725 | 24 | NONE | |
| U5E | | | | |
| U6A | 58725 | 24 | NONE | |
| U6B | 58725 | 24 | NONE | |
| U6C | 58725 | 24 | NONE | |
| U6D | 58725 | 24 | NONE | |
| U6E | | | | |
| U7A | 58725 | 24 | NONE | |
| U7B | 58725 | 24 | NONE | |
| U7C | 58725 | 24 | NONE | |
| U7D | 58725 | 24 | NONE | |
| U7E | | | | |
| U8A | 58725 | 24 | NONE | |
| U8B | 58725 | 24 | NONE | |
| U8C | 58725 | 24 | NONE | |
| U8D | 58725 | 24 | NONE | |
| U8E | | | | |
| U9A | 58725 | 24 | NONE | |
| U9B | 58725 | 24 | NONE | |
| U9C | 58725 | 24 | NONE | |
| U9D | 58725 | 24 | NONE | |
| U9E | | | | |
| U10A | 58725 | 24 | NONE | |
| U10B | 58725 | 24 | NONE | |
| U10C | 58725 | 24 | NONE | |
| U10D | 58725 | 24 | NONE | |
| U10E | | | | |
| U11A | 58725 | 24 | NONE | |
| U11B | 58725 | 24 | NONE | |
| U11C | 58725 | 24 | NONE | |
| U11D | 58725 | 24 | NONE | |
| U11E | | | | |
| U12A | 58725 | 24 | NONE | |
| U12B | 58725 | 24 | NONE | |
| U12C | 58725 | 24 | NONE | |
| U12D | 58725 | 24 | NONE | |
| U12E | | | | |
| U13A | 58725 | 24 | NONE | |
| U13B | 58725 | 24 | NONE | |
| U13C | 58725 | 24 | NONE | |
| U13D | 58725 | 24 | NONE | |
| U13E | | | | |
| U14A | 58725 | 24 | NONE | |
| U14B | 58725 | 24 | NONE | |
| U14C | 58725 | 24 | NONE | |
| U14D | 58725 | 24 | NONE | |
| U14E | | | | |
| U15A | 58725 | 24 | NONE | |
| U15B | 58725 | 24 | NONE | |
| U15C | 58725 | 24 | NONE | |
| U15D | 58725 | 24 | NONE | |
| U15E | | | | |
| U16A | 58725 | 24 | NONE | |
| U16B | 58725 | 24 | NONE | |
| U16C | 58725 | 24 | NONE | |
| U16D | 58725 | 24 | NONE | |
| U16E | | | | |
| U17A | 8216 | 16 | NONE | |
| U17B | 8216 | 16 | NONE | |
| U17C | 8216 | 16 | NONE | |
| U17D | 8216 | 16 | NONE | |
| U17E | LS00 | 14 | NONE | |
| U18A | 8216 | 16 | NONE | |

-continued

TABLE OF DIP LAYOUT ON BOARDS

BOARD-BM1,2 MEMORY BOARD

| POSITION | TYPE | PINS | SPARES | |
|---|---|---|---|---|
| U18B | 8216 | 16 | NONE | |
| U18C | 8216 | 16 | NONE | |
| U18D | 8216 | 16 | NONE | |
| U18E | LS00 | 14 | NONE | |
| U19A | 8T97 | 16 | NONE | (LS365 EQUIVALENT) |
| U19B | ALS138 | 16 | NONE | |
| U19C | ALS138 | 16 | NONE | |
| U19D | 8T97 | 16 | 2/3 | (LS365 EQUIVALENT) |
| U19E | LS138 | 16 | NONE | |
| U20A | | | | |
| U20B | | | | |
| U20C | | | | |
| U20D | | | | |
| U20E | | | | |

BOARD-BB1 BUFFER BOARD

| POSITION | TYPE | PINS | SPARES |
|---|---|---|---|
| U1A | LS175 | 16 | 12/10,11;13/15,14 |
| U1B | LS02 | 14 | 5,6/4;8,9/10;11,12/13 |
| U1C | | | |
| U1D | | | |
| U1E | | | |
| U1F | | | |
| U2A | ALS163 | 16 | NONE |
| U2B | LS00 | 14 | 9,10/8;12,13/11 |
| U2C | | | |
| U2D | | | |
| U2E | | | |
| U2F | | | |
| U3A | ALS163 | 16 | NONE |
| U3B | | | |
| U3C | LS365 | 16 | NONE |
| U3D | LS367 | 16 | NONE |
| U3E | 2149H | 18 | NONE |
| U3F | | | |
| U4A | ALS163 | 16 | NONE |
| U4B | | | |
| U4C | LS365 | 16 | NONE |
| U4D | LS367 | 16 | NONE |
| U4E | 2149H | 18 | NONE |
| U4F | ALS365 | 16 | NONE |
| U5A | ALS161 | 16 | NONE |
| U5B | | | |
| U5C | LS365 | 16 | NONE |
| U5D | LS367 | 16 | NONE |
| U5E | 2149H | 18 | NONE |
| U5F | ALS365 | 16 | NONE |
| U6A | ALS161 | 16 | NONE |
| U6B | LS365 | 16 | NONE |
| U6C | LS367 | 16 | 12/11;14/13 |
| U6D | LS367 | 16 | NONE |
| U6E | 2149H | 18 | NONE |
| U6F | ALS367 | 16 | 12/11;14/13 |
| U7A | ALS161 | 16 | NONE |
| U7B | LS08 | 14 | 9,10/8;12,13/11 |
| U7C | LS365 | 16 | NONE |
| U7D | LS367 | 16 | NONE |
| U7E | 2149H | 18 | NONE |
| U7F | | | |
| U8A | ALS161 | 16 | NONE |
| U8B | LS04 | 14 | 11/10;13/12 |
| U8C | LS365 | 16 | NONE |
| U8D | LS367 | 16 | NONE |
| U8E | 2149H | 18 | NONE |
| U8F | ALS365 | 16 | NONE |
| U9A | | | |
| U9B | | | |
| U9C | LS365 | 16 | NONE |
| U9D | LS367 | 16 | NONE |

BOARD-BB1 BUFFER BOARD

| POSITION | TYPE | PINS | SPARES |
|---|---|---|---|
| U9E | 2149H | 18 | NONE |
| U9F | ALS365 | 16 | NONE |
| U10A | | | |
| U10B | LS365 | 16 | NONE |
| U10C | LS367 | 16 | 12/11;14/13 |
| U10D | LS367 | 16 | NONE |
| U10E | 2149H | 18 | NONE |
| U10F | ALS367 | 16 | 12/11;14/13 |
| U11A | | | |
| U11B | | | |
| U11C | LS365 | 16 | NONE |
| U11D | LS367 | 16 | NONE |
| U11E | 2149H | 18 | NONE |
| U11F | | | |
| U12A | | | |
| U12B | LS139 | 16 | 13,14,15/9,10,11,12 |
| U12C | LS365 | 16 | NONE |
| U12D | LS367 | 16 | NONE |
| U12E | 2149H | 18 | NONE |
| U12F | ALS365 | 16 | NONE |
| U13A | | | |
| U13B | LS04 | 14 | 13/12 |
| U13C | LS365 | 16 | NONE |
| U13D | LS367 | 16 | NONE |
| U13E | 2149H | 18 | NONE |
| U13F | ALS365 | 16 | NONE |
| U14A | | | |
| U14B | LS365 | 16 | NONE |
| U14C | LS367 | 16 | 12/11;14/13 |
| U14D | LS367 | 16 | NONE |
| U14E | 2149H | 18 | NONE |
| U14F | ALS367 | 16 | 12/11;14/13 |
| U15A | | | |
| U15B | | | |
| U15C | LS365 | 16 | NONE |
| U15D | LS367 | 16 | NONE |
| U15E | 2149H | 18 | NONE |
| U15F | | | |
| U16A | | | |
| U16B | | | |
| U16C | LS365 | 16 | NONE |
| U16D | LS367 | 16 | NONE |
| U16E | 2149H | 18 | NONE |
| U16F | ALS365 | 16 | NONE |
| U17A | | | |
| U17B | | | |
| U17C | LS365 | 16 | NONE |
| U17D | LS367 | 16 | NONE |
| U17E | 2149H | 18 | NONE |
| U17F | ALS365 | 16 | NONE |
| U18A | | | |
| U18B | LS365 | 16 | NONE |
| U18C | LS367 | 16 | 12/11;14/13 |
| U18D | LS367 | 16 | NONE |
| U18E | 2149H | 18 | NONE |
| U18F | ALS367 | 16 | 12/11;14/13 |
| U19A | LS174 | 16 | NONE |
| U19B | LS174 | 16 | NONE |
| U19C | LS174 | 16 | NONE |
| U19D | LS174 | 16 | NONE |
| U19E | | | |
| U19F | | | |
| U20A | LS174 | 16 | NONE |
| U20B | LS174 | 16 | NONE |
| U20C | LS174 | 16 | NONE |
| U20D | LS174 | 16 | NONE |
| U20E | | | |
| U20F | | | |
| U21A | LS174 | 16 | NONE |
| U21B | LS174 | 16 | NONE |
| U21C | LS174 | 16 | NONE |
| U21D | LS174 | 16 | NONE |
| U21E | 2149H | 18 | NONE |
| U21F | | | |
| U22A | LS174 | 16 | NONE |
| U22B | LS174 | 16 | NONE |

BOARD-BB1 BUFFER BOARD

| POSITION | TYPE | PINS | SPARES |
|---|---|---|---|
| U22C | LS257 | 16 | NONE |
| U22D | LS257 | 16 | 14,13/12;11,10/9 |
| U22E | 2149H | 18 | NONE |
| U22F | | | |
| U23A | | | |
| U23B | | | |
| U23C | LS367 | 16 | NONE |
| U23D | LS367 | 16 | NONE |
| U23E | 2149H | 18 | NONE |
| U23F | | | |
| U24A | | | |
| U24B | | | |
| U24C | | | |
| U24D | | | |
| U24E | | | |
| U24F | | | |
| U25A | | | |
| U25B | | | |
| U25C | | | |
| U25D | | | |
| U25E | | | |
| U25F | | | |
| U26A | | | |
| U26B | | | |
| U26C | | | |
| U26D | | | |
| U26E | | | |
| U26F | | | |
| U27A | | | |
| U27B | | | |
| U27C | | | |
| U27D | | | |
| U27E | | | |
| U27F | | | |
| U28A | | | |
| U28B | | | |
| U28C | | | |
| U28D | | | |
| U28E | | | |
| U28F | | | |

LOGIC BOARD

| POSITION | TYPE | PINS | BOARD-BL1 SPARES |
|---|---|---|---|
| U1A | | | |
| U1B | | | |
| U1C | | | |
| U1D | | | |
| U1E | | | |
| U2A | | | |
| U2B | | | |
| U2C | | | |
| U2D | | | |
| U2E | | | |
| U3A | | 14 | |
| U3B | | 14 | |
| U3C | | 14 | |
| U3D | | 14 | |
| U3E | | 14 | |
| U4A | | 14 | |
| U4B | | 14 | |
| U4C | | 14 | |
| U4D | | 14 | |
| U4E | | | |
| U5A | | | |
| U5B | LS174 | 16 | NONE |
| U5C | LS174 | 16 | NONE |
| U5D | LS174 | 16 | NONE |
| U5E | LS174 | 16 | NONE |
| U6A | | | |
| U6B | LS283 | 16 | NONE |
| U6C | LS283 | 16 | NONE |
| U6D | S283 | 16 | NONE |
| U6E | F283 | 16 | NONE |
| U7A | | | |
| U7B | LS174 | 16 | NONE |
| U7C | LS174 | 16 | NONE |
| U7D | LS174 | 16 | NONE |
| U7E | LS174 | 16 | NONE |
| U8A | LS04 | 14 | 11/10;13/12 |
| U8B | LS174 | 16 | NONE |
| U8C | LS174 | 16 | NONE |
| U8D | AS174 | 16 | NONE |
| U8E | AS174 | 16 | NONE |
| U9A | AS21 | 14 | NONE |
| U9B | LS174 | 16 | NONE |
| U9C | LS174 | 16 | NONE |
| U9D | AS174 | 16 | NONE |
| U9E | AS174 | 16 | NONE |
| U10A | AS21 | 14 | NONE |
| U10B | LS257 | 16 | NONE |
| U10C | LS257 | 16 | NONE |

-continued

| POSITION | TYPE | PINS | BOARD-BL1 SPARES | LOGIC BOARD |
|---|---|---|---|---|
| U10D | ALS257 | 16 | NONE | |
| U10E | ALS257 | 16 | NONE | |
| U11A | LS02 | 14 | 2,3/1;5,6/4;8,9/10;11,12/13 | |
| U11B | LS257 | 16 | NONE | |
| U11C | LS257 | 16 | NONE | |
| U11D | ALS257 | 16 | NONE | |
| U11E | ALS257 | 16 | NONE | |
| U12A | AS20 | 14 | NONE | |
| U12B | LS257 | 16 | NONE | |
| U12C | LS257 | 16 | NONE | |
| U12D | ALS257 | 16 | NONE | |
| U12E | ALS257 | 16 | NONE | |
| U13A | AS20 | 14 | NONE | |
| U13B | LS283 | 16 | NONE | |
| U13C | LS283 | 16 | NONE | |
| U13D | S283 | 16 | NONE | |
| U13E | S283 | 16 | NONE | |
| U14A | AS04 | 14 | 9/8;11/10;13/12 | |
| U14B | LS283 | 16 | NONE | |
| U14C | LS283 | 16 | NONE | |
| U14D | S283 | 16 | NONE | |
| U14E | S283 | 16 | NONE | |
| U15A | LS08 | 14 | 9,10/8 | |
| U15B | LS283 | 16 | NONE | |
| U15C | LS283 | 16 | NONE | |
| U15D | F283 | 16 | NONE | |
| U15E | F283 | 16 | NONE | |
| U16A | ALS32 | 14 | 8,9/10;11,12/13 | |
| U16B | | 16 | | |
| U16C | | 16 | | |
| U16D | F283 | 16 | NONE | |
| U16E | F283 | 16 | NONE | |
| U17A | ALS00 | 14 | NONE | |
| U17B | LS174 | 16 | NONE | |
| U17C | LS174 | 16 | NONE | |
| U17D | LS174 | 16 | NONE | |
| U17E | LS174 | 16 | NONE | |
| U18A | | 14 | | |
| U18B | LS04 | 14 | 1/2;3/4;9/8;11/10;13/12;5/6 | |
| U18C | LS32 | 14 | NONE | |
| U18D | LS04 | 14 | 11/10 | |
| U18E | LS00 | 14 | 10/8 | |
| U19A | LS02 | 14 | 5,6/4; 8,9/10; 11,12/13 | |
| U19B | LS138 | 16 | NONE | |
| U19C | LS02 | 14 | NONE | |
| U19D | LS02 | 14 | 8,9/10 | |
| U19E | | 14 | | |
| U20A | | 14 | | |
| U20B | LS138 | 16 | NONE | |
| U20C | LS02 | 14 | NONE | |
| U20D | LS02 | 14 | NONE | |
| U20E | LS08 | 14 | NONE | |
| U21A | | | | |
| U21B | LS174 | 16 | 6/7;11/10;13/12;14/15 | (CPD CLOCK) |
| U21C | LS02 | 14 | NONE | |
| U21D | LS20 | 14 | NONE | |
| U21E | LS04 | 14 | NONE | |
| U22A | LS04 | 14 | 5/6;11/10 | |
| U22B | LS00 | 14 | 4,5/6;9,10/8;12,13/11 | |
| U22C | LS32 | 14 | NONE | |
| U22D | | 14 | | |
| U22E | ALS174 | 16 | 3/2;4/5 | |
| U23A | OSC | — | NONE | |
| U23B | | | | |
| U23C | LS174 | 16 | 6/7;13/12;14/15 | |
| U23D | ALS174 | 16 | NONE | |
| U23E | | | | |
| U24A | OSC | — | NONE | |
| U24B | | | | |
| U24C | | | | |
| U24D | | | | |
| U24E | | | | |

MEMORY TABLE-A TO MEMORY TABLE-D
MEMORY TABLE-A

| RAM | PIN-1 | PIN-2 | PIN-3 | PIN-4 | PIN-5 | PIN-6 |
|---|---|---|---|---|---|---|
| U1A | U19D-7 | U19D-5 | U19A-13 | U19A-11 | U19A-9 | U19A-7 |
| U2A | U19D-7 | U19D-5 | U19A-13 | U19A-11 | U19A-9 | U19A-7 |
| U3A | U19D-7 | U19D-5 | U19A-13 | U19A-11 | U19A-9 | U19A-7 |
| U4A | U19D-7 | U19D-5 | U19A-13 | U19A-11 | U19A-9 | U19A-7 |
| U5A | U19D-7 | U19D-5 | U19A-13 | U19A-11 | U19A-9 | U19A-7 |
| U6A | U19D-7 | U19D-5 | U19A-13 | U19A-11 | U19A-9 | U19A-7 |
| U7A | U19D-7 | U19D-5 | U19A-13 | U19A-11 | U19A-9 | U19A-7 |
| U8A | U19D-7 | U19D-5 | U19A-13 | U19A-11 | U19A-9 | U19A-7 |
| U9A | U19D-7 | U19D-5 | U19A-13 | U19A-11 | U19A-9 | U19A-7 |
| U10A | U19D-7 | U19D-5 | U19A-13 | U19A-11 | U19A-9 | U19A-7 |
| U11A | U19D-7 | U19D-5 | U19A-13 | U19A-11 | U19A-9 | U19A-7 |
| U12A | U19D-7 | U19D-5 | U19A-13 | U19A-11 | U19A-9 | U19A-7 |
| U13A | U19D-7 | U19D-5 | U19A-13 | U19A-11 | U19A-9 | U19A-7 |
| U14A | U19D-7 | U19D-5 | U19A-13 | U19A-11 | U19A-9 | U19A-7 |
| U15A | U19D-7 | U19D-5 | U19A-13 | U19A-11 | U19A-9 | U19A-7 |
| U16A | U19D-7 | U19D-5 | U19A-13 | U19A-11 | U19A-9 | U19A-7 |
| U1B | U19D-7 | U19D-5 | U19A-13 | U19A-11 | U19A-9 | U19A-7 |
| U2B | U19D-7 | U19D-5 | U19A-13 | U19A-11 | U19A-9 | U19A-7 |
| U3B | U19D-7 | U19D-5 | U19A-13 | U19A-11 | U19A-9 | U19A-7 |
| U4B | U19D-7 | U19D-5 | U19A-13 | U19A-11 | U19A-9 | U19A-7 |
| U5B | U19D-7 | U19D-5 | U19A-13 | U19A-11 | U19A-9 | U19A-7 |
| U6B | U19D-7 | U19D-5 | U19A-13 | U19A-11 | U19A-9 | U19A-7 |
| U7B | U19D-7 | U19D-5 | U19A-13 | U19A-11 | U19A-9 | U19A-7 |
| U8B | U19D-7 | U19D-5 | U19A-13 | U19A-11 | U19A-9 | U19A-7 |
| U9B | U19D-7 | U19D-5 | U19A-13 | U19A-11 | U19A-9 | U19A-7 |
| U10B | U19D-7 | U19D-5 | U19A-13 | U19A-11 | U19A-9 | U19A-7 |
| U11B | U19D-7 | U19D-5 | U19A-13 | U19A-11 | U19A-9 | U19A-7 |
| U12B | U19D-7 | U19D-5 | U19A-13 | U19A-11 | U19A-9 | U19A-7 |
| U13B | U19D-7 | U19D-5 | U19A-13 | U19A-11 | U19A-9 | U19A-7 |
| U14B | U19D-7 | U19D-5 | U19A-13 | U19A-11 | U19A-9 | U19A-7 |
| U15B | U19D-7 | U19D-5 | U19A-13 | U19A-11 | U19A-9 | U19A-7 |
| U16B | U19D-7 | U19D-5 | U19A-13 | U19A-11 | U19A-9 | U19A-7 |

| RAM | PIN-7 | PIN-8 | PIN-9 | PIN-10 | PIN-11 | PIN-12 |
|---|---|---|---|---|---|---|
| U1A | U19A-5 | U19A-3 | U17A-3 | U17A-6 | U17A-10 | GROUND |
| U2A | U19A-5 | U19A-3 | U17A-3 | U17A-6 | U17A-10 | GROUND |
| U3A | U19A-5 | U19A-3 | U17A-3 | U17A-6 | U17A-10 | GROUND |
| U4A | U19A-5 | U19A-3 | U17A-3 | U17A-6 | U17A-10 | GROUND |
| U5A | U19A-5 | U19A-3 | U17A-3 | U17A-6 | U17A-10 | GROUND |
| U6A | U19A-5 | U19A-3 | U17A-3 | U17A-6 | U17A-10 | GROUND |
| U7A | U19A-5 | U19A-3 | U17A-3 | U17A-6 | U17A-10 | GROUND |
| U8A | U19A-5 | U19A-3 | U17A-3 | U17A-6 | U17A-10 | GROUND |
| U9A | U19A-5 | U19A-3 | U17A-3 | U17A-6 | U17A-10 | GROUND |
| U10A | U19A-5 | U19A-3 | U17A-3 | U17A-6 | U17A-10 | GROUND |
| U11A | U19A-5 | U19A-3 | U17A-3 | U17A-6 | U17A-10 | GROUND |
| U12A | U19A-5 | U19A-3 | U17A-3 | U17A-6 | U17A-10 | GROUND |
| U13A | U19A-5 | U19A-3 | U17A-3 | U17A-6 | U17A-10 | GROUND |
| U14A | U19A-5 | U19A-3 | U17A-3 | U17A-6 | U17A-10 | GROUND |
| U15A | U19A-5 | U19A-3 | U17A-3 | U17A-6 | U17A-10 | GROUND |
| U16A | U19A-5 | U19A-3 | U17A-3 | U17A-6 | U17A-10 | GROUND |
| U1B | U19A-5 | U19A-3 | U17B-3 | U17B-6 | U17B-10 | GROUND |
| U2B | U19A-5 | U19A-3 | U17B-3 | U17B-6 | U17B-10 | GROUND |
| U3B | U19A-5 | U19A-3 | U17B-3 | U17B-6 | U17B-10 | GROUND |
| U4B | U19A-5 | U19A-3 | U17B-3 | U17B-6 | U17B-10 | GROUND |
| U5B | U19A-5 | U19A-3 | U17B-3 | U17B-6 | U17B-10 | GROUND |
| U6B | U19A-5 | U19A-3 | U17B-3 | U17B-6 | U17B-10 | GROUND |
| U7B | U19A-5 | U19A-3 | U17B-3 | U17B-6 | U17B-10 | GROUND |
| U8B | U19A-5 | U19A-3 | U17B-3 | U17B-6 | U17B-10 | GROUND |
| U9B | U19A-5 | U19A-3 | U17B-3 | U17B-6 | U17B-10 | GROUND |
| U10B | U19A-5 | U19A-3 | U17B-3 | U17B-6 | U17B-10 | GROUND |
| U11B | U19A-5 | U19A-3 | U17B-3 | U17B-6 | U17B-10 | GROUND |
| U12B | U19A-5 | U19A-3 | U17B-3 | U17B-6 | U17B-10 | GROUND |
| U13B | U19A-5 | U19A-3 | U17B-3 | U17B-6 | U17B-10 | GROUND |
| U14B | U19A-5 | U19A-3 | U17B-3 | U17B-6 | U17B-10 | GROUND |
| U15B | U19A-5 | U19A-3 | U17B-3 | U17B-6 | U17B-10 | GROUND |
| U16B | U19A-5 | U19A-3 | U17B-3 | U17B-6 | U17B-10 | GROUND |

MEMORY TABLE-B

| RAM | PIN-1 | PIN-2 | PIN-3 | PIN-4 | PIN-5 | PIN-6 |
|---|---|---|---|---|---|---|
| U1C | U19D-7 | U19D-5 | U19A-13 | U19A-11 | U19A-9 | U19A-7 |

-continued

MEMORY TABLE-B

| | | | | | |
|---|---|---|---|---|---|
| U2C | U19D-7 | U19D-5 | U19A-13 | U19A-11 | U19A-9 | U19A-7 |
| U3C | U19D-7 | U19D-5 | U19A-13 | U19A-11 | U19A-9 | U19A-7 |
| U4C | U19D-7 | U19D-5 | U19A-13 | U19A-11 | U19A-9 | U19A-7 |
| U5C | U19D-7 | U19D-5 | U19A-13 | U19A-11 | U19A-9 | U19A-7 |
| U6C | U19D-7 | U19D-5 | U19A-13 | U19A-11 | U19A-9 | U19A-7 |
| U7C | U19D-7 | U19D-5 | U19A-13 | U19A-11 | U19A-9 | U19A-7 |
| U8C | U19D-7 | U19D-5 | U19A-13 | U19A-11 | U19A-9 | U19A-7 |
| U9C | U19D-7 | U19D-5 | U19A-13 | U19A-11 | U19A-9 | U19A-7 |
| U10C | U19D-7 | U19D-5 | U19A-13 | U19A-11 | U19A-9 | U19A-7 |
| U11C | U19D-7 | U19D-5 | U19A-13 | U19A-11 | U19A-9 | U19A-7 |
| U12C | U19D-7 | U19D-5 | U19A-13 | U19A-11 | U19A-9 | U19A-7 |
| U13C | U19D-7 | U19D-5 | U19A-13 | U19A-11 | U19A-9 | U19A-7 |
| U14C | U19D-7 | U19D-5 | U19A-13 | U19A-11 | U19A-9 | U19A-7 |
| U15C | U19D-7 | U19D-5 | U19A-13 | U19A-11 | U19A-9 | U19A-7 |
| U16C | U19D-7 | U19D-5 | U19A-13 | U19A-11 | U19A-9 | U19A-7 |
| U1D | U19D-7 | U19D-5 | U19A-13 | U19A-11 | U19A-9 | U19A-7 |
| U2D | U19D-7 | U19D-5 | U19A-13 | U19A-11 | U19A-9 | U19A-7 |
| U3D | U19D-7 | U19D-5 | U19A-13 | U19A-11 | U19A-9 | U19A-7 |
| U4D | U19D-7 | U19D-5 | U19A-13 | U19A-11 | U19A-9 | U19A-7 |
| U5D | U19D-7 | U19D-5 | U19A-13 | U19A-11 | U19A-9 | U19A-7 |
| U6D | U19D-7 | U19D-5 | U19A-13 | U19A-11 | U19A-9 | U19A-7 |
| U7D | U19D-7 | U19D-5 | U19A-13 | U19A-11 | U19A-9 | U19A-7 |
| U8D | U19D-7 | U19D-5 | U19A-13 | U19A-11 | U19A-9 | U19A-7 |
| U9D | U19D-7 | U19D-5 | U19A-13 | U19A-11 | U19A-9 | U19A-7 |
| U10D | U19D-7 | U19D-5 | U19A-13 | U19A-11 | U19A-9 | U19A-7 |
| U11D | U19D-7 | U19D-5 | U19A-13 | U19A-11 | U19A-9 | U19A-7 |
| U12D | U19D-7 | U19D-5 | U19A-13 | U19A-11 | U19A-9 | U19A-7 |
| U13D | U19D-7 | U19D-5 | U19A-13 | U19A-11 | U19A-9 | U19A-7 |
| U14D | U19D-7 | U19D-5 | U19A-13 | U19A-11 | U19A-9 | U19A-7 |
| U15D | U19D-7 | U19D-5 | U19A-13 | U19A-11 | U19A-9 | U19A-7 |
| U16D | U19D-7 | U19D-5 | U19A-13 | U19A-11 | U19A-9 | U19A-7 |

| RAM | PIN-7 | PIN-8 | PIN-9 | PIN-10 | PIN-11 | PIN-12 |
|---|---|---|---|---|---|---|
| U1C | U19A-5 | U19A-3 | U17C-3 | U17C-6 | U17C-10 | GROUND |
| U2C | U19A-5 | U19A-3 | U17C-3 | U17C-6 | U17C-10 | GROUND |
| U3C | U19A-5 | U19A-3 | U17C-3 | U17C-6 | U17C-10 | GROUND |
| U4C | U19A-5 | U19A-3 | U17C-3 | U17C-6 | U17C-10 | GROUND |
| U5C | U19A-5 | U19A-3 | U17C-3 | U17C-6 | U17C-10 | GROUND |
| U6C | U19A-5 | U19A-3 | U17C-3 | U17C-6 | U17C-10 | GROUND |
| U7C | U19A-5 | U19A-3 | U17C-3 | U17C-6 | U17C-10 | GROUND |
| U8C | U19A-5 | U19A-3 | U17C-3 | U17C-6 | U17C-10 | GROUND |
| U9C | U19A-5 | U19A-3 | U17C-3 | U17C-6 | U17C-10 | GROUND |
| U10C | U19A-5 | U19A-3 | U17C-3 | U17C-6 | U17C-10 | GROUND |
| U11C | U19A-5 | U19A-3 | U17C-3 | U17C-6 | U17C-10 | GROUND |
| U12C | U19A-5 | U19A-3 | U17C-3 | U17C-6 | U17C-10 | GROUND |
| U13C | U19A-5 | U19A-3 | U17C-3 | U17C-6 | U17C-10 | GROUND |
| U14C | U19A-5 | U19A-3 | U17C-3 | U17C-6 | U17C-10 | GROUND |
| U15C | U19A-5 | U19A-3 | U17C-3 | U17C-6 | U17C-10 | GROUND |
| U16C | U19A-5 | U19A-3 | U17C-3 | U17C-6 | U17C-10 | GROUND |
| U1D | U19A-5 | U19A-3 | U17D-3 | U17D-6 | U17D-10 | GROUND |
| U2D | U19A-5 | U19A-3 | U17D-3 | U17D-6 | U17D-10 | GROUND |
| U3D | U19A-5 | U19A-3 | U17D-3 | U17D-6 | U17D-10 | GROUND |
| U4D | U19A-5 | U19A-3 | U17D-3 | U17D-6 | U17D-10 | GROUND |
| U5D | U19A-5 | U19A-3 | U17D-3 | U17D-6 | U17D-10 | GROUND |
| U6D | U19A-5 | U19A-3 | U17D-3 | U17D-6 | U17D-10 | GROUND |
| U7D | U19A-5 | U19A-3 | U17D-3 | U17D-6 | U17D-10 | GROUND |
| U8D | U19A-5 | U19A-3 | U17D-3 | U17D-6 | U17D-10 | GROUND |
| U9D | U19A-5 | U19A-3 | U17D-3 | U17D-6 | U17D-10 | GROUND |
| U10D | U19A-5 | U19A-3 | U17D-3 | U17D-6 | U17D-10 | GROUND |
| U11D | U19A-5 | U19A-3 | U17D-3 | U17D-6 | U17D-10 | GROUND |
| U12D | U19A-5 | U19A-3 | U17D-3 | U17D-6 | U17D-10 | GROUND |
| U13D | U19A-5 | U19A-3 | U17D-3 | U17D-6 | U17D-10 | GROUND |
| U14D | U19A-5 | U19A-3 | U17D-3 | U17D-6 | U17D-10 | GROUND |
| U15D | U19A-5 | U19A-3 | U17D-3 | U17D-6 | U17D-10 | GROUND |
| U16D | U19A-5 | U19A-3 | U17D-3 | U17D-6 | U17D-10 | GROUND |

MEMORY TABLE-C

| RAM | PIN-13 | PIN-14 | PIN-15 | PIN-16 | PIN-17 | PIN-18 |
|---|---|---|---|---|---|---|
| U1A | U17A-13 | U18A-3 | U18A-6 | U18A-10 | U18A-13 | U19B-15 |
| U2A | U17A-13 | U18A-3 | U18A-6 | U18A-10 | U18A-13 | U19B-15 |
| U3A | U17A-13 | U18A-3 | U18A-6 | U18A-10 | U18A-13 | U19B-15 |
| U4A | U17A-13 | U18A-3 | U18A-6 | U18A-10 | U18A-13 | U19B-15 |
| U5A | U17A-13 | U18A-3 | U18A-6 | U18A-10 | U18A-13 | U19B-15 |

MEMORY TABLE-C

| | | | | | | |
|---|---|---|---|---|---|---|
| U6A | U17A-13 | U18A-3 | U18A-6 | U18A-10 | U18A-13 | U19B-15 |
| U7A | U17A-13 | U18A-3 | U18A-6 | U18A-10 | U18A-13 | U19B-15 |
| U8A | U17A-13 | U18A-3 | U18A-6 | U18A-10 | U18A-13 | U19B-15 |
| U9A | U17A-13 | U18A-3 | U18A-6 | U18A-10 | U18A-13 | U19B-14 |
| U10A | U17A-13 | U18A-3 | U18A-6 | U18A-10 | U18A-13 | U19B-14 |
| U11A | U17A-13 | U18A-3 | U18A-6 | U18A-10 | U18A-13 | U19B-14 |
| U12A | U17A-13 | U1BA-3 | U18A-6 | U18A-10 | U18A-13 | U19B-14 |
| U13A | U17A-13 | U18A-3 | U18A-6 | U18A-10 | U18A-13 | U19B-14 |
| U14A | U17A-13 | U18A-3 | U1BA-6 | U1BA-10 | U18A-13 | U19B-14 |
| U15A | U17A-13 | U18A-3 | U18A-6 | U18A-10 | U18A-13 | U19B-14 |
| U16A | U17A-13 | U18A-3 | U18A-6 | U18A-10 | U18A-13 | U19B-14 |
| U1B | U17B-13 | U18B-3 | U18B-6 | U18B-10 | U18B-13 | U19B-13 |
| U2B | U17B-13 | U18B-3 | U18B-6 | U18B-10 | U18B-13 | U19B-13 |
| U3B | U17B-13 | U18B-3 | U18B-6 | U18B-10 | U18B-13 | U19B-13 |
| U4B | U17B-13 | U18B-3 | U18B-6 | U18B-10 | U18B-13 | U19B-13 |
| U5B | U17B-13 | U18B-3 | U18B-6 | U18B-10 | U18B-13 | U19B-13 |
| U6B | U17B-13 | U18B-3 | U1BB-6 | U1BB-10 | U18B-13 | U19B-13 |
| U7B | U17B-13 | U18B-3 | U18B-6 | U18B-10 | U18B-13 | U19B-13 |
| U8B | U17B-13 | U18B-3 | U18B-6 | U18B-10 | U18B-13 | U19B-13 |
| U9B | U17B-13 | U18B-3 | U18B-6 | U18B-10 | U18B-13 | U19B-12 |
| U10B | U17B-13 | U18B-3 | U18B-6 | U18B-10 | U18B-13 | U19B-12 |
| U11B | U17B-13 | U18B-3 | U18B-6 | U18B-10 | U18B-13 | U19B-12 |
| U12B | U17B-13 | U18B-3 | U18B-6 | U18B-10 | U18B-13 | U19B-12 |
| U13B | U17B-13 | U18B-3 | U18B-6 | U18B-10 | U18B-13 | U19B-12 |
| U14B | U17B-13 | U18B-3 | U18B-6 | U18B-10 | U18B-13 | U19B-12 |
| U15B | U17B-13 | U18B-3 | U18B-6 | U18B-10 | U1SB-13 | U19B-12 |
| U16B | U17B-13 | U18B-3 | U18B-6 | U18B-10 | U18B-13 | U19B-12 |

| RAM | PIN-19 | PIN-20 | PIN-21 | PIN-22 | PIN-23 | PIN-24 |
|---|---|---|---|---|---|---|
| U1A | U19D-13 | U19C-15 | U19E-15 | U19D-11 | U19D-9 | VCC |
| U2A | U19D-13 | U19C-14 | U19E-14 | U19D-11 | U19D-9 | VCC |
| U3A | U19D-13 | U19C-13 | U19E-13 | U19D-11 | U19D-9 | VCC |
| U4A | U19D-13 | U19C-12 | U19E-12 | U19D-11 | U19D-9 | VCC |
| U5A | U19D-13 | U19C-11 | U19E-11 | U19D-11 | U19D-9 | VCC |
| U6A | U19D-13 | U19C-10 | U19E-10 | U19D-11 | U19D-9 | VCC |
| U7A | U19D-13 | U19C-9 | U19E-9 | U19D-11 | U19D-9 | VCC |
| USA | U19D-13 | U19C-7 | U19E-7 | U19D-11 | U19D-9 | VCC |
| U9A | U19D-13 | U19C-15 | U19E-15 | U19D-11 | U19D-9 | VCC |
| U10A | U19D-13 | U19C-14 | U19E-14 | U19D-11 | U19D-9 | VCC |
| U11A | U19D-13 | U19C-13 | U19E-13 | U19D-11 | U19D-9 | VCC |
| U12A | U19D-13 | U19C-12 | U19E-12 | U19D-11 | U19D-9 | VCC |
| U13A | U19D-13 | U19C-11 | U19E-11 | U19D-11 | U19D-9 | VCC |
| U14A | U19D-13 | U19C-10 | U19E-10 | U19D-11 | U19D-9 | VCC |
| U15A | U19D-13 | U19C-9 | U19E-9 | U19D-11 | U19D-9 | VCC |
| U16A | U19D-13 | U19C-7 | U19E-7 | U19D-11 | U19D-9 | VCC |
| U1B | U19D-13 | U19C-15 | U19E-15 | U19D-11 | U19D-9 | VCC |
| U2B | U19D-13 | U19C-14 | U19E-14 | U19D-11 | U19D-9 | VCC |
| U3B | U19D-13 | U19C-13 | U19E-13 | U19D-11 | U19D-9 | VCC |
| U4B | U19D-13 | U19C-12 | U19E-12 | U19D-11 | U19D-9 | VCC |
| U5B | U19D-13 | U19C-11 | U19E-11 | U19D-11 | U19D-9 | VCC |
| U6B | U19D-13 | U19C-10 | U19E-10 | U19D-11 | U19D-9 | VCC |
| U7B | U19D-13 | U19C-9 | U19E-9 | U19D-11 | U19D-9 | VCC |
| U8B | U19D-13 | U19C-7 | U19E-7 | U19D-11 | U19D-9 | VCC |
| U9B | U19D-13 | U19C-15 | U19E-15 | U19D-11 | U19D-9 | VCC |
| U10B | U19D-13 | U19C-14 | U19E-14 | U19D-11 | U19D-9 | VCC |
| U11B | U19D-13 | U19C-13 | U19E-13 | U19D-11 | U19D-9 | VCC |
| U12B | U19D-13 | U19C-12 | U19E-12 | U19D-11 | U19D-9 | VCC |
| U13B | U19D-13 | U19C-11 | U19E-11 | U19D-11 | U19D-9 | VCC |
| U14B | U19D-13 | U19C-10 | U19E-10 | U19D-11 | U19D-9 | VCC |
| U15B | U19D-13 | U19C-9 | U19E-9 | U19D-11 | U19D-9 | VCC |
| U16B | U19D-13 | U19C-7 | U19E-7 | U19D-11 | U19D-9 | VCC |

MEMORY TABLE D

| RAM | PIN-13 | PIN-14 | PIN-15 | PIN-16 | PIN-17 | PIN-18 |
|---|---|---|---|---|---|---|
| U1C | U17C-13 | U18C-3 | U18C-6 | U1BC-10 | U18C-13 | U19B-11 |
| U2C | U17C-13 | U18C-3 | U18C-6 | U18C-10 | U18C-13 | U19B-11 |
| U3C | U17C-13 | U18C-3 | U18C-6 | U18C-10 | U18C-13 | U19B-11 |
| U4C | U17C-13 | U18C-3 | U18C-6 | U18C-10 | U18C-13 | U19B-11 |
| U5C | U17C-13 | U18C-3 | U18C-6 | U18C-10 | U18C-13 | U19B-11 |
| U6C | U17C-13 | U18C-3 | U18C-6 | U18C-10 | U18C-13 | U19B-11 |
| U7C | U17C-13 | U18C-3 | U18C-6 | U1SC-10 | U18C-13 | U19B-11 |
| U8C | U17C-13 | U18C-3 | U18C-6 | U18C-10 | U1BC-13 | U19B-11 |
| U9C | U17C-13 | U18C-3 | U18C-6 | U18C-10 | U18C-13 | U19B-10 |

MEMORY TABLE D -continued

| U10C | U17C-13 | U18C-3 | U18C-6 | U18C-10 | U1BC-13 | U19B-10 |
|------|---------|--------|--------|---------|---------|---------|
| U11C | U17C-13 | U18C-3 | U18C-6 | U18C-10 | U18C-13 | U19B-10 |
| U12C | U17C-13 | U18C-3 | U18C-6 | U18C-10 | U18C-13 | U19B-10 |
| U13C | U17C-13 | U18C-3 | U18C-6 | U1BC-10 | U18C-13 | U19B-10 |
| U14C | U17C-13 | U1BC-3 | U18C-6 | U18C-10 | U18C-13 | U19B-10 |
| U15C | U17C-13 | U18C-3 | U18C-6 | U18C-10 | U18C-13 | U19B-10 |
| U16C | U17C-13 | U18C-3 | U18C-6 | U18C-10 | U18C-13 | U19B-10 |
| U1D  | U17D-13 | U18D-3 | U18D-6 | U18D-10 | U1BD-13 | U19B-9  |
| U2D  | U17D-13 | U18D-3 | U18D-6 | U18D-10 | U18D-13 | U19B-9  |
| U3D  | U17D-13 | U18D-3 | U1BD-6 | U1BD-10 | U18D-13 | U19B-9  |
| U4D  | U17D-13 | U18D-3 | U18D-6 | U18D-10 | U18D-13 | U19B-9  |
| U5D  | U17D-13 | U18D-3 | U18D-6 | U18D-10 | U18D-13 | U19B-9  |
| U6D  | U17D-13 | U18D-3 | U18D-6 | U18D-10 | U18D-13 | U19B-9  |
| U7D  | U17D-13 | U18D-3 | U18D-6 | U18D-10 | U18D-13 | U19B-9  |
| U8D  | U17D-13 | U18D-3 | U18D-6 | U18D-10 | U18D-13 | U19B-9  |
| U9D  | U17D-13 | U18D-3 | U18D-6 | U18D-10 | U18D-13 | U19B-7  |
| U10D | U17D-13 | U18D-3 | U18D-6 | U18D-10 | U18D-13 | U19B-7  |
| U11D | U17D-13 | U18D-3 | U18D-6 | U18D-10 | U18D-13 | U19B-7  |
| U12D | U17D-13 | U18D-3 | U18D-6 | U18D-10 | U18D-13 | U19B-7  |
| U13D | U17D-13 | U18D-3 | U18D-6 | U1BD-10 | U18D-13 | U19B-7  |
| U14D | U17D-13 | U18D-3 | U18D-6 | U18D-10 | U18D-13 | U19B-7  |
| U15D | U17D-13 | U18D-3 | U18D-6 | U18D-10 | U18D-13 | U19B-7  |
| U16D | U17D-13 | U18D-3 | U18D-6 | U18D-10 | U18D-13 | U19B-7  |

| RAM | PIN-19 | PIN-20 | PIN-21 | PIN-22 | PIN-23 | PIN-24 |
|-----|--------|--------|--------|--------|--------|--------|
| U1C  | U19D-13 | U19C-15 | U19E-15 | U19D-11 | U19D-9 | VCC |
| U2C  | U19D-13 | U19C-14 | U19E-14 | U19D-11 | U19D-9 | VCC |
| U3C  | U19D-13 | U19C-13 | U19E-13 | U19D-11 | U19D-9 | VCC |
| U4C  | U19D-13 | U19C-12 | U19E-12 | U19D-11 | U19D-9 | VCC |
| U5C  | U19D-13 | U19C-11 | U19E-11 | U19D-11 | U19D-9 | VCC |
| U6C  | U19D-13 | U19C-10 | U19E-10 | U19D-11 | U19D-9 | VCC |
| U7C  | U19D-13 | U19C-9  | U19E-9  | U19D-11 | U19D-9 | VCC |
| U8C  | U19D-13 | U19C-7  | U19E-7  | U19D-11 | U19D-9 | VCC |
| U9C  | U19D-13 | U19C-15 | U19E-15 | U19D-11 | U19D-9 | VCC |
| U10C | U19D-13 | U19C-14 | U19E-14 | U19D-11 | U19D-9 | VCC |
| U11C | U19D-13 | U19C-13 | U19E-13 | U19D-11 | U19D-9 | VCC |
| U12C | U19D-13 | U19C-12 | U19E-12 | U19D-11 | U19D-9 | VCC |
| U13C | U19D-13 | U19C-11 | U19E-11 | U19D-11 | U19D-9 | VCC |
| U14C | U19D-13 | U19C-10 | U19E-10 | U19D-11 | U19D-9 | VCC |
| U15C | U19D-13 | U19C-9  | U19E-9  | U19D-11 | U19D-9 | VCC |
| U16C | U19D-13 | U19C-7  | U19E-7  | U19D-11 | U19D-9 | VCC |
| U1D  | U19D-13 | U19C-15 | U19E-15 | U19D-11 | U19D-9 | VCC |
| U2D  | U19D-13 | U19C-14 | U19E-14 | U19D-11 | U19D-9 | VCC |
| U3D  | U19D-13 | U19C-13 | U19E-13 | U19D-11 | U19D-9 | VCC |
| U4D  | U19D-13 | U19C-12 | U19E-12 | U19D-11 | U19D-9 | VCC |
| U5D  | U19D-13 | U19C-11 | U19E-11 | U19D-11 | U19D-9 | VCC |
| U6D  | U19D-13 | U19C-10 | U19E-10 | U19D-11 | U19D-9 | VCC |
| U7D  | U19D-13 | U19C-9  | U19E-9  | U19D-11 | U19D-9 | VCC |
| U8D  | U19D-13 | U19C-7  | U19E-7  | U19D-11 | U19D-9 | VCC |
| U9D  | U19D-13 | U19C-15 | U19E-15 | U19D-11 | U19D-9 | VCC |
| U10D | U19D-13 | U19C-14 | U19E-14 | U19D-11 | U19D-9 | VCC |
| U11D | U19D-13 | U19C-13 | U19E-13 | U19D-11 | U19D-9 | VCC |
| U12D | U19D-13 | U19C-12 | U19E-12 | U19D-11 | U19D-9 | VCC |
| U13D | U19D-13 | U19C-11 | U19E-11 | U19D-11 | U19D-9 | VCC |
| U14D | U19D-13 | U19C-10 | U19E-10 | U19D-11 | U19D-9 | VCC |
| U15D | U19D-13 | U19C-9  | U19E-9  | U19D-11 | U19D-9 | VCC |
| U16D | U19D-13 | U19C-7  | U19E-7  | U19D-11 | U19D-9 | VCC |

BASIC PROGRAM LISTING
GRAPH.ASC

```
100 PRINT: PRINT: PRINT "FILE: GRAPH.ASC"
110 CLEAR
1940 R%=INP (236): S%=R% AND 1: IF S%=1 THEN 1940    'LOCKUP
ON VERT.SYNC=1
1980 R%=INP (236): S%=R% AND 16: IF S%=0 THEN 1940    'CHECK FIELD
1990 OUT 236,64     'INITIALIZE GRAPHICS GENERATOR
1992 R%=INP (236): S%=R% AND 1
1993 IF S%=0 THEN 1992     'LOCKUP ON VERT.SYNC=0
1994 OUT 236,0     'COMMAND LOAD, RUN-BAR
1995    OUT 238, 246: OUT 237, 0: OUT 236,128: OUT 236,0
'X-ROW MSH
1996    OUT 238, 247: OUT 237, 0: OUT 236,128: OUT 236,0
'X-ROW LSH
1997    OUT 238,242: OUT 237, 0: OUT 236,128: OUT 236,0
```

BASIC PROGRAM LISTING
GRAPH.ASC

```
'X-PIXEL SLOPE MSH
1998   OUT 238,245: OUT 237, 0: OUT 236,128: OUT 236,0
'Y-PIXEL SLOPE MSH
1999   OUT 238,248: OUT 237, 0: OUT 236,128: OUT 236,0
'X-ROW SLOPE MSH
2000   OUT 238,251: OUT 237, 0: OUT 236,128: OUT 236,0
'Y-ROW SLOPE MSH
2001   OUT 238,244: OUT 237, 0: OUT 236,128: OUT 236,0
'Y-PIXEL SLOPE LSH
2002   OUT 238,240: OUT 237, 0: OUT 236,128: OUT 236,0
'X-ROW SLOPE LSH
2003   OUT 238,243: OUT 237, 255: OUT 236,128: OUT 236,0
'X-PIXEL SLOPE LSH
2004   OUT 238,241: OUT 237, 255: OUT 236,128: OUT 236,0
'Y-ROW SLOPE LSH
2005 OUT 236,80 'COMMAND RUN, LOAD-BAR ;PULSE-1 BRACKETING
COMPUTATION PERIOD
2006 R%=INP (236): S%=R% AND 1: IF S%=1 THEN 2006    'LOCKUP
ON VERT.SYNC=1
2007 R%=INP (236): S%=R% AND 16: IF S%=0 THEN 2006   'CHECK FIELD
2060 'ITERATIVE PROCESSING
2100 OUT 236,64
2140 'RESYNCHRONIZATION AND FIELD CONTROL PROCESSOR
2220 R%=INP (236): S%=R% AND 1
2300 IF S%=0 THEN 2220       'LOCKUP ON VERT.SYNC=0
3060       'INTERLACED SCAN CALCULATIONS
3100       'INPUT BYTE    128 064 032 016 008 004 002 001
3140       '       F2      F1     LS     FS
3180 OUT 236,0    'COMMAND LOAD, RUN-BAR
3220 R%=INP (236): S%=R% AND 16: IF S%=0 THEN 3540 ELSE 3260
'CHECK FIELD
3260       'FIELD-2
3300       'OUTPUT POSITION PARAMETERS
3340    OUT 238, 249: OUT 237, 0: OUT 236,128: OUT 236,0
'Y-ROW MSH
3380    OUT 238, 250: OUT 237, 4: OUT 236,128: OUT 236,0
'Y-ROW LSH
3500 GOTO 4140
3540       'FIELD-1
3580       'OUTPUT POSITION PARAMETERS
3620    OUT 238, 249: OUT 237, 0: OUT 236,128: OUT 236,0
'Y-ROW MSH
3660    OUT 238, 250: OUT 237, 0: OUT 236,128: OUT 236,0
'Y-ROW LSH
4140 OUT 236,80 'COMMAND RUN, LOAD-BAR ;PULSE-1 BRACKETING
COMPUTATION PERIOD
4220 GOTO 2060         'LOOP BACK FOR NEXT FIELD
20000 END
```

BASIC PROGRAM LISTING
LD.ASC

```
50   PRINT "ACCESSED "LD" FILE TO LOAD IMAGE MEMORY:
REV.5/15/84 09:0011
55   INPUT "MURPHY (M) OR CAMILLE (C)";K200S
100    INT1%=0: D%=0: K8%=1: K9%=1
112    PRINT: PRINT "*****************************************"
114    PRINT "   SELECT OPERATION"
116    PRINT "*****************************************": PRINT
118    PRINT "RETURN TO OPERATING SYSTEM ................ 0"
120    PRINT "SELECT OVERLAY FOR LOADING INTO IMAGE MEMORY ... 1"
122    PRINT "SELECT IMAGE TO BE LOADED INTO IMAGE MEMORY"
124    PRINT "CONCENTRIC SQUARE FRAMES ................ 2"
126    PRINT "RECTANGLES AND LINES ................ 3"
128    PRINT "SPIRALS ................ 4"
130    PRINT "VIEWPORT COORDINATE SYMBOLS ............. 5"
132    PRINT "PATTERN #6 ................ 6"
134    PRINT "PATTERN #7 ................ 7"
136    PRINT "SQUARE PATTERN ................ 8"
138    PRINT "SQUARE FRAMES ................ 9"
140    PRINT "PERIPHERAL SQUARES ................ 10"
141    PRINT "PERIPHERAL TRIANGLES ................ 11"
142    PRINT "HOUSE ................ 12"
151    INPUT "           SELECT OPERATION
NUMBER";A20%
```

BASIC PROGRAM LISTING
LD.ASC

```
152    IF A20%<13 THEN 155
153    PRINT "***************": PRINT "IMPROPER SELECTION":
PRINT "***************"
154    GOTO 112
155    IF A20%>0 THEN 158
156       SYSTEM
158    ON A20% GOSUB 170, 4400, 4530, 5500, 4500, 7500, 8500,
9000, 9040, 9180, 9280, 11070
159    GOTO 112
170    PRINT: PRINT "*******************************************"
171    PRINT "SELECT OVERLAY FOR LOADING INTO IMAGE MEMORY"
172    PRINT "*******************************************": PRINT
173    PRINT "RETURN TO MAIN MENU ......................... 0"
174    PRINT "SELECT RECTANGULAR IMAGE MEMORY PATTERN"
180    PRINT "   HORIZONTAL BARS"
200    PRINT "       3-2-2 WIDTH BARS, INTENSITY VARATIONS . 1"
220    PRINT "       1-1-1 WIDTH BARS, MAXIMUM INTENSITY ... 2"
240    PRINT "       LINEAR COUNT, ALL COLOR COMBINATIONS .. 8"
260    PRINT "   SOLID SINGLE COLORED IMAGES"
265    PRINT "          RECTANGLE ............................ 3"
270    PRINT "          BACKGROUND ........................... 4"
400    PRINT "   CHECKERBOARD"
420    PRINT "       4-COLORS ............................. 6"
440    PRINT "       2-COLORS ............................. 7"
442    PRINT "   VARIABLE SINGLE COLORS"
443    PRINT "          GREEN SAWTOOTH ....................... 10"
460    PRINT "   CENTER ELEMENT"
480    PRINT "       9-PIXEL SQUARE ....................... 11"
482    PRINT "SELECT SLOPING LINE ........................... 12"
484    INPUT "             SELECT PATTERN
NUMBER";A5%
486    IF A5%>0 THEN 502
500       RETURN
502 IF A5%<13 THEN 520
503 PRINT "***************": PRINT "IMPROPER SELECTION":
PRINT "***************"
504 GOTO 170
520 IF A5%=3 OR A5%=4 OR A5%=12 THEN 523 ELSE 535
523 PRINT "COLOR CODE"
524 PRINT "   BLACK ........ 0"
526 PRINT "   GREEN ........ 1 TO 7"
527 PRINT "   RED .......... 8, 16, 24"
528 PRINT "   BLUE ......... 32, 64, 96"
529 INPUT "             SELECT COLOR
CODE SUM";INT1%
530 IF INT1%<128 THEN 535
531 PRINT:PRINT "***************************************"
532 PRINT "IMPROPER COLOR CODE; ENTER COLOR CODE AGAIN"
533 PRINT "***************************************":PRINT
534 GOTO 523
535 IF A5%=11 THEN 2040
540 IF A5%=6 OR A5%=7 GOTO 560 ELSE 570
560       INPUT "CHECKERBOARD RESOLUTION, PIXELS PER
SIDE";A6%
570 IF A5%=4 THEN 575 ELSE 580
575       A5%=3: XB%=0: YB%=0: XE%=511: YE%=511: GOTO 623
580 INPUT "   START PIXEL COORDINATE";XB%,YB%
620 INPUT "   STOP PIXEL COORDINATE";XE%,YE%
623 GOSUB 630
624 GOTO 170
630 '*********************************************
632 'SUBROUTINE TO OVERLAY A RECTANGLE
635     XB%=(XB%+1)*8: YB%=(YB%+1)*8
640     XE%=(XE%+1)*8: YE%=(YE%+1)*8
642' IF XB%=>8 AND XB%<XE% AND XE%=>8 AND XB%=<512*8 AND
XE%=<512*8 THEN 643 ELSE 656
643' IF YB%=>8 AND YB%<YE% AND YE%=>8 AND YB%=<512*8 AND
YE%=<512*8 THEN 660 ELSE 656
656' PRINT:PRINT "***************************************"
657' PRINT "IMPROPER PIXEL COORDINATES, ENTER PIXEL
COORDINATES AGAIN"
658' PRINT "***************************************":PRINT
659' GOTO 580
660' PRINT: PRINT "***************************************": PRINT
665' PRINT "    IMAGE MEMORY IS BEING LOADED"  'PRINT
"ROW","COLOR INTENSITY"
666' PRINT "***************************************": PRINT
```

BASIC PROGRAM LISTING
LD.ASC

```
667 IF A5%=12 THEN 4200
690 XPS%=256: YPS%=0: XRP%=XB%-8
695 GOSUB 3000
700 FOR OUTLP1%=YB% TO YE% STEP 8      'ROW LOOP
710 YRP%=0UTLP1%-8      'UPDATE TO NEXT ROW
711 XRP%=XB%-8
712 GOSUB 3000          'LOAD IMP REGISTERS
948 OUT 236,32          'SET SEQUENTIAL LOAD COMMAND
1230 'DETERMINE INTENSITY (INT1%)
1240 ON A5% GOTO
1260,1460,1720,1250,1250,1920,1980,1800,1250,1820
1250 PRINT "*************": PRINT "SELECT A DIFFERENT IMAGE":
PRINT "************"
1260 IF D%<8 THEN 1340        'IMAGE PATTERN 1
1280 IF D%<32 THEN 1380       '!-64-32-!-16-08-!-04-02-01-
1300 IF D%<128 THEN 1420      '! BLUE ! RED ! GREEN !
1320 INT1%=0: D%=0: GOTO 1980
1340 INT1%=D% AND 7
1360    D%=D%+1: GOTO 1980
1380 INT1%=D% AND 24
1400    D%=D%+8: GOTO 1980
1420 INT1%=D% AND 96
1440    D%=D%+32: GOTO 1980
1460 A3%=FIX ((OUTLP1%-8)/8)       'IMAGE PATTERN 2
1480 GOSUB 1520
1500 GOTO 1980
1520 "***** SUBROUTINE, MAXIMUM COLOR ******************
1540    A4%=A3% AND 3
1560    A7%=A4%+1
1580    ON A7% GOTO 1600,1620,1640,1660
1600    INT1%=0: GOTO 1680
1620    INT1%=7: GOTO 1680
1640    INT1%=24: GOTO 1680
1660    INT1%=96
1680 RETURN
1700 "*********************************************************
1720    INT1%=INT1%: GOTO 1980     'PATTERN-3, SOLID
COLOR
1800    K2%=(OUTLP1%-8)/8: INT1%=K2% AND 127: GOTO 1980
'PATTERN 8, LINEAR COUNT
1820 INT1%=K8%: K10%=K9% AND 1
1840 IF K10%=0 THEN 1920
1860    K8%=K8%+1         'UPCOUNT, ADD
1880    IF K8%<8 THEN 1980
1900    K9%=K9%+1: K8%=6: GOTO 1980     'CHANGE
COUNT DIRECTION
1920    K8%=K8%-1         'DOWNCOUNT, SUBT
1940    IF K8%>0 THEN 1980
1960    K9%=K9%+1: K8%=2: GOTO 1980
'CHANGE COUNT DIRECTION
1980 SP1%=INIT1% AND 1: SP2%=INIT1% AND 3: SP3%=INT1% AND 7:
SP4%=INT1% AND 15: SP5%=INT1% AND 31: SP6%=INT1% AND 63:
SP7%=INT1% AND 127
1985 OUT 238, 252: OUT 237, SP1%: OUT 237, SP2%: OUT 237,
SP3%: OUT 237, SP4%: OUT 237,SP5%: OUT 237,SP6%: OUT 237, SP7%:
OUT 237, INT1% 'DATA TO LOAD IN IMAGE MEMORY
1991 ON A5% GOTO
1994,1994,1994,1994,1994,1992,1993,1994,1994,1994
1992 A3%=FIX((2*OUTLP1%+INLP1%)/A6%): GOSUB 1520: GOTO 1994
1993 A3%=FIX((2*OUTLP1%+2*INLP1%)/A6%): GOSUB 1520: GOTO 1994
1994 FOR INLP1%=XB% TO XE% STEP 8      'PIXEL LOOP
1995 OUT 236,160: OUT 236,32
1996 NEXT INLP1%
1996 OUT 237, SP7%: OUT 237, SP6%: OUT 237, SP5%: OUT 237,
SP4%: OUT 237,SP3%: OUT 237,SP2%: OUT 237, SP1%: OUT 237,0
'DATA TO LOAD IN IMAGE MEMORY
1900 IF K200$="M" THEN
2000 A8%=INP (93): A8%=A8% AND 2: IF A8%=0 THEN 2009
'OPERATOR RESET
2001 A8%=INP (92): GOTO 2006
2002 A8%=INP (1): A8%=A8% AND 2: IF A8%=0 THEN 2009
'OPERATOR RESET
2003 A8%=INP (0)
2006    A9%=A8% XOR 155: IF A9%=0 THEN 100 'ESCAPE TO MENU
2007    A9%=A8% XOR 127: IF A9%=0 THEN 2008 ELSE 2009
'DELETE TO SYSTEM
2008    SYSTEM
```

BASIC PROGRAM LISTING
LD.ASC

```
2009 NEXT OUTLP1%
2010' PRINT CHR$(7); :PRINT "MEMORY LOAD COMPLETE"
2020 RETURN         'RETURN TO OVERLAY MENU
2040 'PATTERN 11
2060 INT1%=7: K17%=(256-3)*8: K18%=(256+3)*8
2080 FOR OUTLP1%=K17% TO K18% STEP 8
2100    OUT 238, 249       'Y-ROW MSH
2120      C%=FIX(OUTLP1%/64): OUT 237, C%: OUT 236,129: OUT 236,1
2140    OUT 238, 250       'Y-ROW LSH
2160      C%=OUTLP1% AND 63: OUT 237, C%: OUT 236,129: OUT 236,1
2180 FOR INLP1%=K17% TO K18% STEP 8       'PIXEL LOOP
2200    OUT 238, 246       'X-ROW MSH
2220      C%=FIX(INLP1%/64): OUT 237, C%: OUT 236,129: OUT 236,1
2240    OUT 238, 247       'X-ROW LSH
2260        C%=INLP1% AND 63: OUT 237, C%: OUT 236,129: OUT 236,1
2280    OUT 238, 252       'DATA TO LOAD IN IMAGE MEMORY
2300 OUT 237, INT1%: OUT 236,129: OUT 236,1
2320 NEXT INLP1%
2340 NEXT OUTLP1%
2360    OUTLP1%=(256-5)*8
2380    OUT 238, 249       'Y-ROW MSH
2400      C%=FIX(OUTLP1%/64): OUT 237, C%: OUT 236,129: OUT 236,1
2420    OUT 238, 250       'Y-ROW LSH
2440      C%=OUTLP1% AND 63: OUT 237, C%: OUT 236,129: OUT 236,1
2460 K17%=(256-6)*8: K18%=(256)*8
2480 FOR INLP1%=K17% TO K18% STEP 8       'PIXEL LOOP
2500    OUT 238, 246       'X-ROW MSH
2520      C%=FIX(INLP1%/64): OUT 237, C%: OUT 236,129: OUT 236,1
2540    OUT 238, 247       'X-ROW LSH
2560      C%=INLP1% AND 63: OUT 237, C%: OUT 236,129: OUT 236,1
2580    OUT 238, 252       'DATA TO LOAD IN IMAGE MEMORY
2600 OUT 237, INT1%: OUT 236,129: OUT 236,1
2620 NEXT INLP1%
2640 GOTO 2000
3000 '************** SUBROUTINE TO OUTPUT POSITION AND SLOPE PARAMET
3001 OUT 236,0     'DOA5 TURNED OFF TO DISABLE SEQUENCING
DURING LOADING OF REGISTERS
3002 'SLOPE SCALE FACTOR=256*PIXELS/STEP
3003 'POSITION SCALE FACTOR =8*PIXELS
3004 XPSM%=FIX(XPS%/64):    XPSL%=XPS% AND 63
3005      OUT 238,242: OUT 237,XPSM%: OUT 236,128: OUT 236,0
'X-PIXEL SLOPE MSH
3006      OUT 238,243: OUT 237,XPSL%: OUT 236,128: OUT 236,0
'X-PIXEL SLOPE LSH
3007 YPSM%=FIX(YPS%/64): YPSL%=YPS% AND 63
3008      OUT 238,245: OUT 237,YPSM%: OUT 236,128: OUT 236,0
'Y-PIXEL SLOPE MSH
3009      OUT 238,244: OUT 237,YPSL%: OUT 236,128: OUT 236,0
'Y-PIXEL SLOPE LSH
3010' OUT 236, 0          'SUBROUTINE ENTRY POINT
3020 XRPM%=FIX(XRP%/64):      XRPL%=XRP% AND 63
3091 YRPM%=FIX(YRP%/64):      YRPL%=YRP% AND 63
'FORMAT POSITION OUTPUTS
3095      OUT 238,249: OUT 237,YRPM%: OUT 236,128: OUT 236,0
'Y-ROW MSH (Y-PIXEL MSH)
3096      OUT 238,250: OUT 237,YRPL%: OUT 236,128: OUT 236,0
'Y-ROW LSH (Y-PIXEL LSH)
3097      OUT 238,246: OUT 237,XRPM%: OUT 236,128: OUT 236,0
'X-ROW MSH (X-PIXEL MSH)
3098      OUT 238,247: OUT 237,XRPL%: OUT 236,128: OUT 236,0
'X-ROW LSH (X-PIXEL LSH)
3690 RETURN
4200 '*******************************************************
4210 'DRAW A LINE
4220 DX=XE%-XB%: DY=YE%-YB%
4221 DTG=0
4222 IF DX=0 AND DY=0 THEN 4228
4224 IF ABS(DX)>ABS(DY) THEN 4227
4226 YPS%=(DY*256)/ABS(DY): XPS%=(DX*256)/ABS(DY):
DTG=ABS(DY): GOTO 4228
4227 YPS%=(DY*256)/ABS(DX): XPS%=(DX*256)/ABS(DX):
DTG=ABS(DX)
4228 XRP%=XB%-8: YRP%=YB%-8
4255 GOSUB 3000
4270 OUT 238, 252: OUT 237, INT1%       'DATA TO LOAD IN
IMAGE MEMORY
4273 OUT 236,32       'SET SEQUENTIAL LOAD COMMAND
```

BASIC PROGRAM LISTING
LD.ASC

```
4274 DTG=DTG+8
4276 IF DTG>8 THEN 4288
4287 OUT 236,160: OUT 236,32: GOTO 4305
4288 FOR INLP1=8 TO DTG STEP 8        'PIXEL LOOP
4290 OUT 236,160: OUT 236,32
4300 NEXT INLP1
4305 OUT 236,0        'RESET SEQUENTIAL LOAD COMMAND
4350 RETURN
4400 '***************************************************
4410 INIT1%=7: XB%=225: YB%=255: YPS%=0: XPS%=256
4420 FOR OUTLP1%=1 TO 10
4435 XRP%=XB%: YRP%=YB%
4437 XB%=XB%-1: YB%=YB%+1
4440 DX=2*OUTLP1%+1
4470 GOSUB 3000
4480 OUT 238, 252: OUT 237, INT1%        'DATA TO LOAD IN
IMAGE MEMORY
4484 OUT 236,32        'SET SEQUENTIAL LOAD COMMAND
4488 FOR INLP1=8 TO DX STEP 8        'PIXEL LOOP
4492 OUT 236,160: OUT 236,32
4493 NEXT INLP1
4495 OUT 236,0        'RESET SEQUENTIAL LOAD COMMAND
4496 NEXT OUTLP1%
4497 RETURN
4500 '***************************************************
4510 'BLACK BACKGROUND WITH COORDINATE SYMBOLS
4520' A5%=3: INT1%=0: XB%=0: YB%=0: XE%=511: YE%=511:
GOSUB 630
4522 A5%=12: INT1%=3: XB%=0: YB%=0: XE%=0: YE%=511:
GOSUB 630
4523 A5%=12: INT1%=3: XB%=0: YB%=0: XE%=511: YE%=0:
GOSUB 630
4524 A5%=3: INT1%=3: XB%=252: YB%=252: XE%=258: YE%=258:
GOSUB 630
4525 A5%=3: INT1%=3: XB%=250: YB%=250: XE%=260: YE%=260:
GOSUB 630
4526 A5%=3: INT1%=3: XB%=0: YB%=0: XE%=10: YE%=10:
GOSUB 630
4527 RETURN
4530 '***************************************************
4531 'RECTANGLE AND LINE PATTERN
4540 A5%=3: INT1%=24: XB%=100: YB%=400: XE%=200: YE%=500:
GOSUB 630
4550 A5%=1: XB%=400: YB%=100: XE%=500: YE%=200:
GOSUB 630
4555 A5%=10: XB%=100: YB%=100: XE%=200: YE%=200:
GOSUB 630
4556 A5%=12: INT1%=24: XB%=0: YB%=0: XE%=511: YE%=511:
GOSUB 630
4557 A5%=12: INT1%=24: XB%=0: YB%=511: XE%=511: YE%=0:
GOSUB 630
4561 RETURN
5500 '***************************************************
5510 'SPIRAL LINES
5535 A5%=12: INT1%=24: XB%=0: YB%=0: XE%=10000:
YE%=200: GOSUB 630
5540 A5%=12: INT1%=96: XB%=0: YB%=511: XE%=30000:
YE%=200: GOSUB 630
5561 RETURN
6500 '***************************************************
6520 A5%=3: INT1%=96: XB%=0: YB%=0: XE%=511: YE%=511:
GOSUB 630
6530 A5%=3: INT1%=24: XB%=100: YB%=500: XE%=200: YE%=400:
GOSUB 630
6550 A5%=1: XB%=500: YB%=100: XE%=400: YE%=200:
GOSUB 630
6560 A5%=10: XB%=100: YB%=100: XE%=200: YE%=200:
GOSUB 630
6561 RETURN
7500 '***************************************************
7520 A5%=3: INT1%=96: XB%=0: YB%=0: XE%=511: YE%=511:
GOSUB 630
7530 A5%=3: INT1%=24: XB%=100: YB%=500: XE%=200: YE%=400:
GOSUB 630
7535 A5%=12: INT1%=24: XB%=0: YB%=0: XE%=511: YE%=511:
GOSUB 630
7540 A5%=12: INT1%=24: XB%=0: YB%=511: XE%=511: YE%=0:
```

BASIC PROGRAM LISTING
LD.ASC

```
GOSUB 630
7550 A5%=1: XB%=500: YB%=100: XE%=400: YE%=200:
GOSUB 630
7560 A5%=10: XB%=100: YB%=100: XE%=200: YE%=200:
GOSUB 630
7561 RETURN
8500 '****************************************************
8520 A5%=3: INT1%=96: XB%=0: YB%=0: XE%=511: YE%=511:
GOSUB 630
8530 A5%=3: INT1%=24: XB%=100: YB%=500: XE%=200: YE%=400:
GOSUB 630
8535 A5%=12: INT1%=24: XB%=0: YB%=0: XE%=511: YE%=511:
GOSUB 630
8540 A5%=12: INT1%=24: XB%=0: YB%=511: XE%=511: YE%=0:
GOSUB 630
8550 A5%=1: XB%=500: YB%=100: XE%=400: YE%=200:
GOSUB 630
8560 A5%=10: XB%=100: YB%=100: XE%=200: YE%=200:
GOSUB 630
8561 RETURN
9000 '*****************************************************
9001 A5%=3: INT1%=7: XB%=128: YB%=128: XE%=256: YE%=256:
GOSUB 630
9010 A5%=3: INT1%=16: XB%=256: YB%=128: XE%=384: YE%=256:
GOSUB 630
9020 A5%=3: INT1%=96: XB%=256: YB%=256: XE%=384: YE%=384:
GOSUB 630
9030 A5%=3: INT1%=24: XB%=128: YB%=256: XE%=256: YE%=386:
GOSUB 630
9031 RETURN
9032 '********************************************************
9040 A5%=3: INT1%=32: XB%=0: YB%=0: XE%=511: YE%=511:
GOSUB 630
9050 A5%=3: INT1%=7: XB%=104: YB%=104: XE%=127: YE%=407:
GOSUB 630
9060 A5%=3: INT1%=7: XB%=104: YB%=104: XE%=407: YE%=127:
GOSUB 630
9070 A5%=3: INT1%=7: XB%=104: YB%=384: XE%=407: YE%=407:
GOSUB 630
9080 A5%=3: INT1%=7: XB%=384: YB%=104: XE%=407: YE%=407:
GOSUB 630
9090 A5%=3: INT1%=24: XB%=150: YB%=150: XE%=173: YE%=361:
GOSUB 630
9100 A5%=3: INT1%=24: XB%=150: YB%=150: XE%=361: YE%=173:
GOSUB 630
9110 A5%=3: INT1%=24: XB%=150: YB%=338: XE%=361: YE%=361:
GOSUB 630
9120 A5%=3: INT1%=24: XB%=338: YB%=150: XE%=361: YE%=361:
GOSUB 630
9130 A5%=3: INT1%=96: XB%=196: YB%=196: XE%=219: YE%=315:
GOSUB 630
9140 A5%=3: INT1%=96: XB%=196: YB%=196: XE%=315: YE%=219:
GOSUB 630
9150 A5%=3: INT1%=96: XB%=196: YB%=292: XE%=315: YE%=315:
GOSUB 630
9160 A5%=3: INT1%=96: XB%=292: YB%=196: XE%=315: YE%=315:
GOSUB 630
9170 A5%=3: INT1%=7: XB%=242: YB%=242: XE%=269: YE%=269:
GOSUB 630
9171 RETURN
9172 '*****************************************************
9180 A5%=3: INT1%=96: XB%=0: YB%=0: XE%=511: YE%=511:
GOSUB 630
9190 A5%=1: XB%=96: YB%=96: XE%=159: YE%=159:
GOSUB 630
9200 A5%=1: XB%=352: YB%=352: XE%=415: YE%=415:
GOSUB 630
9210 A5%=10: XB%=96: YB%=352: XE%=159: YE%=415:
GOSUB 630
9220 A5%=10: XB%=352: YB%=96: XE%=415: YE%=159:
GOSUB 630
9230 A5%=3: INT1%=24: XB%=224: YB%=224: XE%=287: YE%=287:
GOSUB 630
9240 A5%=12: INT1%=7: XB%=159: YB%=159: XE%=224: YE%=224:
GOSUB 630
9250 A5%=12: INT1%=7: XB%=287: YB%=287: XE%=352: YE%=352:
GOSUB 630
```

-continued

BASIC PROGRAM LISTING
LD.ASC

```
9260 A5%=12: INT1%=7: XB%=159: YB%=352: XE%=224: YE%-=287:
GOSUB 630
9270 A5%=12: INT1%=7: XB%=287: YB%=224: XE%=352: YE%=159:
GOSUB 630
9271 RETURN
9272 '********************************************************
9280 A5%=3: INT1%=96: XB%=0: YB%=0: XE%=511: YE%=511:
GOSUB 630
9300 A5%=12: INT1%=7: XB%=5: YB%=6: XE%=252: YE%=253:
GOSUB 630
9310 A5%=12: INT1%=7: XB%=259: YB%=260: XE%=506: YE%=507:
GOSUB 630
9320 A5%=12: INT1%=7: XB%=5: YB%=507: XE%=252: YE%=260:
GOSUB 630
9330 A5%=12: INT1%=7: XB%=259: YB%=253: XE%=506: YE%=6:
GOSUB 630
9340 A5%=12: INT1%=96: XB%=5: YB%=5: XE%=252: YE%=252:
GOSUB 630
9350 A5%=12: INT1%=96: XB%=259: YB%=259: XE%=506: YE%=506:
GOSUB 630
9360 A5%=12: INT1%=96: XB%=5: YB%=506: XE%=252: YE%=259:
GOSUB 630
9370 A5%=12: INT1%=96: XB%=259: YB%=252: XE%=506: YE%=5:
GOSUB 630
9380 A5%=12: INT1%=24: XB%=5: YB%=4: XE%=252: YE%=251:
GOSUB 630
9390 A5%=12: INT1%=24: XB%=259: YB%=258: XE%=506: YE%=505:
GOSUB 630
9400 A5%=12: INT1%=24: XB%=5: YB%=505: XE%=252: YE%=258:
GOSUB 630
9410 A5%=12: INT1%=24: XB%=259: YB%=251: XE%=506: YE%=4:
GOSUB 630
9420 A5%=3: INT1%=7: XB%=0: YB%=0: XE%=511: YE%=0:
GOSUB 630
9430 A5%=3: INT1%=7: XB%=0: YB%=0: XE%=0: YE%=511:
GOSUB 630
9440 A5%=3: INT1%=7: XB%=511: YB%=0: XE%=511: YE%=511:
GOSUB 630
9450 A5%=3: INT1%=7: XB%=0: YB%=511: XE%=511: YE%=511:
GOSUB 630
9460 A5%=3: INT1%=96: XB%=1: YB%=1: XE%=510: YE%=1:
GOSUB 630
9470 A5%=3: INT1%=96: XB%=1: YB%=1: XE%=1: YE%=510:
GOSUB 630
9480 A5%=3: INT1%=96: XB%=510: YB%=1: XE%=510: YE%=510:
GOSUB 630
9490 A5%=3: INT1%=96: XB%=1: YB%=510: XE%=510: YE%=510:
GOSUB 630
9500 A5%=3: INT1%=24: XB%=2: YB%=2: XE%=509: YE%=2:
GOSUB 630
9510 A5%=3: INT1%=24: XB%=2: YB%=2: XE%=2: YE%=509:
GOSUB 630
9520 A5%=3: INT1%=24: XB%=509: YB%=2: XE%=509: YE%=509:
GOSUB 630
9530 A5%=3: INT1%=24: XB%=2: YB%=509: XE%=509: YE%=509:
GOSUB 630
9540 A5%=3: INT1%=7: XB%=3: YB%=3: XE%=508: YE%=3:
GOSUB 630
9550 A5%=3: INT1%=7: XB%=3: YB%=3: XE%=3: YE%=508:
GOSUB 630
9560 A5%=3: INT1%=7: XB%=508: YB%=3: XE%=508: YE%=508:
GOSUB 630
9570 A5%=3: INT1%=7: XB%=3: YB%=508: XE%=508: YE%=508:
GOSUB 630
9580 A5%=3: INT1%=96: XB%=4: YB%=4: XE%=507: YE%=4:
GOSUB 630
9590 A5%=3: INT1%=96: XB%=4: YB%=4: XE%=4: YE%=507:
GOSUB 630
9600 A5%=3: INT1%=96: XB%=507: YB%=4: XE%=507: YE%=507:
GOSUB 630
9610 A5%=3: INT1%=96: XB%=4: YB%=507: XE%=507: YE%=507:
GOSUB 630
9620 A5%=3: INT1%=24: XB%=5: YB%=5: XE%=506: YE%=5:
GOSUB 630
9630 A5%=3: INT1%=24: XB%=5: YB%=5: XE%=5: YE%=506:
GOSUB 630
9640 A5%=3: INT1%=24: XB%=506: YB%=5: XE%=506: YE%=506:
```

BASIC PROGRAM LISTING
LD.ASC

```
GOSUB 630
9650 A5%=3: INT1%=24: XB%=5: YB%=506: XE%=506: YE%=506:
GOSUB 630
9660 A5%=12: INT1%=7: XB%=192: YB%=128: XE%=319: YE%=128:
GOSUB 630
9670 A5%=12: INT1%=96: XB%=193: YB%=129: XE%=318: YE%=129:
GOSUB 630
9680 A5%=12: INT1%=24: XB%=194: YB%=130: XE%=317: YE%=130:
GOSUB 630
9690 A5%=12: INT1%=7: XB%=200: YB%=136: XE%=311: YE%=136:
GOSUB 630
9700 A5%=12: INT1%=96: XB%=201: YB%=137: XE%=310: YE%=137:
GOSUB 630
9710 A5%=12: INT1%=24: XB%=202: YB%=138: XE%=309: YE%=138:
GOSUB 630
9720 A5%=12: INT1%=7: XB%=208: YB%=144: XE%=303: YE%=144:
GOSUB 630
9730 A5%=12: INT1%=96: XB%=209: YB%=145: XE%=302: YE%=145:
GOSUB 630
9740 A5%=12: INT1%=24: XB%=210: YB%=146: XE%=301: YE%=146:
GOSUB 630
9750 A5%=12: INT1%=7: XB%=216: YB%=152: XE%=295: YE%=152:
GOSUB 630
9760 A5%=12: INT1%=96: XB%=217: YB%=153: XE%=294: YE%=153:
GOSUB 630
9770 A5%=12: INT1%=24: XB%=218: YB%=154: XE%=293: YE%=154:
GOSUB 630
9780 A5%=12: INT1%=7: XB%=224: YB%=160: XE%=287: YE%=160:
GOSUB 630
9790 A5%=12: INT1%=96: XB%=225: YB%=161: XE%=286: YE%=161:
GOSUB 630
9800 A5%=12: INT1%=24: XB%=226: YB%=162: XE%=285: YE%=162:
GOSUB 630
9810 A5%=12: INT1%=7: XB%=232: YB%=168: XE%=279: YE%=168:
GOSUB 630
9820 A5%=12: INT1%=96: XB%=233: YB%=169: XE%=278: YE%=169:
GOSUB 630
9830 A5%=12: INT1%=24: XB%=234: YB%=170: XE%=277: YE%=170:
GOSUB 630
9840 A5%=12: INT1%=7: XB%=240: YB%=176: XE%=271: YE%=176:
GOSUB 630
9850 A5%=12: INT1%=96: XB%=241: YB%=177: XE%=270: YE%=177:
GOSUB 630
9860 A5%=12: INT1%=24: XB%=242: YB%=178: XE%=269: YE%=178:
GOSUB 630
9870 A5%=12: INT1%=7: XB%=248: YB%=184: XE%=263: YE%=184:
GOSUB 630
9890 A5%=12: INT1%=96: XB%=249: YB%=185: XE%=262: YE%=185:
GOSUB 630
9900 A5%=12: INT1%=24: XB%=250: YB%=186: XE%=261: YE%=186:
GOSUB 630
9910 A5%=3: INT1%=7: XB%=255: YB%=192: XE%=256: YE%=192:
GOSUB 630
9920 A5%=3: INT1%=7: XB%=255: YB%=420: XE%=256: YE%=420:
GOSUB 630
9930 A5%=12: INT1%=7: XB%=250: YB%=426: XE%=261: YE%=426:
GOSUB 630
9940 A5%=12: INT1%=96: XB%=249: YB%=427: XE%=262: YE%=427:
GOSUB 630
9950 A5%=12: INT1%=24: XB%=248: YB%=428: XE%=263: YE%=428:
GOSUB 630
9960 A5%=12: INT1%=7: XB%=242: YB%=434: XE%=269: YE%=434:
GOSUB 630
9970 A5%=12: INT1%=96: XB%=241: YB%=435: XE%=270: YE%=435:
GOSUB 630
9980 A5%=12: INT1%=24: XB%=240: YB%=436: XE%=271: YE%=436:
GOSUB 630
9990 A5%=12: INT1%=7: XB%=234: YB%=442: XE%=277: YE%=442:
GOSUB 630
10000 A5%=12: INT1%=96: XB%=233: YB%=443: XE%=278: YE%=443:
GOSUB 630
10010 A5%=12: INT1%=24: XB%=232: YB%=444: XE%=279: YE%=444:
GOSUB 630
10020 A5%=12: INT1%=7: XB%=226: YB%=450: XE%=285: YE%=450:
GOSUB 630
10030 A5%=12: INT1%=96: XB%=225: YB%=451: XE%=286: YE%=451:
GOSUB 630
```

BASIC PROGRAM LISTING
LD.ASC

```
10040 A5%=12: INT1%=24: XB%=224: YB%=452: XE%=287: YE%=452:
GOSUB 630
10050 A5%=12: INT1%=7: XB%=218: YB%=458: XE%=293: YE%=458:
GOSUB 630
10060 A5%=12: INT1%=96: XB%=217: YB%=459: XE%=294: YE%=459:
GOSUB 630
10070 A5%=12: INT1%=24: XB%=216: YB%=460: XE%=295: YE%=460:
GOSUB 630
10080 A5%=12: INT1%=7: XB%=210: YB%=466: XE%=301: YE%=466:
GOSUB 630
10090 A5%=12: INT1%=96: XB%=209: YB%=467: XE%=302: YE%=467:
GOSUB 630
11000 A5%=12: INT1%=24: XB%=208: YB%=468: XE%=303: YE%=468:
GOSUB 630
11010 A5%=12: INT1%=7: XB%=202: YB%=474: XE%=309: YE%=474:
GOSUB 630
11020 A5%=12: INT1%=96: XB%=201: YB%=475: XE%=310: YE%=475:
GOSUB 630
11030 A5%=12: INT1%=24: XB%=200: YB%=476: XE%=311: YE%=476:
GOSUB 630
11040 A5%=12: INT1%=7: XB%=194: YB%=482: XE%=317: YE%=482:
GOSUB 630
11050 A5%=12: INT1%=96: XB%=193: YB%=483: XE%=318: YE%=483:
GOSUB 630
11059 A5%=12: INT1%=24: XB%=192: YB%=484: XE%=319: YE%=484:
GOSUB 630
11060 A5%=3: INT1%=24: XB%=248: YB%=248: XE%=263: YE%=263:
GOSUB 630
11061 RETURN
11062 '********************************************************
11070 A5%=3: INT1%=7: XB%=0: YB%=0: XE%=511: YE%=256:
GOSUB 630
11080 A5%=3: INT1%=96: XB%=0: YB%=256: XE%=511: YE%=511:
GOSUB 630
11090 A5%=3: INT1%=24: XB%=256: YB%=128: XE%=352: YE%=256:
GOSUB 630
12000 A5%=3: INT1%=16: XB%=352: YB%=128: XE%=432: YE%=256:
GOSUB 630
12010 A5%=12: INT1%=0: XB%=256: YB%=256: XE%=296: YE%=296:
GOSUB 630
12020 A5%=12: INT1%=0: XB%=256: YB%=255: XE%=296: YE%=295:
GOSUB 630
12030 A5%=12: INT1%=0: XB%=256: YB%=257: XE%=296: YE%=297:
GOSUB 630
12040 A5%=12: INT1%=0: XB%=296: YB%=296: XE%=392: YE%=296:
GOSUB 630
12050 A5%=12: INT1%=0: XB%=296: YB%=295: XE%=392: YE%=295:
GOSUB 630
12060 A5%=12: INT1%=0: XB%=296: YB%=397: XE%=392: YE%=297:
GOSUB 630
12070 A5%=12: INT1%=0: XB%=392: YB%=296: XE%=352: YE%=256:
GOSUB 630
12080 A5%=12: INT1%=0: XB%=392: YB%=295: XE%=352: YE%=255:
GOSUB 630
12090 A5%=12: INT1%=0: XB%=392: YB%=297: XE%=352: YE%=257:
GOSUB 630
13000 A5%=12: INT1%=0: XB%=256: YB%=256: XE%=352: YE%=256:
GOSUB 630
13010 A5%=12: INT1%=0: XB%=256: YB%=255: XE%=352: YE%=255:
GOSUB 630
13020 A5%=12: INT1%=0: XB%=256: YB%=257: XE%=352: YE%=257:
GOSUB 630
13030 A5%=12: INT1%=0: XB%=256: YB%=128: XE%=256: YE%=256:
GOSUB 630
13040 A5%=12: INT1%=0: XB%=256: YB%=127: XE%=256: YE%=255:
GOSUB 630
13050 A5%=12: INT1%=0: XB%=256: YB%=129: XE%=256: YE%=257:
GOSUB 630
13060 A5%=12: INT1%=0: XB%=256: YB%=128: XE%=432: YE%=128:
GOSUB 630
13070 A5%=12: INT1%=0: XB%=256: YB%=127: XE%=432: YE%=127:
GOSUB 630
13080 A5%=12: INT1%=0: XB%=256: YB%=129: XE%=432: YE%=129:
GOSUB 630
13090 A5%=12: INT1%=0: XB%=352: YB%=128: XE%=352: YE%=256:
GOSUB 630
14000 A5%=12: INT1%=0: XB%=352: YB%=127: XE%=352: YE%=255:
```

BASIC PROGRAM LISTING
LD.ASC

```
GOSUB 630
14010 A5%=12: INT1%=0: XB%=352: YB%=129: XE%=352: YE%=257:
GOSUB 630
14020 A5%=12: INT1%=0: XB%=392: YB%=296: XE%=432: YE%=256:
GOSUB 630
14030 A5%=12: INT1%=0: XB%=392: YB%=295: XE%=432: YE%=255:
GOSUB 630
14040 A5%=12: INT1%=0: XB%=392: YB%=297: XE%=432: YE%=257:
GOSUB 630
14050 A5%=12: INT1%=0: XB%=432: YB%=256: XE%=432: YE%=128:
GOSUB 630
14060 A5%=12: INT1%=0: XB%=432: YB%=255: XE%=432: YE%=127:
GOSUB 630
14070 A5%=12: INT1%=0: XB%=432: YB%=257: XE%=432: YE%=129:
GOSUB 630
14080 A5%=12: INT1%=127: XB%=12: YB%=480: XE%=12: YE%=496:
GOSUB 630
14090 A5%=12: INT1%=127: XB%=12: YB%=496: XE%=16: YE%=500:
GOSUB 630
15000 A5%=12: INT1%=127: XB%=16: YB%=500: XE%=32: YE%=500:
GOSUB 630
15010 A5%=12: INT1%=127: XB%=32: YB%=500: XE%=36: YE%=496:
GOSUB 630
15020 A5%=12: INT1%=127: XB%=36: YB%=496: XE%=36: YE%=480:
GOSUB 630
15030 A5%=12: INT1%=127: XB%=36: YB%=480: XE%=32: YE%=476:
GOSUB 630
15040 A5%=12: INT1%=127: XB%=32: YB%=476: XE%=16: YE%=476:
GOSUB 630
15050 A5%=12: INT1%=127: XB%=16: YB%=476: XE%=12: YE%=480:
GOSUB 630
15060 A5%=12: INT1%=127: XB%=6: YB%=476: XE%=12: YE%=480:
GOSUB 630
15070 A5%=12: INT1%=12-1: XB%=6: YB%=500: XE%=12: YE%=496:
GOSUB 630
15080 A5%=12: INT1%=127: XB%=12: YB%=506: XE%=16: YE%=500:
GOSUB 630
15090 A5%=12: INT1%=127: XB%=36: YB%=506: XE%=32: YE%=500:
GOSUB 630
16000 A5%=12: INT1%=127: XB%=42: YB%=500: XE%=36: YE%=496:
GOSUB 630
16010 A5%=12: INT1%=127: XB%=36: YB%=470: XE%=32: YE%=476:
GOSUB 630
16020 A5%=12: INT1%=127: XB%=12: YB%=470: XE%=16: YE%=476:
GOSUB 630
16030 A5%=12: INT1%=127: XB%=42: YB%=476: XE%=36: YE%=480:
16031 RETURN
16032 '***********************************************************
40000 END
```

BASIC PROGRAM LISTING
FTR.ASC

```
10      LPRINT "FTR2.ASC"      '8/15/84    REV.8/22/4    09:30"
20      'PREFILTER THE DATABASE IMAGE
30              OPEN "R", #1, "PRESENT.BIN",128
40              FIELD 1,128 AS IA$
50      'SET UP INTEGETER CONSTANTS FOR SPEED
60      K1=1/256
70      K2=1/8
80      K3=1/32
90      RC1=0    'INITIALIZE TO ZERO
100     F5%=66              'INPUT "NUMBER OF LINES TO BE
FILTERED";F5%
110 '   INPUT "ENABLE SMOOTHING PRINTOUTS; 'Y' OR 'N'"; A15$
120 '   INPUT "ENABLE STORING PRINTOUTS; 'Y' OR 'N'"; A16$
130 '   PRINT   "SELECT FIXED WEIGHTS"
140 '   INPUT   " SELECT STANDARD WEIGHTS;    'Y' OR 'N'"; A1$
150 '   IF A1$ = "N" THEN 680
160 '   PRINT: PRINT
170 '   PRINT "        SELECT" , " 1 "," 2   "," 3 ": PRINT
180 '   PRINT                    , "2 4 2", "4 6 4", "8 8 8"
190 '   PRINT                    , "4 8 4", "6 8 6", "8 8 8"
200 '   PRINT                    , "2 4 2", "4 6 4", "8 8 8"
210     A1%=3   'PRINT: INPUT "SELECT WEIGHTS '1', '2', OR '3'"; A1%
```

BASIC PROGRAM LISTING
FTR.ASC

```
220     ON A1% GOTO 260, 290, 320
230     PRINT "*************************"
240     PRINT "IMPROPER WEIGHT SELECTION, MAKE ANOTHER SELECTION"
250     PRINT "*************************": PRINT: PRINT: PRINT:
GOTO 130
260     W1% = 2: W2% = 4: W3% = 2                   'WEIGHT KERNEL 1
270     W4% = 4: W5% = 8: W6% = 4
280     W7% = 2: W8% = 4: W9% = 2: GOTO 390
290     W1% = 4: W2% = 6: W3% = 4                   'WEIGHT KERNEL 2
300     W4% = 6: W5% = 8: W6% = 6
310     W7% = 4: W8% = 6: W9% = 4: GOTO 390
320     W1% = 8: W2% = 8: W3% = 8                   'WEIGHT KERNEL 3
330     W4% = 8: W5% = 8: W6% = 8
340     W7% = 8: W8% = 8: W9% = 8: GOTO 390
350     PRINT: PRINT    "INPUT FIXED WEIGHTS"
360     INPUT   "INPUT WEIGHTS; W1, W2, W3"; W1%, W2%, W3%
370     INPUT   "INPUT WEIGHTS; W4, W5, W6"; W4%, W5%, W6%
380     INPUT   "INPUT WEIGHTS; W7, W8, W9"; W7%, W8%, W9%
390     WTS1%=W1%+W2%+W3%+W4%+W5%+W6%+W7%+W8%+W9%       'WEIGHT SCALE FACTOR
400     WTS2=1/WTS1%                                                'RECIPROCAL WEIGHT SCALE FACTOR
410     PRINT: PRINT ,"  WEIGHTS SELECTED": PRINT
420     PRINT ,"W1=";W1%, "W2=";W2%, "W3=";W3%
430     PRINT ,"W4=";W4%, "W5=";W5%, "W6=";W6%
440     PRINT ,"W7=";W7%, "W8=";W8%, "W9=";W9%, "WTS1=";WTS1%: PRINT
450     WRR2% = 0: WRG2% = 0: WRB2% = 0: S1%=0: S2%=0
460     FOR KRLP1% = 1 TO F5%     'KERNEL ROW LOOP
465     IF KRLP1% > 1 THEN TST$="Y" ELSE TST$="N"
470     LPRINT "START KERNEL ROW=";KRLP1%
480     FOR KPLP1% = 1 TO 512    'KERNEL PIXEL LOOP
490     GOSUB 1820      'TERMINAL INPUT
500     XB% = KPLP1%: YB% = KRLP1%
510     XE% = XB% + 2: YE% = YB% + 2
520     X = (XB%/128)    'FIND PIXEL COORDINATE FOR RECORD LOCATION
530     BDC = XB%: IF BDC <=128 THEN 570
540     BDC = ABS(BDC-128)      'FIND BEGINNING DATA COUNT IN RECORD
550     'IF TST$ = "Y" THEN PRINT "PIXEL LOOP ";KPLP1%
560     IF BDC>128 THEN GOTO 540
570     FOR OUTLP1% = YB% TO YE%         'LINE LOOP
580     OUT 236,1
590     GOSUB 1820
600     GOSUB 2180      'DEFINE RECORD NO.
610     'IF TST$ = "Y" THEN PRINT "OUTLP1% ";OUTLP1%
620     'IF TST% = "Y" THEN PRINT "RC ";RC
630     IF (RC >4) AND (RC < 261) THEN 640 ELSE 710
640     RC = RC-4       'SUBTRACT 4 SO LINES GO FROM 1-64
650     IF TOGL$="T" THEN 660 ELSE 860
660        CLOSE #1
670        OPEN "R",#1,"PRESENT.BIN",128 'REOPEN PRESENT FILE IF ANOTHER
680        FIELD 1,128 AS IA$      ' FILE WAS USED
690        TOGL$ ="F"
700     GOTO 860
710     IF RC < 5 THEN 720 ELSE 790
720     'GET RECORD FROM PREVIOUS FILE
730        CLOSE #1
740        OPEN "R",#1,"PRIOR.BIN",128
750        FIELD 1,128 AS IA$
760        TOGL$ = "T"      'FILE MUST BE OPEN FOR INNER LOOP
770        RC=252+RC        'SET RC TO LAST LINE IN PRIOR FILE
780        GOTO 860         'GET RECORD FROM FILE
790     'ELSE
800     'GET RECORD FROM NEXT FILE
810        CLOSE #1
820        OPEN "R",#1, "NEXT.BIN",128
830        FIELD 1,128 AS IA$
840        TOGL$ = "T"      'FILE MUST BE OPEN FOR INNER LOOP
850        RC=RC-260        'SET RC TO FIRST LINE IN NEXT ;FILE
860     GET #1,RC
870     FOR INLP1% = XB% TO XE% STEP 2    'PIXEL LOOP
880     OUT 236,1: OUT 236,0
890     '         CHECK FOR EVEN BYTE STARTING ADDRESS
900     IF A15$="Y" THEN GOSUB 1970
910        IF (INLP1% = XB% ) AND ((XB% MOD 2) = 0) THEN DC=BDC-1
920        IF (INLP1% = XB% ) AND ((XB% MOD 2) <> 0) THEN DC = BDC
930     A$=MID$ (IA$,DC,2) :' GET 2 BYTES
940 'X    IF CVI(A$) = 0 THEN K%=0: GOTO 1220
```

BASIC PROGRAM LISTING
FTR.ASC

```
950      K% = CVI(A$)
960      PIXA% = K% AND 255 : ' GET FIRST BYTE
970      PIXB% = K% * k1 : 'GET SECOND BYTE
975      'IF TST$ = "Y" THEN PRINT "PIXA%, PIXB% ";PIXA%,PIXB%
980 'X   OUT 236,16: OUT 236,0
990      ' UNPACK RED, GREEN, AND BLUE INTENSITIES
1000     IF S1%=0 THEN 1010 ELSE 1020
1010     RDG2%=PIXB% AND 7: RDR2%=(PIXB% AND 24) *K2: RDB2%=(PIXB% AND 96) *K3
1020     RDG1%=PIXA% AND 7: RDR1%=(PIXA% AND 24) *K2: RDB1%=(PIXA% AND 96) *K3
1030 'X  OUT 236,16: OUT 236,0
1040     S3%=OUTLP1%-YB%+1: ON S3% GOTO 1060, 1070, 1080
1050              LPRINT "ERROR AT LINE 1610
1060              WS1%=W1%: WS2%=W2%: WS3%=W3%: GOTO 1090
1070              WS1%=W4%: WS2%=W5%: WS3%=W6%: GOTO 1090
1080              WS1%=W7%: WS2%=W8%: WS3%=W9%
1090 'X  'X OUT 236,16: OUT 236,0
1100     IF S1%=0 THEN 1140
1110     WRR2% = RDR1%*WS3% + WRR2%
1120     WRG2% = RDG1%WS3% + WQRG2%
1130     WRB2% = RDB1%*WS3% + WRB2%:                     GOTO 1170
1140     WRR2% = RDR1%*WS1% + RDR2%*WS2% + WRR2%
1150     WRG2% = RDG1%*WS1% + RDG2%*WS2% + WRG2%
1160     WRB2% = RDB1%*WS1% + RDB2%*WS2% + WRB2%: S1%=1
1170 'X  OUT 236,16: OUT 236,0
1180     DC=DC+2: IF DC>=128 THEN 1190 ELSE 1200 'UPDATE DATA COUNT
1190     DC=1: RC=RC+1: GET #1,RC            'CONDITIONALLY UPDATE RECORD COUNT
1200     NEXT INLP1%
1210     S1%=0
1220     NEXT OUTLP1%
1230     OUT 236,16
1240     IF S2%>0 THEN 1280
1250     S2%=1
1260     WRR1%=WRR2%*WTS2: WRG1%=WRG2%*WTS2: WRB1%=WRB2%*WTS2
1270     IF A15S="Y" THEN GOSUB 1270: GOTO 1310
1280     WRR2%=WRR2%*WTS2: WRG2%=WRG2%*WTS2: WRB2%=WRB2%*WTS2
1290     IF A15S="Y" THEN GOSUB 2000
1300     S2%=0: GOSUB 1410             'STORE
1310     WRR2%=0: WRG2%=0: WRB2%=0
1320     OUT 236,0
1330     NEXT KPLP1%
1340     NEXT KRLP1%
1350'    CLOSE #1
1360'    OPEN "R",#2, "FILTERED.BIN",128
1370'    FIELD 2,128 AS IB$
1380'    PUT #2,RC1
1390     CLOSE
1400     SYSTEM
1410
'----------------------------------------------------------
1420     '
1430     '          CODE TO PUT NEW BYTES TO SPECIFIED WRITE FILE
1440     '                THE NEW BYTES SHOULD BE IN THE WRITE VARIABLES
1450     '
1460     '          CLOSE READ FILE AND OPEN WRITE FILE
1470     '
1480     '
1490     '     CALCULATIONS FOR EXACT PIXEL LOCATION
1500     XX=XB%: YY=YB%
1510     X = (XX/128) : 'FIND PIXEL COORDINATE FOR RECORD LOCATION
1520     BDC = XX: IF BDC <=128 THEN 1550       'MODULO 128
1530     BDC = ABS(BDC-128)      :'FIND BEGINNING DATA COUNT IN RECORD
1540     IF BDC>128 THEN GOTO 1530
1550     DC2 =BDC
1560     OUTLP1%=YY
1570     GOSUB 2180      'GET RECORD NO.
1580     'RC0=RC
1590     'IF TST$ = "Y" THEN PRINT "RC1, RC0 ";RC1,RC0
1600     'IF RC1 = RC0 THEN 1710
1610     CLOSE #1
1620     OPEN "R",#2,"FILTERED.BIN",128
1630     FIELD 2,128 AS IB$
1640     'IF RC1=0 THEN 1660
1645      ' IB$=IB2$
1650       'PUT #2,RC1: 'PRINT "EXECUTED PUT ";CVI(IB$)
```

BASIC PROGRAM LISTING
FTR.ASC

```
1660      GET #2,RC
1665      'IB2$=IB$
1670      'RC1 = RC0
1680      'CLOSE #2
1690      'OPEN "R",#1,"PRESENT.BIN",128
1700      'FIELD 1,128 AS IA$
1710      ' PACK RED, GREEN, BLUE COLORS INTO THEIR RESPECTIVE BYTES
1720              WR1% = WRG1% OR 8 * WRR1%
1730              WR1% = WR1% OR 32 * WRB1%
1740              WR2% = WRG2% OR 8 * WRR2%
1750              WR2% = WR2% OR 32 * WRB2%
1760      N3 = (WR2%*256) OR WR1%         ' PACK 2 BYTES INTO 1 WORD
1770      A$ = MKI$ (N3)
1780      'PRINT "N3 ";N3
1790      MID$(IB$,DC2,2) =A$
1795      'PRINT "A$ ";CVI(A$)
1796      PUT #2,RC
1797      CLOSE #2
1798      OPEN "R",#1,"PRESENT.BIN",128
1799      FIELD 1,128 AS IA$
1800      RETURN
1810      '
1820
'*********************************************************
1830      'SUBROUTINE TO INTERROGATE TERMINAL
1840      A7%=INP (93): A8%=INP (92)
1850      A7%=A7% AND 2: IF A7%=0 THEN 1940       'DATA READY TEST
1860      A8%=A8% AND 127                         'MASK PARITY BIT
1870      A9%=A8% XOR 127: IF A9%=0 THEN 1930 ELSE 1940    'DELETE TO CP/M
1880      CLOSE #1
1890      OPEN "R",#2,"FILTERED.BIN",128
1900      FIELD 2,128 AS IB$
1910      PUT #2,RC1
1920      CLOSE
1930          SYSTEM
1940      RETURN
1950
'*************************************************************
1960      '*******
1970      LPRINT: LPRINT: LPRINT "LINE 342": GOTO 2030
1980      '*******
1990      LPRINT: LPRINT: LPRINT "LINE 1265": GOTO 2030
2000      '*******
2010      LPRINT: LPRINT: LPRINT "LINE 2025": GOTO 2030
2020      '*******
2030      LPRINT "KRLP1=";KRLP1%, "KPLP1=";KPLP1%,
"OUTLP1=";OUTLP1%, "INLP1="; INLP1%
2040      LPRINT "XB=";XB%, "YB=";YB%, "XE=";XE%, "YE=";YE%
2050      LPRINT "DC=";DC, "RC=";RC, "S1=";S1%, "S2=";S2%, "S3=";S3%
2060      LPRINT "RDG1=";RDG1%, "RDR1=";RDR1%, "RDB1=";RDB1%
2070      LPRINT "RDG2=";RDG2%, "RDR2=";RDR2%, "RDB2=";RDB2%
2080      LPRINT "WRG1=";WRG1%, "WRR1=";WRR1%, "WRB1=";WRB1%
2090      LPRINT "WRG2=";WRG2%, "WRR2=";WRR2%, "WRB2=";WRB2%
2100      LPRINT "WS1=";WS1%,   "WS2=";WS2%,   "WS3=";WS3%
2110      RETURN
2120
'*************************************************************
2130      LPRINT : LPRINT : LPRINT "LINE 236"
2140      LPRINT "W1=";W1%, "W2=";W2%, "W3=";W3%
2150      LPRINT "WR=";W4%, "W5=";W5%, "W6=";W6%
2160      LPRINT "W7=";W7%, "W8=";W8%, "W9=";W9% : RETURN
2170
'*************************************************************
2180                'DEFINE RECORD NO.
2190      RC = ((OUTLP1%=1) *4) +1        '4-RECORDS/LINE, RECORD-
1 TO RECORD-4
2200          IF (X>1) AND (X<=2) THEN RC=RC+1    'CHECK FOR PIXEL
OVERFLOWING A RECORD
2210          IF (X>2) AND (X<=3) THEN RC=RC+2
2220          IF (X>3) THEN RC=RC+3
2230      RETURN
2240      END
```

DISCLOSURE DOCUMENT

A disclosure document has been filed in the U.S. Patent and Trademark office on Oct. 17, 1984 No. 131,747, which is herein incorporated by reference. This disclosure document has copies of many of the documents and specification sheets referenced herein as follows.

1. National Semiconductor specification sheet for the MM5321 synchronization generator.
2. Signetics specification sheet for the 8T95, 96, 97, 98 hex buffers/inverters.
3. National Semiconductor specification sheet for the ADC 0800 A/D converter.
4. Texas Instruments specification sheet for the TMS-4016 RAM.
5. TRW specification sheet for the TDC1016J-8, TDC1016J-9, TDC1016J-10 video D/A converters.
6. Mitsubishi Electric specification sheet for the M58725P, S;P-15, S-15, RAMs.
7. Computer Compatible Joystick Instruction sheet.
8. CompuPro CPU 8085/88 Technical Manual.
9. Viewpoint/3A Plus User's Manual.
10. CompuPro RAM 17 Technical Manual.
11. CompuPro RAM 16 Technical Manual.
12. CompuPro 8080 Multi-User Monitor program listing.
13. CompuPro System Support 1 User Manual.
14. International Instrumentation Incorporated Universal Disk Enclosures manual.
15. Siemens OEM Floppy Disk Drive FDD 100-8 manual.
16. CompuPro Disk 1 User Manual.

TABLE OF CONTENTS

ABSTRACT
CROSS-REFERENCE TO RELATED APPLICATIONS
BACKGROUND OF THE INVENTION
FIELD OF THE INVENTION
PRIOR ART
SUMMARY OF THE INVENTION
BRIEF DESCRIPTION OF THE DRAWINGS
GRAPHICS PROCESSOR
SPATIAL FILTERING
   General
   Description of FIG. 7A and the FTR.ASC Listing
   Filtering of Images
MEMORY ARCHITECTURE
   General
   Brief Description
   Re-Addressing and Scanout Memory Architecture
   Memory Enhancement
   Memory Map Display Architecture
   Image Memory
   Improved IC Memory Chip
   Memory Logical Design
   Other Memory Configurations
BUFFER MEMORY
   General
   FIFO Buffer Memory Architecture
   Kernel Memory Operations
   Blanked and Unblanked Memory Operations
   ⅔rds Buffer Memory Architecture
   Other Buffer Configurations
EXPERIMENTAL SYSTEM
EXPERIMENTAL SYSTEM ARCHITECTURE
   General Description
   Supervisory Processor Interface
   Image Loading
   Software
   Circuit Boards
   Cable List
   S-100 Bus System
LOGIC BOARD
   Control Logic
   Address Generators
MEMORY BOARDS
BUFFER BOARD
   General
   ⅔ Buffer Implementation
   Buffer Memory Address Counters
   Line Buffer Memory
   Kernel Logic
   Weight Logic
REAR-END BOARD
CIRCUIT SPECIFICATIONS
DISCLOSURE DOCUMENT
CLAIMS

LIST OF TABLES

BUFFER MEMORY MULTIPLEXER ASSIGNMENT TABLE
VIDEO DAC CONNECTION TABLE
COMPUTER PORT TABLE
PORT-A CONTROL PORT
PORT-B ADDRESS/DATA PORT
PORT-C DESTINATION SELECT PORT
DESTINATION SELECT ASSIGNMENTS
CABLE CONNECTION TABLE
CABLE-I BM1,2/BL1 (C1)
CABLE-II BM1,2/BL1/BB1 (C2)
CABLE-III BR1/BL1/BB1 (C3)
CABLE-IV BR1/BL1/BB1 (C4)
CABLE-V BL1/COMPUTER PORT-A CONTROL (C5)
CABLE-VI BL1/COMPUTER PORT-B ADDRESS/DATA (C6)
CABLE-VII BL1/COMPUTER PORT-C REGISTER SELECT (C7)
TABLE OF DIP LAYOUT ON BOARDS
BOARD-BM1,2 MEMORY BOARD
BOARD-BB1 BUFFER BOARD
BOARD-BL1 LOGIC BOARD
MEMORY TABLE-A TO MEMORY TABLE-D
MEMORY TABLE-A
MEMORY TABLE-B
MEMORY TABLE-C
MEMORY TABLE-D
BASIC PROGRAM LISTING GRAPH.ASC
BASIC PROGRAM LISTING LD.ASC
BASIC PROGRAM LISTING FTR.ASC

What I claim is:

1. A kernel processor system comprising:

a first line buffer storing a first line of display information;

a second line buffer storing a second line of display information;

a third line buffer storing a third line of display information;

an input circuit coupled to the first line buffer, coupled to the second line buffer, and coupled to the third line buffer and writing the first line of display information into the first line buffer;

a first output circuit coupled to the second line buffer and outputting the second line of display information from the second line buffer;

a second output circuit coupled to the third line buffer and outputting the third line of display information from the third line buffer;

a kernel memory coupled to the first output circuit and coupled to the second output circuit and storing a kernel of display information in response to the second line of display information output by the first output circuit and in response to the third line of display information output by the second output circuit; and a kernel processor coupled to the kernel memory and generating a line of spatially filtered display information in response to the kernel of display information stored by the kernel memory.

2. A kernel processor system comprising:

a first line buffer storing a first line of display information;

a second line buffer storing a second line of display information;

a third line buffer storing a third line of display information;

an input circuit coupled to the first line buffer and writing the first line of display information into the first line buffer;

a control circuit coupled to the first line buffer, coupled to the second line buffer, and coupled to the third line buffer and distributing the first line of display information from the first line buffer to the second line buffer and the second line of display information from the second line buffer to the third line buffer;

a first output circuit coupled to the second line buffer and outputting the second line of display information stored by the second line buffer;

a second output circuit coupled to the third line buffer and outputting the third line of display information stored by the third line buffer;

a kernel memory coupled to the first output circuit and coupled to the second output circuit and storing a kernel of display information in response to the second line of display information output by the first output circuit and in response to the third line of display information output by the second output circuit; and a kernel processor coupled to the kernel memory and generating a line of spatially filtered display information in response to the kernel of display information stored by the kernel memory.

3. A kernel processor system comprising:

a first line buffer storing a first line of display information;

a second line buffer storing a second line of display information;

a third line buffer storing a third line of display information;

an input circuit coupled to the first line buffer and writing the first line of display information into the first line buffer;

a first output circuit coupled to the second line buffer and outputting the second line of display information from the second line buffer;

a second output circuit coupled to the third line buffer and outputting the third line of display information from the third line buffer;

a multiplexing circuit coupled to the first line buffer, coupled to the second line buffer, coupled to the third line buffer, coupled to the first output circuit and coupled to the second output circuit and distributing the first line of display information written into the first line buffer by the input circuit in sequence to the first output circuit and to the second output circuit to output the second line of display information and to output the third line of display information;

a kernel memory coupled to the first output circuit and coupled to the second output circuit and storing a kernel of display information in response to the second line of display information output by the first output circuit and in response to the third line of display information output by the second output circuit; and a kernel processor coupled to the kernel memory and generating a line of spatially filtered display information in response to the kernel of display information stored by the kernel memory.

4. A kernel processor system as set forth in claim 1, wherein the kernel memory comprises a kernel of registers coupled to the first output circuit and coupled to the second output circuit and storing the kernel of display information with the kernel of registers in response to the second line of display information output by the first output circuit and in response to the third line of display information output by the second output circuit.

5. A kernel processor system as set forth in claim 1, wherein the kernel processor comprises:

a plurality of multiplier circuits coupled to receive the kernel of display information stored by the kernel memory, the plurality of multiplier circuits generating product information in response to the received kernel of display information; and a plurality of adder circuits coupled to receive the product information generated by the plurality of multiplier circuits, the plurality of adder circuits generating the line of spatially filtered display information by summing the received product information.

6. A kernel processor system as set forth in claim 1, wherein the kernel processor comprises:

a weight circuit generating filter weight information;

a plurality of multiplier circuits coupled to receive the kernel of display information stored by the kernel memory and coupled to receive filter weight information generated by the weight circuit, the plurality of multiplier circuits generating product information in response to the received kernel of display information and in response to the received filter weight information; and a plurality of adder circuits coupled to receive the product information generated by the plurality of multiplier circuits, the plurality of adder circuits generating the line of spatially filtered display information by summing the received product information.

7. A kernel processor system as set forth in claim 1, further comprising a display monitor coupled to receive the line of spatially filtered display information generated by the kernel processor, the display monitor displaying a filtered image in response to the line of spatially filtered display information.

8. A kernel processor system comprising:

a first line buffer storing a first line of display information;

a second line buffer storing a second line of display information;

a third line buffer storing a third line of display information;

an input circuit coupled to the first line buffer and writing the first line of display information into the first line buffer;

a double buffer precessional circuit coupled to the first line buffer, coupled to the second line buffer, and coupled to the third line buffer; the double buffer precessional circuit precessing the first line of display information written into the first line buffer by the input circuit from the first line buffer, to the second line buffer as the second line of display information, and to the third line buffer as the third line of display information, a first output circuit coupled to the second line buffer and outputting the second line of display information from the second line buffer;

a second output circuit coupled to the third line buffer and outputting the third line of display information from the third line buffer;

a kernel memory coupled to the first output circuit and coupled to the second output circuit and storing a kernel of display information in response to the second line of display information output by the first output circuit and in response to the third line of display information output by the second output circuit; and a kernel processor coupled to the kernel memory and generating a line of spatially filtered display information in response to the kernel of display information stored by the kernel memory.

9. A kernel processor system comprising:

a plurality of memories including a first memory, a second memory, and a third memory;

an input circuit coupled to the first memory, to the second memory, and to the third memory and writing a first sequence of input words into the first memory, writing a second sequence of input words into the second memory, and writing a third sequence of input words into the third memory;

a first output circuit coupled to the second memory and outputting a first sequence of output words from the second memory;

a second output circuit coupled to the third memory and outputting a second sequence of output words from the third memory;

a kernel memory coupled to the first output circuit and coupled to the second output circuit and storing a kernel of output words in response to the first sequence of output words generated by the first output circuit and in response to the second sequence of output words generated by the second output circuit; and a kernel processor coupled to the kernel memory and generating a sequence of spatially filtered output words in response to the kernel of output words stored by the kernel memory.

10. A kernel processor system as set forth in claim 9, wherein the kernel memory comprises a kernel of registers coupled to the first output circuit and coupled to the second output circuit and storing the kernel of output words, the kernel of registers storing the kernel of output words in response to the first sequence of output words generated by the first output circuit and in response to the second sequence of output words generated by the second output circuit.

11. A kernel processor system as set forth in claim 9, wherein the kernel processor comprises:

a plurality of multiplier circuits coupled to receive the kernel of output words stored by the kernel memory, the plurality of multiplier circuits generating product words in response to the received kernel of output words; and a plurality of adder circuits coupled to receive the product words generated by the plurality of multiplier circuits, the plurality of adder circuits summing the received plurality of product words and generating the sequence of spatially filtered output words in response to a sum of the received product words.

12. A kernel processor system as set forth in claim 9, wherein the kernel processor comprises:

a weight circuit generating filter weight information;

a plurality of multiplier circuits coupled to receive the kernel of output words stored by the kernel memory and coupled to receive filter weight information generated by the weight circuit, the plurality of multiplier circuits generating product words in response to the received kernel of output words and in response to the received filter weight information; and a plurality of adder circuits coupled to receive the product words generated by the plurality of multiplier circuits, the plurality of adder circuits summing the received plurality of product words and generating the sequence of spatially filtered output words in response to a sum of the received product words.

13. A kernel processor system as set forth in claim 9, further comprising a display monitor coupled to receive the sequence of spatially filtered output words generated by the kernel processor, the display monitor displaying a spatially filtered image in response to the received sequence of spatially filtered output words.

14. A kernel processor system comprising:

a plurality of memories including a first memory storing a first sequence of words, a second memory storing a second sequence of words, and a third memory storing a third sequence of words;

an input circuit coupled to the first memory and writing the first sequence of words into the first memory;

a double buffer precessional circuit coupled to the first memory, coupled to the second memory, and coupled to the third memory, the double buffer precessional circuit precessing the first memory, the second memory, and the third memory;

a first output circuit coupled to the second memory and outputting a first sequence of output words from the second memory;

a second output circuit coupled to the third memory and outputting a second sequence of output words from the third memory;

a kernel memory coupled to receive the first sequence of output words output by the first output circuit and coupled to receive the second sequency of output words output by the second output circuit, the kernel memory storing a kernel of output words in response to the received first sequence of output words and in response to the received second sequence of output words; and a kernel processor coupled to the kernel memory and generating a sequence of spatially filtered output words in response to the kernel of output words stored by the kernel memory.

15. A kernel processor system comprising:

a plurality of memories including a first memory, a second memory, a third memory, and a fourth memory;

an input circuit coupled to the first memory, coupled to the second memory, coupled to the third memory, and coupled to the fourth memory, the input circuit writing a first sequence of input words into the first memory, writing a second sequence of input words into the second memory, writing a third sequence of input words into the third memory, writing a fourth sequence of input words into the fourth memory;

an output circuit coupled to the second memory, coupled to the third memory, and coupled to the fourth memory and outputting a first sequence of output words from the second memory, outputting a second sequence of output words from the third memory, and outputting a third sequence of output words from the fourth memory simultaneously with the writing of the first sequence of input words into the first memory by the input circuit;

a kernel memory coupled to the output circuit and storing a kernel of output words in response to the first sequence of output words, in response to the second sequence of output words, and in response to the third sequence of output words; and a kernel processor coupled to the kernel memory and generating a sequence of spatially filtered output words in response to the kernel of output words stored by the kernel memory.

16. A kernel processor system as set forth in claim 15, wherein the kernel memory comprises a kernel of registers coupled to the output circuit and storing the kernel of output words with the kernel of registers in response to the first sequence of output words, in response to the second sequence of output words, and in response to the third sequence of output words.

17. A kernel processor system as set forth in claim 15, wherein the kernel processor comprises:

a plurality of multiplier circuits coupled to receive the kernel of output words stored by the kernel memory, the plurality of multiplier circuits generating product words in response to the received kernel of output words; and a plurality of adder circuits coupled to receive the product words generated by the plurality of multiplier circuits, the plurality of adder circuits summing the received plurality of product words and generating the sequence of spatially filtered output words in response to a sum of the received product words.

18. A kernel processor system as set forth in claim 15, wherein the kernel processor comprises:

a weight circuit generating filter weight information;

a plurality of multiplier circuits coupled to receive the kernel of output words stored by the kernel memory and coupled to receive filter weight information generated by the weight circuit, the plurality of multiplier circuits generating product words in response to the received kernel of output words and in response to the received filter weight information; and a plurality of adder circuits coupled to receive the product words generated by the plurality of multiplier circuits, the plurality of adder circuits summing the received plurality of product words and generating the sequence of spatially filtered output words in response to a sum of the received product words.

19. A kernel processor system as set forth in claim 15, further comprising a display monitor coupled to receive the sequence of spatially filtered output words generated by the kernel processor, the display monitor displaying a filtered image in response to the received sequence of spatially filtered output words.

20. A kernel processor system comprising:

a plurality of memories including a first memory storing first information, a second memory storing second information, a third memory storing third information, and a fourth memory storing fourth information;

an input circuit coupled to the first memory and writing the first information into the first memory;

a double buffer precessional circuit coupled to the first memory, coupled to the second memory, coupled to the third memory, and coupled to the fourth memory, the double buffer precessional circuit precessing the first memory, the second memory, the third memory, and the fourth memory;

an output circuit coupled to the second memory, coupled to the third memory, and coupled to the fourth memory and outputting a first sequence of output words from the second memory, outputting a second sequence of output words from the third memory, and outputting a third sequence of output words from the fourth memory simultaneously with the writing of the first information into the first memory by the input circuit;

a kernel memory coupled to the output circuit and storing a kernel of output words in response to the first sequence of output words, in response to the second sequence of output words, and in response to the third sequence of output words; and a kernel processor coupled to the kernel memory and generating a sequence of spatially filtered output words in response to the kernel of output words stored by the kernel memory.

21. A kernel processor system comprising:

an input circuit generating input information;

a buffer memory storing buffered information;

a write address circuit generating write addresses;

a buffer memory write access circuit coupled to receive input information generated by the input circuit and coupled to receive write addresses generated by the write address circuit, the buffer memory write access circuit writing buffered information into the buffer memory in response to the received input information and in response to the received write addresses;

a read address circuit generating read addresses;

a buffer memory read access circuit coupled to receive buffered information stored by the buffer memory and coupled to receive read addresses generated by the read address circuit, the buffer memory read access circuit generating buffered output information in response to the received buffered information and in response to the received read addresses;

a kernel memory coupled to receive the buffered output information generated by the buffer memory read access circuit, the kernel memory storing a kernel of information in response to the received buffered output information;

a kernel processor coupled to receive the kernel of information stored by the kernel memory, the kernel processor generating filtered output information in response to the received kernel of information; and a display monitor coupled to receive filtered output information generated by the kernel processor, the display monitor displaying a filtered image in response to the received filtered output information.

22. A kernel processor system comprising:

a plurality of memories including a first memory, a second memory, a third memory, and a fourth memory storing sequences of words;

an input circuit coupled to the first memory, coupled to the second memory, coupled to the third memory, and coupled to the fourth memory and writing a first sequence of words into the first memory, writing a second sequence of words into the second memory, writing a third sequence of words into the third memory, and writing a forth sequence of words into the fourth memory;

an output circuit coupled to the second memory, to the third memory and to the fourth memory and outputting a first sequence of output words from the second memory, outputting a second sequence of output words from the third memory, and outputting a third sequence of output words from the fourth memory simultaneously with the writing of the first sequence of words into the first memory by the input circuit; and a kernel processor coupled to receive the first sequence of output words output by the output circuit, coupled to receive the second sequence of output words output by the output circuit, and coupled to receive the third sequence of output words output by the output circuit, the kernel processor generating a filtered sequence of output words in response to the received first sequence of output words, in response to the received second sequence of output words, and in response to the received third sequence of output words.

23. A kernel processor system comprising:

a plurality of memories including a first memory storing a first sequence of words, a second memory storing a second sequence of words, a third memory storing a third sequence of words, and a fourth memory storing storing a forth sequence of words;

an input circuit coupled to the first memory and writing the first sequence of words into the first memory;

a control circuit coupled to the first memory, coupled to the second memory, coupled to the third memory, and coupled to the fourth memory, the control circuit distributing the first sequence of words from the first memory, to the second memory, then to the third memory, and then to the fourth memory;

an output circuit coupled to the second memory, coupled to the third memory, and coupled to the fourth memory and outputting a first sequence of output words in response to the second sequence of words stored by the second memory, outputting a second sequence of output words in response to the third sequence of words stored by the third memory, and outputting a third sequence of output words in response to the fourth sequence of words stored by the fourth memory simultaneously with the writing of the first sequence of words into the first memory by the input circuit; and a kernel processor coupled to receive the first sequence of output words output by the output circuit, coupled to receive the second sequence of output words output by the output circuit, and coupled to receive the third sequence of output words output by the output circuit, the kernel processor generating a filtered sequence of output words in response to the received first sequence of output words, in response to the received second sequence of output words, and in response to the received third sequence of output words.

24. A kernel processor system comprising:

a plurality of memories including a first memory, a second memory, a third memory, and a fourth memory, each storing a sequence of words;

an input circuit coupled to the first memory and writing a sequence of words into the first memory;

a multiplexing circuit coupled to the first memory, coupled to the second memory, coupled to the third memory, coupled to the fourth memory, and coupled to the input circuit, the multiplexing circuit distributing a sequence of words from the input circuit through the plurality of memories;

an output circuit coupled to the second memory, to the third memory and to the fourth memory and outputting a first sequence of output words from the second memory, outputting a second sequence of output words from the third memory, and outputting a third sequence of output words from the fourth memory simultaneously with the writing of the sequence of words into the first memory by the input circuit; and a kernel processor coupled to receive the first sequence of output words output by the output circuit, coupled to receive the second sequence of output words output by the output circuit, and coupled to receive the third sequence of output words output by the output circuit, the kernel processor generating a filtered sequence of output words in response to the received first sequence of output words, in response to the received second sequence of output words, and in response to the received third sequence of output words.

25. A kernel processor system as set forth in claim 22, further comprising a control circuit coupled to the input circuit and coupled to the output circuit, the control circuit controlling the input circuit for writing the first sequence of words into the first memory at a first word rate, and the control circuit controlling the output circuit for outputting the first sequence of output words, the second sequence of output words, and the third sequence of output words at a second word rate, wherein the first word rate is higher than the second word rate.

26. A kernel processor system as set forth in claim 22, further comprising a control circuit coupled to the input circuit and coupled to the output circuit, the control circuit controlling the input circuit for writing the first sequence of words into the first memory at a first word rate, and outputting the first sequence of output words, the second sequence of output words, and the third sequence of output words by the output circuit at a second word rate, wherein the first word rate is lower than the second word rate.

27. A kernel processor system as set forth in claim 22, wherein the kernel processor comprises:

a plurality of multiplier circuits coupled to receive the first sequence of output words output by the second memory, coupled to receive the second sequence of output words output by the third memory, and coupled to receive the third sequence of output words output by the fourth memory; the plurality of multiplier circuits generating product words in response to the received first sequence of output words, in response to the received second sequence of output words, and in response to the received third sequence of output words; and a plurality of adder circuits coupled to receive the product words generated by the plurality of multiplier circuits, the plurality of adder circuits generating the filtered sequence of output words by summing the received product words.

28. A kernel processor system as set forth in claim 22, wherein the kernel processor comprises:

a weight circuit generating filter weight information;

a plurality of multiplier circuits coupled to receive the first sequence of output words output by the second memory, coupled to receive the second sequence of output words output by the third memory, coupled to receive the third sequence of output words output by the fourth memory, and coupled to receive filter weight information generated by the weight circuit; the plurality of multiplier circuits generating product words in response to the received first sequence of output words, in response to the received second sequence of output words, in response to the received third sequence of output words, and in response to the received filter weight information; and a plurality of adder circuits coupled to receive the product words generated by the plurality of multiplier circuits, the plurality of adder circuits generating the filtered sequence of output words by summing the received product words.

29. A kernel processor system as set forth in claim 22, further comprising a display monitor coupled to receive the filtered sequence of output words generated by the kernel processor, the display monitor displaying a filtered image in response to the filtered sequence of output words.

30. A kernel processor system comprising:

a plurality of memories including a first memory, a second memory, a third memory, and a fourth memory storing sequences of words;

an input circuit coupled to the first memory and writing a first sequence of words into the first memory;

a double buffer precessional circuit coupled to the first memory, coupled to the second memory, coupled to the third memory, and coupled to the fourth memory, the double buffer precessional circuit precessing the first memory, the second memory, the third memory, and the fourth memory;

an output circuit coupled to the second memory, coupled to the third memory, and coupled to the fourth memory, the output circuit outputting a first sequence of output words from the second memory, outputting a second sequence of output words from the third memory, and outputting a third sequence of output words from the fourth memory simultaneously with the writing of the first sequence of words into the first memory by the input circuit; and a kernel processor coupled to receive the first sequence of output words output by the double buffer precessional circuit, coupled to receive the second sequence of output words output by the double buffer precessional circuit, and coupled to receive the third sequence of output words output by the double buffer precessional circuit, the kernel processor generating a filtered sequence of output words in response to the received first sequence of output words, in response to the received second sequence of output words, and in response to the received third sequence of output words.

31. A process of operating a kernel processor system comprising the acts of:

generating input information;

storing buffered information in a buffer memory;

generating write addresses;

writing the buffered information into the buffer memory in response to the input information and in response to the write addresses;

generating read addresses;

generating buffered output information in response to the buffered information stored in the buffer memory and in response to the read addresses;

storing a kernel of information in response to the buffered output information;

generating filtered output information in response to the kernel of information; and displaying a filtered image in response to the filtered output information.

32. A process of operating a kernel processor system comprising the acts of:

generating input information;

storing buffered information in a buffer memory;

generating write addresses;

writing the buffered information into the buffer memory in response to the input information and in response to the write addresses;

generating read addresses;

generating buffered output information in response to the buffered information stored in the buffer memory and in response to the read addresses;

storing a kernel of information in response to the buffered output information;

generating filtered output information in response to the kernel of information;

displaying a filtered image in response to the filtered output information; and making a product in response to the filtered output information.

33. A process of operating a kernel processor system comprising the acts of:

generating input information;

storing double buffered information in a double buffer memory;

double buffering the input information in the double buffer memory and generating double buffered output information in response to the double buffered information stored in the double buffer memory;

storing a kernel of information in response to the double buffered output information; and generating filtered output information in response to the kernel of output information.

34. A process of operating a kernel processor system comprising the acts of:

generating input information;

storing double buffered information in a double buffer memory;

double buffering the input information in the double buffer memory and generating double buffered output information in response to the double buffered information stored in the double buffer memory;

storing a kernel of information in response to the double buffered output information;

generating filtered output information in response to the kernel of output information; and making a product in response to the filtered output information.

35. A memory kernel processor comprising:

an input circuit generating input information;

a double buffer memory storing double buffered information;

a write address circuit generating write addresses;

a write access circuit coupled to receive input information generated by the input circuit and coupled to receive write addresses generated by the write address circuit, the write access circuit writing double buffered information into the double buffer memory in response to the received input information and in response to the received write addresses;

a read address circuit generating read addresses;

a read access circuit coupled to receive double buffered information stored by the double buffer memory and coupled to receive read addresses generated by the read address circuit, the read access circuit receiving the double buffered information from the double buffer memory in response to the read addresses and generating a plurality of lines of double buffered output information in response to the received double buffered information;

a kernel memory coupled to receive the plurality of lines of double buffered output information generated by the read access circuit, the kernel memory storing a kernel of information in response to the received plurality of lines of double buffered output information; and a kernel processor coupled to receive the kernel of information stored by the kernel memory, the kernel processor generating filtered output information in response to the received kernel of information.

36. A kernel processor system as set forth in claim 35, further comprising a display monitor coupled to receive filtered output information generated by the kernel processor, the display monitor displaying a filtered image in response to the received filtered output information.

37. A kernel processor system comprising:

an input circuit generating input information;

a double buffer memory storing double buffered information;

a write address circuit generating write addresses;

a write access circuit coupled to receive input information generated by the input circuit and coupled to receive write addresses generated by the write address circuit, the write access circuit writing double buffered information into the double buffer memory in response to the received input information and in response to the received write addresses;

a read address circuit generating read addresses;

a read access circuit coupled to receive double buffered information stored by the double buffer memory and coupled to receive read addresses generated by the read address circuit, the read access circuit receiving the double buffered information from the double buffer memory in response to the read addresses and generating double buffered output information in response to the received double buffered information and in response to the received read addresses;

a kernel memory coupled to receive the double buffered output information generated by the read access circuit, the kernel memory storing a kernel of information in response to the received double buffered output information; and a kernel processor coupled to receive the kernel of information stored by the kernel memory, the kernel processor generating filtered output information in response to the received kernel of information.

38. A kernel processor system as set forth in claim 37, further comprising a display monitor coupled to receive filtered output information generated by the kernel processor, the display monitor displaying a filtered image in response to the received filtered output information.

39. A process of operating a kernel processor system comprising the acts of:

generating input information;

storing double buffered information in a double buffer memory;

generating write addresses;

writing the double buffered information into the double buffer memory in response to the input information and in response to the write addresses;

generating read addresses;

generating a plurality of lines of double buffered output information in response to the double buffered information stored in the double buffer memory and in response to the read addresses;

storing a kernel of information in response to the plurality of lines of double buffered output information; and generating filtered output information in response to the kernel of information.

40. A process of operating a kernel processor system comprising the acts of:

generating input information;

storing double buffered information in a double buffer memory;

generating write addresses;

writing the double buffered information into the double buffer memory in response to the input information and in response to the write addresses;

generating read addresses;

generating a plurality of lines of double buffered output information in response to the double buffered information stored in the double buffer memory and in response to the read addresses;

storing a kernel of information in response to the plurality of lines of double buffered output information;

generating filtered output information in response to the kernel of information; and making a product in response to the filtered output information.

41. A process of operating a kernel processor system comprising the acts of:

generating input information;

storing double buffered information in a double buffer memory;

generating write addresses;

writing the double buffered information into the double buffer memory in response to the input information and in response to the write addresses;

generating read addresses;

generating double buffered output information in response to the double buffered information stored in the double buffer memory and in response to the read addresses;

storing a kernel of information in response to the double buffered output information; and generating filtered output information in response to the kernel of information.

42. A process of operating a kernel processor system comprising the acts of:

generating input information;

storing double buffered information in a double buffer memory;

generating write addresses;

writing the double buffered information into the double buffer memory in response to the input information and in response to the write addresses;

generating read addresses;

generating double buffered output information in response to the double buffered information stored in the double buffer memory and in response to the read addresses;

storing a kernel of information in response to the double buffered output information;

generating filtered output information in response to the kernel of information; and making a product in response to the filtered output information.

43. A kernel processor system comprising:

an input circuit generating an input line of display information;

a first line buffer storing a first line of display information;

a second line buffer storing a second line of display information;

a third line buffer storing a third line of display information;

a writing circuit coupled to receive the input line of display information generated by the input circuit, the writing circuit writing the first line of display information into the first line buffer in response to the received input line of display information;

a double buffered control circuit coupled to receive the first line of display information stored by the first line buffer, coupled to receive the second line of display information stored by the second line buffer, and coupled to receive the third line of display information stored by the third line buffer; the double buffered control circuit double buffering the first line of display information with the first line buffer, the second line buffer, and the third line buffer;

an output circuit coupled to the double buffered control circuit and generating a plurality of lines of double buffered display information in response to the double buffering of the first line of display information by the double buffer control circuit;

a kernel memory coupled to receive the plurality of lines of double buffered display information generated by the output circuit, the kernel memory storing a kernel of display information in response to the received plurality of lines of double buffered display information; and a kernel processor coupled to the kernel memory and generating a line of spatially filtered display information in response to the kernel of display information stored by the kernel memory.

44. A kernel processor system comprising:

an input circuit generating input information;

a double buffer memory storing double buffered information;

a double buffered control circuit coupled to receive the input information generated by the input circuit and coupled to the double buffer memory, the double buffered control circuit double buffering the received input information in the double buffer memory and generating double buffered output information in response to the double buffered information stored by the double buffer memory;

a kernel memory coupled to receive double buffered output information generated by the double buffered control circuit, the kernel memory storing a kernel of information in response to the received double buffered output information; and a kernel processor coupled to receive the kernel of information stored by the kernel memory, the kernel processor generating filtered output information in response to the received kernel of output information.

* * * * *